United States Patent
Hwang et al.

(10) Patent No.: US 11,420,518 B2
(45) Date of Patent: Aug. 23, 2022

(54) USER INTERFACE DEVICE FOR VEHICLES AND SERVICE INFORMATION PROVISION SYSTEM

(71) Applicant: LG Electronics Inc., Seoul (KR)

(72) Inventors: Inyoung Hwang, Seoul (KR); Kyoungha Lee, Seoul (KR); Kangmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 16/500,898

(22) PCT Filed: Aug. 21, 2018

(86) PCT No.: PCT/KR2018/009565
§ 371 (c)(1),
(2) Date: Oct. 4, 2019

(87) PCT Pub. No.: WO2020/040319
PCT Pub. Date: Feb. 27, 2020

(65) Prior Publication Data
US 2021/0402878 A1  Dec. 30, 2021

(51) Int. Cl.
*B60K 35/00* (2006.01)
*H04W 4/44* (2018.01)
*B60W 60/00* (2020.01)
*G06V 20/59* (2022.01)
*G06V 40/20* (2022.01)
(Continued)

(52) U.S. Cl.
CPC ....... *B60K 35/00* (2013.01); *B60W 60/00253* (2020.02); *G05D 1/0016* (2013.01); *G06Q 30/0284* (2013.01); *G06V 20/593* (2022.01); *G06V 40/20* (2022.01); *H04W 4/44* (2018.02); *B60K 2370/11* (2019.05); *B60K 2370/152* (2019.05); *B60K 2370/175* (2019.05); *B60K 2370/589* (2019.05); *G05D 2201/0213* (2013.01)

(58) Field of Classification Search
CPC ...................................................... B60K 35/00
See application file for complete search history.

(56) References Cited

U.S. PATENT DOCUMENTS

| 7,363,357 | B2 * | 4/2008 | Parupudi | H04L 29/06 709/220 |
| 10,308,430 | B1 * | 6/2019 | Brady | G05D 1/0278 |

(Continued)

FOREIGN PATENT DOCUMENTS

| CN | 111149141 | A | * | 5/2020 | G07C 5/008 |
| GB | 2540413 | A | * | 1/2017 | G07B 15/02 |
| KR | 102164396 | B1 | * | 10/2020 | |

*Primary Examiner* — Redhwan K Mawari
(74) *Attorney, Agent, or Firm* — Fish & Richardson P.C.

(57) ABSTRACT

Disclosed is a user interface device for vehicles, the user interface device including a communication device configured to wirelessly exchange a signal with at least one server, at least one display, and at least one processor configured to receive prior information of a service provided at a first point from a first server through the communication device while a vehicle moves to the first point, to output the prior information through the display, to acquire user input corresponding to the prior information, and to transmit user data based on the user input to the first server through the communication device.

12 Claims, 100 Drawing Sheets

(51) Int. Cl.
    *G05D 1/00*          (2006.01)
    *G06Q 30/02*       (2012.01)

(56)               References Cited

U.S. PATENT DOCUMENTS

| | | | |
|---|---|---|---|
| 10,332,162 B1* | 6/2019 | Brock | G06Q 30/0284 |
| 10,733,641 B2* | 8/2020 | Xu | G06F 16/951 |
| 10,957,205 B2* | 3/2021 | Li | G08G 5/0069 |
| 2012/0215437 A1* | 8/2012 | Hao | H04W 4/029 |
| | | | 701/400 |
| 2014/0039987 A1* | 2/2014 | Nerayoff | G08G 1/146 |
| | | | 705/13 |
| 2016/0078759 A1* | 3/2016 | Nerayoff | G06T 7/248 |
| | | | 701/3 |
| 2017/0147064 A1* | 5/2017 | Yang | H04L 67/38 |
| 2017/0186056 A1* | 6/2017 | Amin | G08G 1/202 |
| 2018/0129221 A1* | 5/2018 | Mandeville-Clarke | |
| | | | G08G 1/202 |
| 2018/0136655 A1* | 5/2018 | Kim | G05D 1/0011 |
| 2018/0158018 A1* | 6/2018 | Luckay | G01C 21/343 |
| 2018/0211541 A1* | 7/2018 | Rakah | G08G 1/148 |
| 2018/0239359 A1* | 8/2018 | Jian | G05D 1/0274 |
| 2018/0273032 A1* | 9/2018 | Yang | G01C 21/3415 |
| 2019/0080266 A1* | 3/2019 | Zhu | G05D 1/0217 |
| 2019/0087834 A1* | 3/2019 | Mercury | H04L 63/0861 |
| 2019/0208979 A1* | 7/2019 | Bassa | G06V 20/10 |
| 2019/0265059 A1* | 8/2019 | Warnick | G08G 1/20 |

* cited by examiner

FIG.1
10
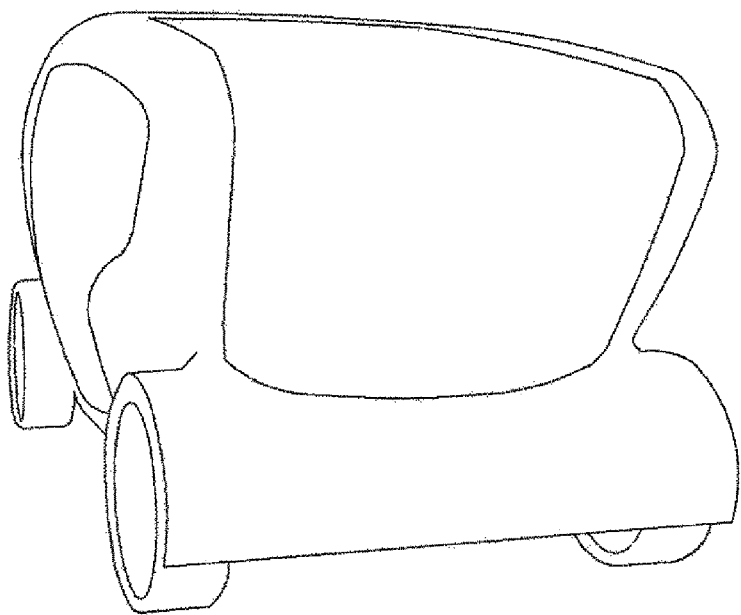
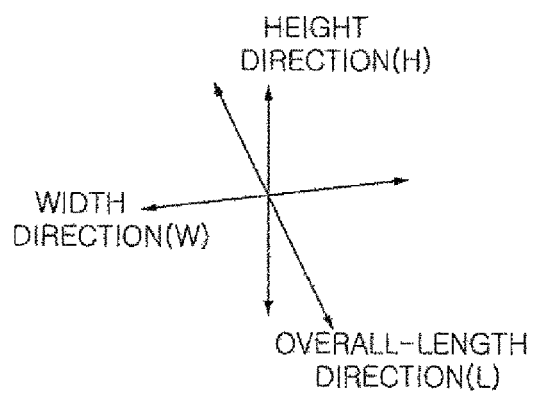

FIG. 17
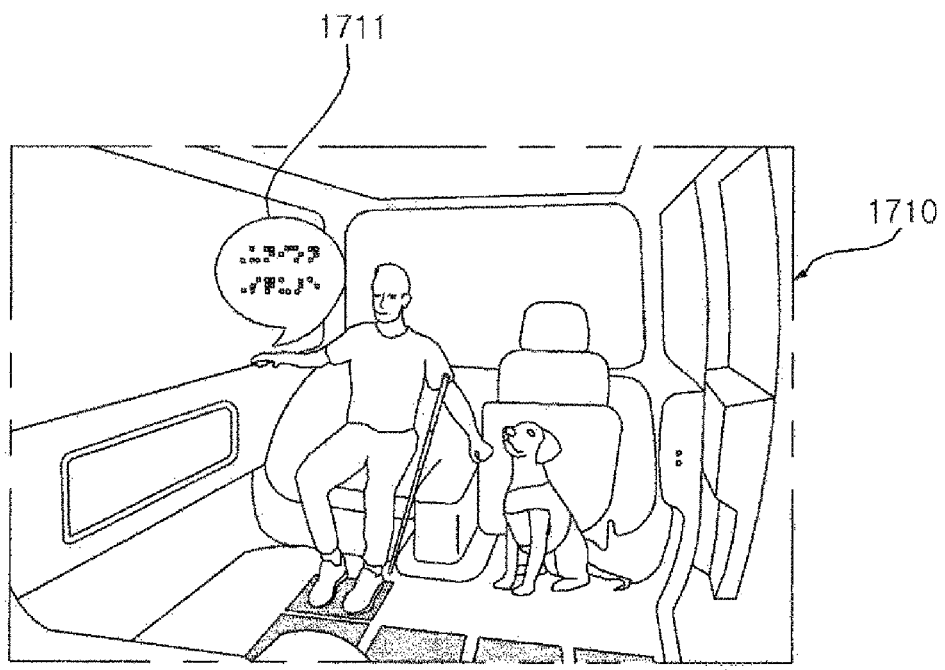
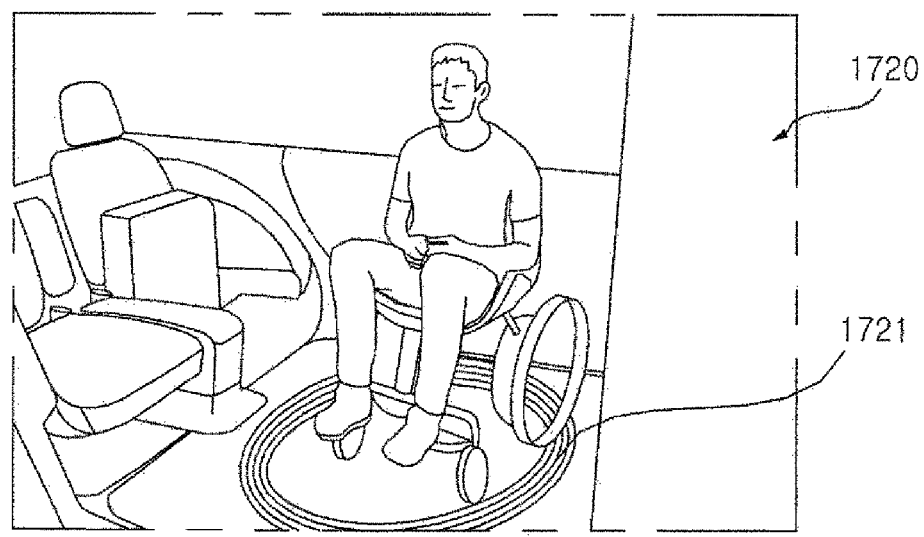

FIG. 26
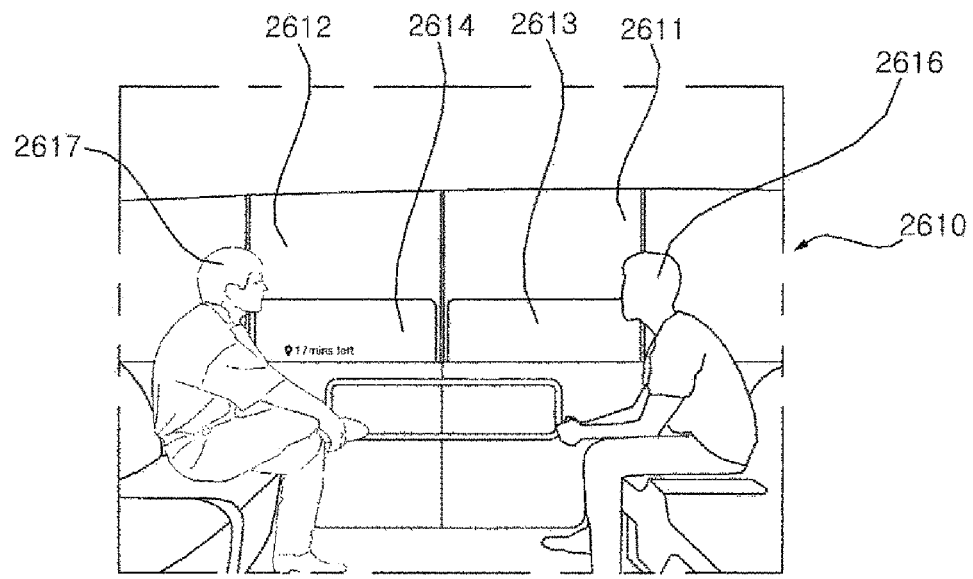
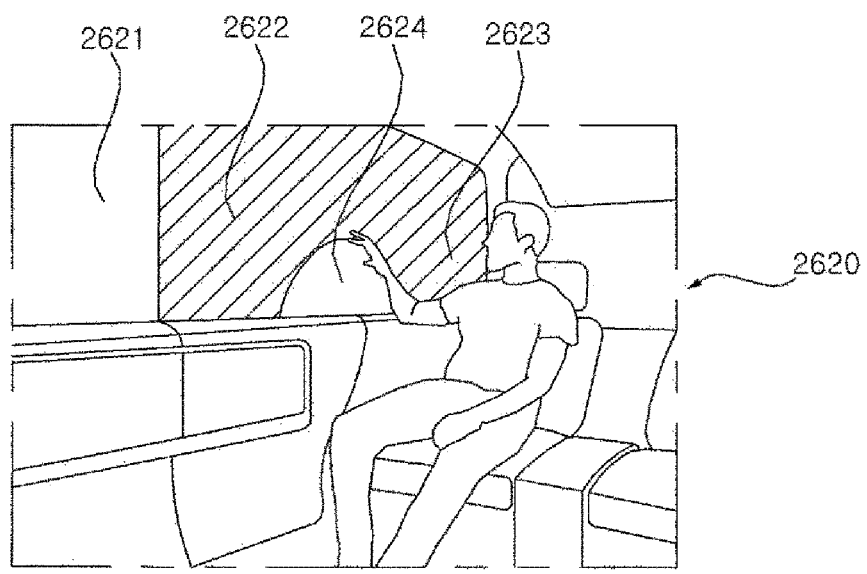

FIG. 29
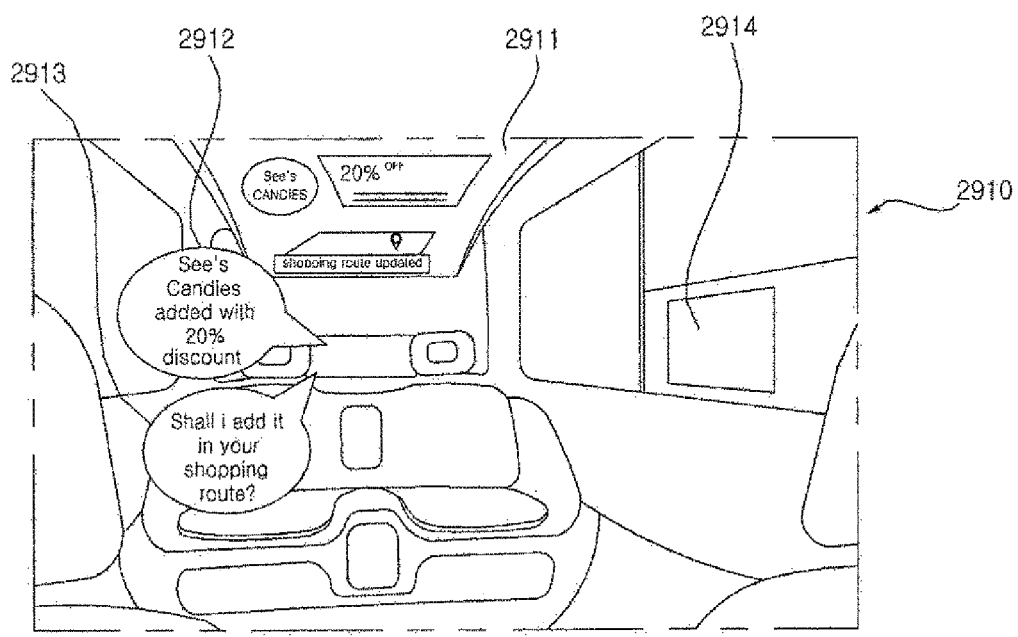
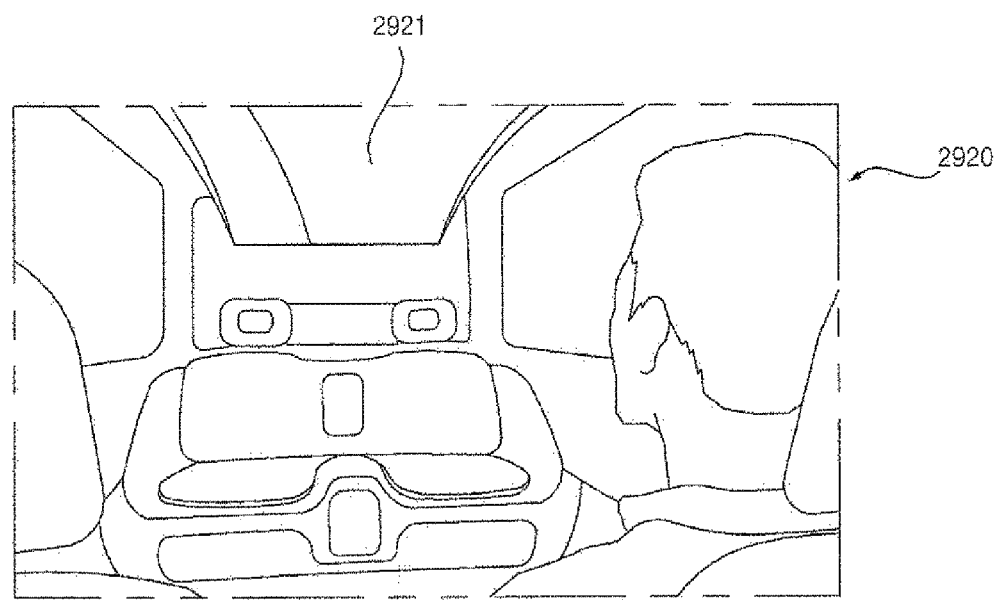

FIG. 31
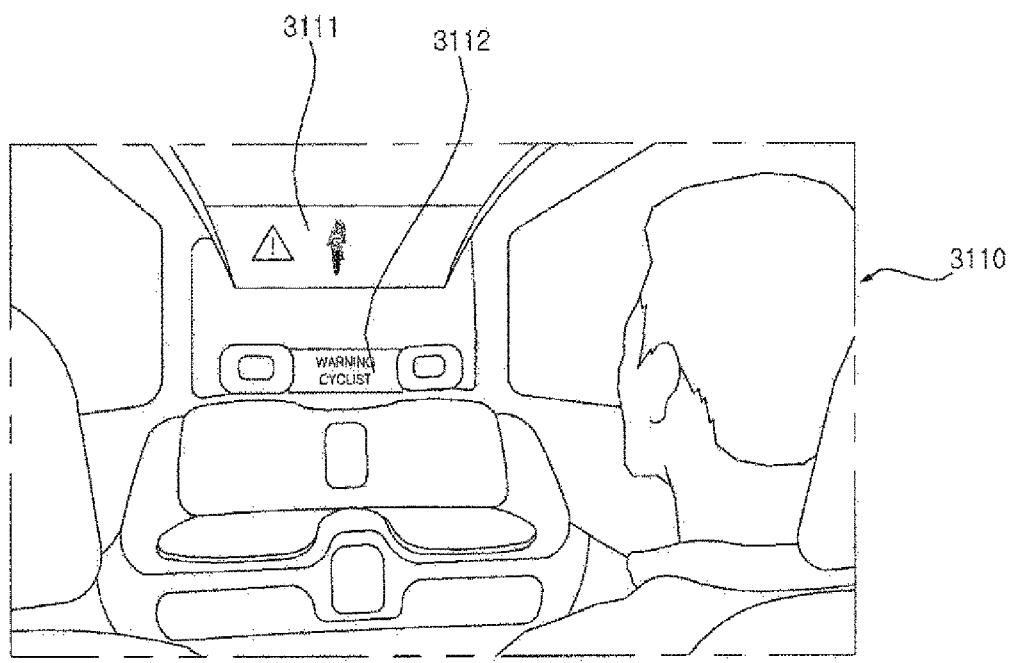
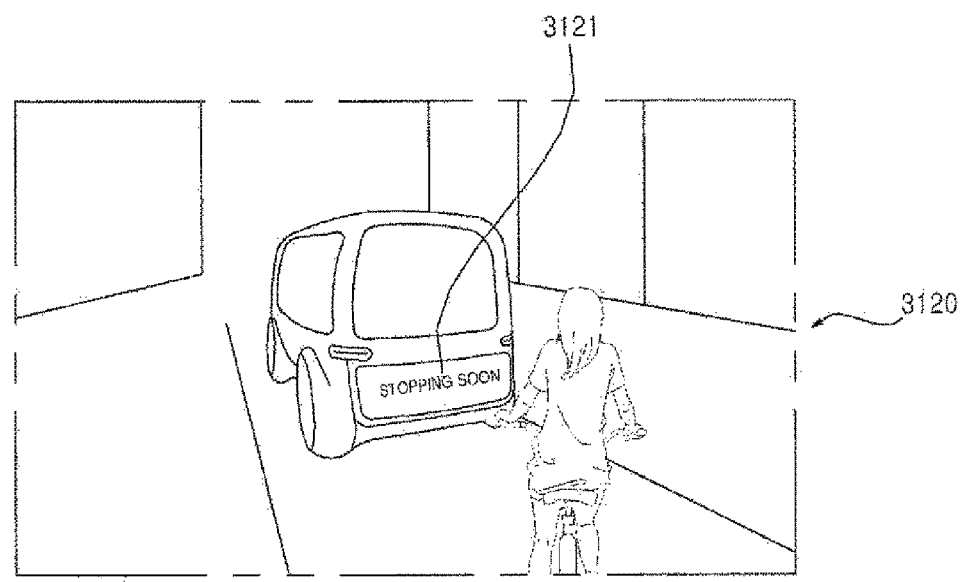

3610

FIG. 56
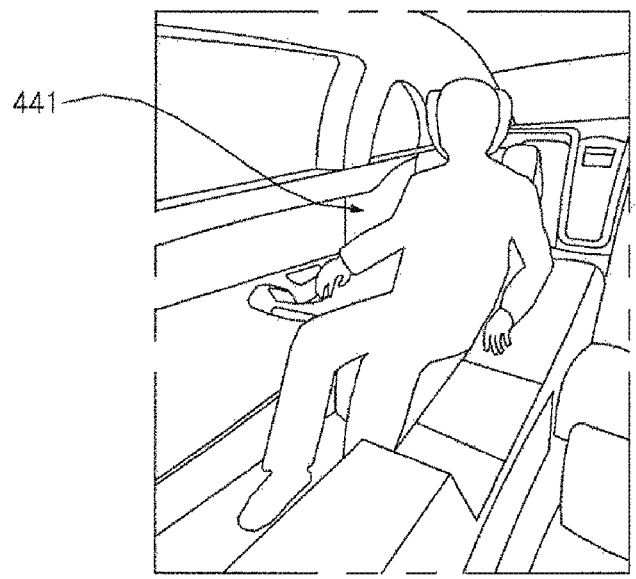
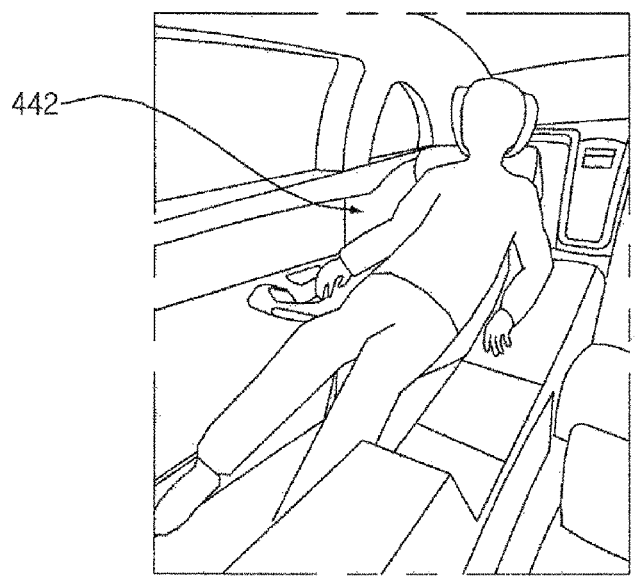

FIG. 59
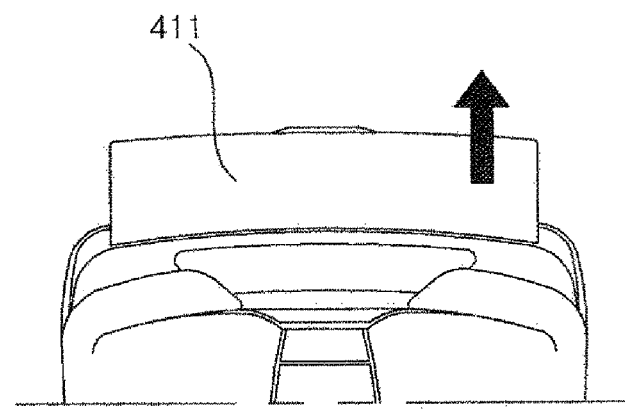
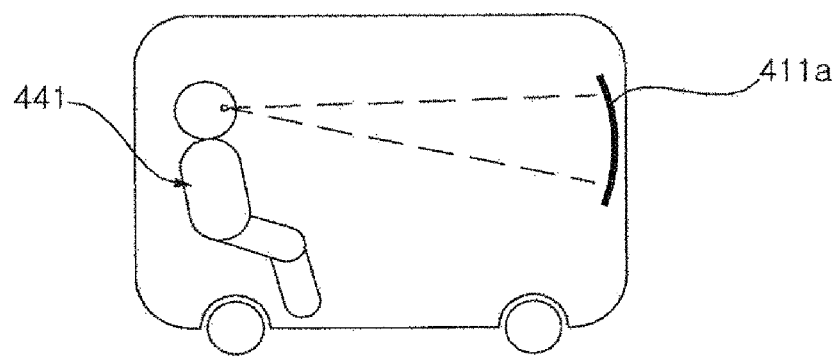
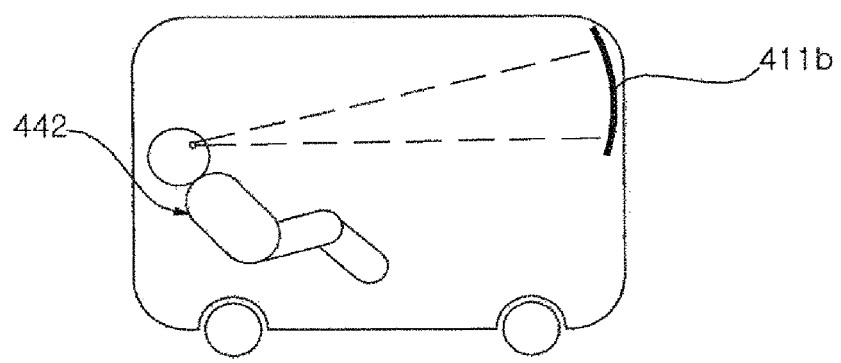

FIG. 61
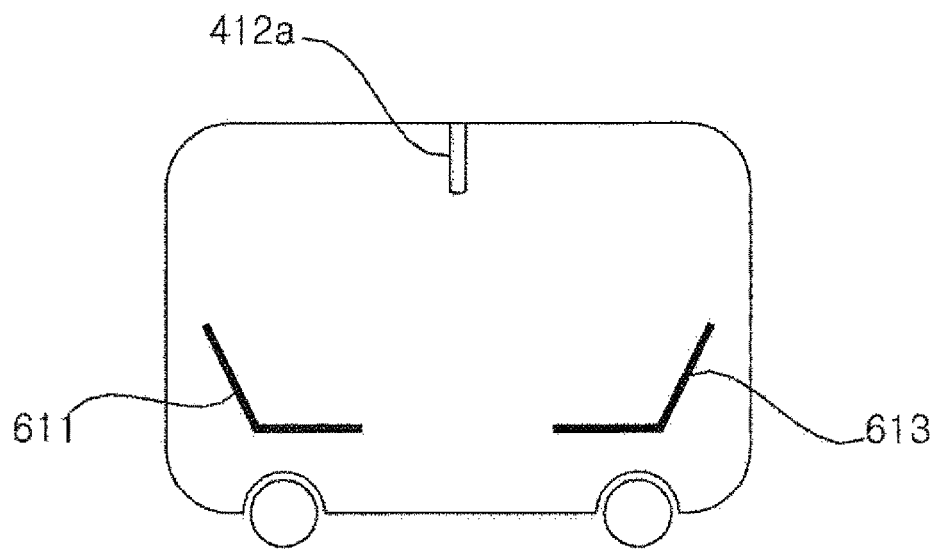
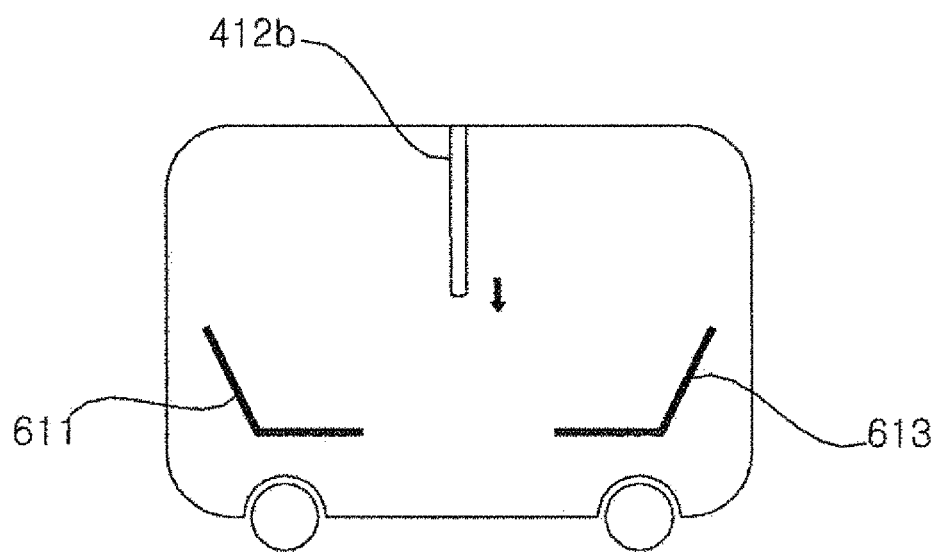

FIG. 62
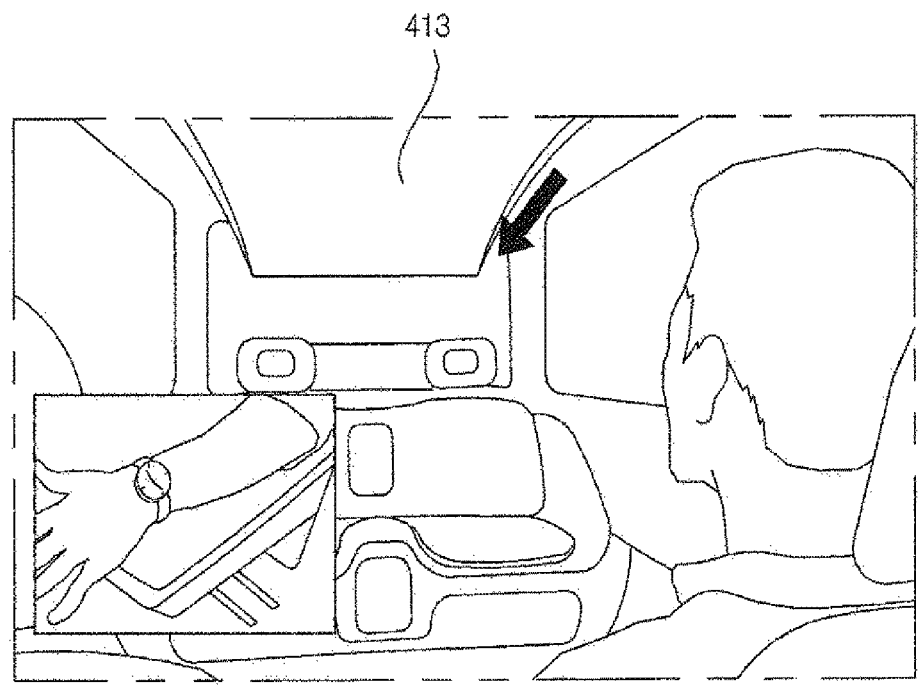
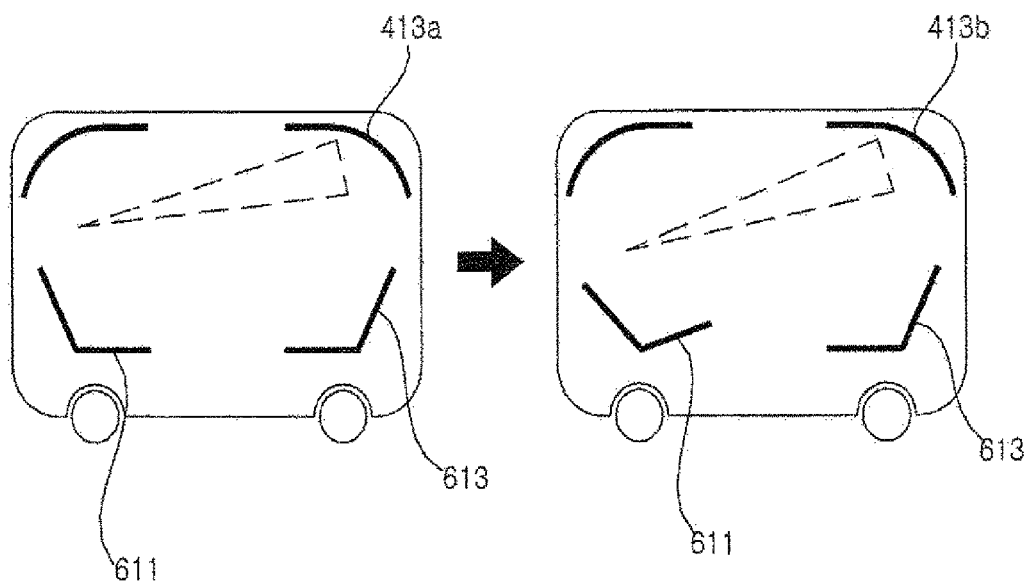

FIG. 65
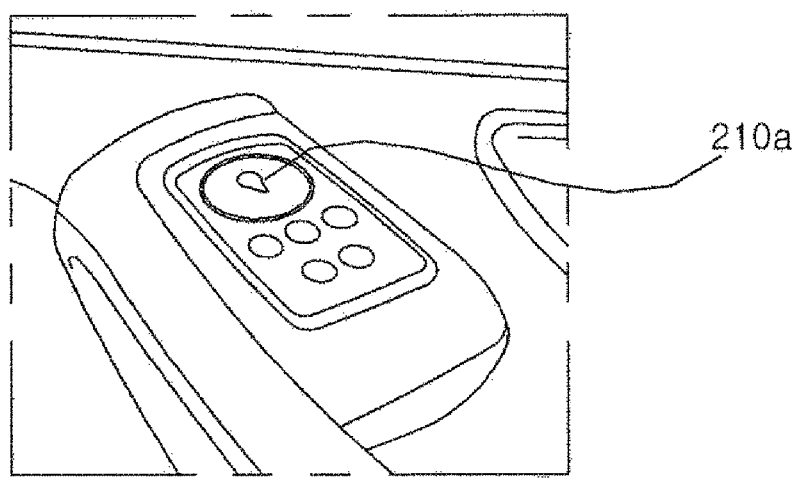
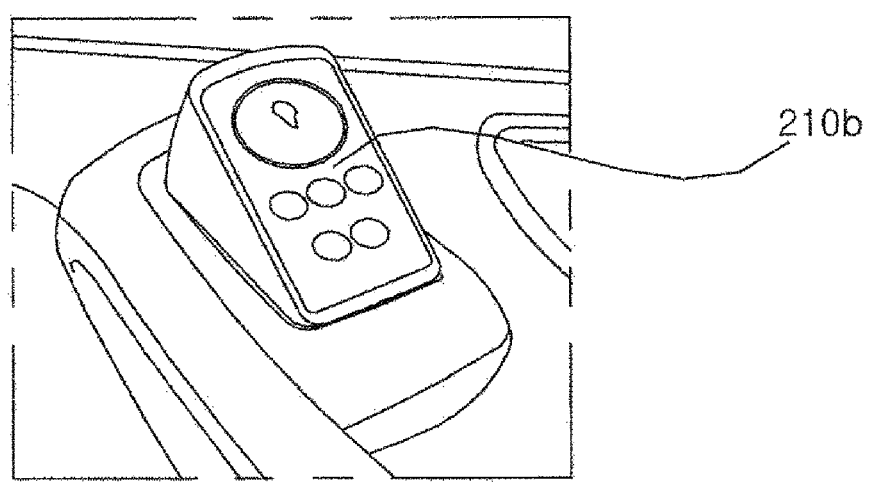

FIG. 66
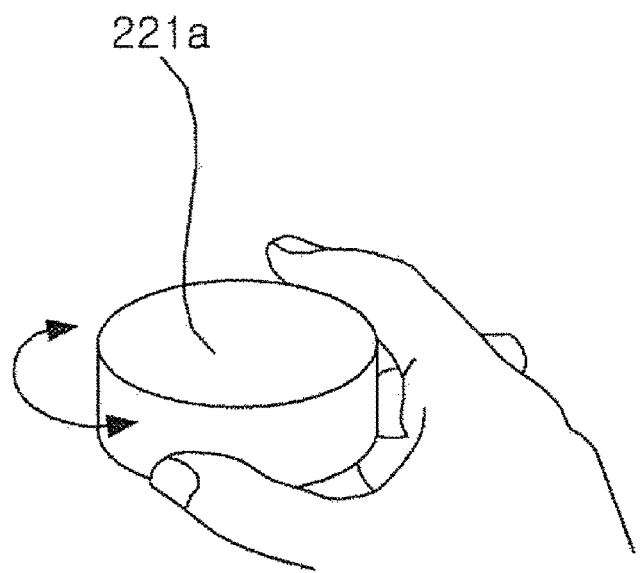
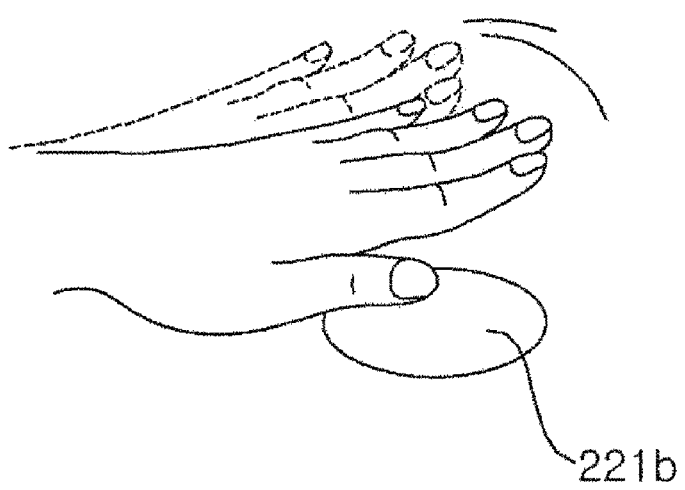

FIG. 71b
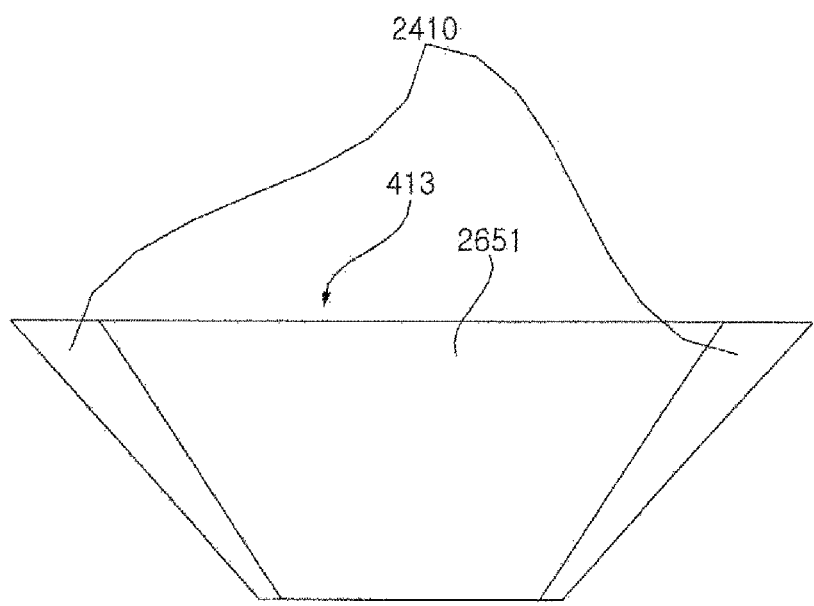
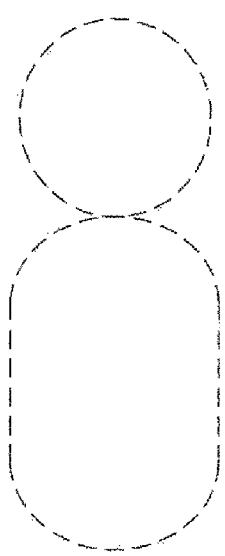

FIG. 72
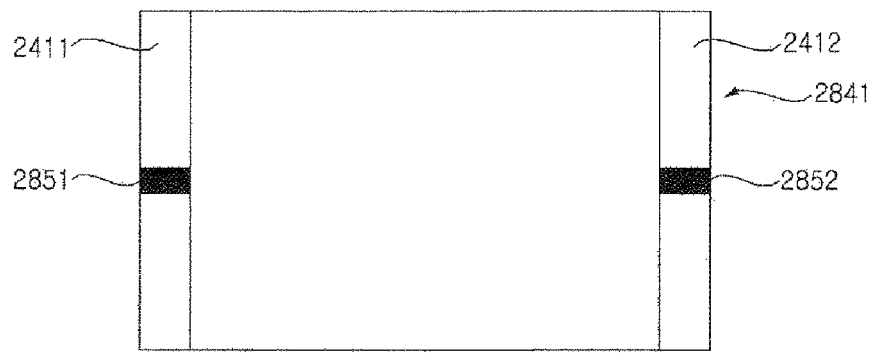
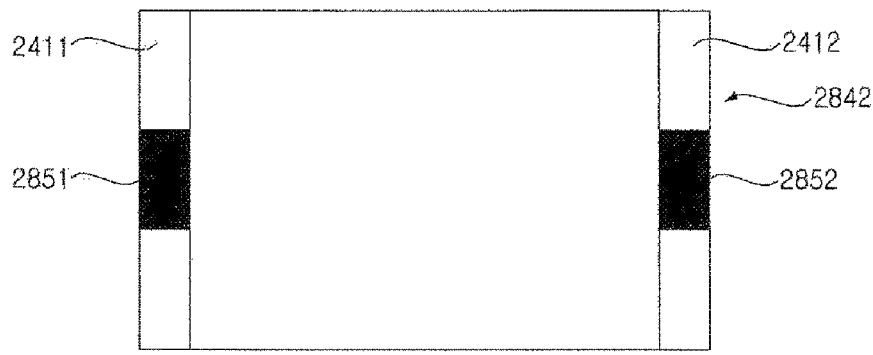
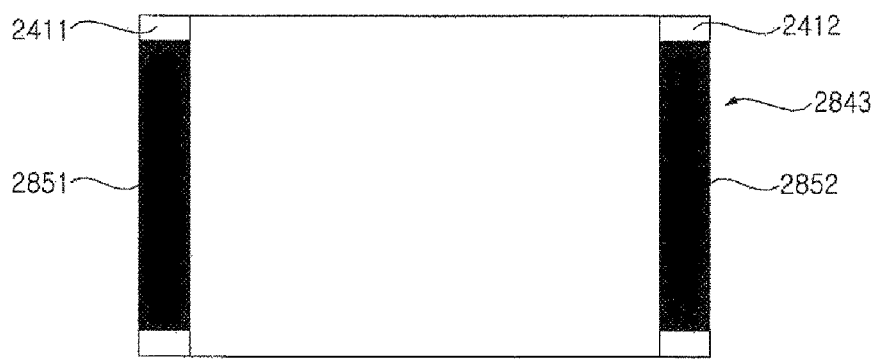

FIG. 73
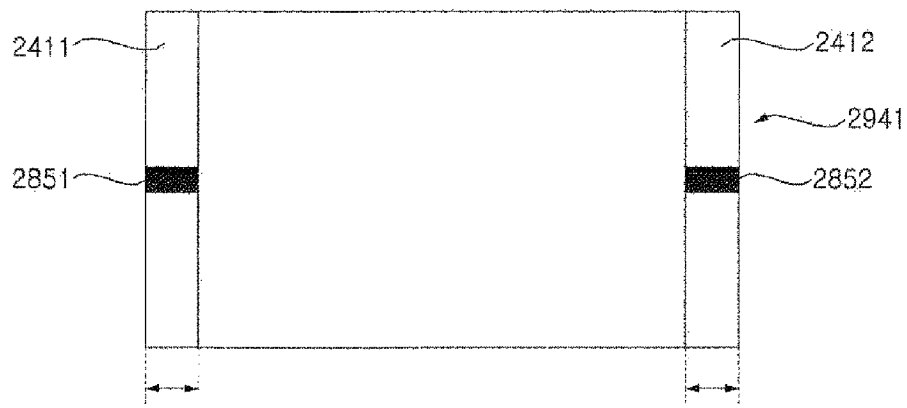
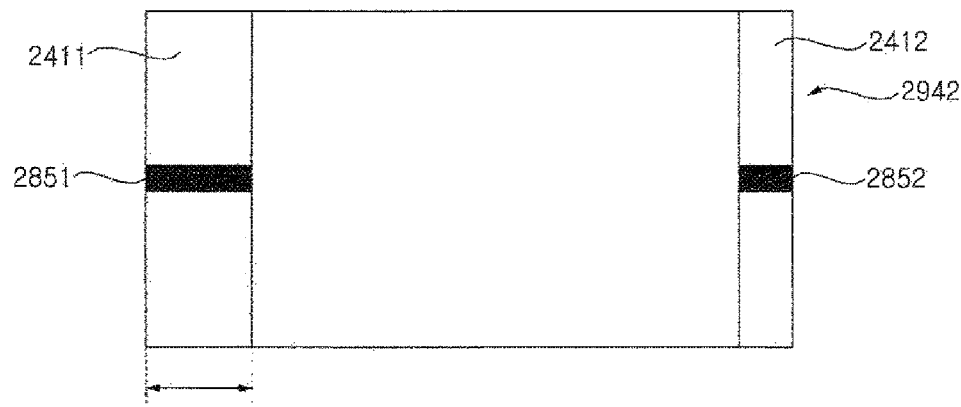
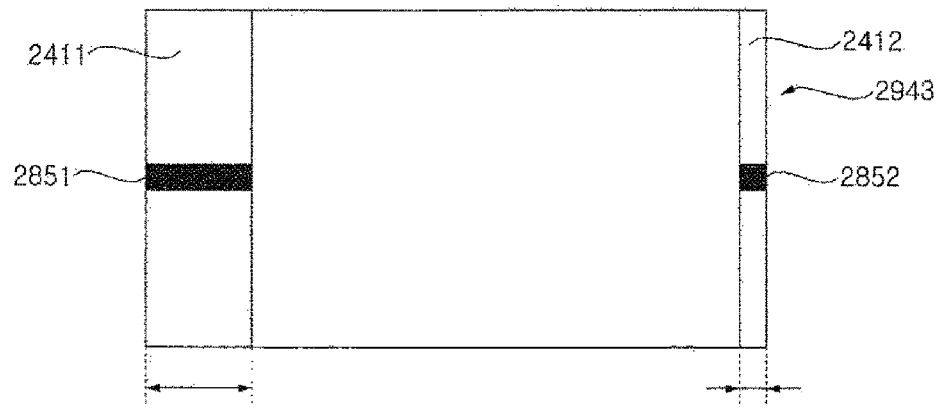

FIG. 74
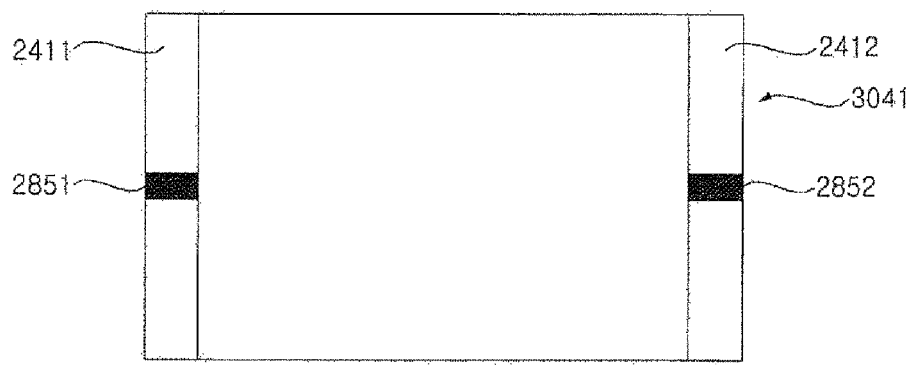
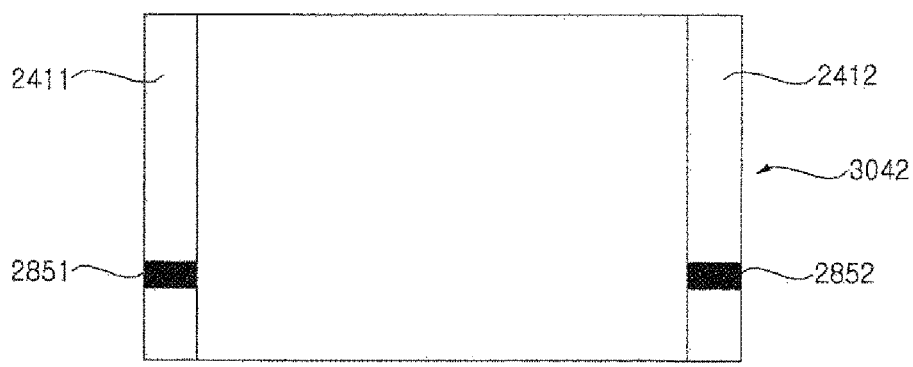

FIG. 75
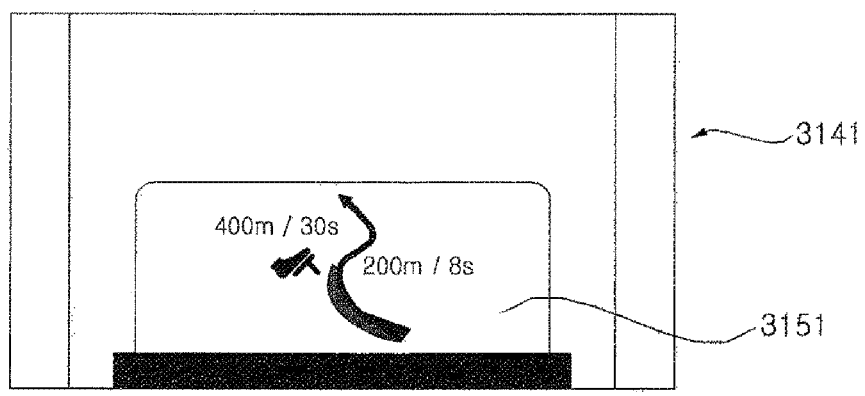
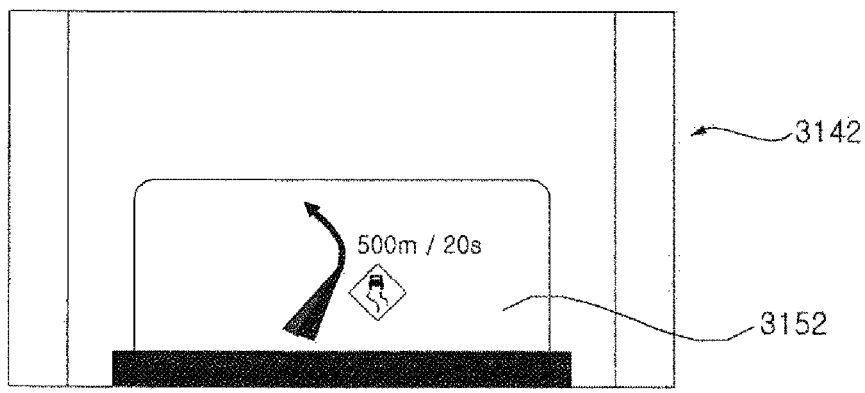

FIG. 90a

| Available service | A→B: Before use of service | | B→A': After use of service |
|---|---|---|---|
| | User data | Prior information of service | Post information of service |
| Hospital | •Basic patient medical information (for reception)<br>•Including current dosage information, Questionnaire<br>•In-vehicle health care sensing information: temperature/pulse /blood pressure, etc. | •Hospital reception status and waiting list<br>•Information about medical staff in charge | •Dosage information<br>•Confirmation of reception of medical supplies (linked to pharmacy)<br>•Provision of further information related to disease in question: nutrition guidance/care guidance<br>•Reservation of next visit to hospital |
| Department store/Grocery store | •Provision of basic body information (height/weight/size)<br>•SNS information<br>•Wish list products<br>•Membership particulars | •Provision of new product/seasonal fruit information<br>•Provision of popular product information<br>•Provision of sales information<br>•Advertising | •Information related to purchased product: recipe /coordinator recommendation<br>•Delivery service information |
| Airport | •Booked air ticket<br>•Passport number<br>•User biometric authentication<br>•Baggage information: weight and size | •Terminal/airline location /guidance<br>•Delayed arrival guidance<br>•Airport use guidance<br>•Provision of pre-check in | •Use satisfaction survey<br>•Provision of jet lag settlement environment (lighting/music, etc.) |
| Hotel | •Membership particulars<br>•Passport information (Nationality/Passport number/Name, etc.)<br>•User biometric authentication<br>•Fatigue/feeling<br>•Baggage information: weight and size<br>•Preference environment<br>•Fellow user information | •Provision of pre-check in<br>•Provision of available room<br>•Concierge connection service if necessary<br>•Guidance of linked service, such as tour<br>•Guidance of service by user group type (ex. Family/business /single, etc.) | •Use satisfaction survey<br>•Membership update content |
| Drive-thru cafý /restaurant | •Selected menu information<br>•Movement route information<br>•When route is changed, information is transmitted to same chain on changed route<br>•Payment information | •Menu information<br>•Preparation status<br>•Entry congestion information<br>•Expected waiting time | •Use satisfaction survey (Satisfaction is checkable based on expression of user when eating |

FIG. 90b

| Available service | A→B: Before use of service | | B→A': After use of service |
|---|---|---|---|
| | User data | Prior information of service | Post information of service. |
| Company | •Entrance authority proof (linked to ID card, etc.)<br>•Biometric authentication information | •Today's schedule<br>•Company-related news<br>•Company mail system access | •Next day schedule briefing |
| School | •Identification (student number/name) | •Prerequisite learning information<br>•Class timetable<br>•School supplies<br>•Home record<br>•Official announcement<br>•Extracurricular activity information | •Linked to home record<br>•Official announcement<br>•Study summary<br>•Extracurricular activity information<br>•Supplementary lesson information |
| Sports | •Body information: height/weight/biorhythm<br>•Wish list sport information<br>•SNS | •Guidance of provided sport service<br>•Instructor information<br>•Information about sports recommended by type | •Provision of information related to eating habits<br>•Supplementary sport information |
| Movie theater | •Booked movie information<br>•Wish list movie information<br>•Movie viewing particulars<br>•Fellow viewer information | •In-theater snack sales menu<br>•Guidance of theater location<br>•Movie-related advertising<br>•Recommended movie list (based on previous movie viewing data/by situation) | •Trailer of movie that will be released<br>•Preference booking of movie<br>•Movie grade |
| Service center | •Basic customer information<br>•Input of information about service-requested product<br>•Description of symptom | •Video communication with service engineer<br>•Simple measures by symptom | •Use satisfaction survey<br>•Reservation of revisit schedule |

USER INTERFACE DEVICE FOR VEHICLES AND SERVICE INFORMATION PROVISION SYSTEM

CROSS-REFERENCE TO RELATED APPLICATION

This application is the National Stage filing under 35 U.S.C. 371 of International Application No. PCT/KR2018/009565, filed on Aug. 21, 2018, which is incorporated by reference.

TECHNICAL FIELD

The present disclosure relates to a user interface device for vehicles and a service information provision system.

BACKGROUND ART

An autonomous vehicle is a vehicle capable of autonomously traveling without the manipulation of a driver. A great number of companies have already entered the autonomous vehicle business and have been immersed in research and development. In recent years, a concept of a shared autonomous vehicle configured for many people to use together in addition to an autonomous vehicle configured for a specific individual to use alone has been introduced into the industrial world.

Meanwhile, with an increase in the use of the autonomous vehicle, a system linked to a third party who provides a service and to the autonomous vehicle has also been developed. Therefore, there is necessity for research on a method of efficiently sharing information between the autonomous vehicle and the third party who provides the service.

DISCLOSURE

Technical Problem

It is an object of the present disclosure to provide a user interface device for sharing information between an autonomous vehicle and a third party.

It is another object of the present disclosure to provide a service information provision system including the user interface device.

The objects of the present disclosure are not limited to the above-mentioned object, and other objects that have not been mentioned above will become evident to those skilled in the art from the following description.

Technical Solution

In accordance with the present disclosure, the above objects can be accomplished by the provision of a user interface device for vehicles configured to receive information of a destination, to provide the received information to a user, and to provide data based on user input to the destination.

The details of other embodiments are included in the following description and the accompanying drawings.

Advantageous Effects

According to the present disclosure, one or more of the following effects are provided.

First, it is possible to input in advance data for the use of a service provided at a destination in a vehicle during traveling of the vehicle, whereby it is possible to efficiently use the service.

Second, it is possible to exchange various kinds of information by destination, whereby it is possible to improve user convenience.

It should be noted that effects of the present disclosure are not limited to the effects of the present disclosure as mentioned above, and other unmentioned effects of the present disclosure will be clearly understood by those skilled in the art from the following claims.

DESCRIPTION OF DRAWINGS

FIG. 1 is a view showing the external appearance of a vehicle according to an embodiment of the present disclosure.

FIGS. 11 to 36 are reference views illustrating the operation of the cabin system according to the embodiment of the present disclosure.

FIG. 56 is a view exemplarily showing a user sitting position according to an embodiment of the present disclosure.

FIGS. 58 and 59 are views exemplarily showing a physical viewing angle adjustment operation of a first display according to an embodiment of the present disclosure.

FIGS. 60 and 61 are views exemplarily showing a physical viewing angle adjustment operation of a second display according to an embodiment of the present disclosure.

FIGS. 62 and 63 are views exemplarily showing a physical viewing angle adjustment operation of a third display according to an embodiment of the present disclosure.

FIG. 65 is a view exemplarily showing a tilting angle adjustment operation of a touch input unit according to an embodiment of the present disclosure.

FIG. 66 is a view exemplarily showing an upward and downward movement adjustment operation of a jog dial device according to an embodiment of the present disclosure.

FIGS. 71a and 71b are reference views illustrating the display and the light output area according to the embodiment of the present disclosure.

FIGS. 72 to 74 are reference views illustrating a change in the light output pattern of the light output area according to an embodiment of the present disclosure.

FIG. 75 is a reference view illustrating an operation of outputting a graphical object that reduces motion sickness according to an embodiment of the present disclosure.

FIGS. 90a and 90b are views exemplarily showing service information provided based on a destination according to an embodiment of the present disclosure.

BEST MODE

Figure 2:
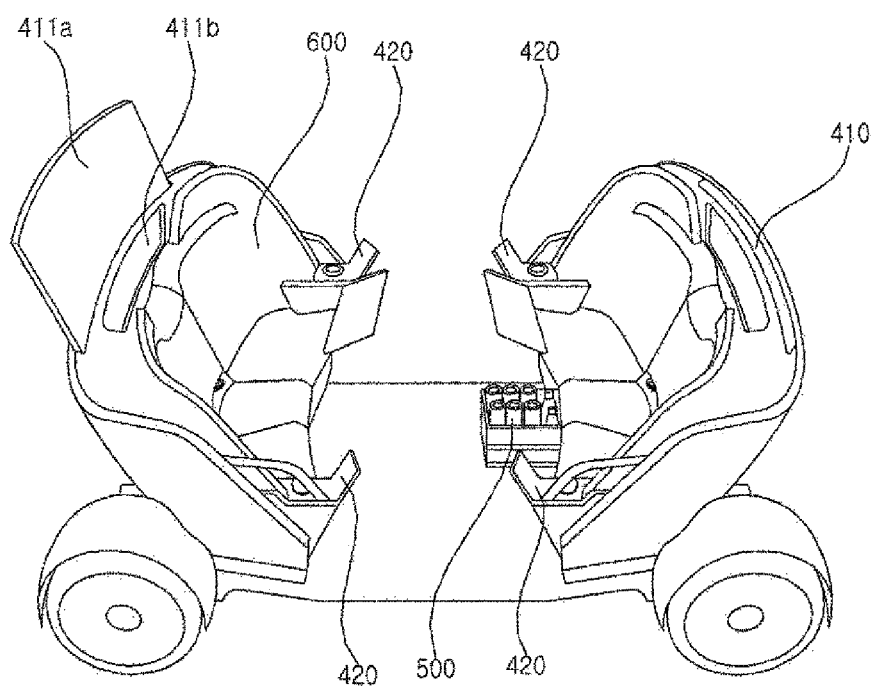
FIG. 2 is a view showing the interior of the vehicle according to the embodiment of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve different meanings. Also, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

It will be understood that, although the terms "first," "second," etc., may be used herein to describe various components, these components should not be limited by these terms. These terms are only used to distinguish one component from another component.

It will be understood that, when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the traveling direction of the vehicle, and "the right side of the vehicle" refers to the right side in the traveling direction of the vehicle.

FIG. 1 is a view showing the external appearance of a vehicle according to an embodiment of the present disclosure.

Referring to FIG. 1, the vehicle 10 according to the embodiment of the present disclosure is defined as a transportation means that runs on a road or a track. The vehicle 10 is a concept including a car, a train, and a motorcycle. Hereinafter, an autonomous car, which travels without a driver's driving manipulation, will be described by way of example as the vehicle 10. The autonomous car may switch between an autonomous traveling mode and a manual traveling mode based on user input.

The vehicle 10 may include a powertrain driving unit for controlling a powertrain, a chassis driving unit for controlling a chassis, a door driving unit for controlling a door, a safety device driving unit for controlling various safety devices, a lamp driving unit for controlling various lamps, and an air conditioner driving unit for controlling an air conditioner. The driving units included in the vehicle 10 may be described as electronic devices. In some embodiments, the vehicle 10 may further include components other than the components that are described in this specification, or may not include some of the components that are described.

The vehicle 10 may include at least one object detection device for detecting an object outside the vehicle 10. The object detection device may include at least one of a camera, a radar, a lidar, an ultrasonic sensor, or an infrared sensor. The object detection device may provide data about an object generated based on a sensing signal generated by a sensor to at least one electronic device included in the vehicle. The at least one object detection device included in the vehicle 10 may be described as an electronic device.

The vehicle 10 may include at least one communication device for exchanging a signal with a device located outside the vehicle 10. The communication device may exchange a signal with at least one of an infrastructure (e.g. a server) or another vehicle. The at least one communication device included in the vehicle 10 may be described as an electronic device.

The vehicle 10 may include an internal communication system. A plurality of electronic devices included in the vehicle 10 may exchange a signal with each other via the internal communication system. The signal may include data. The internal communication system may use at least one communication protocol (e.g. CAN, LIN, FlexRay, MOST, or Ethernet).

The vehicle 10 may include a cabin system 100. The cabin system 100 will be described with reference to FIGS. 2 to 3.

FIG. 2 is a view showing the interior of the vehicle according to the embodiment of the present disclosure.

Figure 3:
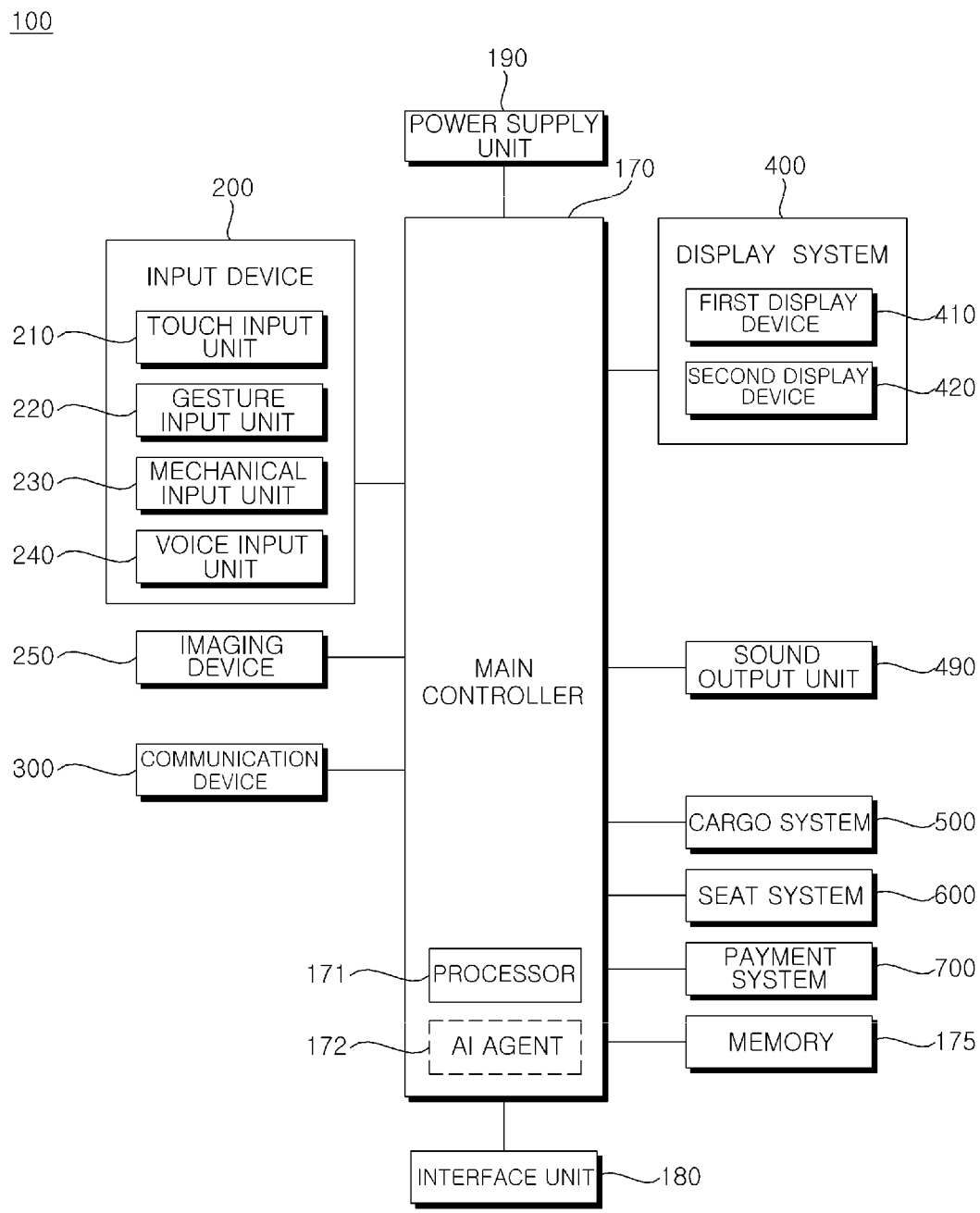
FIG. 3 is a reference block diagram illustrating a cabin system for vehicles according to an embodiment of the present disclosure.

FIG. 3 is a reference block diagram illustrating a cabin system for vehicles according to an embodiment of the present disclosure.

Figure 4A:
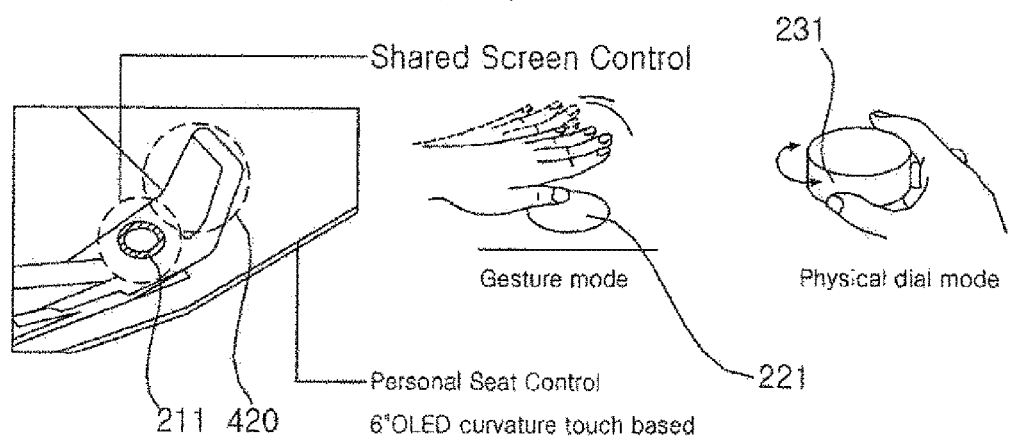
FIGS. 4a to 4c are reference views illustrating an input device according to an embodiment of the present disclosure.
Figure 4B:
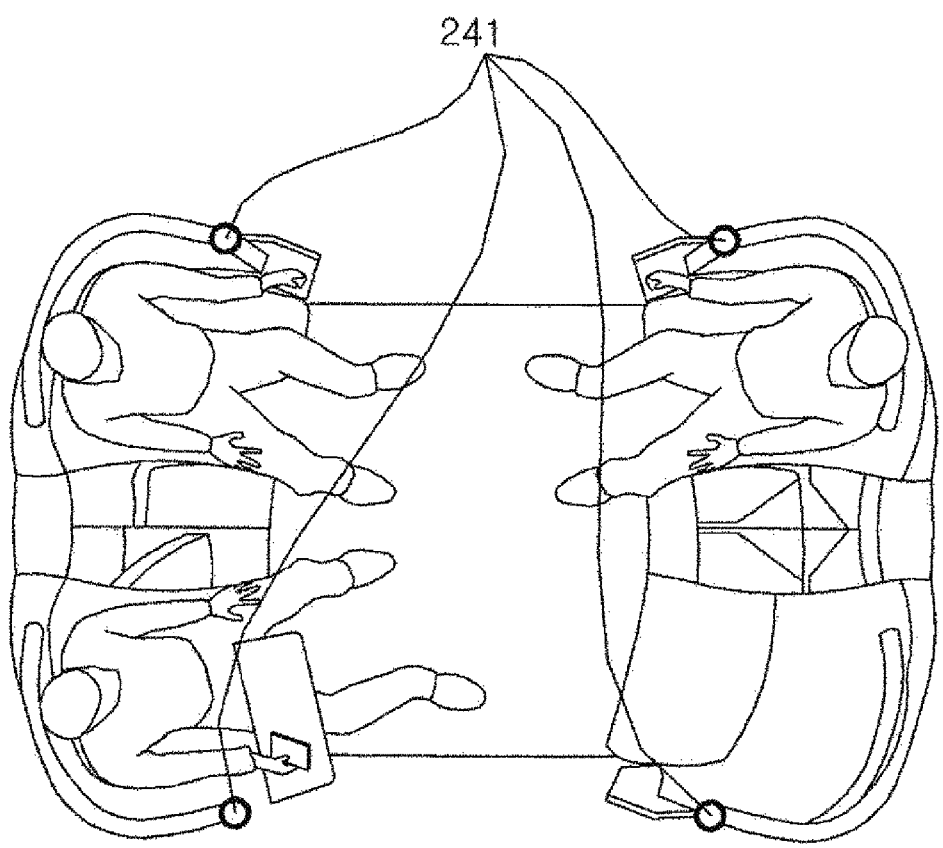
Figure 4C:
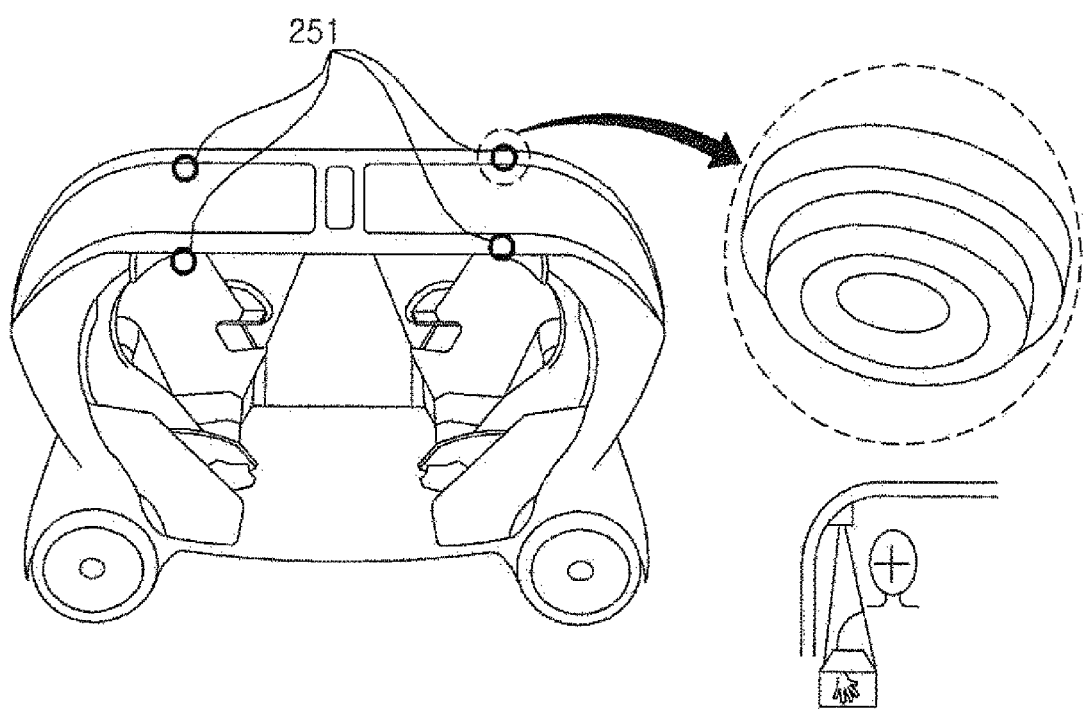

FIGS. 4a to 4c are reference views illustrating an input device according to an embodiment of the present disclosure.

Figure 5:
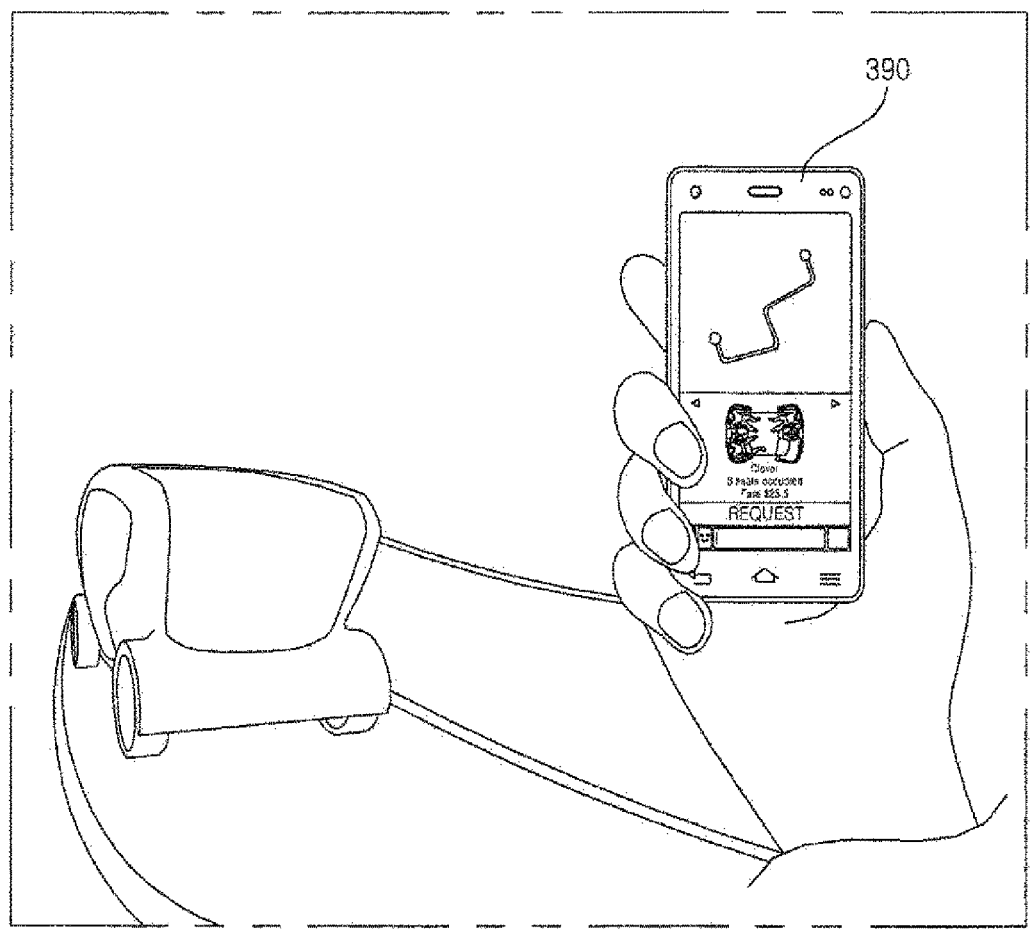
FIG. 5 is a reference view illustrating a communication operation between a communication device and a mobile terminal according to an embodiment of the present disclosure.

FIG. 5 is a reference view illustrating a communication operation between a communication device and a mobile terminal according to an embodiment of the present disclosure.

Figure 6:
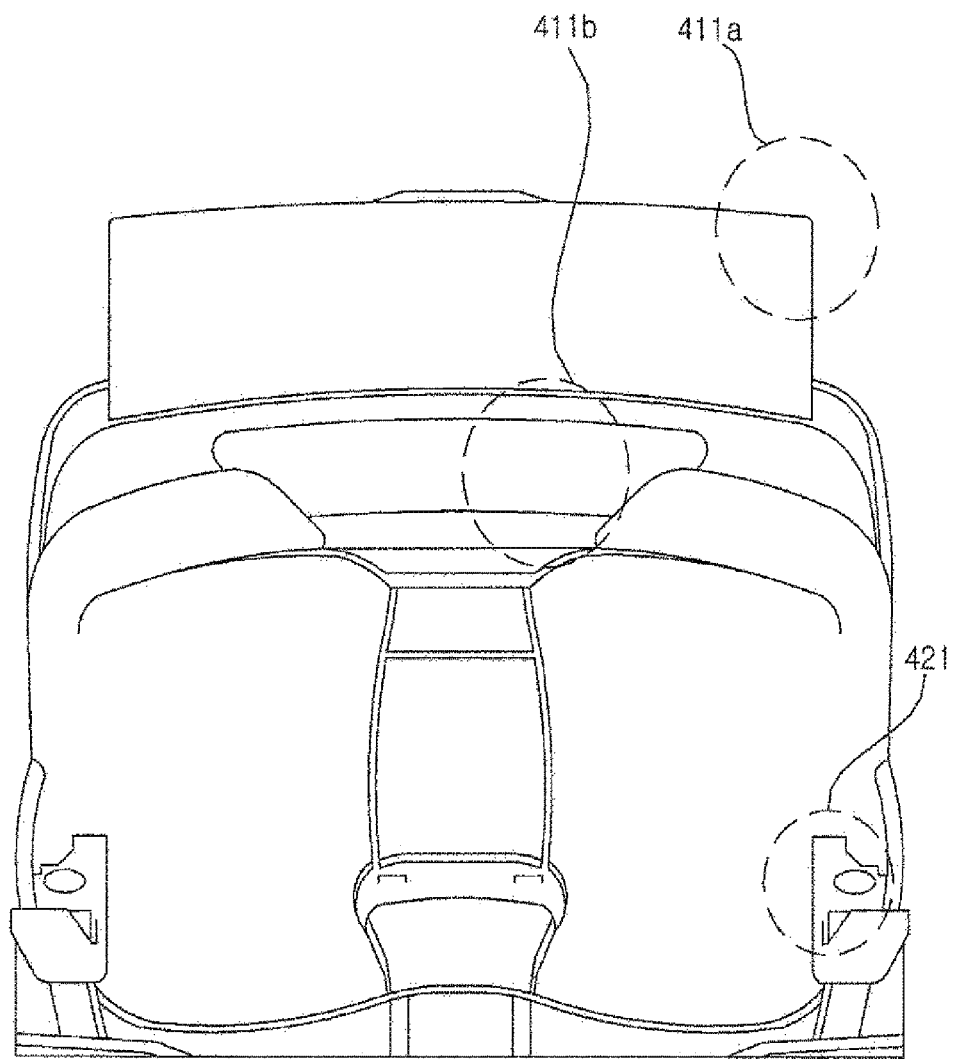
FIG. 6 is a reference view illustrating a display system according to an embodiment of the present disclosure.

FIG. 6 is a reference view illustrating a display system according to an embodiment of the present disclosure.

Figure 7:
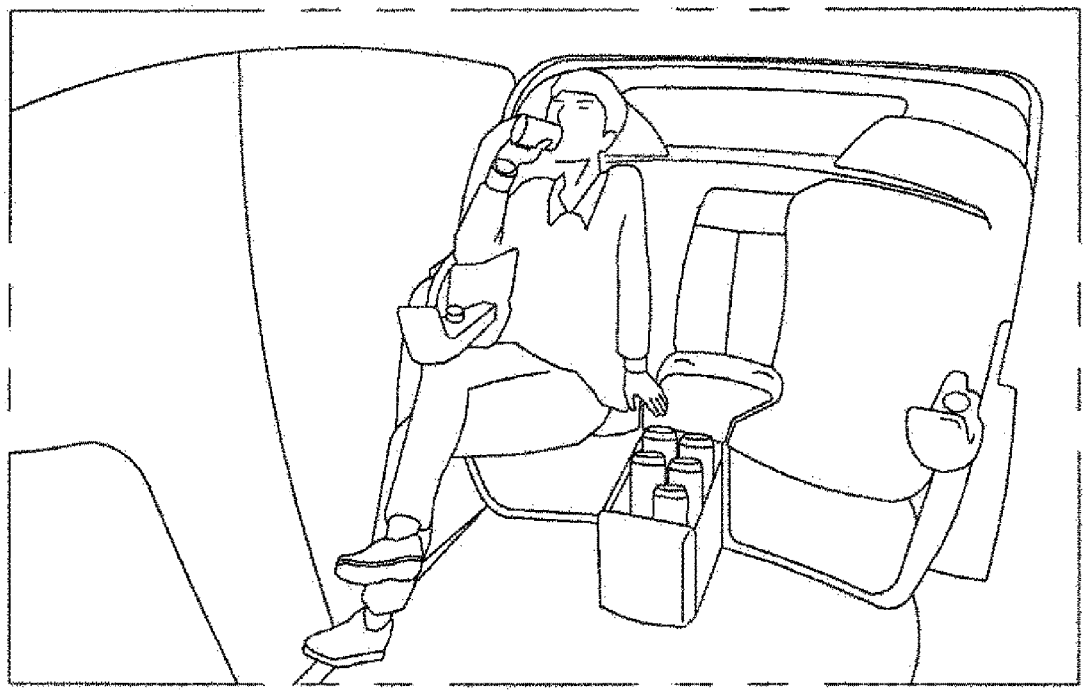
FIG. 7 is a reference view illustrating a cargo system according to an embodiment of the present disclosure.

FIG. 7 is a reference view illustrating a cargo system according to an embodiment of the present disclosure.

Figure 8:
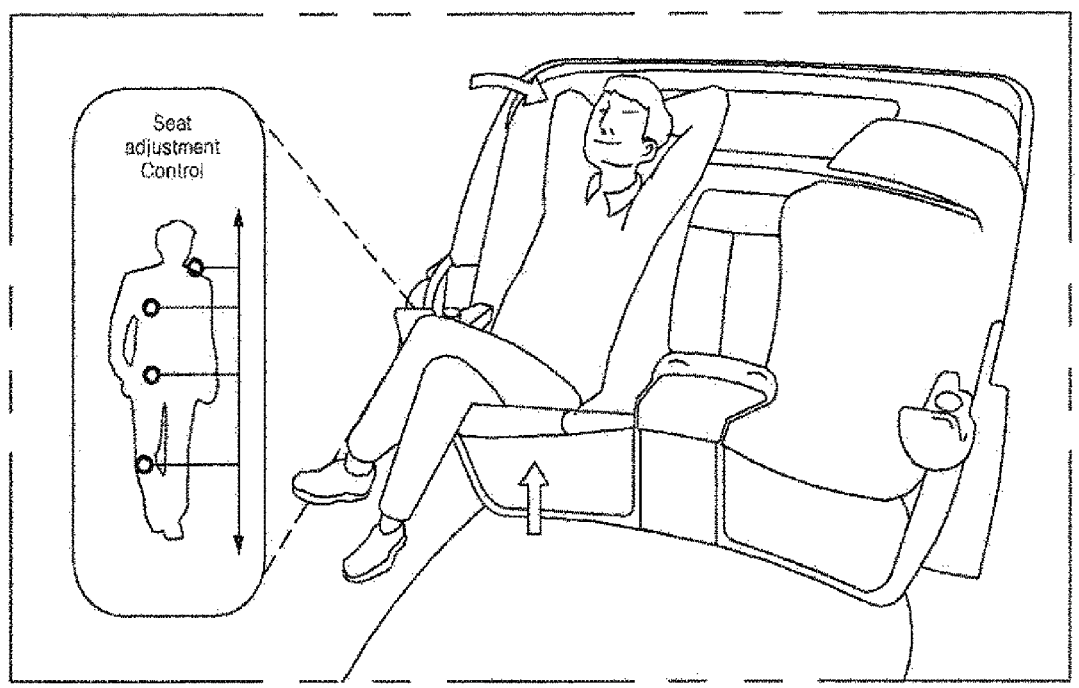
FIG. 8 is a reference view illustrating a seat system according to an embodiment of the present disclosure.

FIG. 8 is a reference view illustrating a seat system according to an embodiment of the present disclosure.

Figure 9:
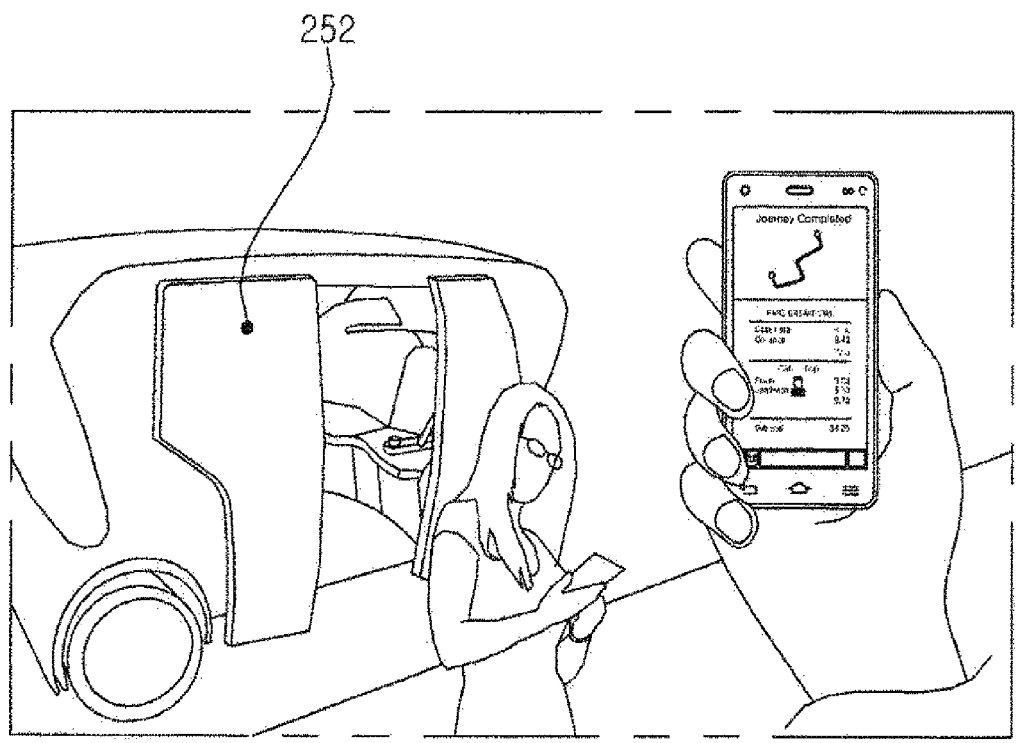
FIG. 9 is a reference view illustrating a payment system according to an embodiment of the present disclosure.

FIG. 9 is a reference view illustrating a payment system according to an embodiment of the present disclosure.

Referring to FIGS. 2 to 9, the cabin system 100 for vehicles (hereinafter, the cabin system) may be defined as a convenience system for a user who uses the vehicle 10. The cabin system 100 may be described as an uppermost system including a display system 400, a cargo system 500, a seat system 600, and a payment system 700. The cabin system 100 may include a main controller 170, a memory 175, an interface unit 180, a power supply unit 190, an input device 200, an image device 250, a communication device 300, a display system 400, a sound output unit 490, a cargo system 500, a seat system 600, and a payment system 700. In some embodiments, the cabin system 100 may further include components other than the components that are described in this specification, or may not include some of the components that are described.

The main controller 170 may be electrically connected to the input device 200, the communication device 300, the display system 400, the cargo system 500, the seat system 600, and the payment system 700 in order to exchange a signal therewith. The main controller 170 may control the input device 200, the communication device 300, the display system 400, the cargo system 500, the seat system 600, and the payment system 700. The main controller 170 may be realized using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing other functions.

The main controller 170 may be constituted by at least one sub-controller. In some embodiments, the main controller 170 may include a plurality of sub-controllers. Each of the sub-controllers may individually control devices and systems included in the cabin system 100 in a grouped state. The devices and systems included in the cabin system 100 may be grouped by function, or may be grouped based on an available seat.

The main controller 170 may include at least one processor 171. Although the main controller 170 is exemplarily shown as including a single processor 171 in FIG. 3, the main controller 170 may include a plurality of processors. The processor 171 may be classified as one of the sub-controllers.

The processor 171 may acquire first information about a first user and second information about a second user through the communication device 300. A first mobile terminal of the first user may transmit the first information to the cabin system 100. A second mobile terminal of the second user may transmit the second information to the cabin system 100. The communication device 300 may receive the first information and the second information, and may provide the same to the processor 171.

The processor 171 may specify each of the first user and the second user based on image data received from at least one of an internal camera 251 or an external camera 252. The processor 171 may apply an image processing algorithm to the image data in order to specify the first user and the second user. For example, the processor 171 may compare the first information and the second information with the image data in order to specify the first user and the second user. For example, the first information may include at least one of route information, body information, fellow passenger information, baggage information, location information, content preference information, food preference information, handicap-related information, or use history information of the first user. For example, the second information may include at least one of route information, body information, fellow passenger information, baggage information, location information, content preference information, food preference information, handicap-related information, or use history information of the second user.

The processor 171 may provide a control signal to at least one of a display or a speaker based on an electrical signal generated by the input device 200 such that content is provided to the user.

The processor 171 may determine a first boarding seat of the first user among a plurality of seats according to the first information. The processor 171 may determine the orientation of the first boarding seat according to the first information. The processor 171 may determine a second boarding seat of the second user among the plurality of seats according to the second information. The processor 171 may determine the orientation of the second boarding seat according to the second information.

The processor 171 may determine a service charge based on an electrical signal received from at least one of the communication device 300, the internal camera 251, the external camera 252, the input device 200, the display of the display system 400, the speaker of the sound output unit 490, the cargo system 500, or the seats of the seat system 600. The processor 171 may provide a signal to the payment system 700 such that the determined service charge is charged.

The main controller 170 may include an artificial intelligence agent 172. The artificial intelligence agent 172 may perform machine learning based on data acquired through the input device 200. The artificial intelligence agent 172 may control at least one of the display system 400, the sound output unit 490, the cargo system 500, the seat system 600, or the payment system 700 based on the result of machine learning.

Meanwhile, the main controller 170 may be understood as an electronic device for vehicles. The electronic device 170 may include an interface unit and a processor 171. The interface unit of the electronic device 170 may exchange a signal with at least one of the communication device 300 for exchanging a signal with an external device, at least one internal camera 251 for capturing an image inside a cabin, at least one external camera 252 for capturing an image outside the vehicle, the input device 200 for converting user input into an electrical signal, at least one display for outputting visual content, at least one speaker for outputting audible content, or a plurality of seats on which a plurality of users is capable of sitting. The processor 171 of the electronic device 170 may acquire the first information about the first user and the second information about the second user through the communication device, may specify each of the first user and the second user based on image data received from at least one of the internal camera or the external camera, may provide a control signal to at least one of the display or the speaker based on an electrical signal generated by the input device such that content is provided to the user, may determine a first boarding seat of the first user among the plurality of seats according to the first information, may determine a second boarding seat of the second user among the plurality of seats according to the second information, may determine the orientation of the first boarding seat according to the first information, and may determine the orientation of the second boarding seat according to the second information.

The memory 175 is electrically connected to the main controller 170. The memory 175 may store basic data about the units, control data necessary to control the operation of the units, and data that are input and output. The memory 175 may store data processed by the main controller 170. In a hardware aspect, the memory 175 may be constituted by at least one of a ROM, a RAM, an EPROM, a flash drive, or a hard drive. The memory 175 may store various data necessary to perform the overall operation of the cabin system 100, such as a program for processing or control of the main controller 170. The memory 175 may be integrated into the main controller 170.

The interface unit 180 may exchange a signal with at least one electronic device provided in the vehicle 10 in a wired or wireless fashion. The interface unit 180 may be constituted by at least one of a communication module, a terminal, a pin, a cable, a port, a circuit, an element, or a device.

The power supply unit 190 may supply power to the cabin system 100. The power supply unit 190 may receive power from a power source (e.g. a battery) included in the vehicle 10, and may supply the received power to the respective units of the cabin system 100. The power supply unit 190 may be operated according to a control signal provided from the main controller 170. For example, the power supply unit 190 may be realized as a switched-mode power supply (SMPS).

The cabin system 100 may include at least one printed circuit board (PCB). The main controller 170, the memory 175, the interface unit 180, and the power supply unit 190 may be mounted on the at least one printed circuit board.

The input device 200 may receive user input. The input device 200 may convert the user input into an electrical signal. The electrical signal converted by the input device 200 may be converted into a control signal, which may then be provided to at least one of the display system 400, the sound output unit 490, the cargo system 500, the seat system 600, or the payment system 700. The at least one processor included in the main controller 170 or in the cabin system 100 may generate a control signal based on the electrical signal received from the input device 200.

The input device 200 may include at least one of a touch input unit 210, a gesture input unit 220, a mechanical input unit 230, or a voice input unit 240.

As exemplarily shown in FIG. 4a, the touch input unit 210 may convert user touch input into an electrical signal. The touch input unit 210 may include at least one touch sensor 211 for sensing user touch input. In some embodiments, the touch input unit 210 may be integrated into the at least one display included in the display system 400 in order to realize a touchscreen. The touchscreen may provide both an input interface and an output interface between the cabin system 100 and a user.

As exemplarily shown in FIG. 4a, the gesture input unit 220 may convert user gesture input into an electrical signal. The gesture input unit 220 may include at least one of an infrared sensor 221 or an image sensor for sensing user gesture input. In some embodiments, the gesture input unit 220 may sense three-dimensional user gesture input. To this end, the gesture input unit 220 may include a light output unit for outputting a plurality of infrared beams or a plurality of image sensors. The gesture input unit 220 may sense the three-dimensional user gesture input through a time of flight (TOF) scheme, a structured light scheme, or a disparity scheme.

As exemplarily shown in FIG. 4a, the mechanical input unit 230 may convert physical user input (e.g. push or rotation) through a mechanical device 231 into an electrical signal. The mechanical input unit 230 may include at least one of a button, a dome switch, a jog wheel, or a jog switch.

Meanwhile, the gesture input unit 220 and the mechanical input unit 230 may be integrated into a single unit. For example, the input device 200 may include a jog dial device including a gesture sensor, the jog dial device being configured to protrude from and retreat into a portion of a peripheral structure (e.g. at least one of a seat, an armrest, or a door). In the case in which the jog dial device is level with the peripheral structure, the jog dial device may function as the gesture input unit 220. In the case in which the jog dial device protrudes farther than the peripheral structure, the jog dial device may function as the mechanical input unit 230.

As exemplarily shown in FIG. 4b, the voice input unit 240 may convert user voice input into an electrical signal. The voice input unit 240 may include at least one microphone 241. The voice input unit 240 may include a beamforming microphone.

The image device 250 may include at least one camera. The image device 250 may include at least one of an internal camera 251 or an external camera 252. The internal camera 251 may capture an image inside the cabin, and the external camera 252 may capture an image outside the vehicle.

As exemplarily shown in FIG. 4c, the internal camera 251 may acquire an image inside the cabin. The image device 250 may include at least one internal camera 251. Preferably, the image device 250 includes cameras 251 corresponding in number to the passenger capacity of the vehicle. The image device 250 may provide an image acquired by the internal camera 251. The at least one processor included in the main controller 170 or in the cabin system 100 may detect user motion based on the image acquired by the internal camera 251, may generate a signal based on the detected motion, and may provide the signal to at least one of the display system 400, the sound output unit 490, the cargo system 500, the seat system 600, or the payment system 700.

The external camera 252 may acquire an image outside the vehicle. The image device 250 may include at least one internal camera 252). Preferably, the image device 250 includes cameras 252 corresponding in number to the number of boarding doors. The image device 250 may provide an image acquired by the external camera 252. The at least one processor included in the main controller 170 or in the cabin system 100 may acquire user information based on the image acquired by the external camera 252. The at least one processor included in the main controller 170 or in the cabin system 100 may authenticate the user based on the user information, or may acquire body information (e.g. height information and weight information), fellow passenger information, and baggage information of the user.

Although the input device 200 is exemplarily shown as being directly connected to the main controller 170 in FIG. 3, the input device 200 may be connected to the main controller 170 via the interface unit 180.

The communication device 300 may wirelessly exchange a signal with an external device. The communication device 300 may exchange a signal with the external device over a network, or may directly exchange a signal with the external device. The external device may include at least one of a server, a mobile terminal, or another vehicle. As exemplarily shown in FIG. 5, the communication device 300 may exchange a signal with at least one mobile terminal 390.

The communication device 300 may include at least one of an antenna, a radio frequency (RF) circuit capable of realizing at least one communication protocol, or an RF element in order to perform communication. In some embodiments, the communication device 300 may use a plurality of communication protocols. The communication device 300 may perform switching between the communication protocols depending on the distance from the mobile terminal.

Although the communication device 300 is exemplarily shown as being directly connected to the main controller 170 in FIG. 3, the communication device 300 may be connected to the main controller 170 via the interface unit 180.

As exemplarily shown in FIGS. 2 and 6, the display system 400 may display a graphical object. The display system 400 may include a first display device 410 and a second display device 420.

The first display device 410 may include at least one display 411 for outputting visual content. The display 411 included in the first display device 410 may be realized as at least one of a flat display, a curved display, a rollable display, or a flexible display.

For example, the first display device 410 may include a first display 411 located at the rear of a seat, the first display being configured to protrude into and retreat from the cabin, and a first mechanism for moving the first display 411. The first display 411 may be disposed so as to protrude from and retreat into a slot formed in a seat main frame. In some embodiments, the first display device 410 may further include a flexible area adjustment mechanism. The first display may be formed so as to be flexible, and the flexible area of the first display may be adjusted depending on the location of a user.

For example, the first display device 410 may include a second display located at a ceiling in the cabin, the second display being configured to be rollable, and a second mechanism for rolling or unrolling the second display. The second display may be formed so as to output screens from opposite surfaces thereof.

For example, the first display device 410 may include a third display located at the ceiling in the cabin, the third display being configured to be flexible, and a third mechanism for bending or unbending the third display.

In some embodiments, the display system 400 may further include at least one processor for providing a control signal to at least one of the first display device 410 or the second display device 420. The processor included in the display system 400 may generate a control signal based on a signal received from at least one of the main controller 170, the input device 200, the image device 250, or the communication device 300.

The display area of the display included in the first display device 410 may be divided into a first area 411a and a second area 411b. The first area 411a may be defined as a content display area. For example, the first area 411a may display at least one of entertainment content (e.g. movies, sports, shopping, or music), a video conference, a food menu, or a graphical object corresponding to an augmented reality screen. The first area 411a may display a graphic object corresponding to travel status information of the vehicle 10. The travel status information may include at least one of object-outside-vehicle information, navigation information, or vehicle state information. The object-outside-vehicle information may include information about presence or absence of an object, information about the position of the object, information about the distance between the vehicle 100 and the object, and information about speed relative to the object. The navigation information may include at least one of map information, information about a set destination, information about a route based on the setting of the destination, information about various objects on the route, lane information, or information about the current position of the vehicle. The vehicle state information may include vehicle orientation information, vehicle speed information, vehicle tilt information, vehicle weight information, vehicle direction information, vehicle battery information, vehicle fuel information, information about the air pressure of tires of the vehicle, vehicle steering information, in-vehicle temperature information, in-vehicle humidity information, pedal position information, and vehicle engine temperature information. The second area 411b may be defined as a user interface area. For example, the second area 411b may output an artificial intelligence agent screen. In some embodiments, the second area 411b may be located in an area partitioned as a seat frame. In this case, a user may view content displayed in the second area 411b between a plurality of seats.

In some embodiments, the first display device 410 may provide hologram content. For example, the first display device 410 may provide hologram content for each user such that only a user who requests content can view corresponding content.

The second display device 420 may include at least one display 421. The second display device 420 may provide the display 421 at a position at which only an individual passenger confirms content that is displayed. For example, the display 421 may be disposed at an armrest of a seat. The second display device 420 may display a graphical object corresponding to personal information of a user. The second display device 420 may include displays 421 corresponding in number to the passenger capacity of the vehicle. The second display device 420 may be connected to a touch sensor in a layered structure, or may be formed integrally with the touch sensor, so as to constitute a touchscreen. The second display device 420 may display a graphical object for receiving user input for seat adjustment or in-vehicle temperature adjustment.

Although the display system 400 is exemplarily shown as being directly connected to the main controller 170 in FIG. 3, the display system 400 may be connected to the main controller 170 via the interface unit 180.

The sound output unit 490 may convert an electrical signal into an audio signal. The sound output unit 490 may include at least one speaker for outputting audible content. For example, the sound output unit 490 may include a plurality of speakers provided for available seats.

As exemplarily shown in FIG. 7, the cargo system 500 may provide a product to a user according to a user request. The cargo system 500 may be operated based on an electrical signal generated by the input device 200 or the communication device 300. The cargo system 500 may include a cargo box. The cargo box may be hidden in a portion of the lower end of a seat in the state in which products are loaded therein. In the case in which an electrical signal based on user input is received, the cargo box may be exposed in the cabin. A user may select a desired product from among the products loaded in the cargo box, which is exposed. The cargo system 500 may include a slide moving mechanism and a product pop-up mechanism in order to expose the cargo box according to user input. The cargo system 500 may include a plurality of cargo boxes in order to provide various kinds of products. A weight sensor for determining whether to provide each product may be mounted in the cargo box.

Although the cargo system 500 is exemplarily shown as being directly connected to the main controller 170 in FIG. 3, the cargo system 500 may be connected to the main controller 170 via the interface unit 180.

As exemplarily shown in FIG. 8, the seat system 600 may provide a customized seat to a user. The seat system 600 may be operated based on an electrical signal generated by the input device 200 or the communication device 300. The seat system 600 may adjust at least one element of a seat based on acquired user body data. The seat system 600 may include a user sensor (e.g. a pressure sensor) for determining whether a user sits on the seat.

The seat system 600 may include a plurality of seats on which a plurality of users is capable of sitting. One of the seats may be disposed so as to face at least another of the seats. In the cabin, at least two users may sit so as to face each other.

Although the seat system 600 is exemplarily shown as being directly connected to the main controller 170 in FIG. 3, the seat system 600 may be connected to the main controller 170 via the interface unit 180.

As exemplarily shown in FIG. 9, the payment system 700 may provide a payment service to a user. The payment system 700 may be operated based on an electrical signal generated by the input device 200 or the communication device 300. The payment system 700 may calculate a charge for at least one service used by a user, and may request the user to pay the calculated charge.

Although the payment system 700 is exemplarily shown as being directly connected to the main controller 170 in FIG. 3, the payment system 700 may be connected to the main controller 170 via the interface unit 180.

Meanwhile, in some embodiments, the cabin system 100 may further include a mobile terminal 390 as a component thereof.

Figure 10:
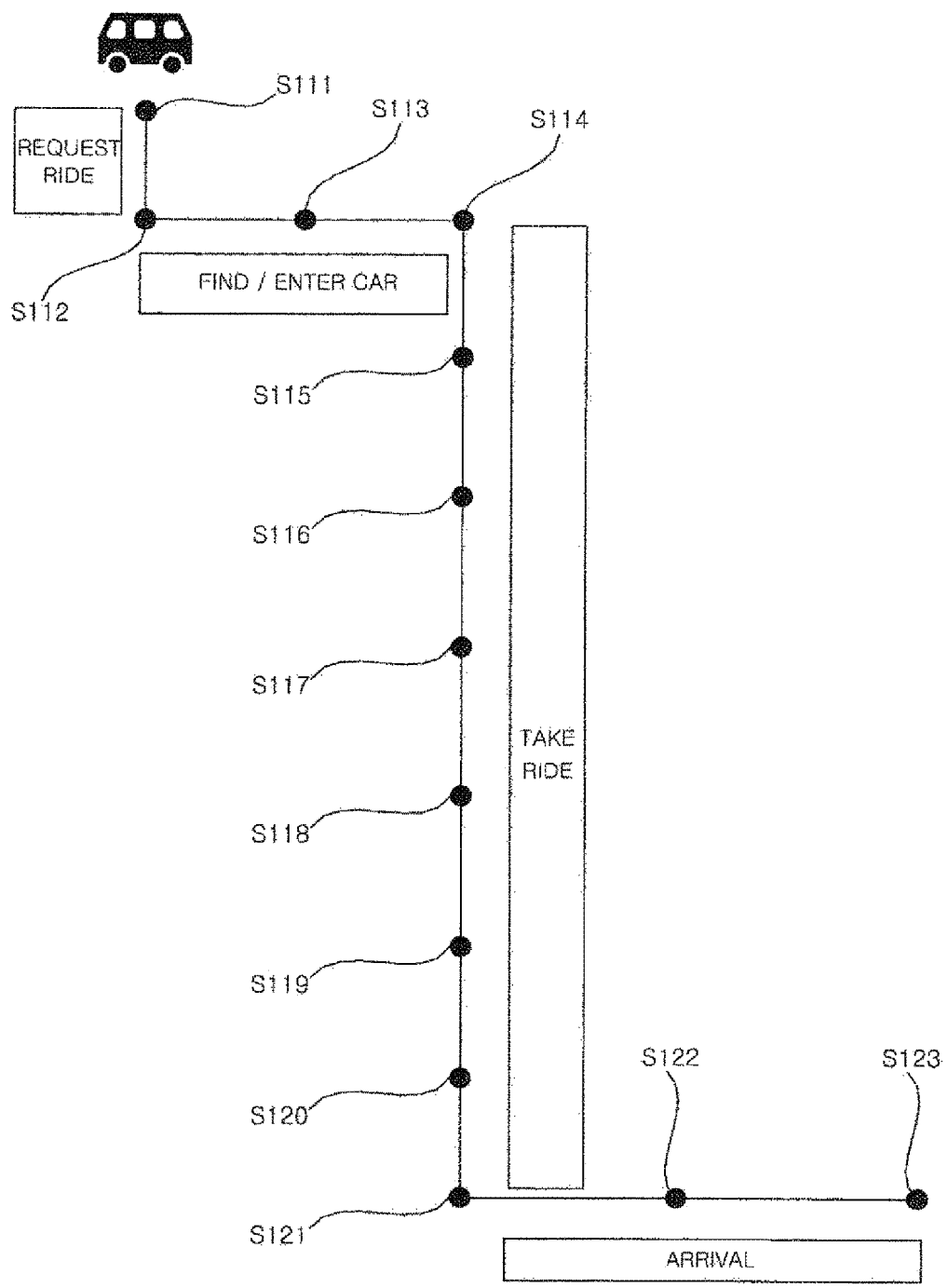
FIG. 10 is a reference view illustrating a use scenario according to an embodiment of the present disclosure.

FIG. 10 is a reference view illustrating a use scenario according to an embodiment of the present disclosure.

A first scenario S111 is a user destination forecasting scenario. An application for interoperation with the cabin system 100 may be installed in the mobile terminal 390. The mobile terminal 390 may forecast a user destination based on user's contextual information through the application. The mobile terminal 390 may provide information about a vacant seat in the cabin through the application.

A second scenario S112 is a cabin interior layout preparation scenario. The cabin system 100 may further include a scanner for acquiring data about a user located outside the vehicle 100. The scanner may scan the user in order to acquire user body data and baggage data. The user body data and the baggage data may be used to set a layout. The user body data may be used for user authentication. The scanner may include at least one image sensor. The image sensor may acquire a user image using visible light or infrared light.

The seat system 600 may set a layout in the cabin based on at least one of the user body data or the baggage data. For example, the seat system 600 may be provided with a baggage loading space or a car seat installation space.

A third scenario S113 is a user welcome scenario. The cabin system 100 may further include at least one guide light. The guide light may be disposed on a floor in the cabin. In the case in which entrance of a user is sensed, the cabin system 100 may output guide light such that the user sits on a predetermined seat among a plurality of seats. For example, the main controller 170 may realize moving light through sequential turning on of a plurality of light sources over time from an opened door to a predetermined user seat.

A fourth scenario S114 is a seat adjustment service scenario. The seat system 600 may adjust at least one element of a seat that matches with the user based on acquired body information.

A fifth scenario S115 is a personal content provision scenario. The display system 400 may receive user's personal data through the input device 200 or the communication device 300. The display system 400 may provide content corresponding to the user's personal data.

A sixth scenario S116 is a product provision scenario. The cargo system 500 may receive user data through the input device 200 or the communication device 300. The user data may include user preference data and user destination data. The cargo system 500 may provide a product based on the user data.

A seventh scenario S117 is a payment scenario. The payment system 700 may receive data for fare calculation from at least one of the input device 200, the communication device 300, or the cargo system 500. The payment system 700 may calculate a user's vehicle fare based on the received data. The payment system 700 may request the user (e.g. a mobile terminal of the user) to pay the vehicle fare.

An eighth scenario S118 is a user display system control scenario. The input device 200 may receive user input having at least one form, and may convert the same into an electrical signal. The display system 400 may control content that is displayed based on the electrical signal.

A ninth scenario S119 is a multichannel artificial intelligence (AI) agent scenario for a plurality of users. The artificial intelligence agent 172 may distinguish between inputs from a plurality of users. The artificial intelligence agent 172 may control at least one of the display system 400, the sound output unit 490, the cargo system 500, the seat system 600, or the payment system 700 based on an electrical signal converted from individual user input.

A tenth scenario S120 is a multimedia content provision scenario for a plurality of users. The display system 400 may provide content that all users can watch together. In this case, the sound output unit 490 may provide the same sound to each user through a speaker provided for each seat. The display system 400 may provide content that a plurality of users can watch individually. In this case, the sound output unit 490 may provide individual sound through a speaker provided for each seat.

An eleventh scenario S121 is a user safety security scenario. In the case in which information about an object around the vehicle that threatens the user is acquired, the main controller 170 may perform control such that an alarm about the object around the vehicle is output through at least one of the display system 400 or the sound output unit 490.

A twelfth scenario S122 is a user's belongings loss prevention scenario. The main controller 170 may acquire data about user's belongings through the input device 200. The main controller 170 may acquire user motion data through the input device 200. The main controller 170 may determine whether the user exits the vehicle while leaving the belongings based on the belongings data and the motion data. The main controller 170 may perform control such that an alarm about the belongings is output through at least one of the display system 400 or the sound output unit 490.

A thirteenth scenario S123 is an exiting report scenario. The main controller 170 may receive user's exiting data through the input device 200. After the user exits the vehicle, the main controller 170 may provide report data based on exiting to the mobile terminal of the user through the communication device 300. The report data may include data about total charges incurred as the result of using the vehicle 10.

Figure 11:
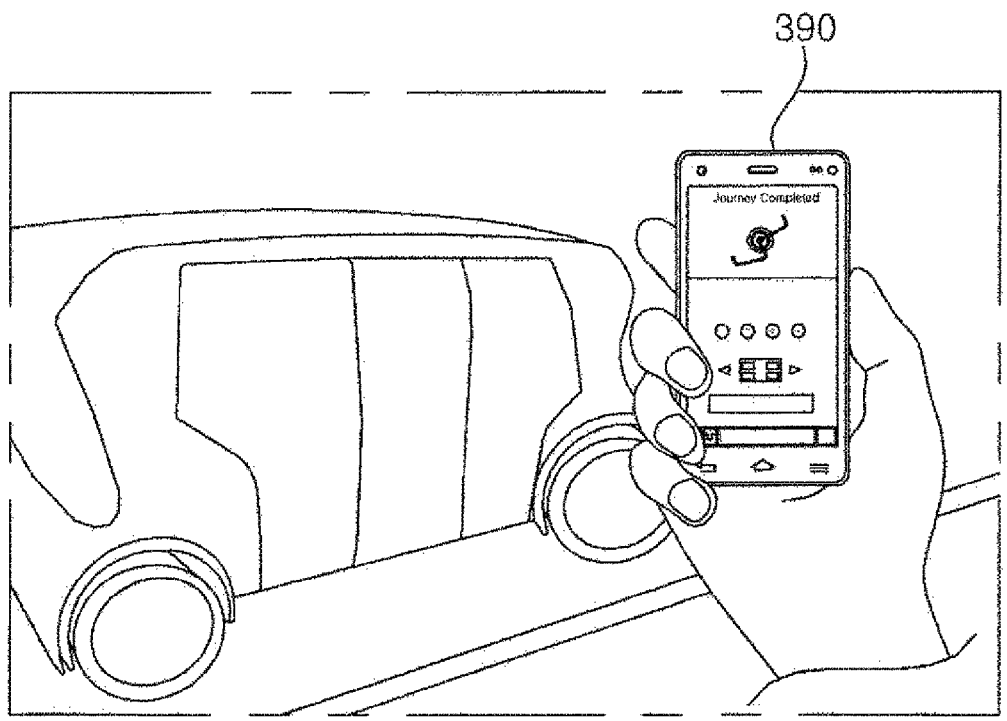

FIG. 11 is a reference view illustrating the operation of the cabin system according to the embodiment of the present disclosure.

Referring to FIG. 11, the processor 171 may acquire image data about the interior of the cabin from the internal camera 251. The processor 171 may generate information about the number of people in the cabin based on the image data about the interior of the cabin. The processor 171 may provide the information about the number of people in the cabin to the mobile terminal 390 through the communication device 300. The mobile terminal 390 may display the information about the number of people in the cabin. When booking the use of the cabin system 100, a user may check the displayed information about the number of people in the cabin, and may determine whether to enter the vehicle in consideration of whether a fellow passenger is present.

Figure 12:
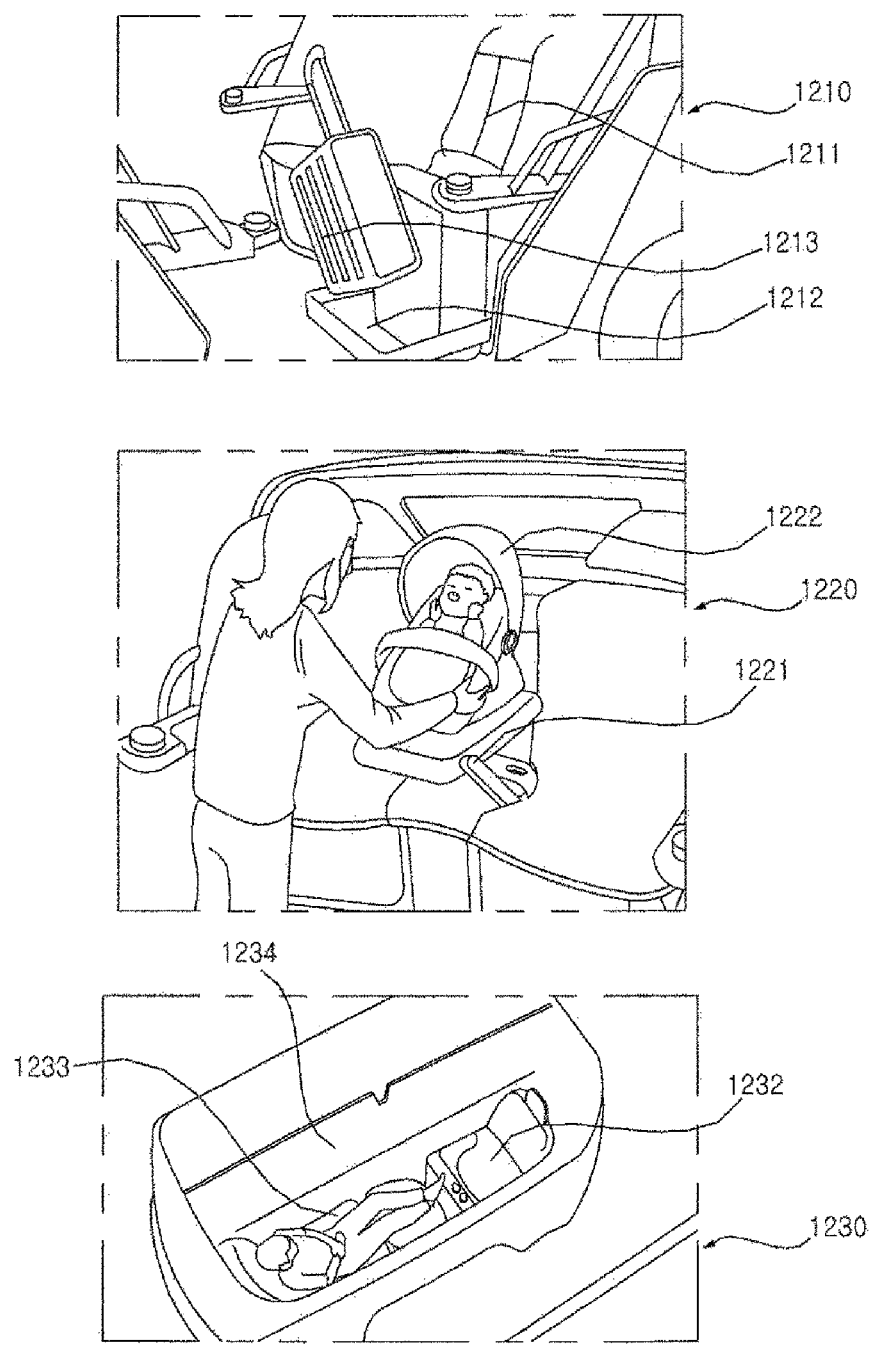

FIG. 12 is a reference view illustrating the operation of the cabin system according to the embodiment of the present disclosure.

Referring to FIG. 12, the processor 171 may set a layout of a plurality of seats according to first information and second information. The seats may be configured in a modular form. Each of the seats may be formed so as to be modified. Each of the seats may be formed so as to be movable. The seat system 6500 may include at least one driving device. The driving device may provide driving force necessary to modify or move each of the seats.

As indicated by reference numeral 1210, the processor 171 may modify or move at least one 1211 of the seats based on information about user's baggage 1213 in order to provide a control signal for securing a space 1212 for storing baggage in the cabin. As indicated by reference numeral 1220, the processor 171 may modify at least one 1221 of the seats based on information about user's use of the car seat 1222 in order to provide a control signal for securing a place at which the car seat can be fixed in the cabin. Meanwhile, the information about the user's use of the car seat may be included in the first information or the second information. As indicated by reference numeral 1230, the processor 171 may move or modify at least one 1232 or 1233 of the seats based on business seat (e.g. private seat) request information in order to provide a business seat. At this time, the processor 171 may provide a control signal for providing a wall 1234 in order to partition a space for the business seat and another space in the cabin from each other. Meanwhile, the business seat request information may be included in the first information or the second information.

Figure 13:
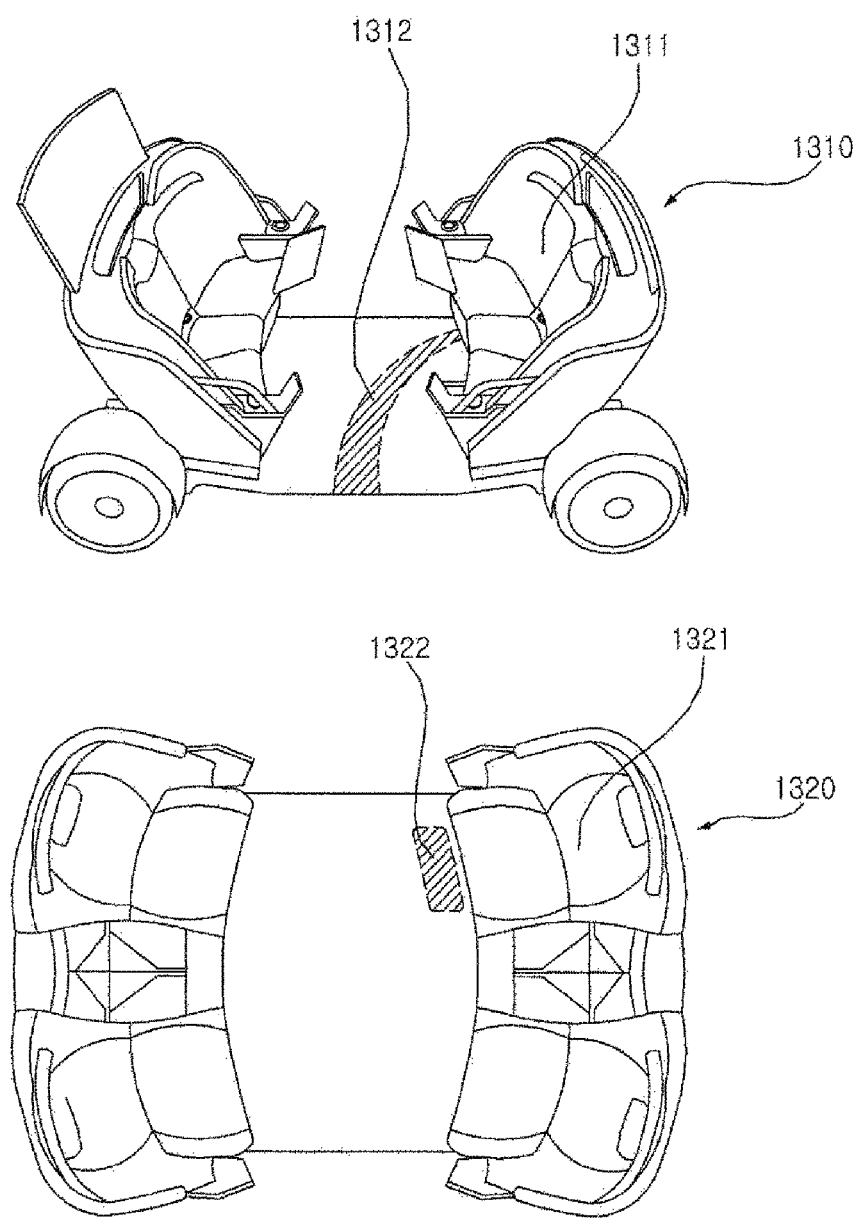

FIG. 13 is a reference view illustrating the operation of the cabin system according to the embodiment of the present disclosure.

Referring to FIG. 13, the cabin system 100 may further include guide lights 1312 and 1322. The guide lights 1312 and 1322 may be disposed on at least one of the floor, the ceiling, the door, or the seat in the cabin. The processor 171 may sense entrance of a first user. The processor 171 may sense entrance of the first user based on image data received from the internal camera 251 and the external camera 252. As indicated by reference numeral 1310, in the case in which entrance of the first user is sensed, the processor 171 may provide a control signal to the guide light 1312 such that guide light is output from the door to a first boarding seat. In some embodiments, the guide light 1312 may include a plurality of light sources disposed from the door to a first seat 1311. The processor 171 may control the guide light 1312 such that the light sources are sequentially turned on in order to provide an animation effect.

As indicated by reference numeral 1320, in the case in which entrance of the first user is sensed, the processor 171 may control the guide light 1322 such that a light source disposed around a first seat 1321 is turned on.

Figure 14:
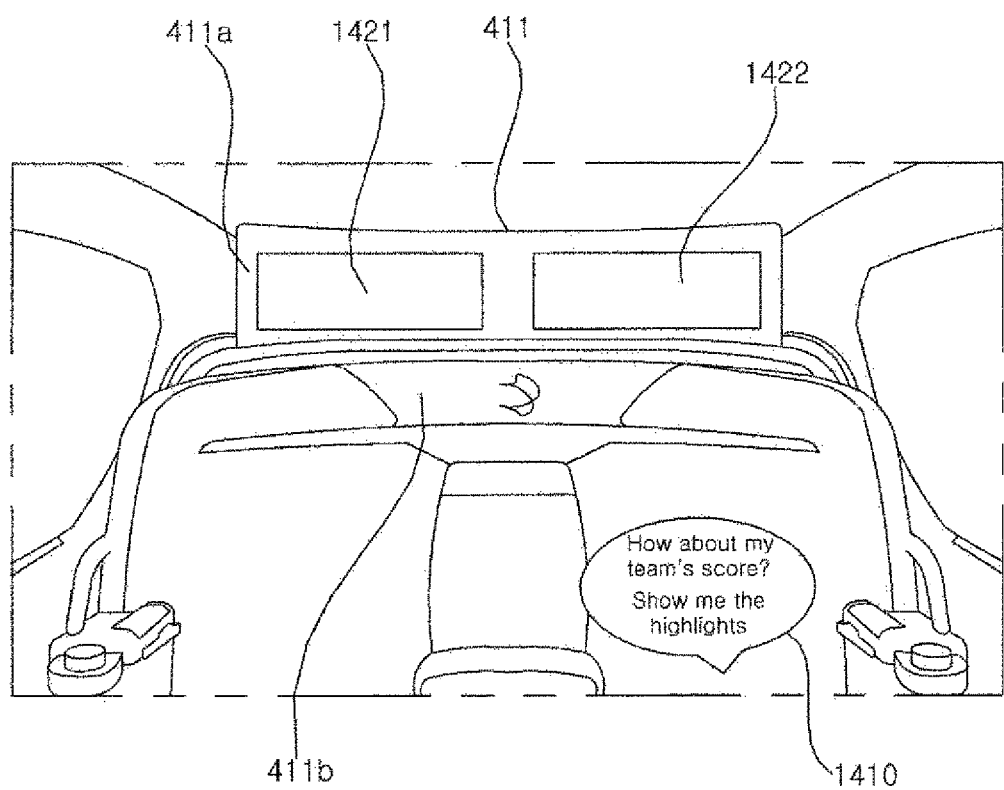

FIG. 14 is a reference view illustrating the operation of the cabin system according to the embodiment of the present disclosure.

Referring to FIG. 14, the processor 171 may provide a control signal to at least one of the display or the speaker such that first content corresponding to the first information is output. For example, in the case in which the first user requests highlight output (1410), the processor 171 may display a highlight image of a team that the user prefers on at least one display 411 based on first user information. The preference team of the first user may be included in the first information.

In the case in which a plurality of users is in the cabin, the processor 171 may divide a display area of the display 411. The processor 171 may divide the display area of the display 411 into a first area and a second area. The processor 171 may perform control such that first content corresponding to the first information is displayed in the first area 1421 of the display 411. The processor 171 may perform control such that second content corresponding to the second information is displayed in the second area 1422 of the display 411. In the case in which the second content is identical to the first content, the processor 171 may display the first content in the entire area of the display 411.

Meanwhile, the processor 141 may divide the display 411 into a plurality of areas by default. The processor 141 may divide the display 411 into a content display area 1420 and a user interface area 1430. The processor 171 may display the user request content in the content display area 1420. The content display area 1420 may be divided into a first area 1421 and a second area 1422. The user interface area 1430 may be a display area that reacts to a user request. The processor 171 may output a user interface screen in the user interface area 1430. The processor 171 may output an artificial intelligence agent screen in the user interface area 1430. For example, in the case in which the input device 200 receives user input, the processor 171 may change a first graphical object displayed in the user interface area 1430 to a second graphical object in order to indicate that the user input has been received. The first graphical object and the second graphical object may be realized as animations.

Figure 15:
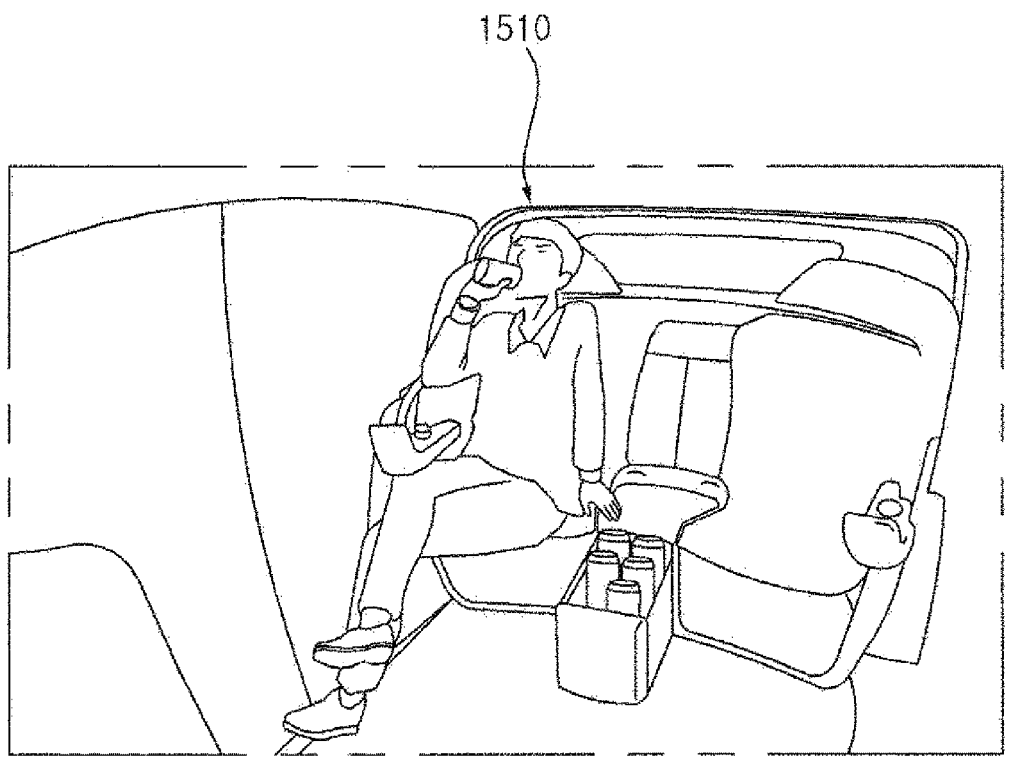

FIG. 15 is a reference view illustrating the operation of the cabin system according to the embodiment of the present disclosure.

Referring to FIG. 15, the processor 171 may select a product based on an electrical signal received from at least one of the communication device 300, the internal camera 251, or the input device 200 ("200" 의 오기입니다). For example, a user's product selection intention may be converted into an electrical signal through at least one of the mobile terminal 390, the communication device 300, the internal camera 251, or the input device 200. The processor 171 may select a product that the user needs based on the electrical signal converted from the user intention. The processor 171 may provide a signal to the cargo system such that the selected product is provided. The cargo system 500 may open the cargo box in order to provide the selected product.

The input device 200 may receive user input, and may convert the same into a first electrical signal. The touch sensor included in the touch input unit 210 may convert user touch input into an electrical signal. The gesture sensor 221 included in the gesture input unit 220 may convert user gesture input into an electrical signal. The jog dial 231 included in the mechanical input unit 230 may convert mechanical user input into an electrical signal. The microphone 241 included in the voice input unit 240 may convert user voice input into an electrical signal.

The display system 400 may display a product menu on at least one display based on the electrical signal converted by the input device 200. In the state in which the product menu is displayed on the display, the input device 200 may receive user input for selecting a product. The input device 200 may convert user input for selecting a first product into a second electrical signal.

The cargo system 500 may control a sliding mechanism based on the second electrical signal such that the box is moved into the cabin. The cargo system 500 may control a lifting mechanism based on the second electrical signal such that the first product is exposed in the cabin.

Meanwhile, a cargo button 549 may convert user input into an electrical signal. The cargo system 500 may control the sliding mechanism based on the electrical signal such that the box is moved into the cabin. The cargo system 500 may control the lifting mechanism based on the electrical signal such that a plurality of products is exposed in the cabin.

Meanwhile, the sliding mechanism may be operated according to a control signal received from the processor 171. The sliding mechanism may slide the cargo box. The sliding mechanism may slide the cargo box into the cabin from a hidden space in the seat. The sliding mechanism may include a driving unit, a power conversion unit, and a driving force transmission unit. The driving unit may convert electrical energy into kinetic energy. The driving unit may generate driving force. The driving unit may include at least one of a motor, an actuator, or a solenoid. The power conversion unit may convert the generated driving force into power suitable to move the cargo box. For example, the power conversion unit may convert rotary power into rectilinear power. The driving force transmission unit may provide the converted power to the cargo box. The sliding mechanism may further include a rail. The cargo box may slide along the rail based on the power transmitted by the driving force transmission unit.

Meanwhile, the lifting mechanism may be operated according to a control signal received from the processor 171. The lifting mechanism may lift a shelf disposed in the cargo box. The lifting mechanism may include a driving unit, a power conversion unit, and a driving force transmission unit. The driving unit may convert electrical energy into kinetic energy. The driving unit may generate driving force. The driving unit may include at least one of a motor, an actuator, or a solenoid. The power conversion unit may convert the generated driving force into power suitable to move the shelf. For example, the power conversion unit may convert rotary power into rectilinear power. The driving force transmission unit may provide the converted power to the shelf. The shelf may be lifted based on the power transmitted by the driving force transmission unit.

Figure 16:
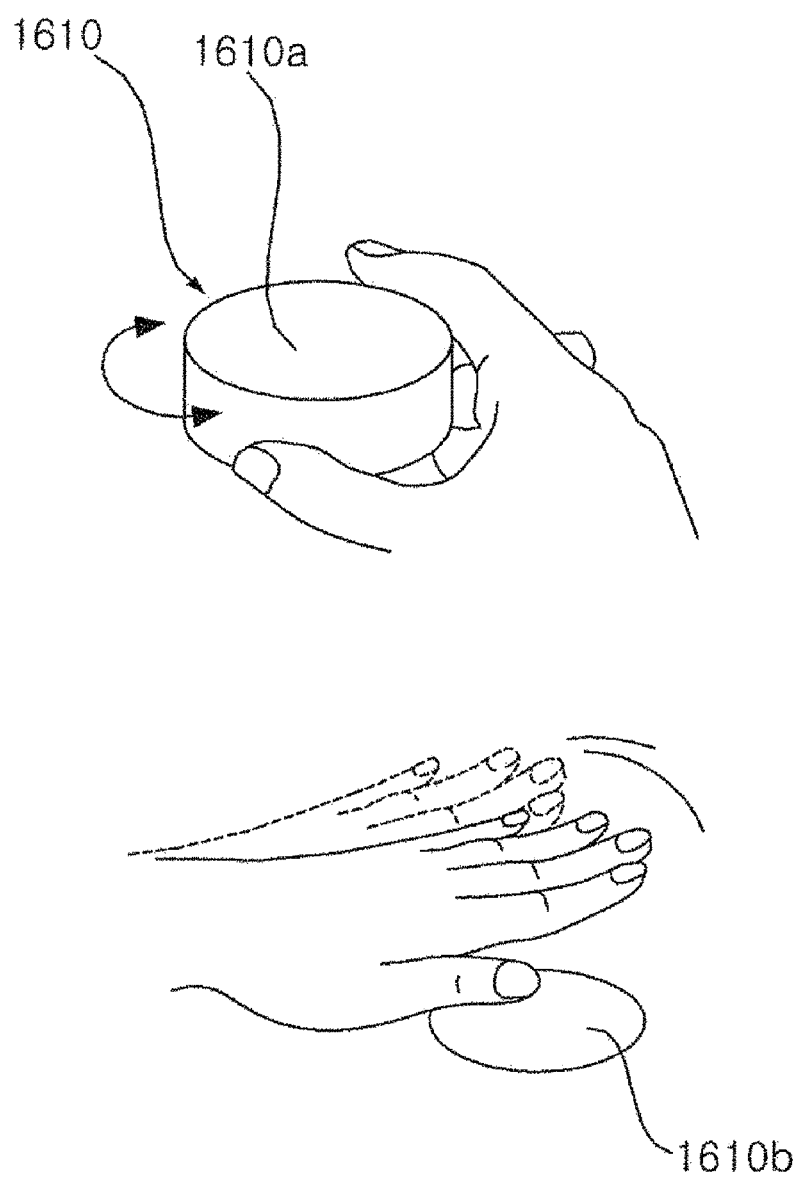

FIG. 16 is a reference view illustrating the operation of the cabin system according to the embodiment of the present disclosure.

Referring to FIG. 16, the input device 200 may further include a jog dial device 1610. The jog dial device 1610 may include a gesture sensor provided on at least a portion thereof for converting user gesture input into an electrical signal. The jog dial device 1610 may be formed so as to protrude from and retreat into at least one of the seat, the armrest, or the door.

In the state of protruding from the armrest (1610a), the jog dial device 1610 may receive mechanical input. In this case, the jog dial device 1610 may function as the mechanical input unit 230. In the state of retreating in the armrest (1610b), the jog dial device 1610 may receive gesture input. In this case, the jog dial device 1610 may function as the gesture input unit 220.

The input device 200 may further include an upward and downward movement mechanism. The upward and downward movement mechanism may be operated according to a control signal from the processor 171. The upward and downward movement mechanism may include a driving unit, a power conversion unit, and a power transmission unit. The driving unit may convert electrical energy into kinetic energy. The driving unit may generate driving force. For example, the driving unit may include at least one of a motor, an actuator, or a solenoid. The power conversion unit may convert the generated driving force into power suitable to move the jog dial device. The power transmission unit may transmit the converted power to the jog dial device.

The processor 171 may provide a control signal for adjusting the upward or downward movement of the jog dial device in response to a sitting position. In the case in which first sitting position data are acquired, the processor 171 may provide a control signal to the upward and downward movement mechanism such that the jog dial device is level with the peripheral structure (e.g. the seat, the armrest, or the door). The upward and downward movement mechanism may move the jog dial device upwards. In this case, the jog dial device may be in a first state 1610a. In the first state 1610a, the jog dial device may function as the mechanical input unit 230. In the case in which second sitting position data are acquired, the processor 171 may provide a control signal to the upward and downward movement mechanism such that the jog dial device protrudes farther than the peripheral structure. The upward and downward movement mechanism may move the jog dial device downwards. In this case, the jog dial device may be in a second state 1610b. In the second state 1610b, the jog dial device may function as the gesture input unit 220.

Meanwhile, in the case in which the sitting position is lowered (e.g. in the case in which the sitting position is changed from the first sitting position to the second sitting position), the processor 171 may provide a control signal for displaying a manipulation guide image, displayed on the upper surface of the jog dial device, on the side surface of the jog dial device.

Meanwhile, the user sitting position may be divided into a first sitting position and a second sitting position. The first sitting position may be defined as a posture in which the user sits on the seat, and the second sitting position may be defined as a posture in which the user lies down on the seat. The first sitting position may be described as a higher posture than the second sitting position, and the second sitting position may be described as a lower posture than the first sitting position.

FIG. 17 is a reference view illustrating the operation of the cabin system according to the embodiment of the present disclosure.

Referring to FIG. 17, the processor 171 may provide an interface for handicapped people based on the first information. As indicated by reference numeral 1710, the processor 171 may realize a haptic interface for blind people on one surface of the jog dial device. For example, the processor 171 may three-dimensionally realize a manipulation guide mark on one surface of the jog dial device.

As indicated by reference numeral 1720, the cabin system 200 may include a turntable 1721. The processor 171 may acquire information about a wheelchair through the image device 250. Upon determining that the wheelchair is located on the turntable 1721, the processor 171 may rotate the turntable 1721 toward a boarding seat for a user in the wheelchair.

Figure 18:
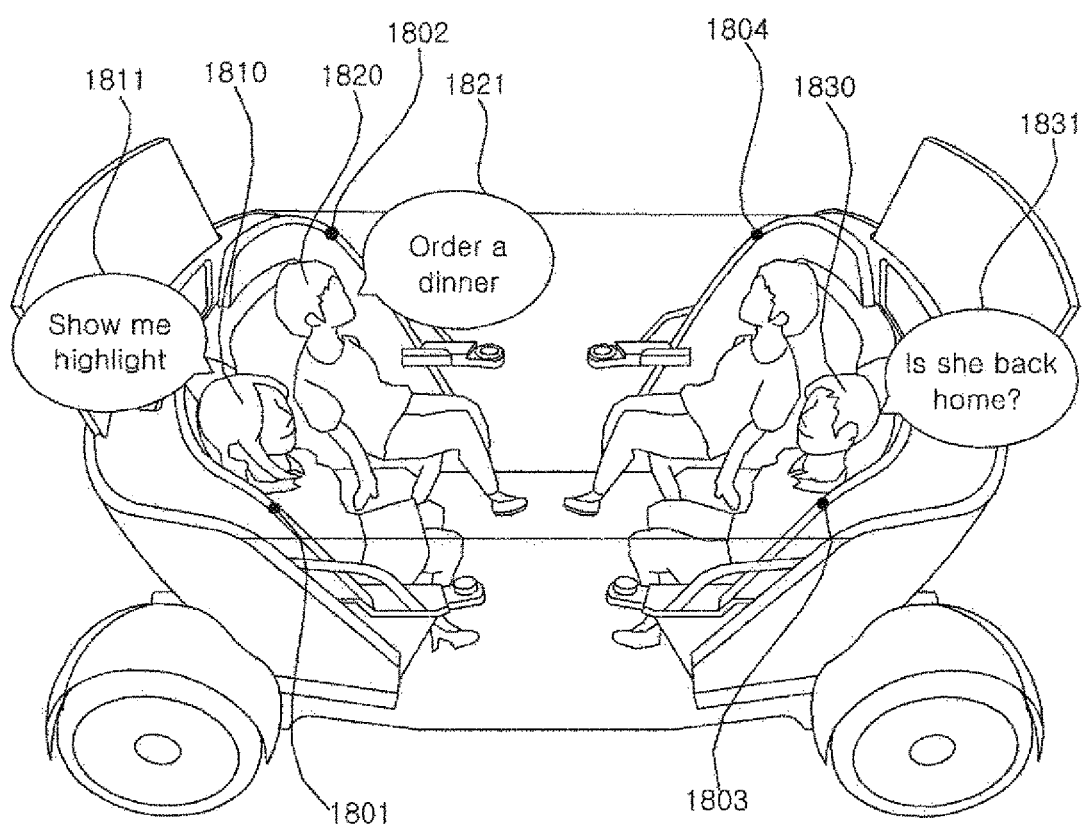

FIG. 18 is a reference view illustrating the operation of the cabin system according to the embodiment of the present disclosure.

Referring to FIG. 18, the input device 200 may include at least one beamforming microphone 1801, 1802, 1803, or 1804. The processor 171 may divide voice input through the beamforming microphone 1801, 1802, 1803, or 1804 into first user voice and second user voice. For example, the input device 200 may include a plurality of beamforming microphones 1801, 1802, 1803, and 1804 disposed around the seats. The number of beamforming microphones 1801, 1802, 1803, and 1804 may correspond to the number of seats. For example, the input device 200 may include a single beamforming microphone.

As exemplarily shown in FIG. 18, the first beamforming microphone 1801 may receive first voice 1811 of a first user 1810. The first beamforming microphone 1801 may receive second voice 1821 of a second user 1820. The first beamforming microphone 1801 may receive third voice 1831 of a third user 1830. The processor 171 may distinguish among the first user 1810, the second user 1820, and the third user 1830 based on the location of speakers determined through two microphones included in the beamforming microphone. The processor 171 may distinguish among the first voice

1811, the second voice 1821, and the third voice 1831 based on the location of each of the first user 1810, the second user 1820, and the third user 1830. The processor 171 may generate a control signal based on voice input of the distinguished users.

Figure 19:
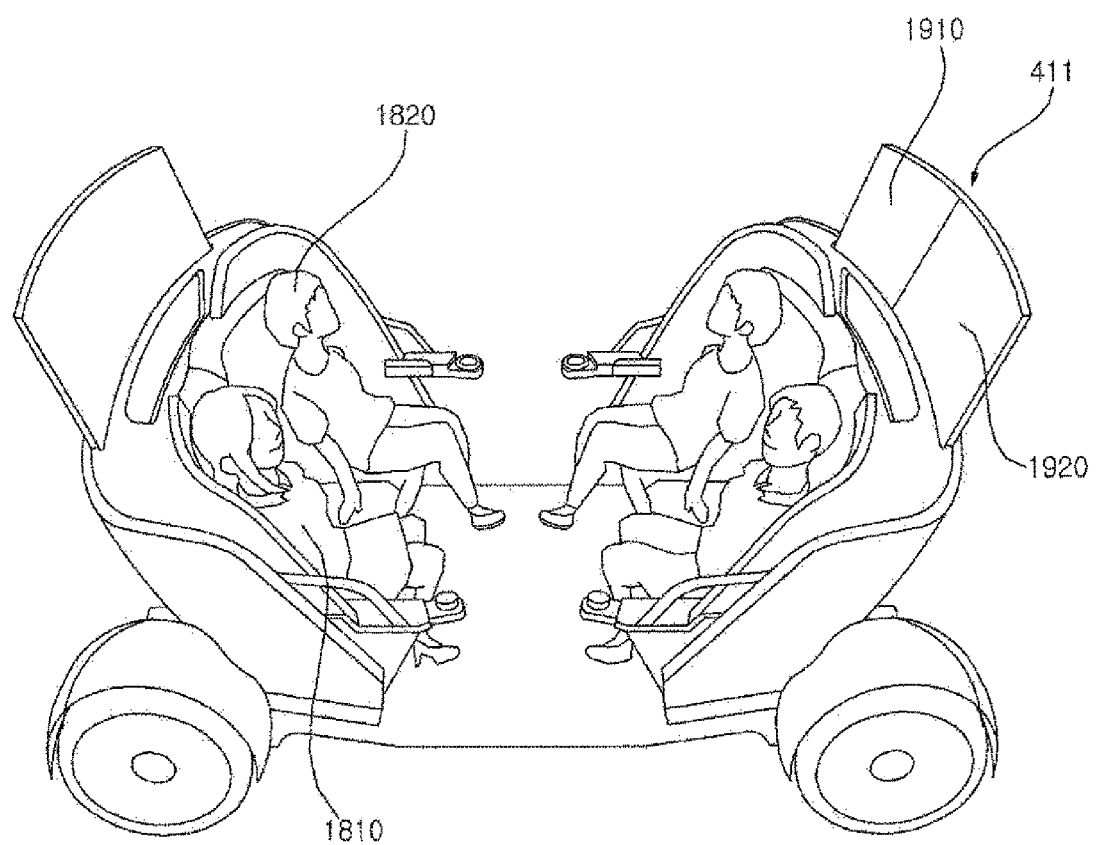

FIG. 19 is a reference view illustrating the operation of the cabin system according to the embodiment of the present disclosure.

Referring to FIG. 19, the input device 200 may receive first input of the first user 1810 and second input of the second user 1820. Each of the first input and the second input may be input requesting the output of content.

The first input and the second input may correspond to different kinds of content. The first input may be input requesting the output of first content, and the second input may be input requesting the output of second content. In this case, the processor 171 may divide the display area of the display 411 into a first area 1910 and a second area 1920. The processor 171 may display the first content corresponding to the first input in the first area, and may display the second content corresponding to the second input in the second area.

Both the first input and the second input may correspond to the first content. Each of the first input and the second input may be input requesting output of the first content. In this case, the processor 171 may display the first content in the entire area of the display 411.

Figure 20:
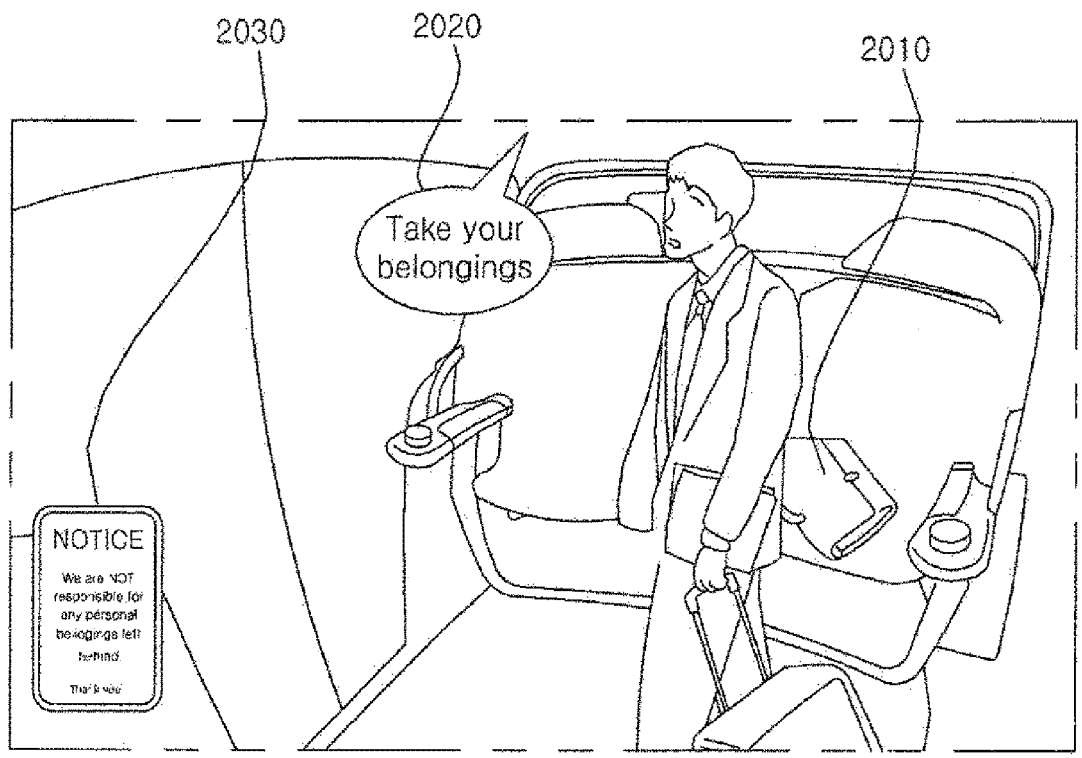

FIG. 20 is a reference view illustrating the operation of the cabin system according to the embodiment of the present disclosure.

Referring to FIG. 20, the processor 171 may detect first user's belongings 2010 in an image inside the cabin. The processor 171 may receive image data from the internal camera 251. The processor 171 may detect the first user's belongings 2010 based on the image data. For example, the processor 171 may detect an increase in volume due to the belongings 2010 in order to detect the belongings.

The processor 171 may determine whether the first user exits the vehicle while leaving the belongings based on the image inside the cabin. The processor 171 may detect the belongings 2010 on the seat or the floor and the motion of the first user exiting the vehicle based on the image data from the internal camera 251. Upon determining that the first user exits the vehicle while leaving the belongings, the processor 171 may output an alarm 2020 or 2030 through at least one of the display of the display system 400 or the speaker of the sound output unit 490.

Figure 21:
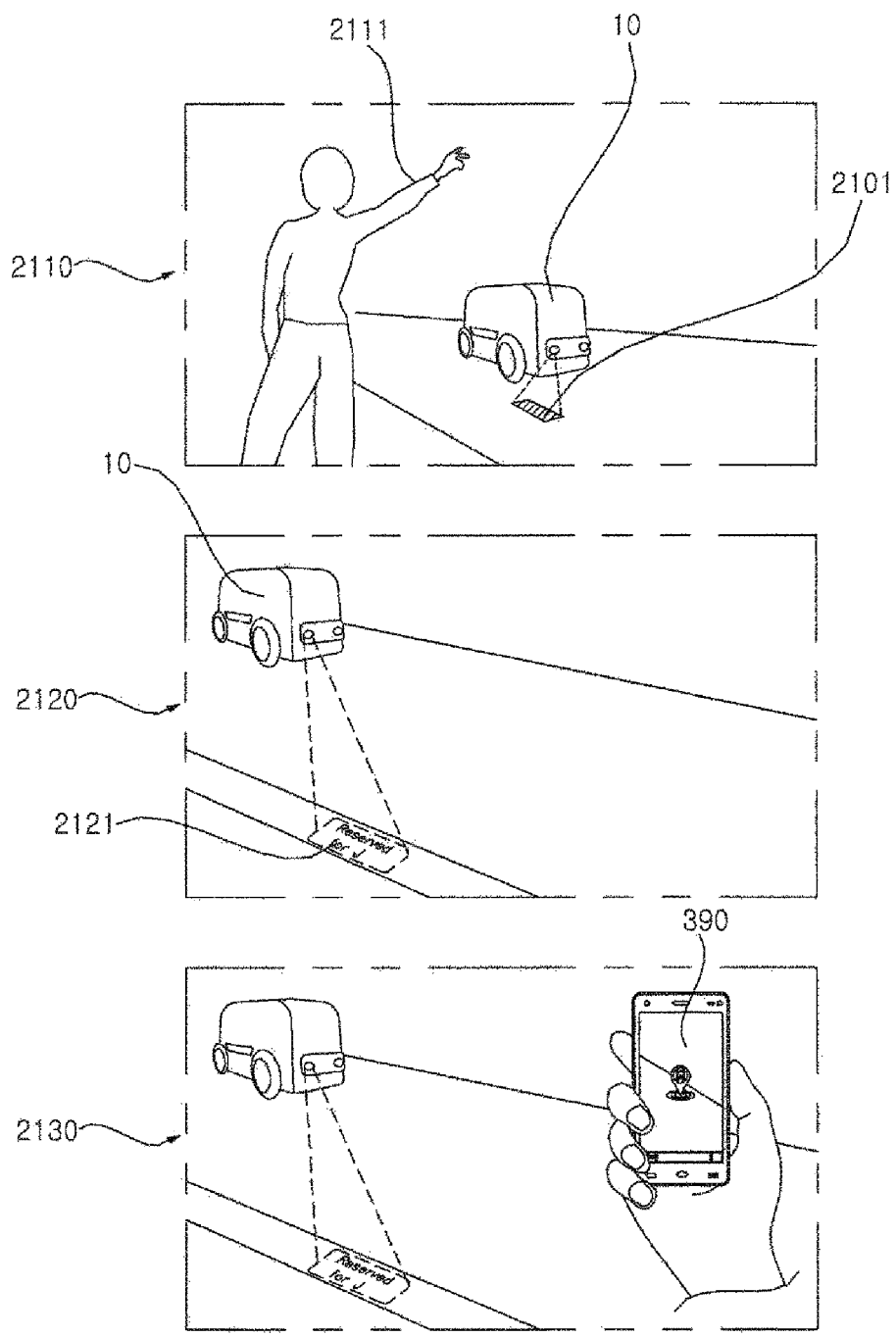

FIG. 21 is a reference view illustrating the operation of the cabin system according to the embodiment of the present disclosure.

Referring to FIG. 21, the vehicle 10 may be operated according to the wave motion of an external user. As indicated by reference numeral 2110, the vehicle 10 may detect a user wave motion 2111 through the camera included in the object detection device. In this case, the vehicle 10 may output first light 2101 to the surface of a road toward the user through a light output device. Here, the first light 2101 may be understood to be light informing adjacent vehicles or pedestrians that the vehicle 10 approaches the user. As indicated by reference numeral 2120, the vehicle 10 may output second light 2121 to the vicinity of the user through the light output device. Here, the second light 2121 may be understood to be light informing the user of a boarding position. As indicated by reference numeral 2130, the vehicle 10 may transmit boarding position information to the mobile terminal 390 of the user. The mobile terminal 390 may display the boarding position information in augmented reality. Through the above processes, the user may use the vehicle 10 without separate booking.

Figure 22:
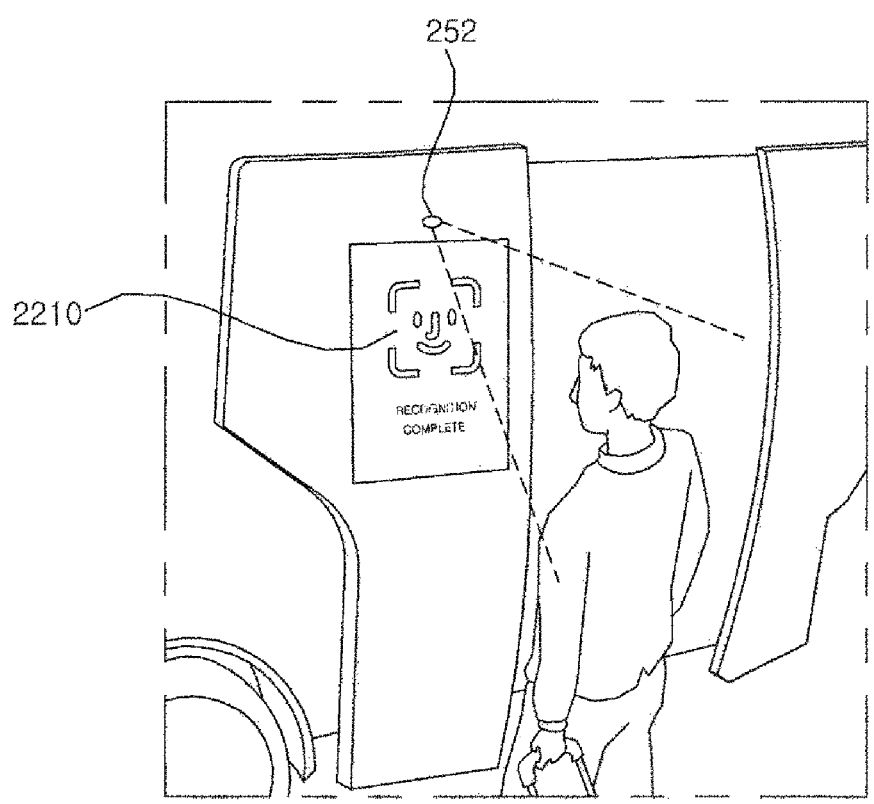

FIG. 22 is a reference view illustrating the operation of the cabin system according to the embodiment of the present disclosure.

Referring to FIG. 22, the external camera 252 may capture an image of a user. The processor 171 may acquire user information based on image data acquired by the external camera 252. For example, the processor 171 may acquire user body information, baggage information, and fellow passenger information based on the image data of the external camera 252. The processor 171 may specify the user based on the image data of the external camera 252.

The cabin system 100 may further include an external display 2210. The external display 2210 may be classified as a lower-level component of the display system 400. The external display 2210 may be disposed at a portion of the outside of the door. The processor 171 may provide a screen before entrance of the user through the external display 2210. For example, the processor 171 may display a user information confirmation screen or a user authentication completion screen on the external display 2210.

Figure 23:
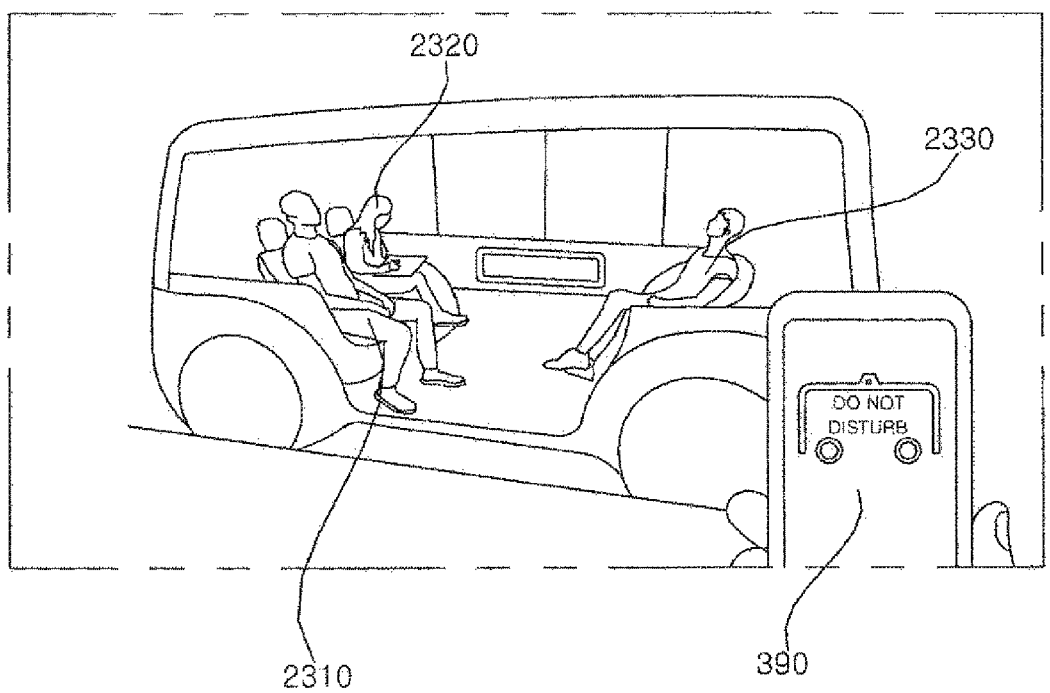

FIG. 23 is a reference view illustrating the operation of the cabin system according to the embodiment of the present disclosure.

Referring to FIG. 23, the cabin system 100 may provide various boarding modes to a user. The processor 171 may provide the user with a mode selected based on user input. Mode selection may be performed through the mobile terminal 390 before the user enters the vehicle 10. Alternatively, the mode selection may be performed by the user through the input device 200 in the cabin.

The cabin system 100 may further include a light output device. The light output device may include a plurality of light sources disposed so as to correspond to the plurality of seats. For example, the processor 171 may provide a sleeping mode 2310 according to sleeping mode selection input. In the case in which the sleeping mode is selected, the processor 171 may control the light output device such that no light is output toward the user. For example, the processor 171 may provide a reading mode 2320 according to reading mode selection input. In the case in which the reading mode is selected, the processor 171 may control the light output device such that light is output toward the user.

For example, the processor 171 may provide a multimedia mode 2330 according to multimedia mode selection input. In the case in which the multimedia mode is selected, the processor 171 may provide multimedia content to the user. For example, the processor 171 may provide at least one of a drama, a movie, a TV program, or a music video. In this case, the processor 171 may provide content having running time corresponding to the movement time of the user. In some embodiments, the processor 171 may provide game content. The processor 171 may provide game interfaces to a plurality of users such that the users can use a single game.

Figure 24:
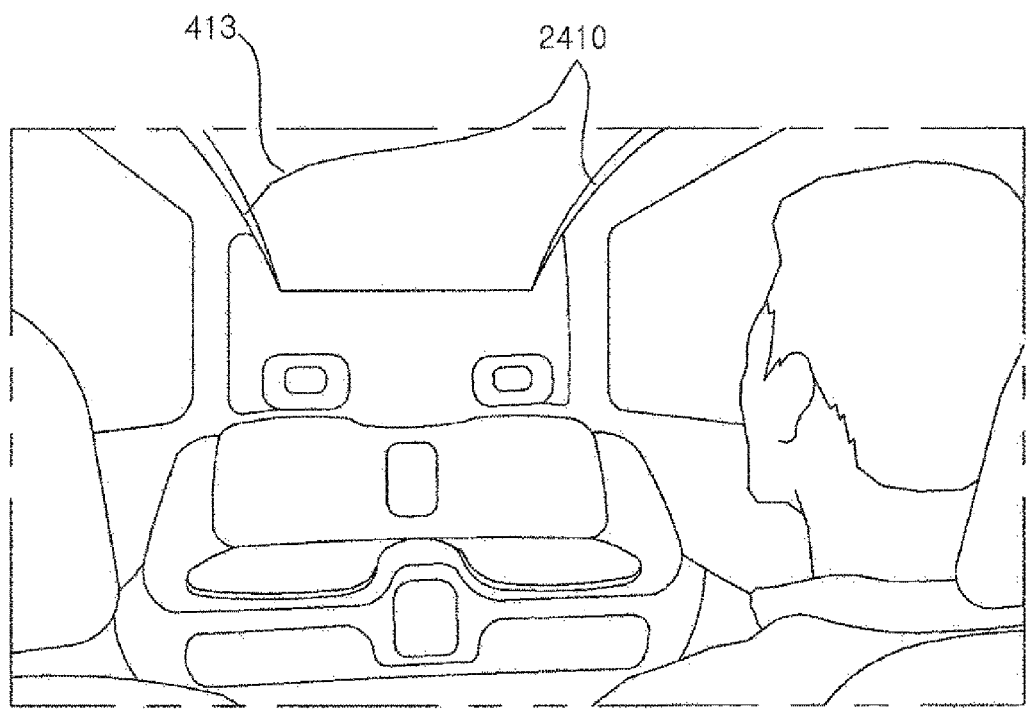

FIG. 24 is a reference view illustrating the operation of the cabin system according to the embodiment of the present disclosure.

Referring to FIG. 24, the cabin system 100 may further include a light output area 2410. The light output area 2410 may be disposed around the display 413 of the display system 400. The light output area 2410 may be disposed at opposite sides of the edge of the display 413. The processor 171 may control a light output pattern of the light output area 2410 disposed at the opposite sides of the display 413 of the display system 400. The processor 171 may perform control such that the color of the light output from respective parts of the light output area 2410 is changed.

The processor 171 may receive traveling speed data of the vehicle 10 from at least one electronic device mounted in the vehicle 10 through the interface unit 180. The processor 171 may control the light output pattern of the light output area 2410 based on the traveling speed data. For example, the processor 171 may control speed at which the color of the light output from the respective parts of the light output area 2410 is changed based on the traveling speed data. Through the above control, the user who watches the content output from the display 413 may recognize the motion of the vehicle 10 and thus may not feel motion sickness.

Figure 25:
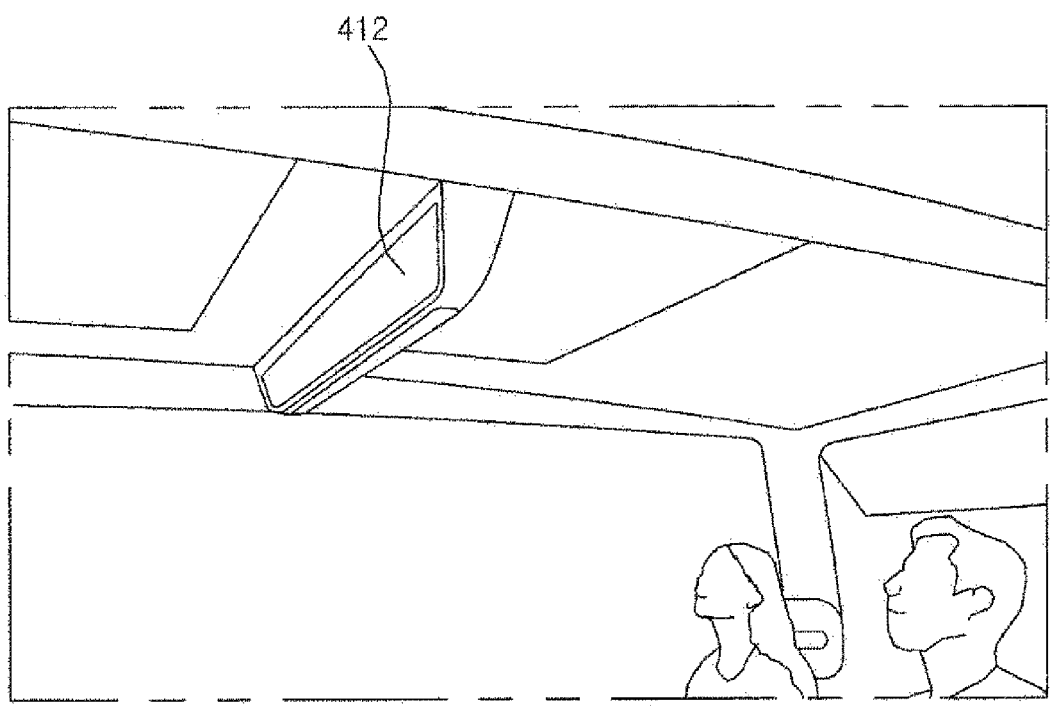

FIG. 25 is a reference view illustrating the operation of the cabin system according to the embodiment of the present disclosure.

Referring to FIG. 25, the processor 171 may display information related to a landform on which the vehicle is traveling on the display 412 of the display system 400. The processor 171 may display content on the display 412 of the display system 400 in a state of being linked to the landform on which the vehicle is traveling. For example, the processor 171 may receive data about whether the vehicle 10 passes over a bump from at least one electronic device mounted in the vehicle 10 through the interface unit 180. The processor 171 may change the position of the content display area based on the data about the bump. Through the above control, the user who watches the content output from the display 413 may recognize the motion of the vehicle 10 and thus may not feel motion sickness.

FIG. 26 is a reference view illustrating the operation of the cabin system according to the embodiment of the present disclosure.

As indicated by reference numeral 2610, the display system 400 may further include a window screen 2613 or 2614. The window screen may be provided on at least a portion of a window 2611 or 2612 of the vehicle. The window screen may be realized as a transparent display. The processor 171 may provide a control signal to the window screen. A plurality of window screens 2613 and 2614 may be provided at windows 2611 and 2612 that are adjacent to the plurality of seats. The processor 171 may display content requested by a plurality of users on the window screens 2613 and 2614. The processor 171 may display content requested by a user on the window screen 2613 or 2614 that is the closest to the user. For example, the processor 171 may display first content requested by a first user 2616 on a first window screen 2613, which is the closest to the first user 2616. In addition, the processor 171 may display second content requested by a second user 2617 on a second window screen 2614, which is the closest to the second user 2617. The user may watch the content displayed on the window screen 2614 while looking out the windows 2611 and 2612.

As indicated by reference numeral 2620, a window screen 2622 may realize a blind function. The window screen 2622 may adjust the transmission amount of light directed to a window 2621. The processor 171 may control the window screen 2622 based on user input. The processor 171 may control the window screen 2622 such that at least a portion of a blind area is removed (2624) based on user touch or gesture 2623 on the window screen 2622.

Figure 27:
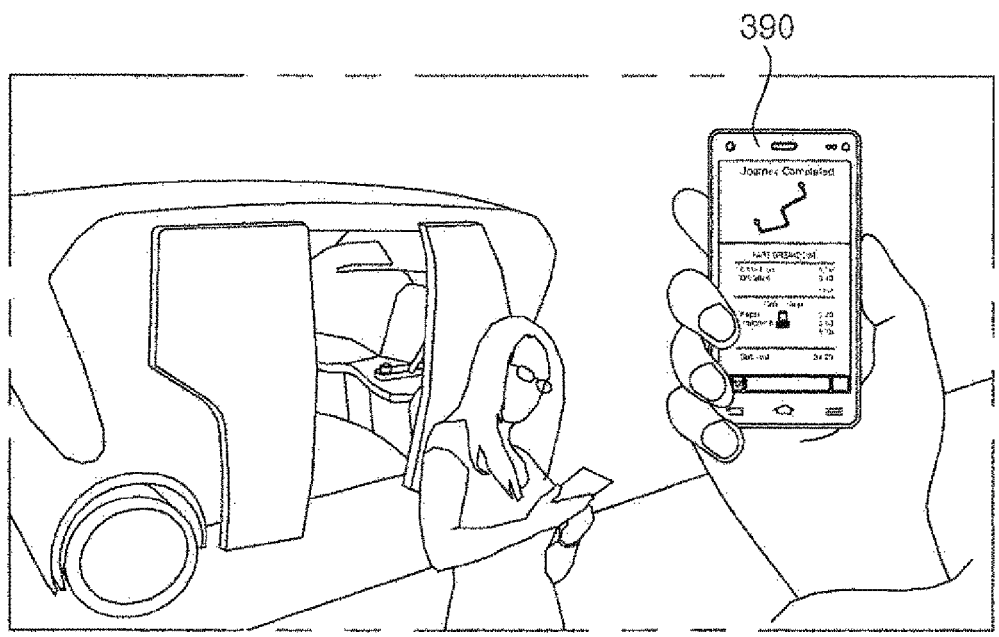

FIG. 27 is a reference view illustrating the operation of the cabin system according to the embodiment of the present disclosure.

Referring to FIG. 27, in the case in which exiting information of a user is acquired, the processor 171 may transmit data related to user's use of the cabin system to the mobile terminal 390 through the communication device 300. For example, the processor 171 may transmit information about the movement route of the user, the kind of functions that the user uses, and charges based on the use to the mobile terminal 390. The mobile terminal 390 may display data related to the use of the cabin system.

Figure 28:
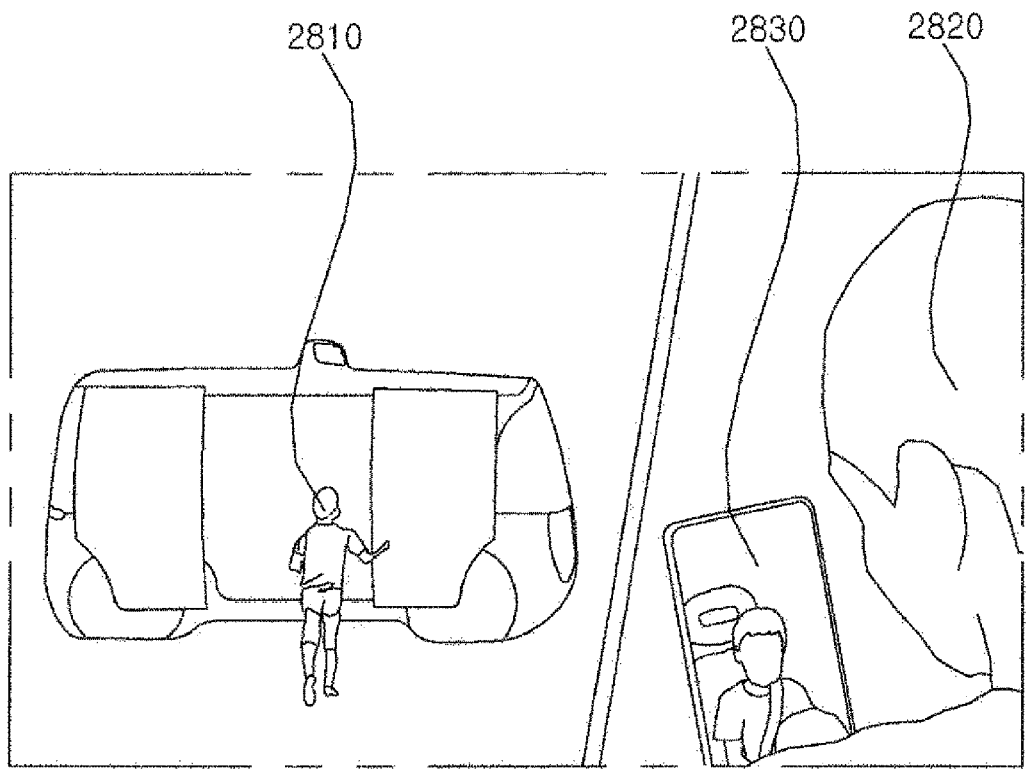

FIG. 28 is a reference view illustrating the operation of the cabin system according to the embodiment of the present disclosure.

Referring to FIG. 28, the cabin system 100 may provide a guardian notification function. The processor 171 may transmit status information of a passenger 2810 to a mobile terminal 2830 of a user 2820 through the communication device 300. The user 2820 may be a guardian of the passenger 2810.

The user 2820 may reserve the vehicle 10 for the passenger 2810, and may request information about the passenger 2810. The processor 171 may transmit entrance information, location information, and exiting information of the passenger 2810 to the mobile terminal 2830 of the user 2820. The processor 171 may transmit an image of the passenger 2810 captured by the internal camera 251 and the external camera 252 to the mobile terminal 2830 of the user 2820. The mobile terminal 2830 may display information received from the cabin system 100.

FIG. 29 is a reference view illustrating the operation of the cabin system according to the embodiment of the present disclosure.

Referring to FIG. 29, the cabin system 100 may provide a shopping function and a hotel reservation function. As indicated by reference numeral 2910, the processor 171 may display shopping content 2911 and 2914 received from a shopping server through the display of the display system 400. The processor 171 may receive product purchase input 2912 and 2913 related to the shopping content 2911 and 2914 through the input device 200. The processor 171 may transmit user's product purchase input data to the shopping server through the communication device 300. Meanwhile, the shopping content 2911 and 2914 may relate to a product connected with products provided by the cargo system 500. In the case in which user purchase input is received with respect to the product connected with the products provided by the cargo system 500, the processor 171 may transmit purchase input data including discounted price data to the shopping server.

As indicated by reference numeral 2920, the processor 171 may display hotel reservation content 2921 received from a hotel server through the display of the display system 400. The processor 171 may receive hotel reservation input through the input device 200. The processor 171 may transmit hotel reservation input data to the hotel server through the communication device 300.

Figure 30:
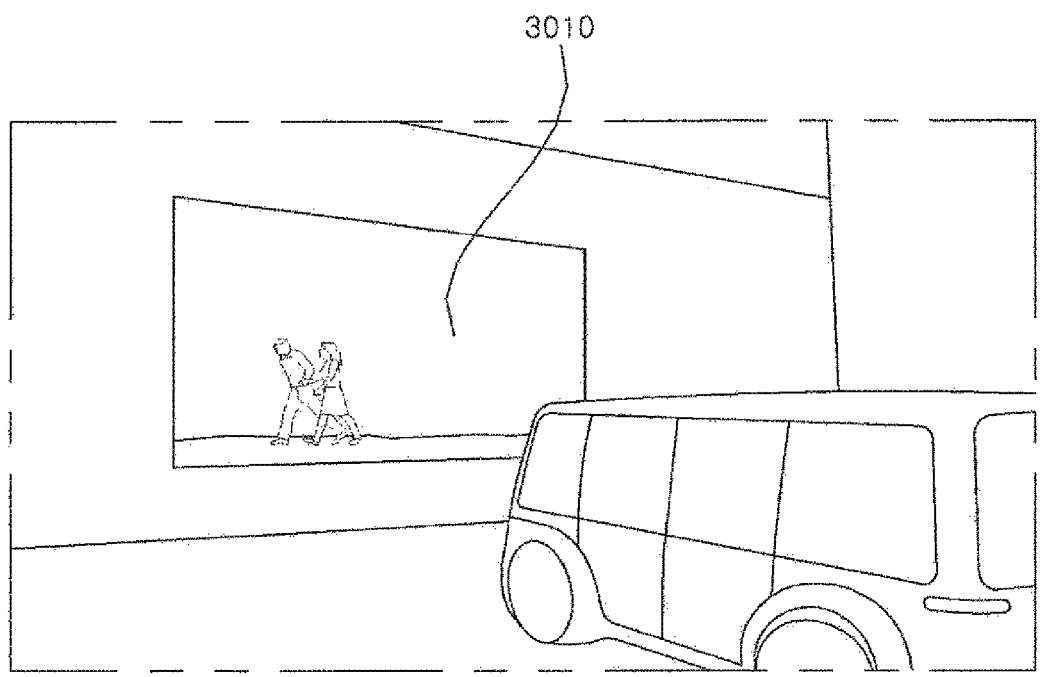

FIG. 30 is a reference view illustrating the operation of the cabin system according to the embodiment of the present disclosure.

Referring to FIG. 30, the cabin system 100 may provide a movie playing function on an external screen. The processor 171 may provide a control signal to an external light output device of the vehicle 10. The processor 171 may provide a control signal such that selected content is projected to the external screen through the external light output device.

FIG. 31 is a reference view illustrating the operation of the cabin system according to the embodiment of the present disclosure.

Referring to FIG. 31, the cabin system 100 may provide a function of alarming collision with an object outside the vehicle. As indicated by reference numeral 3110, the processor 171 may receive data about an object around the vehicle 10 from an external object detection device. The processor 171 may acquire data about whether a user exits the vehicle from at least one of the input device 200, the image device 250, the communication device 300, the seat system 600, or the memory 175. In the case in which a dangerous object is present around the vehicle 10 in the state in which the data about whether the user exits the vehicle are acquired, the processor 171 may output an alarm 3112. In this case, the processor 171 may output an image of the surroundings of the vehicle 10.

As indicated by reference numeral 3120, the display system 4090 may further include an external display. The external display may be disposed at a portion of the outside of the vehicle 10. In the case in which the data about whether the user exits the vehicle are acquired, the processor 171 may output an alarm 3112 to the external display. The processor 170 may receive data about the operation of the vehicle 10 from at least one electronic device provided in the vehicle 10 through the interface unit 180. The processor 171 may display content on the external display based on the data about the operation of the vehicle 10. In the case in which data about stop of the vehicle 10 are acquired, the processor 171 may output the alarm 3112 to the external display.

Figure 32:
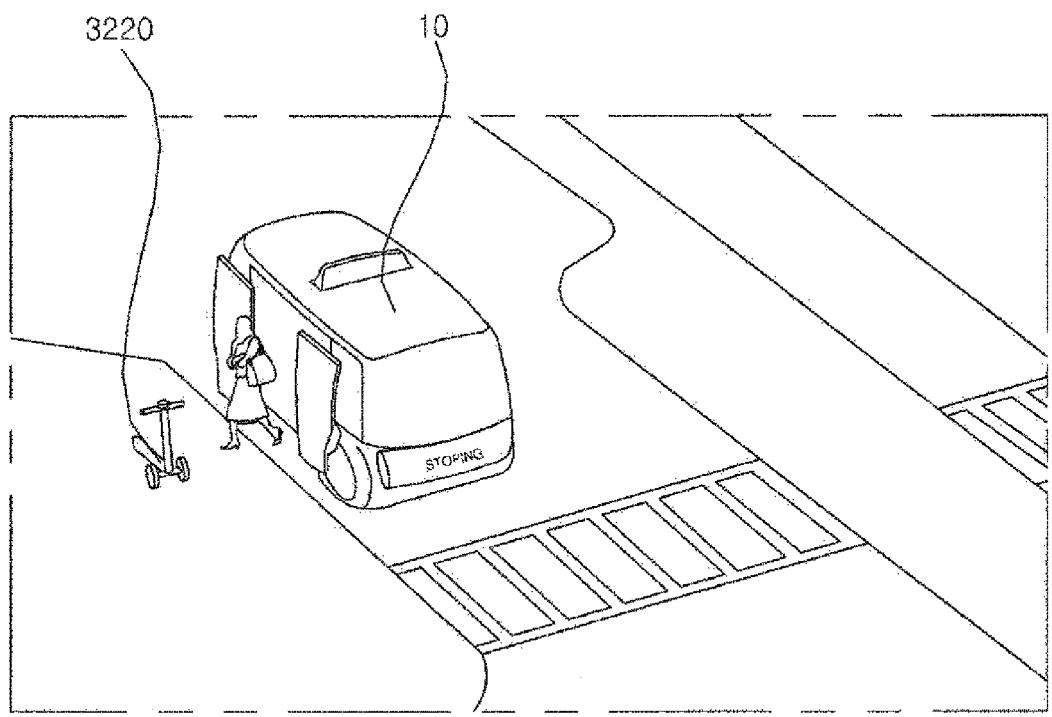

FIG. 32 is a reference view illustrating the operation of the cabin system according to the embodiment of the present disclosure.

Referring to FIG. 32, the cabin system 100 may provide a function of interoperation with a personal mobility 3220. The processor 171 may exchange a signal with an administration server through the communication device 300. The processor 171 may receive information about an available personal mobility 3220 from the administration server. The processor 171 may request that the administration server dispose the personal mobility 3220 at a place at which a user exits the vehicle based on destination information.

The processor 171 may provide information about an available personal mobility 3220 through at least one of the display system 400 or the sound output unit 490. Alternatively, the processor 171 may provide information about an available personal mobility 3220 through the communication device 300 and the mobile terminal 390. The information about the mobility 3220 may include at least one of position information of the mobility 3220, information about whether the mobility is available, residual energy information of the mobility, or information about the distance that the mobility can move.

Figure 33:
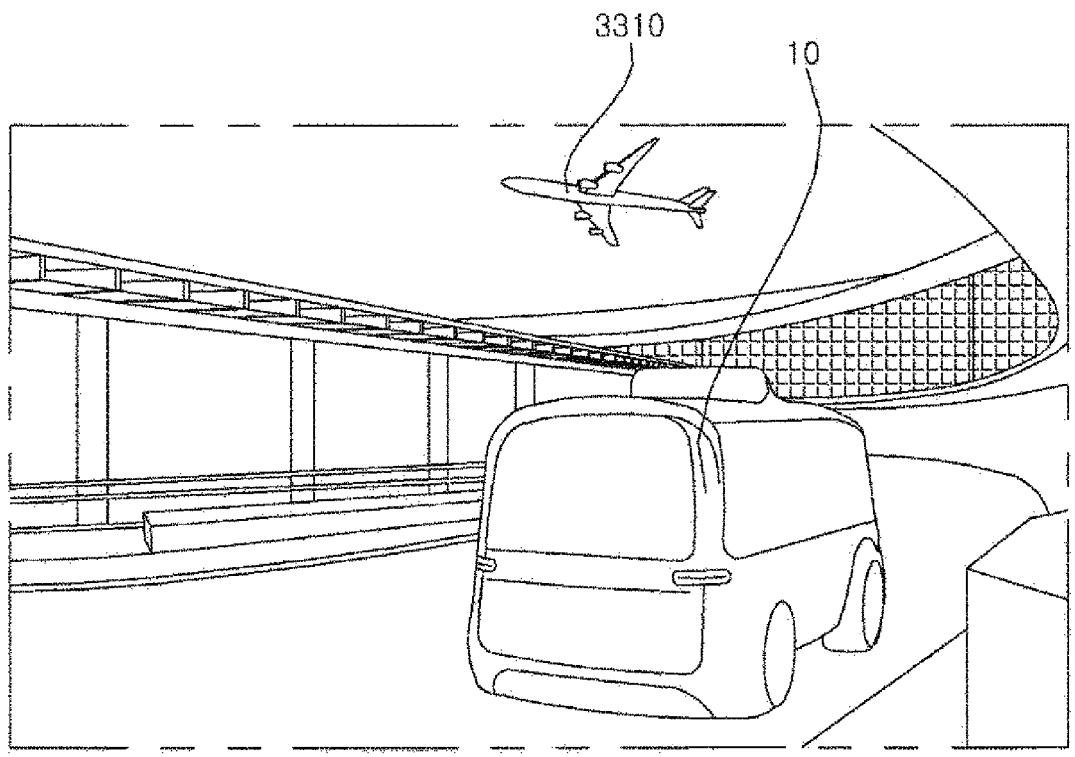

FIG. 33 is a reference view illustrating the operation of the cabin system according to the embodiment of the present disclosure.

Referring to FIG. 33, the cabin system 100 may provide a function of interoperation with an air traffic service. The processor 171 may exchange a signal with the administration server through the communication device 300. The processor 171 may receive at least one of airplane 3310 departure schedule information or airplane arrival schedule information from the administration server. The processor 171 may set airport arrival time based on at least one of the airplane departure schedule information or the airplane arrival schedule information. The processor 171 may provide a control signal such that the vehicle 10 arrives at an airport at the set time.

Figure 34:
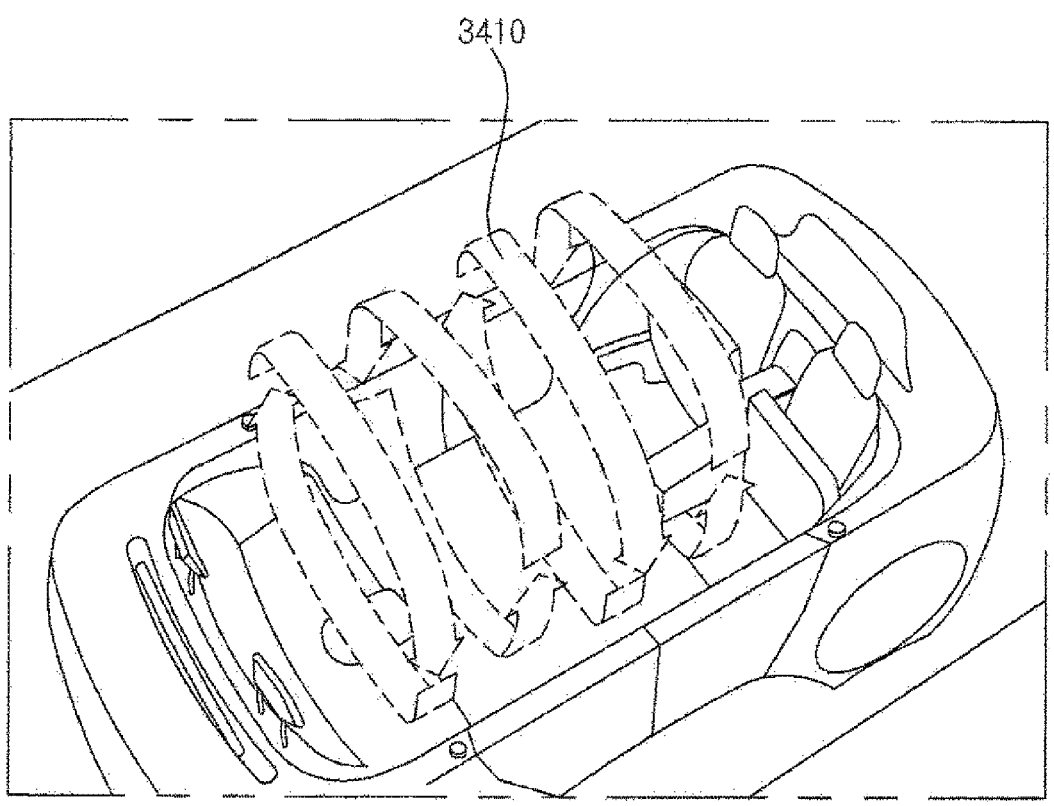

FIG. 34 is a reference view illustrating the operation of the cabin system according to the embodiment of the present disclosure.

Referring to FIG. 34, the cabin system 100 may provide a cleaning function. The cabin system 100 may further include an automatic cleaning system. The processor 171 may provide a control signal to the automatic cleaning system such that automatic cleaning is performed while the operation of the cabin system 100 is stopped. The processor 171 may emit ultraviolet light 3410 into the cabin in order to keep the cabin sanitary.

Figure 35:
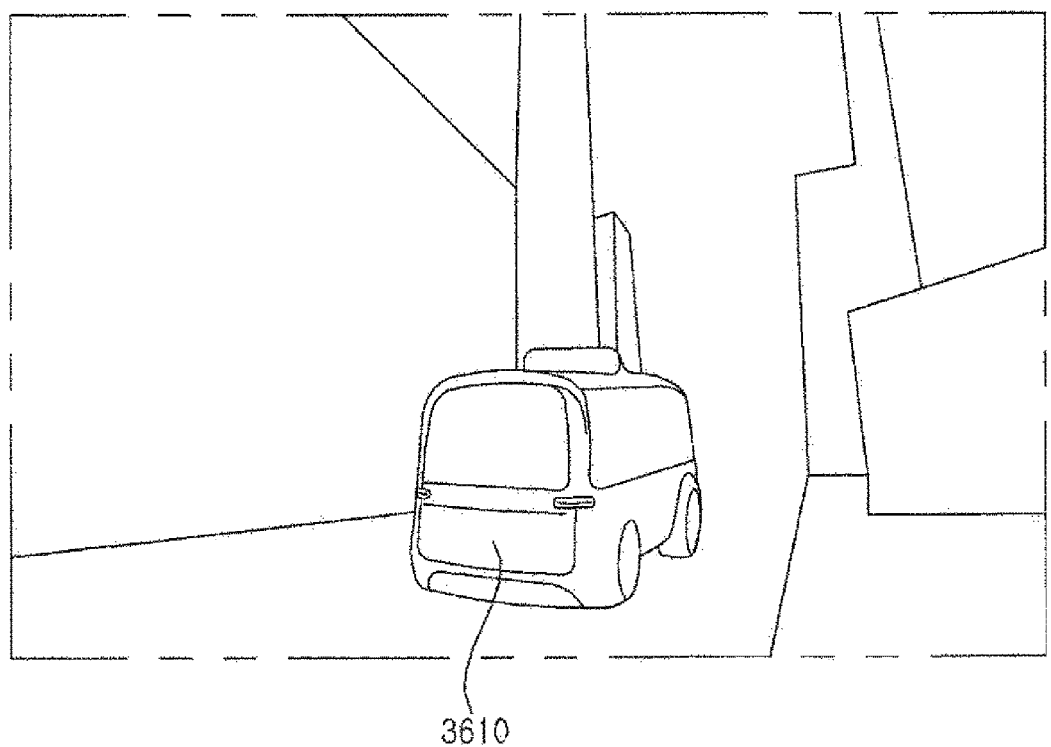

FIG. 35 is a reference view illustrating the operation of the cabin system according to the embodiment of the present disclosure.

Referring to FIG. 35, the cabin system 100 may provide an advertising function using an external display. The display system 400 may further include an external display. The processor 171 may receive advertising data from an advertising server through the communication device 300. The processor 171 may provide a control signal such that content based on the advertising data is displayed on the external display.

Figure 36:
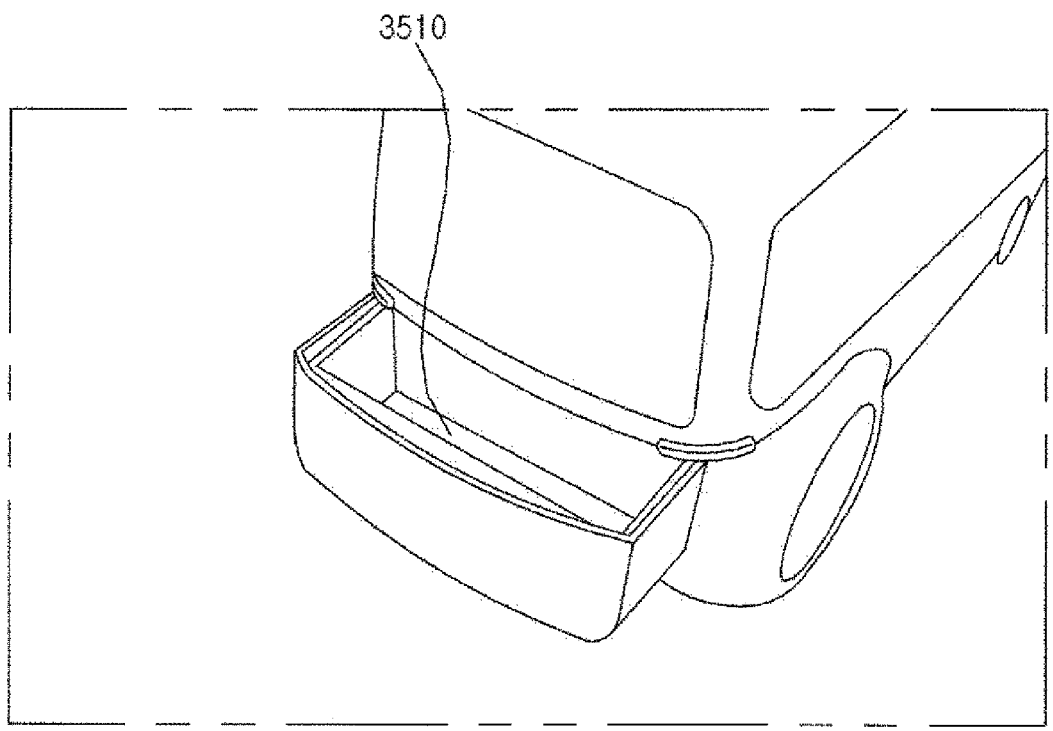

FIG. 36 is a reference view illustrating the operation of the cabin system according to the embodiment of the present disclosure.

Referring to FIG. 36, the cabin system 100 may further include a trunk 3510. The trunk 3510 may be configured in a modular form. The modular trunk 3510 may be replaced according to user information. For example, an additional battery pack may be mounted in a first trunk. The cargo box, in which products are stored, may be mounted in a second trunk. A styler for treating clothes may be mounted in a third trunk. The modular trunk 3510 may be received in a space defined in the vehicle 10. A modular trunk 3510 suitable for user information may be provided in order to provide a function appropriate for a user request.

Figure 37:
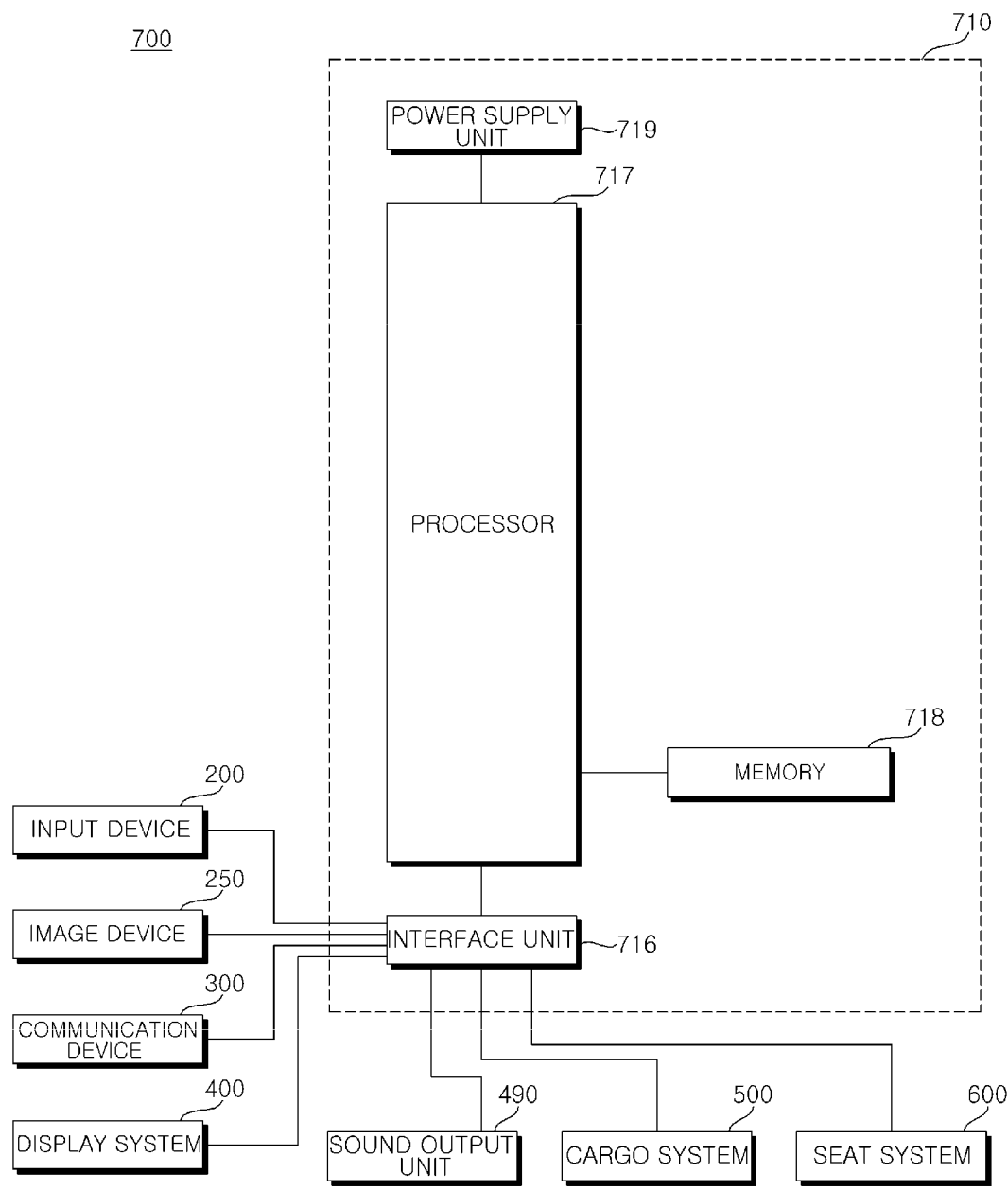
FIG. 37 is a control block diagram of the payment system according to the embodiment of the present disclosure.

FIG. 37 is a control block diagram of the payment system according to the embodiment of the present disclosure.

Referring to FIG. 37, the payment system 700 may include an input device 200, an image device 250, a communication device 300, a display system 400, a sound output unit 490, a cargo system 500, a seat system 600, and an electronic device 710. In some embodiments, the payment system 700 may not include some of the components described above, or may further include other components.

The description given with reference to FIGS. 1 to 37 may be applied to the input device 200, the image device 250, the communication device 300, the display system 400, the sound output unit 490, the cargo system 500, and the seat system 600.

The electronic device 710 may perform a charging operation with respect to a vehicle passenger. To this end, the electronic device 710 may include at least one interface unit 716, at least one processor 717, at least one memory 718, and a power supply unit 719.

The interface unit 716 may exchange a signal with at least one electronic device mounted in the vehicle 10. The interface unit 716 may exchange a signal with at least one electronic device provided in the cabin system 100 in a wireless or wired fashion. The interface unit 716 may exchange a signal with at least one of the input device 200, the image device 250, the communication device 300, the display system 400, the sound output unit 490, the cargo system 500, or the seat system 600. The interface unit 716 may be electrically connected to the processor 717 in order to provide a received signal to the processor 717. The interface unit 716 may be constituted by at least one of a communication module, a terminal, a pin, a cable, a port, a circuit, an element, or a device.

The interface unit 716 may exchange a signal with at least one internal camera 251 for capturing an image inside the cabin. A plurality of internal cameras 251 may be provided. For example, a plurality of internal cameras 251 may be provided in order to capture images of a plurality of users using the plurality of seats. The interface unit 716 may exchange a signal with a plurality of internal cameras 251. A single internal camera 251 may be provided. For example, the internal camera 251 may be disposed at the ceiling in order to capture images of a plurality of users. The interface unit 716 may exchange a signal with a single internal camera 251.

The interface unit 716 may receive a signal according to sensing of a user sitting on a seat from the seat system 600. The seat system 600 may include a sensor (e.g. a weight sensor) for sensing whether the user sits on the seat. The interface unit 716 may receive a signal according to the sensing of the user sitting on the seat from the sensor of the seat system 600.

The interface unit 716 may exchange a signal with at least one external camera 252 for capturing an image of the outside of the vehicle.

The processor 717 may control the overall operation of each unit of the electronic device 710. The processor 717 may be electrically connected to the interface unit 716, the memory 718, and the power supply unit 719. The processor 717 may be described as one of a plurality of sub-controllers constituting the main controller 170.

The processor 717 may be realized using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing other functions.

The processor 717 may receive image data from at least one internal camera 251 through the interface unit 716. The image data may be a captured image inside the cabin. The processor 717 may detect a user based on the image data. The processor 717 may detect user motion based on the image data.

In the case in which a detection signal of user sitting on the seat is received from the seat system 600, the processor 717 may receive image data from an internal camera assigned to a specific user boarding seat, among a plurality of internal cameras.

In the case in which a detection signal of user sitting on the seat is received from the seat system 600, the processor 717 may separately process an image of an area corresponding to the specific user boarding seat based on the image data received from the internal camera.

The processor 717 may generate charging data based on the detected user motion. The charging data may be data for charging the user. The charging data may include at least one of user information, used service information, money amount information, or charge payment means information.

The processor 717 may specify a user who is to be charged based on image data acquired through the internal camera 251. For example, the processor 717 may specify one of a plurality of users as a user who is to be charged based on the image data. In some embodiments, the processor 717 may specify a user who is to be charged based on image data acquired through the external camera 252. The processor 717 may receive a detection signal of user sitting on the seat from the seat system 600 through the interface unit 716. The processor 717 may also specify a user who is to be charged based on the detection signal of the user sitting on the seat.

The processor 717 may compare image data before entrance of the user and image data after entrance of the user with each other. The processor 717 may track a user motion through the comparison between the image data.

The processor 717 may determine whether the detected user motion is at least one of a motion causing contamination, a property damage motion, or a robbery motion. The processor 717 may track a specified user motion through computer image processing. The processor 717 may determine whether the specified user motion corresponds to at least one of a motion causing contamination, a property damage motion, or a robbery motion based on the tracked motion.

The processor 717 may receive vehicle motion data through the interface unit 716. The processor 717 may compare the time at which the user motion causing contamination occurs and the time at which the vehicle motion occurs with each other in order to determine whether the user motion causing contamination is based on the vehicle motion. For example, the processor 717 may determine whether a user motion of spilling a beverage has occurred when the vehicle passes over an object (e.g. a bump) on a road. Upon determining that the user motion causing contamination is based on the vehicle motion, the processor 717 may generate no charging data, or may generate charging data including discounted price.

The processor 717 may determine whether the motion causing contamination is caused by a product purchased in the cabin. For example, the processor 717 may determine whether the motion causing contamination is caused as the result of the user exiting the vehicle while leaving a purchased beverage container in the cabin. Upon determining that the user motion causing contamination is caused by a product purchased in the cabin, the processor 717 may generate no charging data, or may generate charging data including discounted price.

The processor 717 may receive image data from at least one of the internal camera 251 or the external camera 252. The processor 717 may generate user body profile data based on the image data received from at least one of the internal camera 251 or the external camera 252. The user body profile data may include at least one of user body size information or user body feature information (e.g. user body shape information or handicap-related information). The processor 717 may track the user motion based on the user body profile data. The processor 717 may determine whether the specified user motion corresponds to at least one of a motion causing contamination, a property damage motion, or a robbery motion based on the tracked motion.

The processor 717 may determine whether products stored in the cargo box are purchased based on the user motion. The cargo box may be provided in the cabin in order to provide products to users. For example, the cargo box may be configured to protrude from and retreat into at least a portion of the seat in the state in which a plurality of products is stored in the cargo box.

The processor 717 may specify the direction of a hand accessing a product stored in the cargo box from the image data. The processor 717 may specify a user who is to be charged based on the direction of the hand. For example, upon determining that the hand is directed from the first seat to the cargo box, the processor 717 may specify the passenger on the first seat as a user who is to be charged.

The processor 717 may detect a product selection motion and a product opening motion of the specified user from the image data. In the case in which the product selection motion and the product opening motion are detected from the image data, the processor 717 may determine that the specified user purchases a product. The processor 717 may generate charging data including price information of the purchased product.

Meanwhile, the processor 717 may receive sensing data from the weight sensor included in the cargo box through the interface unit 716. The processor 717 may determine whether the user selects a product based on the received sensing data.

Meanwhile, the cargo box may include a light-emitting device. The light-emitting device may include a plurality of light sources disposed so as to correspond to the plurality of the products. The light-emitting device may change light output from one of the light sources in response to a signal corresponding to the selection of one of the products. In the case in which a change in the color of light around a pocket disposed in the cargo box is detected from the image data, the processor 717 may determine that the specified user selects a product stored in the pocket.

In the case in which the product selection motion is detected, the processor 717 may provide a signal for outputting product selection information to at least one electronic device included in the vehicle 10 through the interface unit 716. At least one of the display system 400 or the sound output unit 490 may output the product selection information based on the provided signal. The mobile terminal 390 of the user may output the product selection information based on the signal provided through the communication device 300. In the case in which the product opening motion is detected, the processor 717 may provide a signal for outputting product purchase information to at least one electronic device included in the vehicle 10 through the interface unit 716. At least one of the display system 400 or the sound output unit 490 may output the product purchase information based on the provided signal. The mobile terminal 390 of the user may output the product purchase information based on the signal provided through the communication device 300.

In the case in which a motion of selecting a product and then returning the product to cargo box is detected from the image data, the processor 717 may determine that the purchase of the product is canceled.

The processor 717 may store image data based on which charging is performed in the memory 718. The processor 717 may transmit charging data to the mobile terminal 390 of the user through the interface unit 716 and the communication device 300. In this case, the processor 717 may transmit the stored image data to the mobile terminal 390 of the user together with the charging data through the interface unit 716 and the communication device 300. The user may check the image received by the mobile terminal 390 in order to grasp a cause of charging.

The processor 717 may also generate charging data based on at least one of a vehicle running operation or a service provision operation. A fare based on the vehicle running operation may be defined as a vehicle running fare from entrance to exiting of the specified user. A charge based on the service provision operation may include at least one of a seat massage function provision service, a vehicle cooling and heating service, a content provision service through the display system 400, or a private space provision service.

The processor 717 may transmit the charging data to a payment server. The payment server may charge the specified user based on the charging data. For example, the charging data may include user card data. The payment server may charge based on the card data. For example, the charging data may include user mobile terminal data. The payment server may charge using the mobile terminal.

The processor 717 may receive charging processing result data from the payment server through the interface unit 716 and the communication device 300. The processor 717 may provide a signal to the display system 400 such that charging result information is displayed based on the charging processing result data.

The processor 717 may detect the exiting operation of the user based on the image data received from at least one of the internal camera 251 or the external camera 252. In the case in which the exiting operation of the user is detected, the processor 717 may transmit the charging data to the payment server.

The memory 718 is electrically connected to the processor 717. The memory 718 may store basic data about the units, control data necessary to control the operation of the units, and data that are input and output. The memory 718 may store data processed by the processor 717. In a hardware aspect, the memory 718 may be constituted by at least one of a ROM, a RAM, an EPROM, a flash drive, or a hard drive. The memory 718 may store various data necessary to perform the overall operation of the electronic device 710, such as a program for processing or control of the processor 717. The memory 718 may be integrated into the processor 717. The memory 718 may be driven by power supplied from the power supply unit 719.

The power supply unit 719 may supply power to the electronic device 710. The power supply unit 719 may receive power from the power source included in the vehicle 10, and may supply the received power to the respective units of the electronic device 710. The power supply unit 719 may be operated according to a control signal provided from the processor 717. For example, the power supply unit 719 may be realized as a switched-mode power supply (SMPS).

The electronic device 710 may include at least one printed circuit board (PCB). The interface unit 716, the processor 717, the memory 718, and the power supply unit 719 may be mounted on the at least one printed circuit board.

Figure 38:
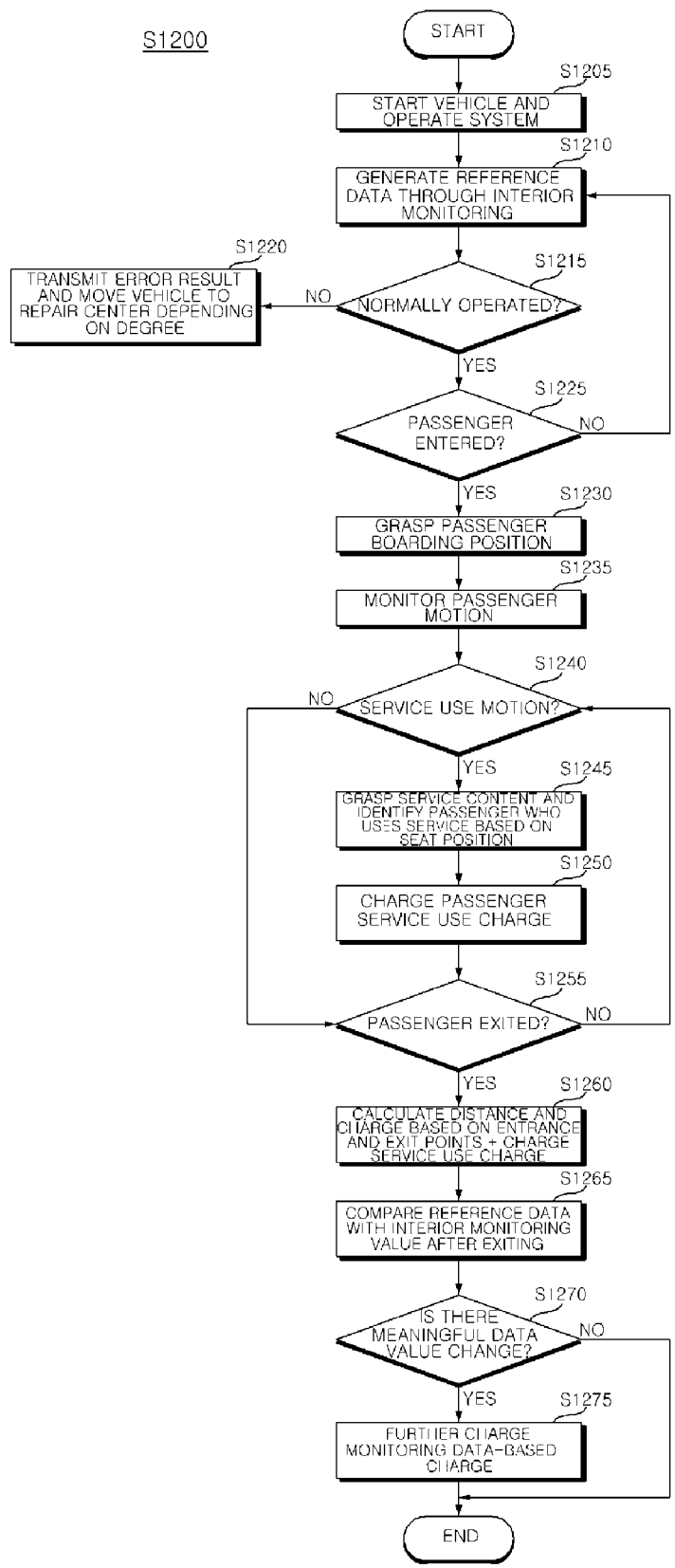
FIG. 38 is a reference flowchart illustrating the operation of the payment system according to the embodiment of the present disclosure.

FIG. 38 is a reference flowchart illustrating the operation of the payment system according to the embodiment of the present disclosure.

Referring to FIG. 38, when the vehicle 10 is started, the payment system 700 is operated (S1205).

The processor 717 may generate reference data through interior monitoring (S1210). The processor 717 may receive various data from several electronic devices in the cabin through the interface unit 716. The processor 717 may generate reference data based on the received data. For example, the processor 717 may acquire image data through at least one of the internal camera 251 or the external camera 252. The processor 717 may generate reference data based on the image data. For example, the processor 717 may generate reference data for at least one of seat orientation data, basic seat volume data, seat contamination data, data about the operation status of the devices in the cabin, data about damage to the devices in the cabin, or cargo box stock data.

The processor 717 may determine whether the cabin system 100 is normally operated (S1215). The processor 717 may determine whether the cabin system 100 is normally operated based on received data.

In the case in which the cabin system 100 is not normally operated, the processor 717 may transmit an error result to a control server, and may provide a signal to an electronic control unit (ECU) of the vehicle 10 such that the vehicle 10 is moved to a repair center (S1220).

In the case in which the cabin system 100 is normally operated, the processor 717 may determine whether a user (e.g. a passenger) enters the vehicle based on received data (S1225). For example, the processor 717 may determine whether the user enters the vehicle based on the image data received from at least one of the internal camera 251 or the external camera 252. Upon determining that the user does not enter the vehicle, the procedure returns to step S1210.

Upon determining that the user enters the vehicle, the processor 717 may grasp a user boarding position (S1230) based on the received data. For example, the processor 717 may grasp the user boarding position based on the image data received from the internal camera 251. The processor 717 may grasp the user boarding position in order to specify the user.

The processor 717 may monitor a user motion (S1235). For example, the processor 717 may monitor a user motion based on the image data received from the internal camera 251.

The processor 717 may determine whether the user motion is a service use motion (S1240). For example, the processor 717 may determine whether the user motion is a motion using a seat massage function, a motion using content of the display system 400, a motion using a business seat (e.g. a motion using a private space service), or a motion purchasing a product in the cargo box.

Upon determining that the user motion is a motion using a service, the processor 717 may specify service content and a service user (S1245). For example, the processor 717 may specify the service content and the service user based on the image data received from the internal camera 251. For example, the processor 717 may specify the service user based on the sensing data received from the seat system.

The processor 717 may charge the specified user a charge for the used service (S1250). The processor 717 may generate first charging data based on the detected user motion. The first charging data may include at least one of specified user information, used service information, charge information, or payment means information.

The processor 717 may determine whether the passenger exits the vehicle based on the received data (S1255). For example, the processor 717 may determine whether the passenger exits the vehicle based on the image data received from at least one of the internal camera 251 or the external camera 252.

Upon determining that the passenger exits the vehicle, the processor 717 may generate second charging data based on a fare incurred as the result of running the vehicle 10 (S1260). The second charging data may include at least one of specified user information, information about the positions at which the user enters and exits, movement distance information, movement time information, or payment means information.

The processor 717 may compare the reference data generated at step S1210 with image data acquired after exiting of the user (S1265).

The processor 717 may determine whether there is a difference between the reference data and the image data acquired after exiting of the user (S1270). For example, the processor 717 may determine at least one of whether a seat is contaminated, whether property in the cabin is damaged, whether property in the cabin is stolen, or whether the device in the cabin malfunctions as the result of comparison.

Upon determining that there is a difference, the processor 717 may generate third charging data based on the difference (S1275). The third charging data may include at least one of specified user information, charging cause information, charge information, or payment means information.

Subsequently, the processor 717 may transmit a signal including the charging data to the payment server through the interface unit 716 and the communication device 300. The charging data may include at least one of the first charging data, the second charging data, or the third charging data.

Figure 39:
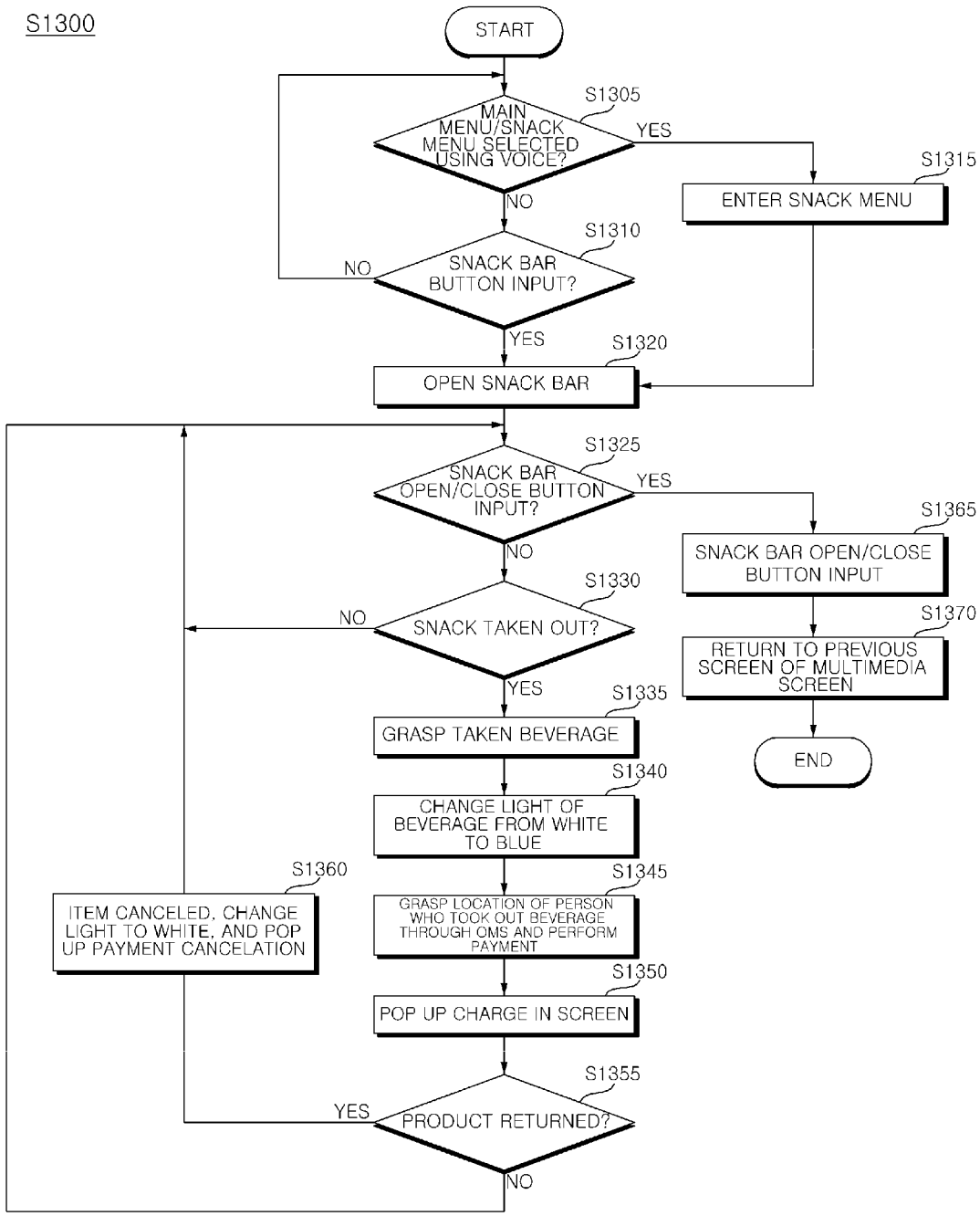
FIG. 39 is a reference flowchart illustrating the operation of the payment system according to the embodiment of the present disclosure.

FIG. 39 is a reference flowchart illustrating the operation of the payment system according to the embodiment of the present disclosure.

Referring to FIG. 39, in the case in which the input device 300 receives user's snack menu selection input (S1305), the processor 717 may enter a snack menu (S1315), and may provide a signal for opening a snack bar to the cargo system 500 (S1320). Here, the snack bar may be understood as the cargo box.

In the case in which a snack bar button is input although there is no user's snack menu selection input (S1310), the processor 717 may provide a signal for opening the snack bar to the cargo system 500 (S1320). Meanwhile, the snack bar button may be understood as a button disposed on at least a portion of the cargo box in order to generate an insertion and withdrawal signal of the cargo box.

In the case in which the snack bar button is input again in the state in which the snack bar is open (S1325 and S1365), the processor 717 may provide a signal to the display system 400 such that return to the previous screen of a multimedia screen is performed (S1370). In the case in which there is no previous screen, the display system 400 may output a main menu.

In the state in which the snack bar is open, the processor 717 may determine whether a snack is taken out (S1330). Here, the snack may be understood as one of the products provided through the cargo box. The processor 717 may determine whether a snack is taken out based on at least one of the weight sensor included in the cargo box or the image data received from the internal camera 251. The processor 717 may specify the taken snack (S1335). The processor 717 may provide a signal for changing the color of the light output from a light source corresponding to the pocket in which the taken snack was located from a first color to a second color (S1340).

The processor 717 may specify a user who took out the snack, and may generate charging data (S1345). For example, the processor 717 may specify a user who took out the snack based on the image data received from the internal camera 251. The processor 717 may generate charging data including at least one of specified user information, selected snack price information, or payment means information.

The processor 717 may provide a signal to the display system 400 such that information about the charging data is output (S1350). The display system may output the information about the charging data based on the received signal.

The processor 717 may determine whether the selected product returns to the snack bar (S1355). The processor 717 may determine whether the selected product returns to the snack bar based on the image data received from the internal camera 251.

Upon determining that the product returns to the snack bar, the processor 717 may cancel a charging process. The processor 717 may provide a signal for changing the color of the light output from a light source corresponding to the pocket in which the returned snack is located from the second color to the first color. The processor 717 may provide a signal for outputting payment cancelation information to the display system 400 (S1360).

Figure 40:
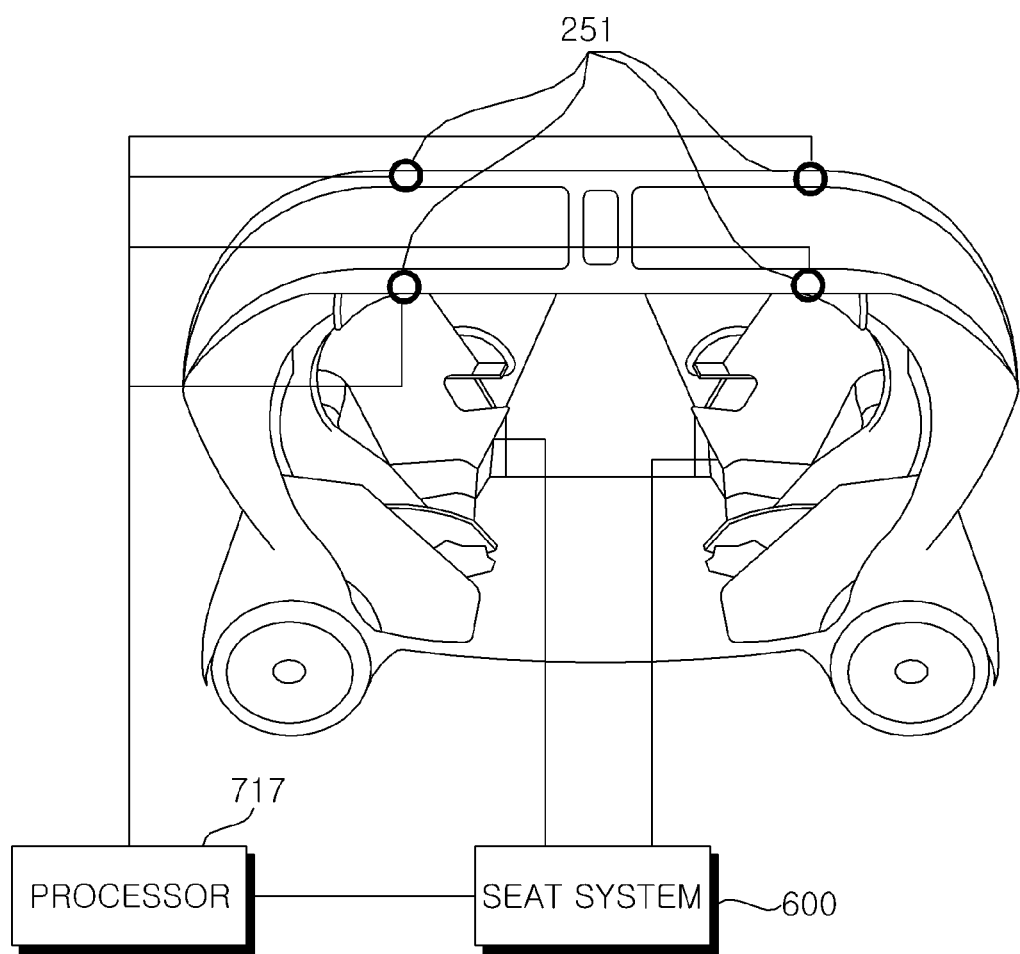
FIG. 40 is a reference view illustrating an image data acquisition scenario according to an embodiment of the present disclosure.

FIG. 40 is a reference view illustrating an image data acquisition scenario according to an embodiment of the present disclosure.

Referring to FIG. 40, the processor 717 may exchange a signal with the seat system 600 for controlling the plurality of seats through the interface unit 716. The seat system 600 may include a sitting sensor disposed at each of the seats. The processor 717 may receive a sitting sensing signal from the seat system 600.

The image device 250 may include a plurality of cameras 251 corresponding in number to the number of seats. The cameras 251 may be disposed at positions at which the seats can be photographed. Alternatively, the cameras 251 may be disposed at positions at which users sitting on the seats can be photographed. For example, a first camera, among the plurality of cameras, may be disposed at a position on the ceiling corresponding to a first seat, among the plurality of seats. The processor 717 may exchange a signal with a plurality of internal cameras 251 through the interface unit 716.

The processor 717 may receive a signal corresponding to the sensing signal generated from the sitting sensor disposed at the first seat from the seat system 600. In this case, the processor 717 may receive image data from the first camera corresponding to the first seat. The processor 717 may detect a motion of the user sitting on the first seat based on the image data received from the first camera, and may perform a charging operation based on the user motion.

Figure 41:
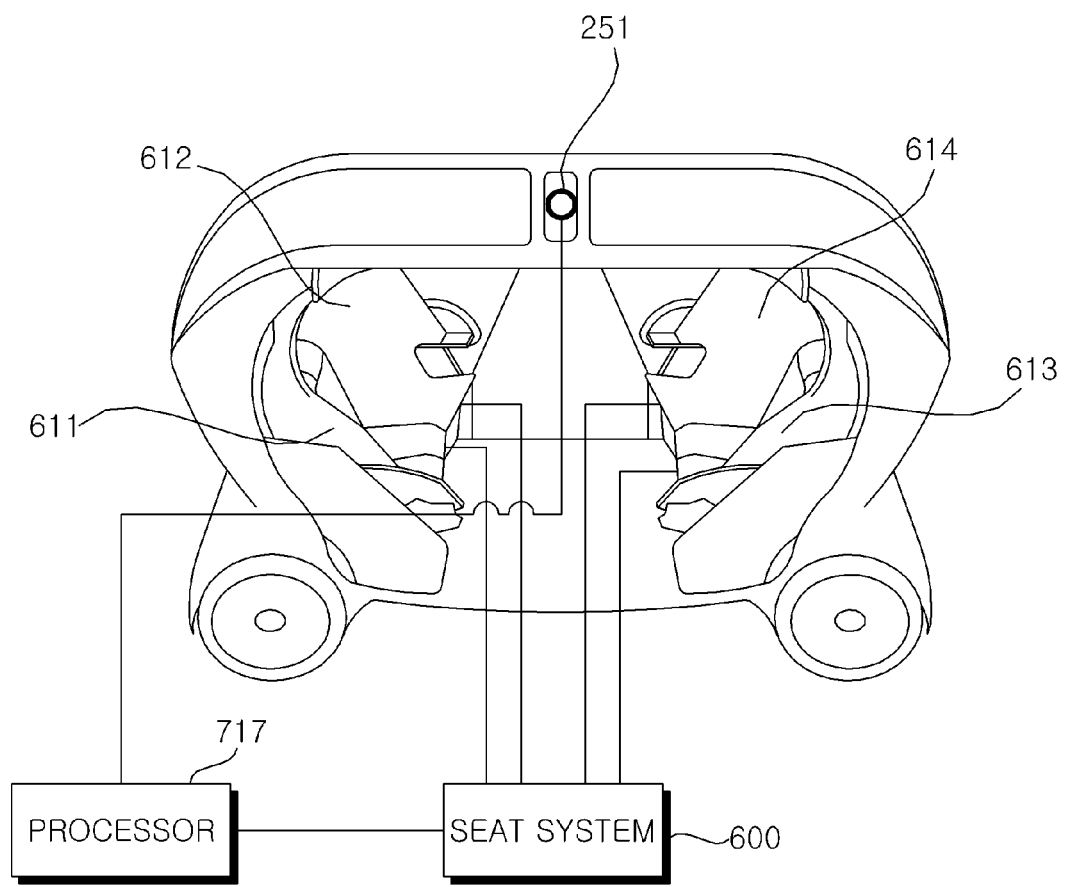
FIG. 41 is a reference view illustrating the image data acquisition scenario according to the embodiment of the present disclosure.

FIG. 41 is a reference view illustrating the image data acquisition scenario according to the embodiment of the present disclosure.

Referring to FIG. 41, the processor 717 may exchange a signal with the seat system 600 for controlling the plurality of seats through the interface unit 716. The seat system 600 may include a sitting sensor disposed at each of a plurality of seats 611, 612, 613, and 614. The processor 717 may receive a sitting sensing signal from the seat system 600.

The image device 250 may include a camera 251. The camera 251 may be disposed at a position at which all the seats can be photographed. For example, the camera 251 may be disposed at a portion of the ceiling. The processor 717 may exchange a signal with the camera 251 through the interface unit 716.

The processor 717 may receive a signal corresponding to the sensing signal generated from the sitting sensor disposed at the first seat from the seat system 600. In this case, the processor 717 may separately process an image of a first area corresponding to the first seat in the image acquired from the camera 251. The processor 717 may detect user motion in the first area, and may perform a charging operation based on the user motion.

Figure 42:
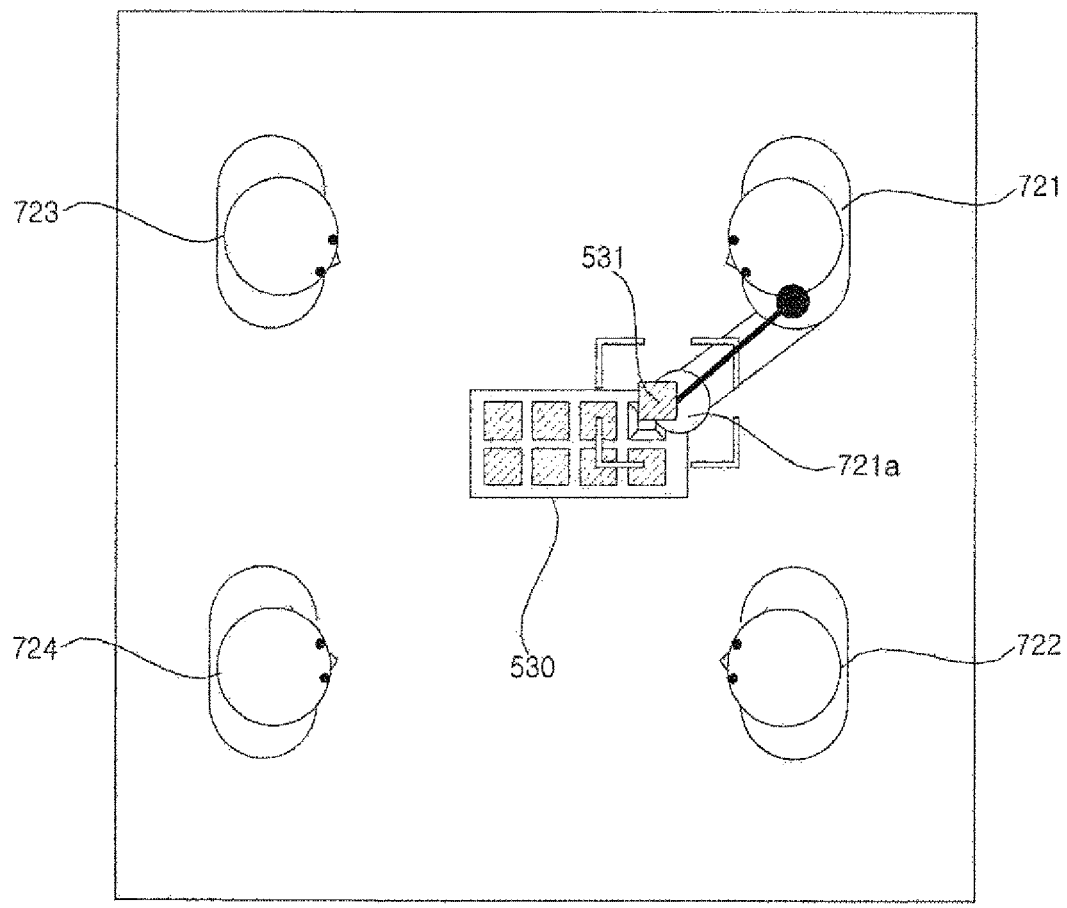
FIGS. 42 and 43 are reference views illustrating a product selection motion and a product opening motion according to an embodiment of the present disclosure.
Figure 43:
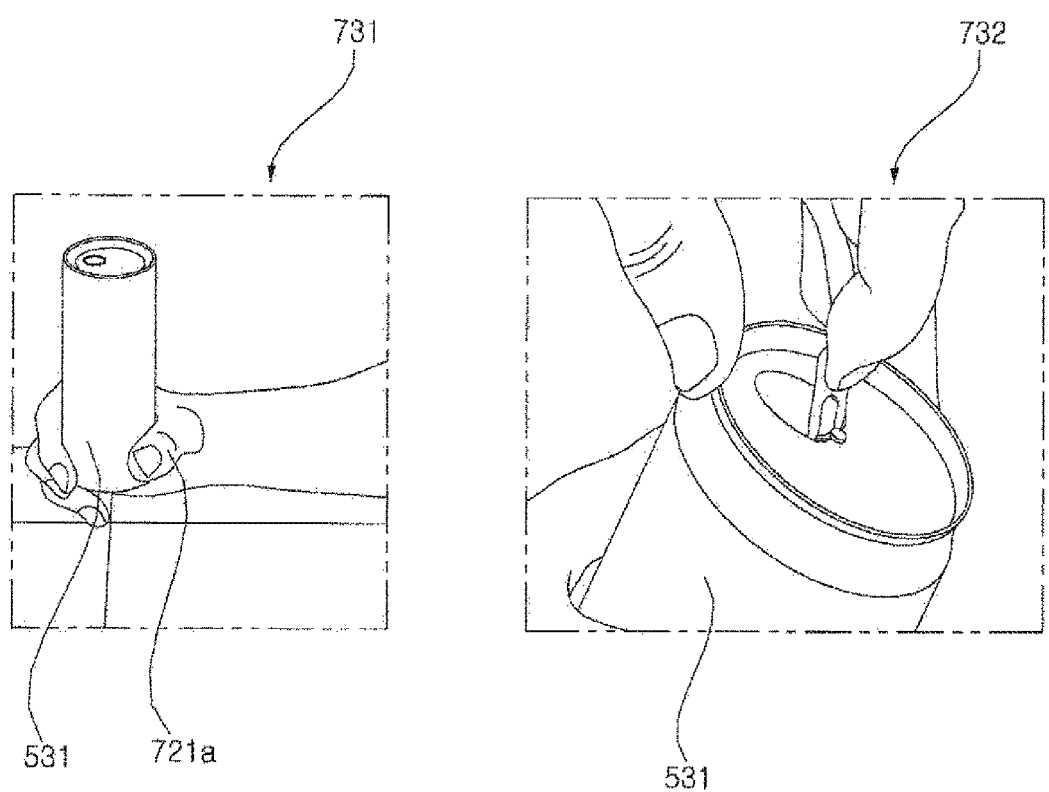

FIGS. 42 and 43 are reference views illustrating a product selection motion and a product opening motion according to an embodiment of the present disclosure.

Referring to FIG. 42, the processor 717 may select a user who selects a product based on the image data acquired by the internal camera 251. For example, the processor 717 may detect a motion of retrieving a first product 531 stored in the cargo box 530 from the image data. The processor 717 may specify a first user 721 as a purchaser of the first product 531 based on a motion of the first user 721 retrieving the first product 531. For example, the processor 717 may detect a hand 721a of the first user 721 catching the first product 531. The processor 717 may specify the first user 721 as the purchaser of the first product 531 based on the motion trajectory of the hand 721a.

Referring to FIG. 43, the processor 717 may detect the hand 721a of the first user 721 holding the first product 531. The processor 717 may determine whether the first user 721 selects the first product 531 (731) based on the hand 721a holding the first product 531. The processor 717 may detect an opening motion 732 of the first product 531. The processor 717 may determine whether the first user 721 purchases the first product 531 based on the opening motion 732 of the first product 531. Upon determining that the first user 721 selects and purchases the first product 531, the processor 717 may generate charging data.

The processor 717 may detect a motion of the first user 721 returning the first product 531 to the cargo box 530. The processor 717 may determine whether the first user 721 cancels the purchase of the first product 531 based on the motion of returning the first product 531.

Figure 44:
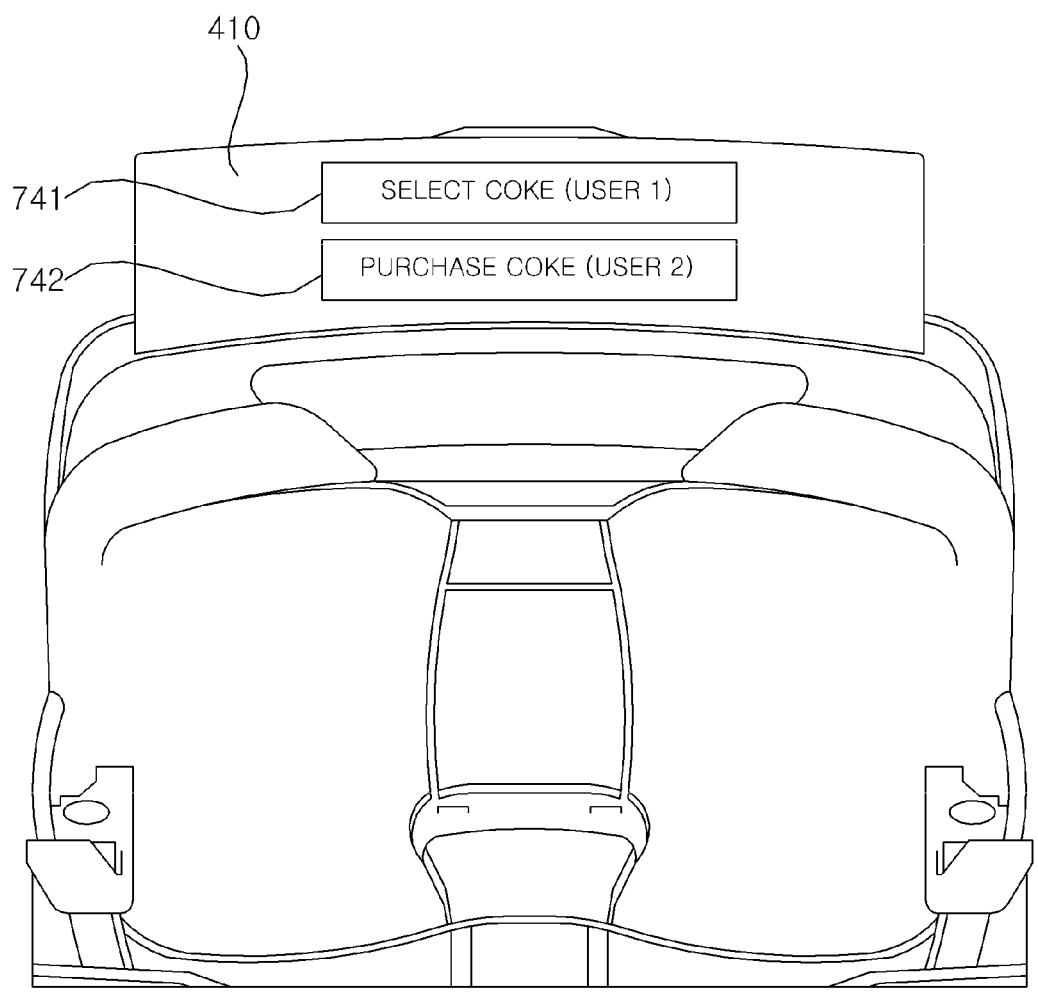
FIG. 44 is a reference view illustrating an information display operation according to an embodiment of the present disclosure.

FIG. 44 is a reference view illustrating an information display operation according to an embodiment of the present disclosure.

Referring to FIG. 44, the processor 717 may exchange a signal with at least one of the display system 400 or the sound output unit 490 through the interface unit 716.

The processor 717 may determine whether a product is purchased based on the determination as to whether the product is selected and the determination as to whether the product is opened.

In the case in which an operation of a first user selecting a first product is detected, the processor 717 may provide a signal corresponding to first product selection information of the first user to the display system 400. The display system 400 may output the first product selection information 741 through at least one display based on the received signal. The processor 717 may provide a signal corresponding to the first product selection information of the first user to the sound output unit 490. The sound output unit 490 may output the first product selection information through at least one speaker based on the received signal. As a result, the first user may recognize whether the first product is selected.

In the case in which an operation of the first user opening the first product is detected, the processor 717 may provide a signal corresponding to first product purchase information of the first user to the display system 400. The display system 400 may output the first product purchase information 742 through at least one display based on the received signal. The processor 717 may provide a signal corresponding to the first product purchase information of the first user to the sound output unit 490. The sound output unit 490 may output the first product selection information through at least one speaker based on the received signal. As a result, the first user may recognize whether the first product is purchased.

Figure 45:
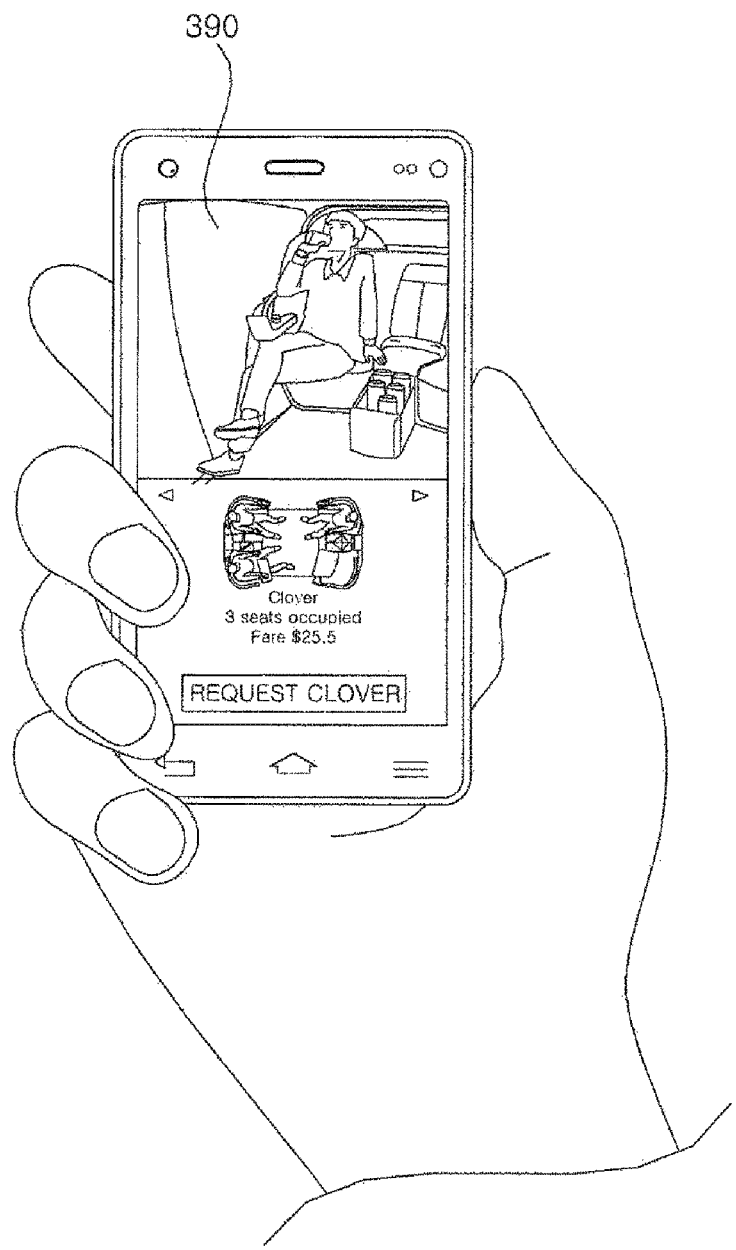
FIG. 45 is a reference view illustrating an operation of providing information to the mobile terminal according to an embodiment of the present disclosure.

FIG. 45 is a reference view illustrating an operation of providing information to the mobile terminal according to an embodiment of the present disclosure.

Referring to FIG. 45, the payment system 700 may include a mobile terminal 390.

The processor 717 may exchange a signal with the mobile terminal 390 through the interface unit 716 and the communication device 300. The processor 717 may transmit charging data to the mobile terminal 390. The charging data may include at least one of user information, charging cause information, charge information, or payment means information. The processor 717 may transmit image data based on which charging is performed to the mobile terminal 390 together with the charging data. The mobile terminal 390 may output charging information based on the charging data. The mobile terminal 390 may output the image data based on which charging is performed together with the charging data. The mobile terminal 390 may perform payment based on the charging data.

When a user purchases a product, the processor 717 may transmit product purchase information to the mobile terminal 390. In the case in which an operation of a first user selecting a first product is detected, the processor 717 may transmit a signal corresponding to first product selection information of the first user to the mobile terminal 390 of the first user. The mobile terminal 390 may output the first product selection information of the first user. In the case in which an operation of the first user opening the first product is detected, the processor 717 may transmit a signal corresponding to first product purchase information of the first user to the mobile terminal 390 of the first user. The mobile terminal 390 may output the first product purchase information of the first user.

Figure 46:
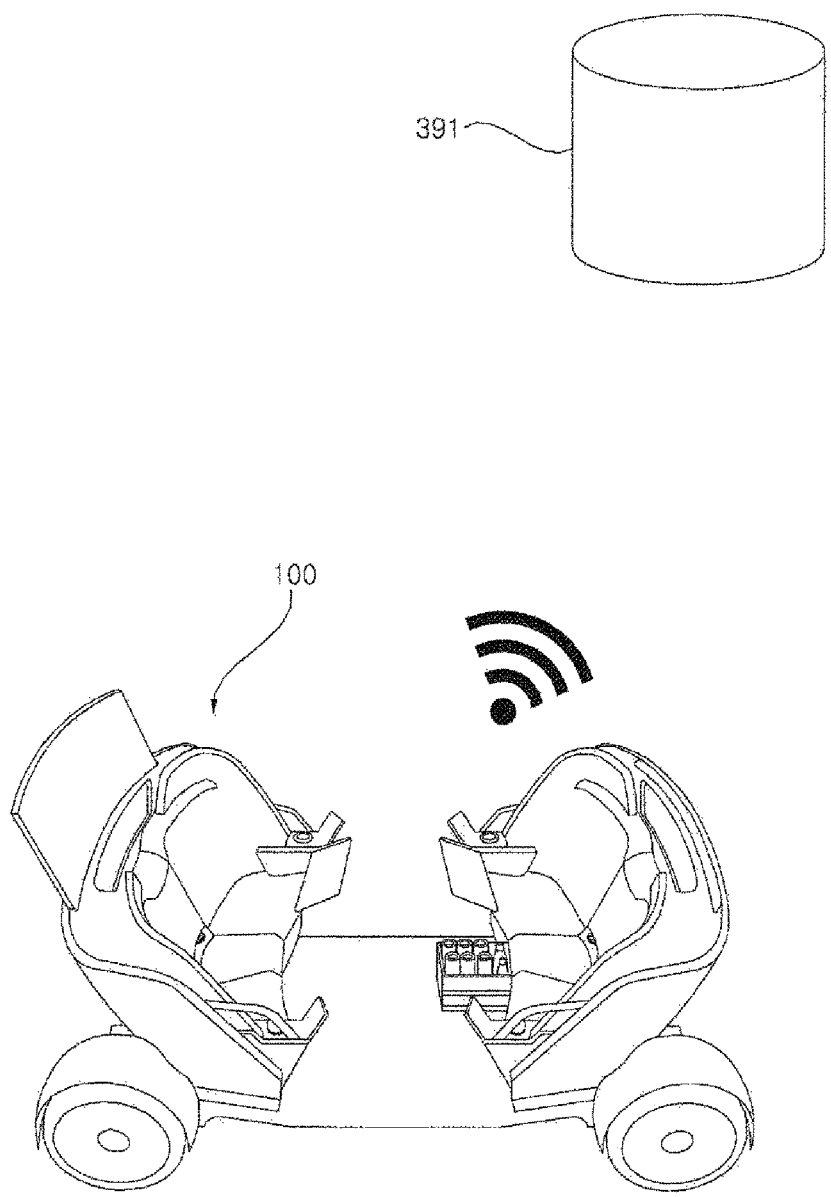
FIG. 46 is a reference view illustrating a payment progress operation according to an embodiment of the present disclosure.

FIG. 46 is a reference view illustrating a payment progress operation according to an embodiment of the present disclosure.

Referring to FIG. 46, the payment system 700 may include a payment server 391.

The processor 717 may exchange a signal with the payment server 391 through the interface unit 716 and the communication device 300. The processor 717 may transmit charging data to the payment server 391. The payment server 391 may perform payment based on the charging data.

Figure 47:
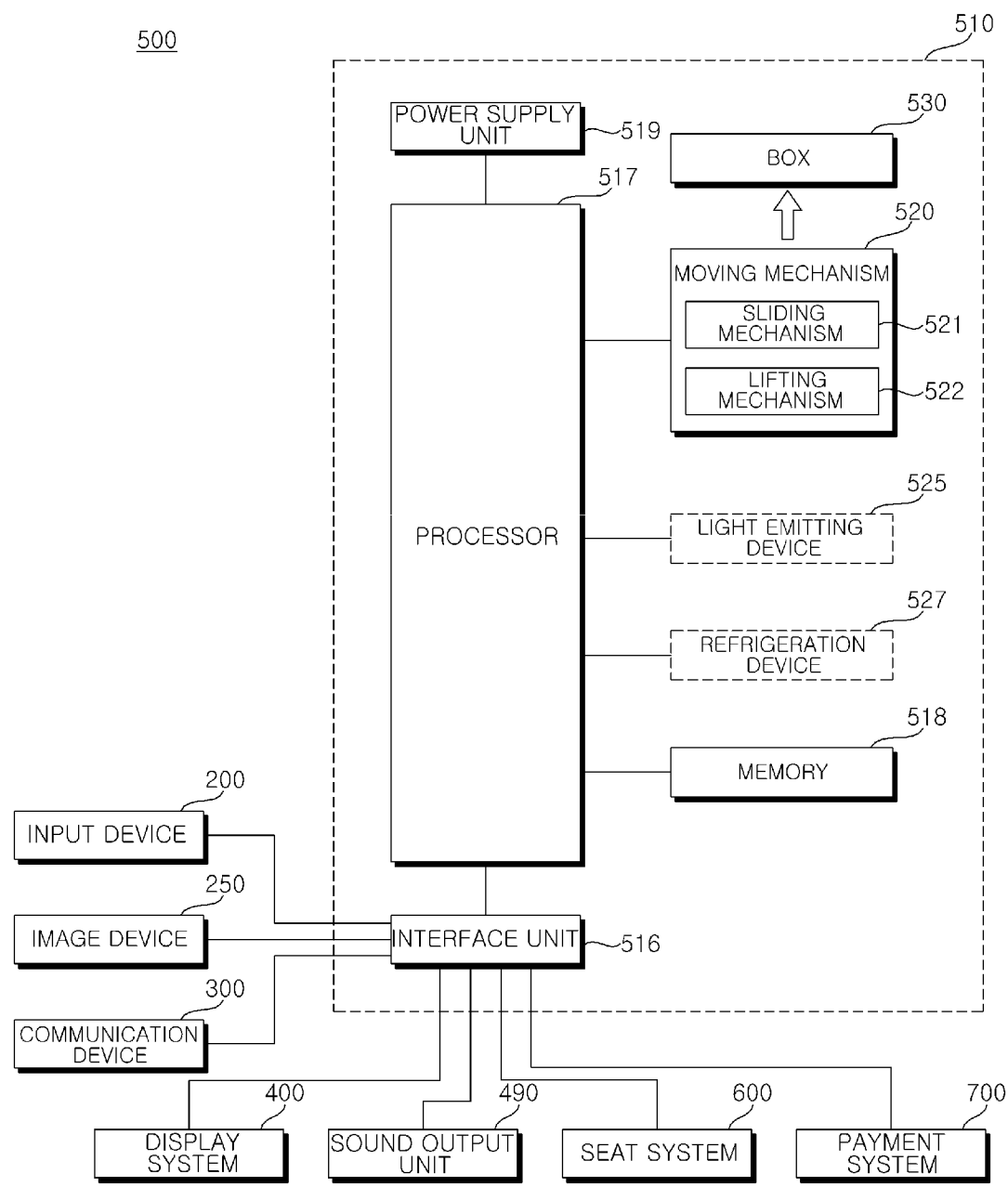
FIG. 47 is a control block diagram of the cargo system according to the embodiment of the present disclosure.

FIG. 47 is a control block diagram of the cargo system according to the embodiment of the present disclosure.

Referring to FIG. 47, the cargo system 500 may include an input device 200, an image device 250, a communication device 300, a display system 400, a sound output unit 490, a seat system 600, a payment system 700, and a product provision device 510. In some embodiments, the cargo system 500 may not include some of the components described above, or may further include other components.

The description given with reference to FIGS. 1 to 47 may be applied to the input device 200, the image device 250, the communication device 300, the display system 400, the sound output unit 490, the seat system 600, and the payment system 700.

The product provision device 510 may be mounted to at least a portion of the vehicle 10. The product provision device 510 may be referred to as a product provision device 510 for vehicles. The product provision device 510 may provide a product to a user in the cabin. To this end, the product provision device 510 may include at least one box 530, at least one interface unit 516, at least one processor 517, at least one memory 518, a power supply unit 519, and a moving mechanism 520. In some embodiments, the product provision device 510 may further include a light-emitting device 525 and a refrigeration device 527 individually or in a combined state.

The box 530 may be configured to protrude from and retreat into at least a portion of the seat in the state in which a plurality of products is stored in the box. The box 530 may be hidden between lower parts of a plurality of seats. For example, the box 530 may be hidden between the lower part of the first seat and the lower part of the second seat. At least one surface of the box 530 may be made of a transparent material. The box 530 will be described with reference to FIG. 49 and the following figures.

The interface unit 516 may exchange a signal with at least one electronic device mounted in the vehicle 10. The interface unit 516 may exchange a signal with at least one electronic device provided in the cabin system 100 in a wireless or wired fashion. The interface unit 516 may exchange a signal with at least one of the input device 200, the image device 250, the communication device 300, the display system 400, the sound output unit 490, the seat system 600, or the payment system 700. The interface unit 516 may be electrically connected to the processor 517 in order to provide a received signal to the processor 517. The interface unit 516 may be constituted by at least one of a communication module, a terminal, a pin, a cable, a port, a circuit, an element, or a device.

The interface unit 516 may receive a converted signal of user input from at least one of the input device 200, the image device 250, or the communication device 300. The interface unit 516 may receive user destination data from a navigation device of the vehicle 10. The interface unit 516 may receive location data of the vehicle 10 from the navigation device.

The processor 517 may control the overall operation of each unit of the product provision device 510. The processor 517 may be electrically connected to the interface unit 516, the memory 518, and the power supply unit 519. The processor 517 may be described as one of a plurality of sub-controllers constituting the main controller 170. The processor 517 may be driven by power supplied from the power supply unit 519.

The processor 517 may be realized using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing other functions.

The processor 517 may receive a signal based on user input. The processor 517 may receive a signal based on user input from at least one of the input device 200, the image device 250, or the communication device 300. The processor 517 may receive a signal based on user input from a button provided on at least one surface of the box 530.

In the case in which a signal based on user input is received, the processor 517 may provide a control signal such that at least one of a plurality of products is exposed in the cabin. In the case in which a signal is received from at least one electronic device mounted in the vehicle, the processor 517 may provide a control signal. For example, the processor 517 may provide a control signal such that at least a portion of the box hidden in the state of being integrally formed with the seat is exposed in the cabin. The processor 517 may provide a control signal to the moving mechanism 520 in order to move the box. The moving mechanism 520 may move the box according to a control signal.

The processor 517 may provide a control signal to the moving mechanism 520. According to a first condition, the processor 517 may provide a control signal for hiding the box 530 exposed in the cabin to the moving mechanism 520. The first condition may be a condition in which an operation of a user selecting a product is not sensed for a predetermined time or more. The processor 517 may determine whether the first condition is satisfied based on user motion data detected from image data of the internal camera 251.

According to a second condition, the processor 517 may provide a control signal for exposing the box 530, inserted into at least the seat, in the cabin. The second condition may be a condition in which user access to the box 530 is sensed or touch on the box is sensed. The processor 517 may determine whether the second condition is satisfied based on user motion data detected from image data of the internal camera 251. The processor 517 may determine whether the second condition is satisfied based on sensing data received from a touch sensor provided on at least one surface of the box 530.

The processor 517 may provide a control signal to a sliding mechanism 521. The sliding mechanism 521 may slide the box 530 according to the control signal. The processor 517 may provide a control signal to a lifting mechanism 522. The lifting mechanism 522 may lift a shelf disposed in the box according to the control signal. The box 530 may include at least one shelf. The box 530 may include a first shelf on which a first product is placed. In the case in which a signal corresponding to the selection of the first product is received, the processor 517 may provide a control signal for lifting the first shelf to the lifting mechanism 522.

The processor 517 may provide a control signal to the light-emitting device 525. A plurality of products may include the first product. The light-emitting device 525 may include a first light source having a shape surrounding at least a portion of the first product. In the case in which a signal corresponding to the selection of the first product is received, the processor 517 may provide a control signal for changing the color of the light output from the first light source from a first color to a second color to the light-emitting device 525.

The box 530 may include a plurality of boxes. In the case in which a signal is received in the state in which a plurality of boxes is hidden in a space outside the cabin of the vehicle 10, the processor 517 may provide a control signal for exposing a product stored in a box corresponding to the signal, among the plurality of boxes. For example, the processor 517 may receive a signal including user destination data from at least one electronic device mounted in the vehicle 10. The processor 517 may provide a control signal for exposing a product stored in a box corresponding to the destination data, among the plurality of boxes.

The processor 517 may provide a control signal to the refrigeration device 527. The processor 517 may receive location data of the vehicle 10 from at least one electronic device mounted in the vehicle through the interface unit 516. The processor 517 may control the operation of the refrigeration device 527 based on the location data. For example, the processor 517 may control the operation of the refrigeration device 527 based on distance data between the vehicle 10 and a user who intends to enter the vehicle, calculated based on the location data of the vehicle. The processor 517 may provide a control signal such that refrigeration performance is improved as the distance value between the vehicle 10 and the user is reduced. For example, in the case in which the vehicle 10 is an electric car, the processor 517 may control the operation of the refrigeration device based on distance data between the vehicle 10 and a battery charging station, calculated based on the location data of the vehicle. In the case in which the residual battery capacity is equal to or less than a reference value, refrigeration performance may be reduced in the case in which the distance value between the vehicle 10 and the battery charging station is equal to or greater than a reference value.

The memory 518 is electrically connected to the processor 517. The memory 518 may store basic data about the units, control data necessary to control the operation of the units, and data that are input and output. The memory 518 may store data processed by the processor 517. In a hardware aspect, the memory 518 may be constituted by at least one of a ROM, a RAM, an EPROM, a flash drive, or a hard drive. The memory 518 may store various data necessary to perform the overall operation of the product provision device 510, such as a program for processing or control of the processor 517. The memory 518 may be integrated into the processor 517. The memory 518 may be driven by power supplied from the power supply unit 519.

The power supply unit 519 may supply power to the product provision device 510. The power supply unit 519 may receive power from the power source included in the vehicle 10, and may supply the received power to the respective units of the product provision device 510. The power supply unit 519 may be operated according to a control signal provided from the processor 517. For example, the power supply unit 519 may be realized as a switched-mode power supply (SMPS).

The product provision device 510 may include at least one printed circuit board (PCB). The interface unit 516, the processor 517, the memory 518, and the power supply unit 519 may be mounted on the at least one printed circuit board.

The moving mechanism 520 may be operated according to a control signal received from the processor 517. The moving mechanism 520 may move the box 530 from a space in which the box 530 is hidden to the cabin. The moving mechanism 520 may move the box according to a control signal from the processor 517. The moving mechanism 520 may include a driving unit for providing driving force (e.g. a motor, an actuator, or a solenoid) and a driving force transmission unit for transmitting the driving force to the box. In some embodiments, the moving mechanism 520 may further include a power conversion unit for converting the driving force into moving power. The moving mechanism 520 may hide the box, exposed in the cabin, in the seat based on a control signal from the processor 517. The moving mechanism 520 may expose the box 530, inserted into the seat, in the cabin again based on a control signal from the processor 517. The moving mechanism 520 may include a sliding mechanism 521 and a lifting mechanism 522.

The sliding mechanism 521 may be operated according to a control signal received from the processor 517. The sliding mechanism 521 may slide the box 530. The sliding mechanism 521 may slide the box 530 from a space in the seat in which the box is hidden to the cabin.

The lifting mechanism 522 may be operated according to a control signal received from the processor 517. The lifting mechanism 522 may lift a shelf disposed in the box 530. The lifting mechanism 522 may lift a plurality of shelves disposed in the box so as to correspond to products.

The light-emitting device 525 may be operated according to a control signal received from the processor 517. The light-emitting device 525 may be disposed in the box 530. The light-emitting device 525 may include a plurality of light sources disposed so as to correspond to a plurality of products. The light-emitting device 525 may change light output from one of the light sources in response to a signal corresponding to the selection of one of the products.

The refrigeration device 527 may be operated according to a control signal received from the processor 517. The refrigeration device 527 may absorb heat in the box 530. For example, the refrigeration device 527 may absorb heat in the box 530 according to a control signal of the processor 517 such that refrigeration performance is improved as the distance value between the vehicle 10 and the user is reduced. For example, in the case in which the vehicle 10 is an electric car, the refrigeration device 527 may absorb heat in the box 530 according to a control signal of the processor 517 such that refrigeration performance is reduced in the case in which the distance value between the vehicle 10 and the battery charging station is equal to or greater than a reference value in the state in which the residual battery capacity is equal to or less than a reference value.

Figure 48:
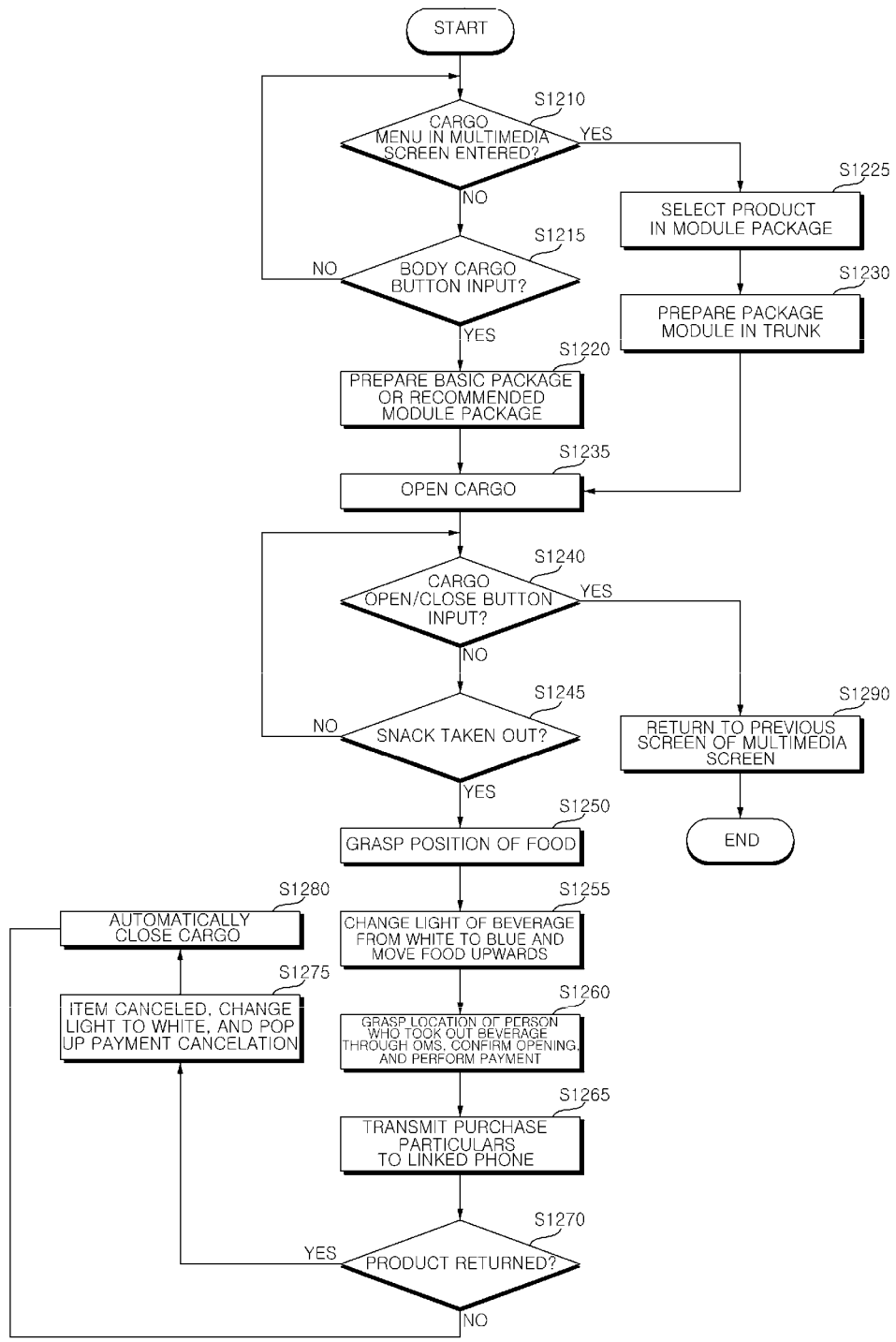
FIG. 48 is a reference flowchart illustrating the operation of the cargo system according to the embodiment of the present disclosure.

FIG. 48 is a reference flowchart illustrating the operation of the cargo system according to the embodiment of the present disclosure.

Referring to FIG. 48, entry into a cargo menu is performed in a screen of the display system 400 (S1210), and in the case in which user input for selecting a product is received (S1225), the processor 517 may select a box in which the selected product is stored, among a plurality of boxes located in the trunk (S1230).

In the case in which a cargo button is input although the entry into the cargo menu is not performed in the screen of the display system 400 (S1215), the processor 517 may select a box (S1220). The processor 517 may select a box containing a basic package product or a box containing a recommended package product. Meanwhile, the cargo button may be understood as a button disposed on at least a portion of the box in order to generate an insertion and withdrawal signal of the box.

The processor 517 may provide a control signal to the moving mechanism 520 such that the box 530 is opened (S1235). The moving mechanism 520 may be move the box in order to open the box.

In the case in which the cargo button is input in the state in which the box 530 is open (S1240), the processor 517 may hide the box (S1285), and may return the display screen of the display system 400 to the previous screen (S1290).

The processor 517 may determine whether a first product is selected from among a plurality of products (S1245). For example, the processor 517 may determine whether the first product is selected based on image data of the internal camera 512. For example, the processor 517 may determine whether the first product is selected based on sensing data generated by a weight sensor provided in the box. In the case in which the first product is selected, the processor 517 may grasp the position of the selected first product based on at least one of the image data and the sensing data (S1250).

The processor 517 may change the color of the light output from a first light source corresponding to the first product from a first color to a second color (S1255).

The payment system 700 or the processor 517 may specify the first user who selects the first product based on the image data of the internal camera 251, and may detect the opening motion of the first product. In this case, the payment system 700 or the processor 517 may generate charging data about the first product to the first user (S1260). In the case in which the processor 517 specifies the first user and detects the opening motion of the first product in order to generate the charging data, the processor 517 may transmit the charging data to the payment system 700.

The payment system 700 or the processor 517 may transmit a signal including the charging data to the mobile terminal 390 of the first user (S1265).

The processor 517 may determine whether the first product is returned (S1270). For example, the processor 517 may determine whether the first product is returned based on at least one of the image data of the internal camera 251 or the sensing data of the weight sensor.

In the case in which the first product is returned, the processor 517 may change the color of the light output from the first light source from the second color to the first color. The processor 517 may cancel a charging process (S1275).

The processor 517 may provide a control signal to the moving mechanism 520 such that the box 530 is hidden in the seat (S1280).

Figure 49:
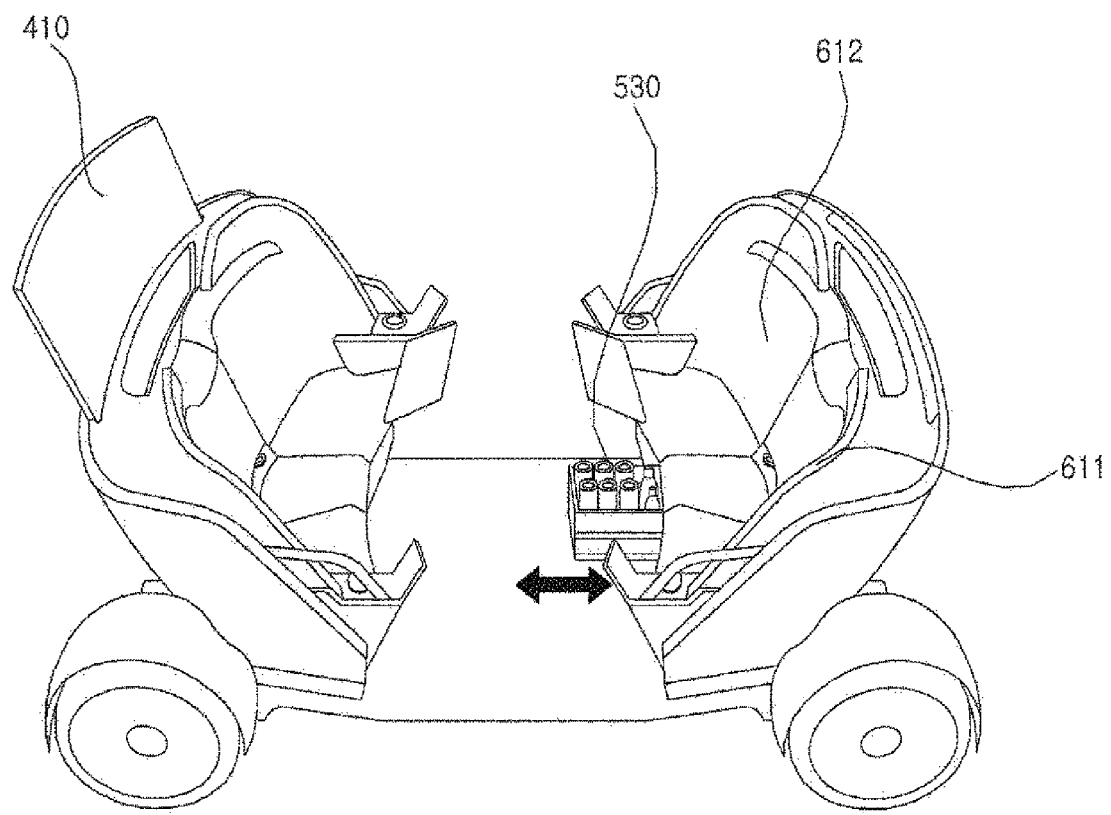
FIG. 49 is a view schematically showing a cabin according to an embodiment of the present disclosure.
Figure 50:
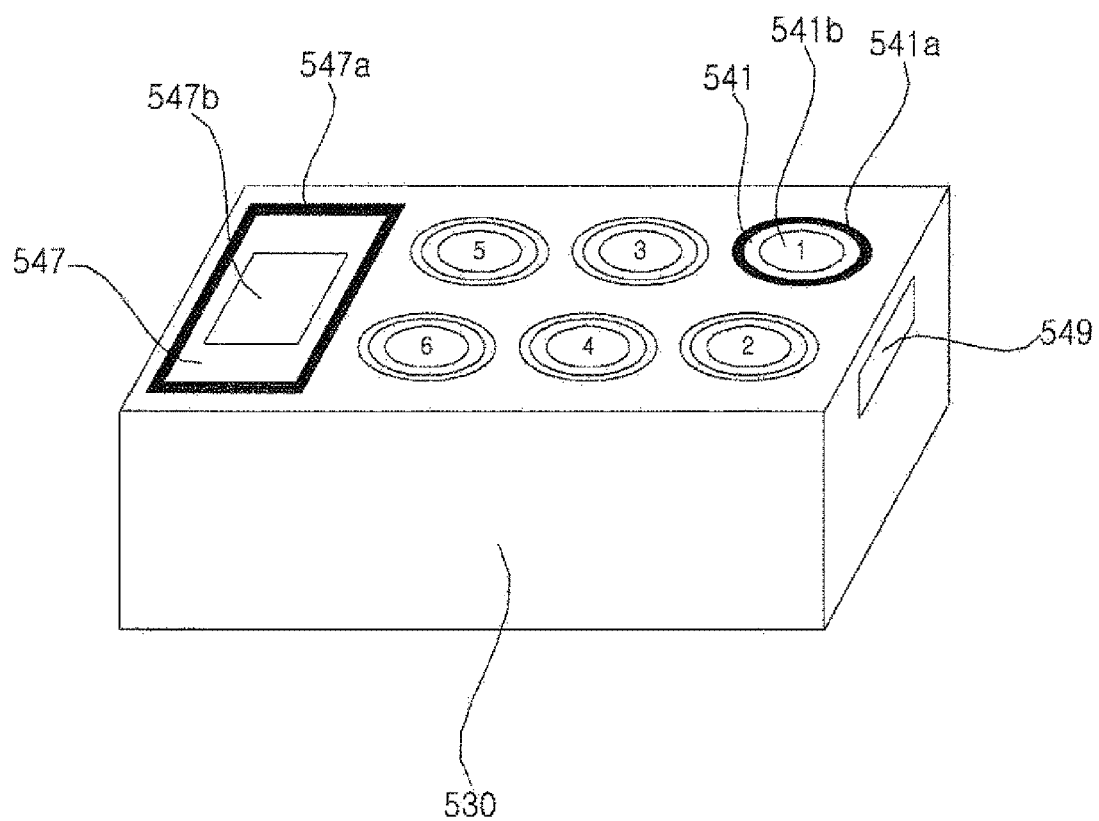
FIG. 50 is a view exemplarily showing a box according to an embodiment of the present disclosure.

FIG. 49 is a view schematically showing a cabin according to an embodiment of the present disclosure. FIG. 50 is a view exemplarily showing a box according to an embodiment of the present disclosure.

Referring to FIGS. 49 and 50, the product provision device 510 may include at least one box 530. The box 530 may be referred to as a cargo box.

The box 530 may be configured to protrude from and retreat into at least a portion of each of the seats 611 and 612 in the state in which a plurality of products is stored in the box. The box 530 may be moved from the seat into the cabin or from the cabin into the seat due to the force provided by the moving mechanism 520. The box 530 may be exposed in the cabin due to the force provided by the moving mechanism 520. The box 530 may be hidden in each of the seats 611 and 612 due to the force provided by the moving mechanism 520. A space for receiving the box 530 may be formed in each of the seats 611 and 612.

The box 530 may be hidden in a space defined in at least one seat. The box 530 may be hidden in a space defined in at least one seat. The box 530 may be hidden in a space between lower parts of a plurality of seats. The box 530 may be hidden between the lower part of the first seat 611 and the lower part of the second seat 612. In the state in which the box 530 is hidden, the box 530 may be integrated with the seat. At least one surface of the box 530 (e.g. the surface of the box that is exposed toward the interior of the cabin) may be made of a material having the same color as the seat.

At least one surface of the box 530 may be made of a transparent material. For example, the surface of the box 530 that is exposed toward the interior of the cabin, among a plurality of surfaces defining the box, may be made of a transparent material.

A button 549 may be disposed on at least one surface of the box 530. For example, the button 549 may be disposed on the surface of the box 530 that is exposed toward the interior of the cabin, among a plurality of surfaces defining the box. The button 549 may convert user input into an electrical signal. The converted electrical signal may be transmitted to the processor 517. The processor 517 may open or close the box according to the electrical signal received from the button 549.

A plurality of products 541b and 547b may be stored in the box 530. Each product may be a simple food, such as a beverage, a snack, pasta, or hamburger, or a leisure product, such as a golf ball or a golf glove. However, the product is not particularly restricted.

The box 530 may include a plurality of pockets 541 and 547. A plurality of products may be stored in each of the pockets 541 and 547. The side surface of each of the pockets 541 and 547 may be made of a modifiable material. A sensor for sensing the presence of a product (e.g. a weight sensor) may be disposed at the lower part of each of the pockets 541 and 547. The lower end of each of the pockets 541 and 547 may contact a shelf. In the case in which the shelf is moved upwards by the lifting mechanism 522, the side surface of each of the pockets 541 and 547 may be compressed, whereby at least a portion of each of the products 541b and 547b may be exposed in the cabin. A plurality of light sources may be disposed around an opening of each of the pockets 541 and 547. Each of the light sources 541a and 547a may have a shape surrounding the edge of the opening of each of the pockets so as to correspond to the shape of the opening of each of the pockets. The light sources 541a and 547a may be lower-level components of the light-emitting device 525 described above, and may be controlled under the control of the processor 517. In the case in which one of the products 541b and 547b is selected, the light output from the light source 541a or 547a around the pocket 541 or 547 storing the selected product may be changed.

The box 530 may include a first pocket 541. A first product 541b may be stored in a first pocket 541. The side surface of the first pocket 541 may be made of a modifiable material. A sensor for sensing the presence of the first product 541b may be disposed at the lower part of the first pocket 541. The lower end of the first pocket 541 may contact the shelf. In the case in which the shelf is moved upwards by the lifting mechanism 522, the side surface of the first pocket 541 may be compressed, whereby at least a portion of the first product 541b may be exposed in the cabin. A first light source 541a may be disposed around an opening of the first pocket 541. The first light source 541a may have a shape surrounding the edge of the opening of the first pocket 541 so as to correspond to the shape of the opening of the first pocket. In the case in which the first product 541b is selected, the color of the light output from a first light source 541a around the first pocket 541 storing the first product 541b may be changed from a first color to a second color.

Figure 51:
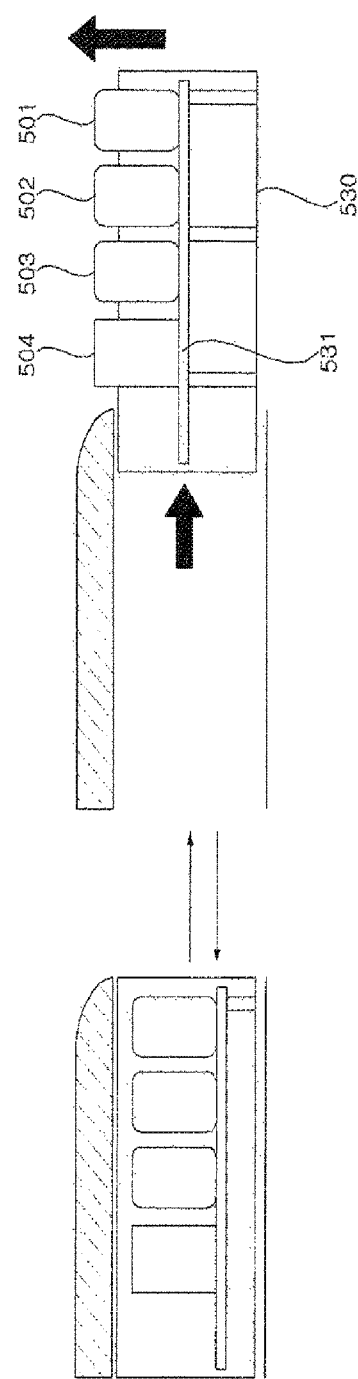
FIGS. 51 and 52 are reference views illustrating a moving mechanism according to an embodiment of the present disclosure.
Figure 52:
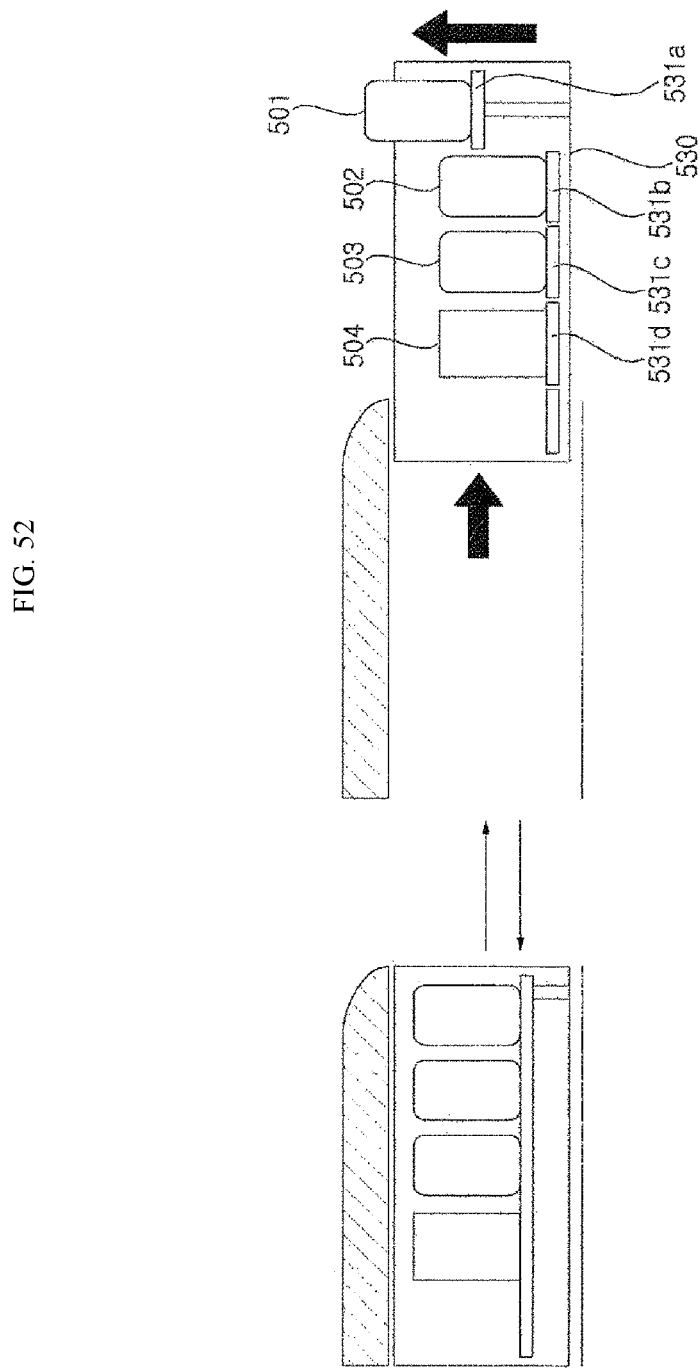

FIGS. 51 and 52 are reference views illustrating a moving mechanism according to an embodiment of the present disclosure.

Referring to FIG. 51, the moving mechanism 520 may include a sliding mechanism 521 and a lifting mechanism 522. The sliding mechanism 521 may include a driving unit, a power conversion unit, and a driving force transmission unit. The driving unit may convert electrical energy into kinetic energy. The driving unit may generate driving force. The driving unit may include at least one of a motor, an actuator, or a solenoid. The power conversion unit may convert the generated driving force into power suitable to move the box 530. For example, the power conversion unit may convert rotary power into rectilinear power. The driving force transmission unit may provide the converted power to the box 530. The sliding mechanism 521 may further include a rail. The box 530 may slide along the rail based on the power transmitted by the driving force transmission unit.

The lifting mechanism 522 may include a driving unit, a power conversion unit, and a driving force transmission unit. The driving unit may convert electrical energy into kinetic energy. The driving unit may generate driving force. The driving unit may include at least one of a motor, an actuator, or a solenoid. The power conversion unit may convert the generated driving force into power suitable to move the shelf 531. For example, the power conversion unit may convert rotary power into rectilinear power. The driving force transmission unit may provide the converted power to the shelf 531. The shelf 531 may be lifted based on the power transmitted by the driving force transmission unit.

Meanwhile, the shelf 531 may be classified as a lower-level component of the box 530. At least one product 501, 502, 503, or 504 may be placed on the shelf 531. As exemplarily shown in FIG. 51, the shelf 531 may be of an integrated type. In the case in which the shelf 531 is of an integrated type, a plurality of products 501, 502, 503, and 504 may be simultaneously exposed in the cabin due to power provided by the lifting mechanism 522. As exemplarily shown in FIG. 52, the shelf 531 may be of a separable type. Each of the products 501, 502, 503, and 504 may be placed on the shelf 531. For example, the shelf 531 may include a plurality of selves 531a, 531b, 531c, and 531d. A first product 501 may be placed on a first shelf 531a, and a second product 502 may be placed on a second shelf 531b. The selves 531a, 531b, 531c, and 531d may be individually lifted. For example, the first shelf 531a may be lifted due to power provided by the lifting mechanism 522 based on a signal for selecting the first product 501. In this case, only the first product 501 may be exposed in the cabin.

Figure 53:
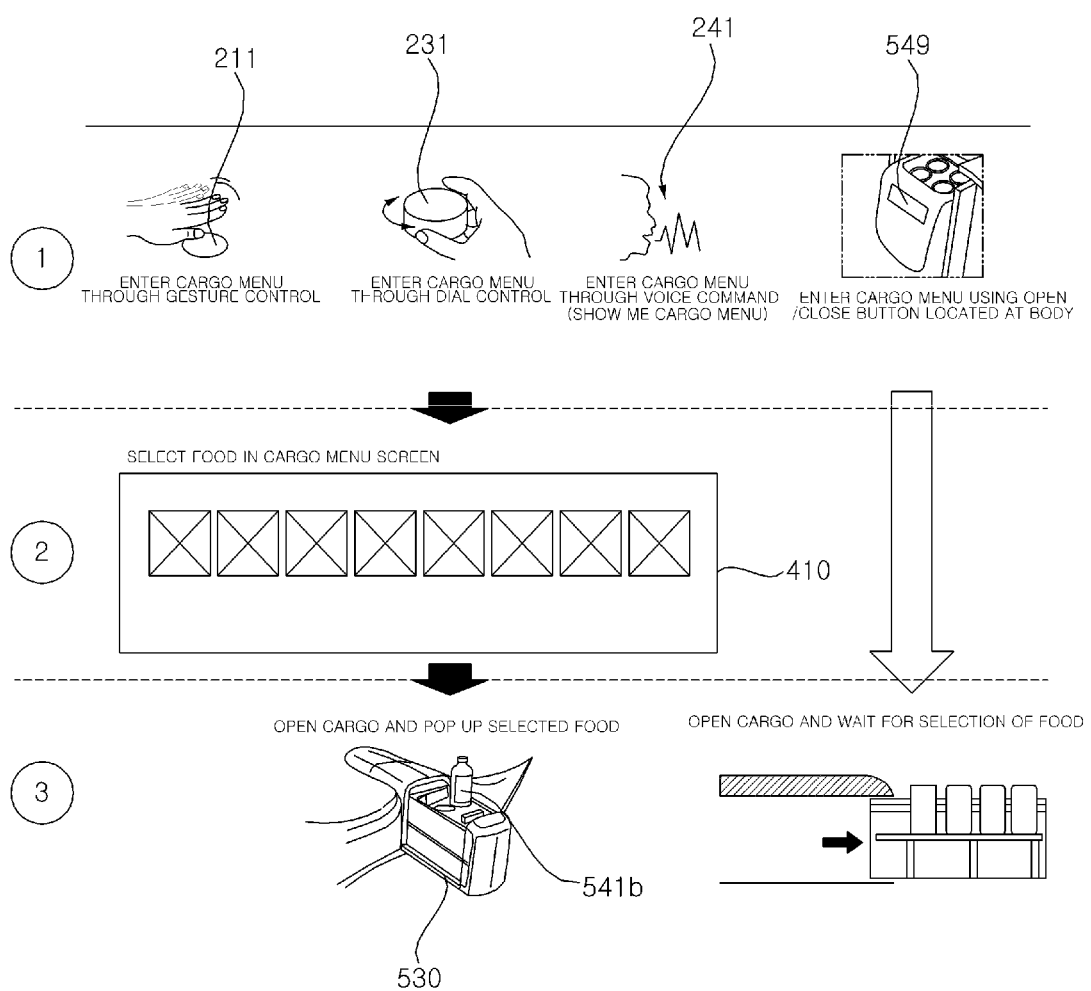
FIG. 53 is a reference view illustrating an operation in which a product is exposed by user input according to an embodiment of the present disclosure.

FIG. 53 is a reference view illustrating an operation in which a product is exposed by user input according to an embodiment of the present disclosure.

Referring to FIG. 53, the input device 200 may receive user input, and may convert the received user input into an electrical signal. The touch sensor included in the touch input unit 210 may convert user touch input into an electrical signal. The gesture sensor 221 included in the gesture input unit 220 may convert user gesture input into an electrical signal. The jog dial 231 included in the mechanical input unit 230 may convert mechanical user input into an electrical signal. The microphone 241 included in the voice input unit 240 may convert user voice input into an electrical signal.

The display system 400 may display a product menu on at least one display based on the electrical signal converted by the input device 200. In the state in which the product menu is displayed on the display, the input device 200 may receive user input for selecting a product. The input device 200 may convert user input for selecting a first product into a second electrical signal.

The processor 517 may control the sliding mechanism 521 such that the box is moved into the cabin based on the second electrical signal. The processor 517 may control the lifting mechanism 522 such that the first product is exposed in the cabin based on the second electrical signal.

Meanwhile, the cargo button 549 may convert user input into an electrical signal. The processor 517 may control the sliding mechanism 521 such that the box is moved into the cabin based on the electrical signal. The processor 517 may control the lifting mechanism 522 such that a plurality of products is exposed in the cabin based on the electrical signal.

Figure 54:
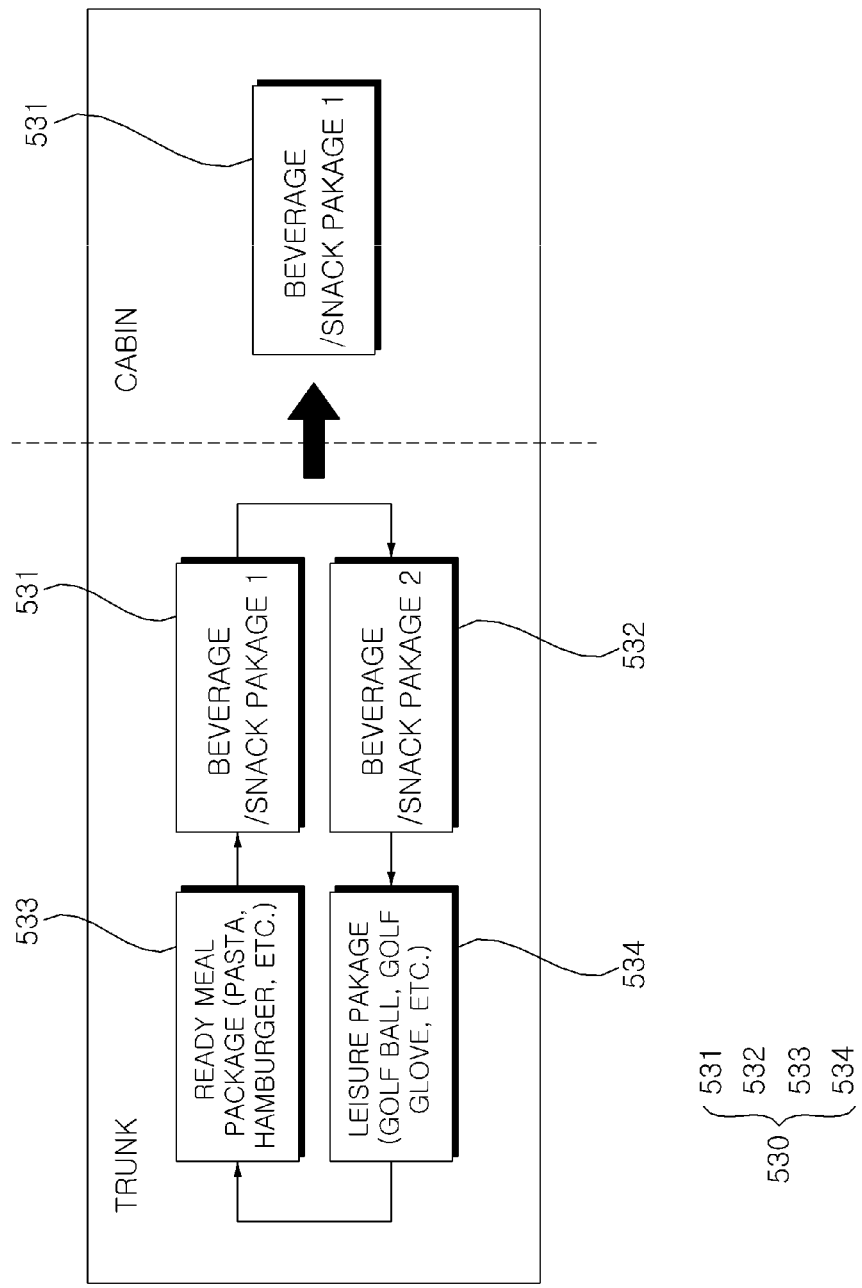
FIG. 54 is a reference view illustrating an operation in which only a selected box is opened among a plurality of boxes according to an embodiment of the present disclosure.

FIG. 54 is a reference view illustrating an operation in which only a selected box is opened among a plurality of boxes according to an embodiment of the present disclosure.

Referring to FIG. 54, the product provision device 510 may include a plurality of boxes 531, 532, 533, and 534. The boxes 531, 532, 533, and 534 may be located in a space outside the cabin. For example, the boxes 531, 532, 533, and 534 may be located in a trunk. Meanwhile, the interior of the cabin may communicate with the trunk such that the boxes 531, 532, 533, and 534 are moved from the trunk into the cabin or from the cabin into the trunk. The trunk may be provided with a mechanism for circulating the boxes 531, 532, 533, and 534.

A first box 531 may be selected according to a predetermined condition. For example, the first box 531 may be selected by default. For example, the first box 531 may be selected from among the plurality of boxes according to user input. For example, the first box 531 may be selected according to preference data of a plurality of users. For example, the first box 531 may be selected from among the plurality of boxes according to user product purchase history data. For example, the first box 531 may be selected from among the plurality of boxes according to user destination data. The selected first box 531 may be moved from the trunk into the cabin by the moving mechanism 520.

Figure 55:
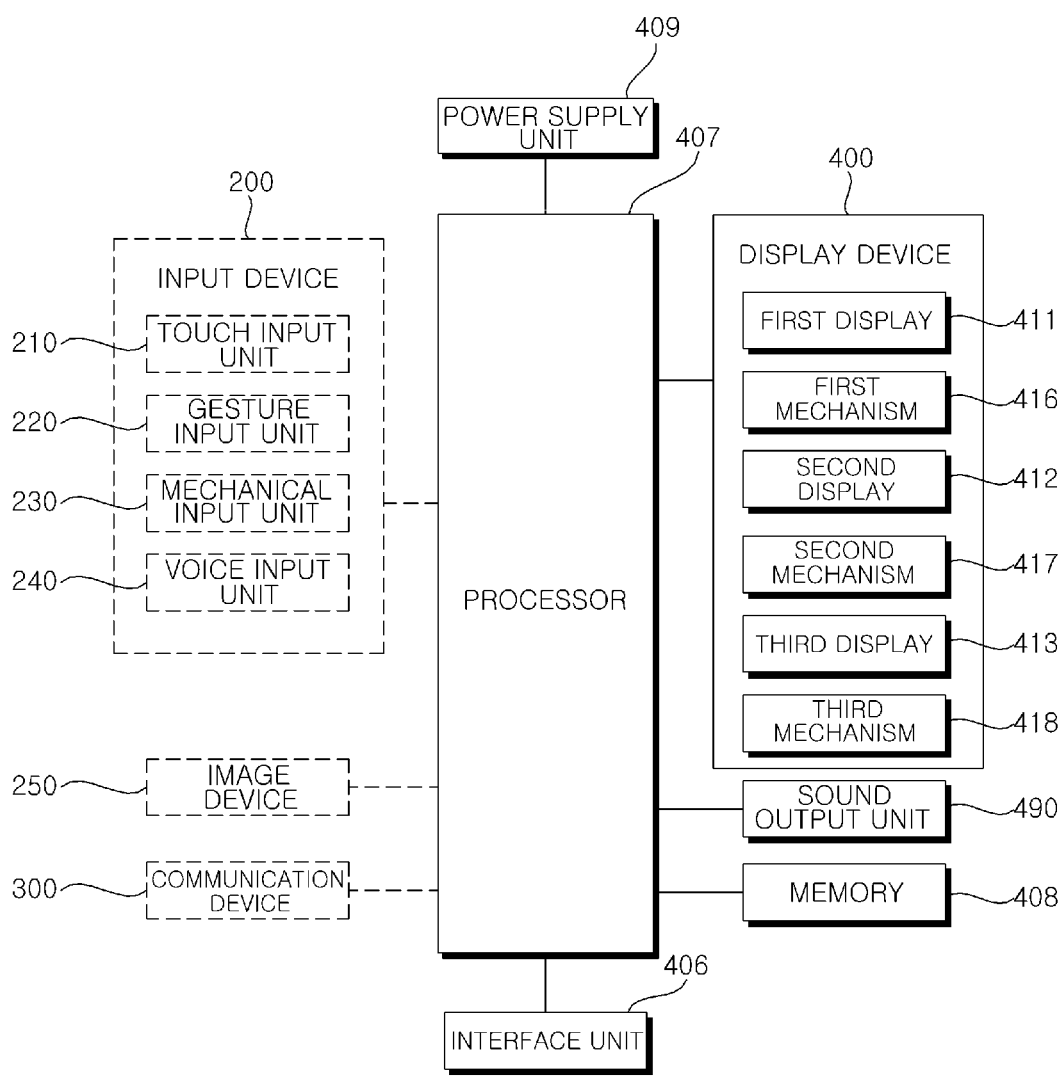
FIG. 55 is a control block diagram of the display system according to the embodiment of the present disclosure.

FIG. 55 is a control block diagram of the display system according to the embodiment of the present disclosure.

Referring to FIG. 55, the display system 400 may include an interface unit 406, a processor 407, a memory 408, a power supply unit 409, a display device 410, and a sound output unit 490. In some embodiments, the display system 400 may further include an input device 200, an image device 250, and a communication device 300 individually or in a combined state.

The description given with reference to FIGS. 1 to 55 may be applied to the input device 200, the image device 250, the communication device 300, the display device 410, and the sound output unit 490. Hereinafter, constructions omitted from the description given with reference to FIGS. 1 to 55 will be described.

The input device 200 may receive user input for manipulating the display device 4100, and may convert the received user input into an electrical signal. The image device 250 may acquire an image necessary to detect a user motion. The communication device 300 may receive content to be output through the display device 410 and the sound output unit 490 from at least one of an external server, a mobile terminal, or another vehicle. Although the input device 200, the image device 250, and the communication device 300 are exemplarily shown as directly exchanging a signal with the processor 407 in FIG. 55, the input device 200, the image device 250, and the communication device 300 may exchange a signal with the processor 407 via the interface unit 406.

The display system 400 may be mounted in the vehicle 10. The display system 400 may be referred to as a display system for vehicles. The display system 400 may provide a menu, multimedia content, a video conference, and traveling status information to a user in the cabin.

The interface unit 406 may exchange a signal with at least one electronic device mounted in the vehicle 10. The interface unit 406 may exchange a signal with at least one electronic device provided in the cabin system 100 in a wireless or wired fashion. The interface unit 406 may exchange a signal with at least one of the input device 200, the image device 250, the communication device 300, the cargo system 500, the seat system 600, or the payment system 700. The interface unit 406 may be electrically connected to the processor 407 in order to provide a received signal to the processor 407. The interface unit 406 may be constituted by at least one of a communication module, a terminal, a pin, a cable, a port, a circuit, an element, or a device.

The interface unit 406 may exchange a signal with at least one of the input device 200, the image device 250, or the communication device 300. The interface unit 406 may exchange a signal with the internal camera 251. The interface unit 406 may receive image data from the internal camera 251.

The processor 407 may control the overall operation of each unit of the display system 400. The processor 407 may be electrically connected to the interface unit 406, the memory 408, and the power supply unit 409. The processor 407 may be described as one of a plurality of sub-controllers constituting the main controller 170. The processor 407 may be driven by power supplied from the power supply unit 409.

The processor 407 may be realized using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing other functions.

The processor 407 may receive a signal based on user input. The processor 407 may receive a signal based on user input from at least one of the input device 200, the image device 250, or the communication device 300. The processor 407 may provide a control signal to at least one of the display device 410 or the sound output unit 490.

The processor 407 may acquire user sitting position data. The processor 407 may receive sitting position data from at least one electronic device mounted in the vehicle. For example, the processor 407 may receive user sitting position data from the seat system 600. The seat system 600 may include a sitting position sensor. The processor 407 may receive sensing data generated by the sitting position sensor. For example, the processor 407 may receive sitting position data from the image device 250. The processor 407 may receive sitting position data detected through image processing based on image data of the internal camera 251.

The processor 407 may provide a control signal for controlling the viewing angles of the displays 411, 412, and 413 based on the user sitting position data. The processor 407 may provide a control signal for controlling the viewing angles of the displays 411, 412, and 413 so as to correspond to the sitting position. The processor 407 may provide a control signal to at least one of the first display 411, the second display 412, or the third display 413. The processor 407 may provide a control signal to at least one of a first mechanism 416, a second mechanism 417, or a third mechanism 418.

The processor 407 may receive seat change data from the seat system 600 through the interface unit 406. In this case, the processor 407 may receive user gaze data from the internal camera 251 through the interface unit 406. The processor 407 may provide a control signal for controlling the viewing angles of the displays 411, 412, and 413 based on the user gaze data.

The processor 407 may provide a control signal for controlling the orientations of the displays 411, 412, and 413 in response to the user sitting position. The processor 407 may provide a control signal to the first mechanism 416 such that the first display 411 is moved upwards or downwards in response to the user sitting position. The first mechanism 416 may move the first display 411 upwards or downwards based on the control signal. The processor 407 may provide a control signal to the second mechanism 417 such that the second display 412 is rolled up or down in response to the user sitting position. The second mechanism 417 may roll up or down the second display 412 based on the control signal. The processor 407 may provide a control signal to the third mechanism 418 such that the curvature of the third display 413 is changed in response to the user sitting position. The third mechanism 418 may change the curvature of the third display 413 based on the control signal.

The processor 407 may provide a control signal for changing the positions of the display areas of the displays 411, 412, and 413 to the display device 410 in response to the user sitting position. The display device 410 may change the positions of the display areas of the displays 411, 412, and 413 in at least one of the upward direction or the downward direction based on the control signal.

The processor 407 may provide a control signal for controlling the viewing angles of the displays 411, 412, and 413 based on data received from at least one electronic device mounted in the vehicle 10.

For example, the processor 407 may receive image data including a user image from the internal camera 251. The processor 407 may detect the gaze and the finger of the user from the image data. The processor 407 may determine whether an imaginary extension line interconnecting the gaze and the finger of the user comes across spaces in which the displays 411, 412, and 413 can be located. Upon determining that the imaginary extension line comes across the spaces in which the displays 411, 412, and 413 can be located, the processor 407 may output user controllable notification content. The processor 407 may display a graphical object, or may output sound content. The processor 407 may track the motion of the finger of the user from the user image. The processor 407 may provide a control signal for controlling the viewing angles of the displays based on the tracked motion of the finger of the user. Through the above control, the user may intuitively adjust the viewing angles of the displays.

The processor 407 may provide a control signal for adjusting the orientation of the input device 200 based on the user sitting position data. The processor 407 may provide a control signal for adjusting the orientation of the input device 200 in response to the user sitting position. The processor 407 may provide a control signal for adjusting the tilting angle of the touch input unit 210 in response to the sitting position. The processor 407 may provide a control signal for adjusting the upward or downward movement of the jog dial device in response to the user sitting position. In the case in which the user sitting position is lowered, the processor 407 may provide a control signal for displaying a manipulation guide image, displayed on the upper surface of the jog dial device, on the side surface of the jog dial device.

The processor 407 may receive data about the number of passengers. The processor 407 may receive data about the number of passengers from at least one electronic device mounted in the vehicle 10. For example, the processor 407 may receive data about the number of passengers from the seat system 600. The processor 407 may acquire data about the number of passengers from the sitting sensor included in the seat system 600. For example, the processor 407 may receive data about the number of passengers from the image device 250. The processor 407 may acquire data about the number of passengers based on an image acquired from at least one of the internal camera 251 or the external camera 252.

The processor 407 may provide a control signal for dividing the display area of each of the displays 411, 412, and 413 based on the data about the number of passengers to the display device 410. The processor 407 may provide a control signal for dividing the display area of each of the displays 411, 412, and 413 according to the number of passengers to the display device 410.

The memory 408 is electrically connected to the processor 407. The memory 408 may store basic data about the units, control data necessary to control the operation of the units, and data that are input and output. The memory 408 may store data processed by the processor 407. In a hardware aspect, the memory 408 may be constituted by at least one of a ROM, a RAM, an EPROM, a flash drive, or a hard drive. The memory 408 may store various data necessary to perform the overall operation of the display system 400, such as a program for processing or control of the processor 407. The memory 408 may be integrated into the processor 407. The memory 408 may be driven by power supplied from the power supply unit 409.

The power supply unit 409 may supply power to the display system 400. The power supply unit 409 may receive power from the power source included in the vehicle 10, and may supply the received power to the respective units of the display system 400. The power supply unit 409 may be operated according to a control signal provided from the processor 407. For example, the power supply unit 409 may be realized as a switched-mode power supply (SMPS).

The display system 400 may include at least one printed circuit board (PCB). The interface unit 406, the processor 407, the memory 4018, and the power supply unit 409 may be mounted on the at least one printed circuit board.

The display device 410 may display at least one graphical object. The display device 410 may display the graphical object in order to provide a menu, multimedia content, a video conference, and traveling status information to a user in the cabin. The description of the first display device 410 given with reference to FIGS. 1 to 10 may be applied to the display device 410.

The display device 410 may include at least one display 411, 412, or 413. Although the display device 410 is exemplarily shown as including four displays in FIG. 55, the number of displays is not limited thereto.

The display device 410 may include all or selectively some of the first display 411, the first mechanism 416, the second display 412, the second mechanism 417, the third display 413, and the third mechanism 418.

The display device 410 may selectively include the first display 411 and the first mechanism 416. The first display 411 may be located at the rear of the seat, and may be configured to protrude into and retreat from the cabin. The first mechanism 416 may move the first display 411.

The display device 410 may selectively include the second display 412 and the second mechanism 417. The second display 412 may be located at the ceiling in the cabin, and may be configured to be rollable. The second mechanism 417 may roll or unroll the second display 412.

The display device 410 may selectively include the third display 413 and the third mechanism 418. The third display 413 may be located at the ceiling in the cabin, and may be configured to be flexible. The third mechanism 418 may bend or unbend the third display 413.

FIG. 56 is a view exemplarily showing a user sitting position according to an embodiment of the present disclosure.

Referring to FIG. 56, the user sitting position 441 or 442 may be defined as a user posture on the seat.

The seat system 600 may generate user sitting position data through a sitting position sensor. For example, the seat system 600 may include a tilting sensor disposed at the back of the seat. The seat system 600 may generate user sitting position data based on sensing data generated by the tilting sensor.

The image device 250 may generate user sitting position data through image processing. The image device 250 may include at least one processor for realizing an image processing algorithm. The image device 250 may acquire a user image through the internal camera 251. For example, the image device 250 may generate sitting position data based on the height of the head of the user in the state in which the user sits on the seat. For example, the image device 250 may generate sitting position data based on the tilt of an upper body or the tilt of a lower body with respect to the floor in the cabin.

Meanwhile, the user sitting position may be divided into a first sitting position 441 and a second sitting position 442. The first sitting position 441 may be defined as a posture in which the user sits on the seat, and the second sitting position 442 may be defined as a posture in which the user lies down on the seat. The first sitting position 441 may be described as a higher posture than the second sitting position 442, and the second sitting position 442 may be described as a lower posture than the first sitting position 441.

Figure 57:
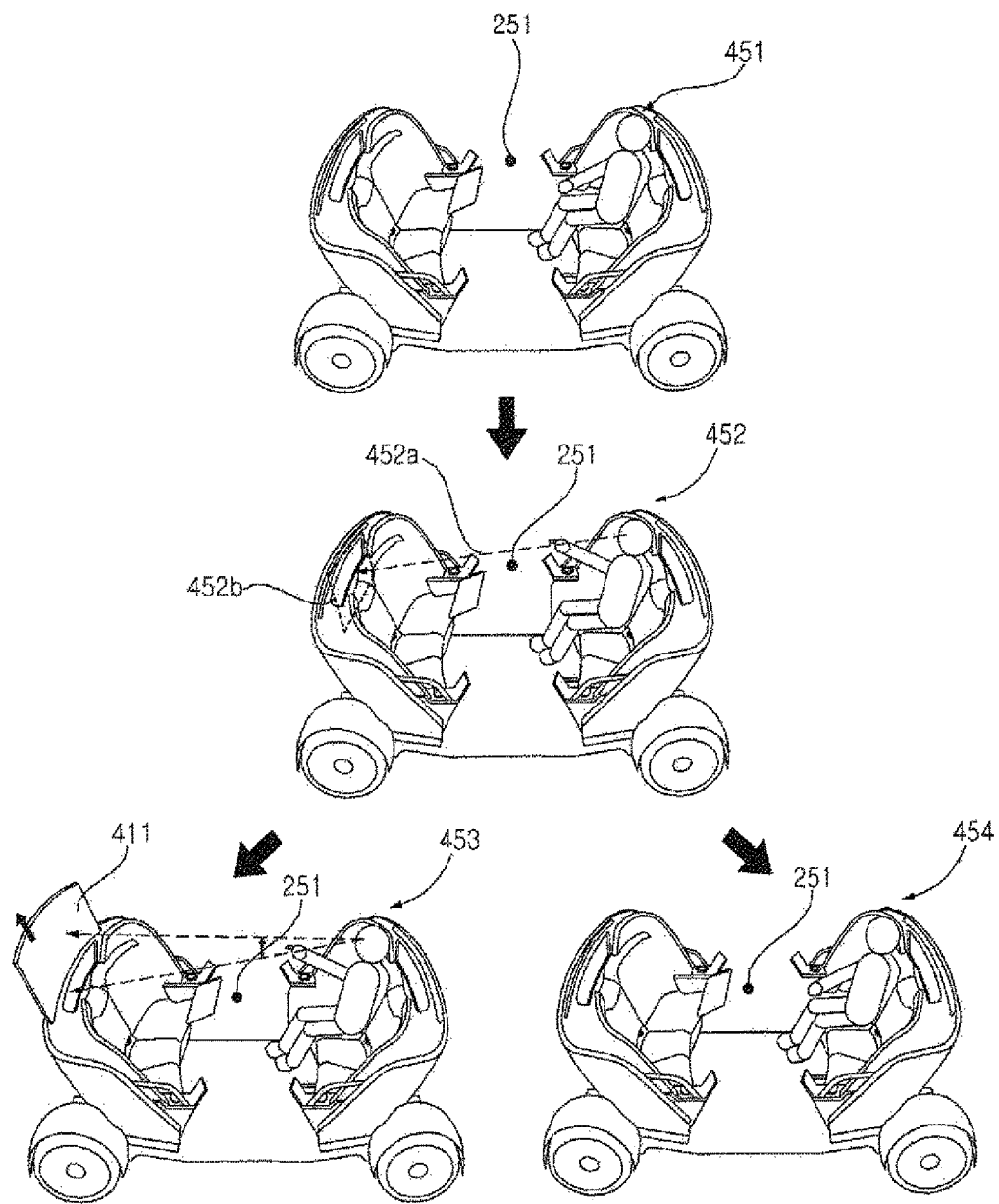
FIG. 57 is a view exemplarily showing user input for adjusting the viewing angle of a display according to an embodiment of the present disclosure.

FIG. 57 is a view exemplarily showing user input for adjusting the viewing angle of the display according to an embodiment of the present disclosure.

Referring to FIG. 57, as indicated by reference numeral 451, the processor 407 may receive image data including a user image from the internal camera 251. As indicated by reference numeral 452, the processor 407 may detect the gaze and the finger of the user from the image data through a predetermined image processing algorithm. The processor 407 may determine whether an imaginary extension line 452*a* interconnecting the gaze and the finger of the user comes across a space 452*b* in which the display 411 can be located. Upon determining that the display 411 is located on the imaginary extension line 452*a*, the processor 407 may output content informing that the position of the display can be controlled using user motion through at least one of the display device 410 or the sound output unit 490. As indicated by reference numeral 453, the processor 407 may track the motion of the finger of the user from the user image, and may provide a control signal for controlling the viewing angle of the displays 411 based on the tracked motion of the finger of the user. For example, in the case in which an upwardly moving finger is tracked, the processor 407 may provide a control signal such that the first display is moved upwards. For example, in the case in which a downwardly moving finger is tracked, the processor 407 may provide a control signal such that the first display is moved downwards. As indicated by reference numeral 454, in the case in which the user lowers their arm and thus no finger directed to the display 411 is detected, the processor 407 may finish a display control process.

Figure 58:
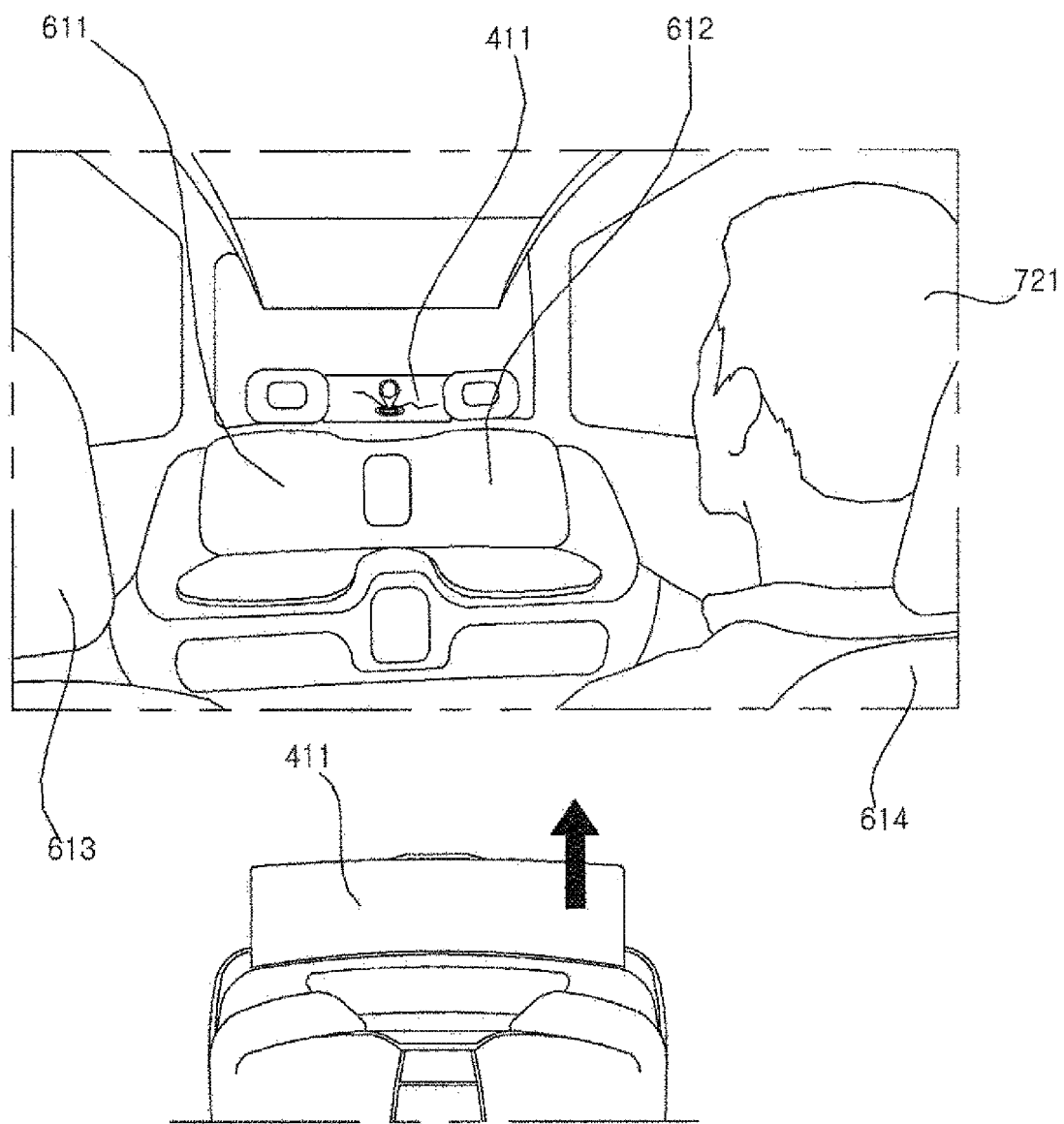

FIGS. 58 and 59 are views exemplarily showing a physical viewing angle adjustment operation of a first display according to an embodiment of the present disclosure.

Referring to the figures, the first display 411 may be located at the rear of at least one seat 611 or 612. For example, the first display 411 may be located at the rear of a first seat 611 and a second seat 612. In this case, the first display 411 may face a third seat and a fourth seat. A user sitting on the third seat or the fourth seat may watch content displayed on the first display 411. For example, the first display 411 may be located at the rear of the third seat and the fourth seat. In this case, the first display 411 may face the first seat 611 and the second seat 612. A user sitting on the first seat 611 or the second seat 612 may watch content displayed on the first display 411.

The first display 411 may be configured to protrude into and retreat from the cabin. The first display 411 may be disposed in a slot formed in a seat frame. The first display 411 may be protruded from the slot into the cabin, or may be retreated from the cabin into the slot, by the first mechanism. The first mechanism may protrude at least a portion of the first display 411 from the slot into the cabin, or may retreat at least a portion of the first display 411 from the cabin into the slot.

The first mechanism 416 may physically move the first display 411 in order to adjust the viewing angle thereof. The first mechanism 416 may be operated according to a control signal of the processor 407. The first mechanism 416 may include a driving unit, a power conversion unit, and a power transmission unit. The driving unit may generate driving force. For example, the driving unit may include at least one of a motor, an actuator, or a solenoid. The power conversion unit may convert the generated driving force into power suitable to move the first display 411. The power transmission unit may transmit the converted power to the first display 411.

The processor 407 may provide a control signal to the first mechanism 416 such that the first display 411 is moved upwards or downwards in response to the sitting position. In the case in which data about a first sitting position 441 are acquired, the processor 407 may provide a control signal to the first mechanism 416 such that at least a portion of the first display 411 is protruded into the cabin. The first mechanism may protrude at least a portion of the first display 411 from the slot into the cabin. In this case, the first display 411 may be in a first state 411*a*. In the case in which data about a second sitting position 442 are acquired, the processor 407 may provide a control signal to the first mechanism 416 such that at least a portion of the first display 411 retreats into the slot. The first mechanism 416 may retreat at least a portion of the first display 411 from the cabin into the slot. In this case, the first display 411 may be in a second state 411*b*. The second state 411*b* may be understood as a state in which the area of the first display exposed in the cabin is smaller than the first state 411*a*.

The display device 410 may further include a flexible area adjustment mechanism. The flexible area adjustment mechanism may be operated according to a control signal of the processor 407. The flexible area adjustment mechanism may include a first rail, a second rail, a post, a connection unit, and a driving unit. The first rail may be attached to one surface of the first display 411. The first rail may be made of a flexible material. The first rail may constrain one end of the connection unit in the height direction. The first rail may guide the connection unit so as to slide in the width direction. The second rail may be attached to a portion of the floor in the cabin or the seat frame. The second rail may constrain one end of the post in the overall length direction. The second rail may guide the post so as to slide in the width direction. The post may extend in the height direction. One end of the post may be inserted into the second rail, and the post may slide along the second rail in the width direction. The connection unit may interconnect the post and the first display 411. One end of the connection unit may be inserted into the first rail. One end of the connection unit may be connected to the first rail in the state in which a portion of the first display 411 is bent in the first direction. The driving unit may provide driving force such that the post is slidable. The driving unit may include at least one of a motor, an actuator, or a solenoid. When the post slides along the second rail, the connection unit may slide along the first rail. As the connection unit moves, the flexible area of the first rail may be changed, and as the flexible area of the first rail is changed, the flexible area of the first display 411 may be changed.

The flexible area adjustment mechanism may include a post extending in the upward-downward direction (e.g. the width direction) and a connection unit for interconnecting the post and the first display 411.

The first display 411 may be formed so as to be flexible in the leftward-rightward direction (e.g. the width direction).

The processor 407 may provide a control signal to the flexible area adjustment mechanism such that the first display is directed to the user. The processor 407 may provide a control signal to the flexible area adjustment mechanism such that the flexible area of the first display 411 is adjusted depending on the location of the user.

Figure 60:
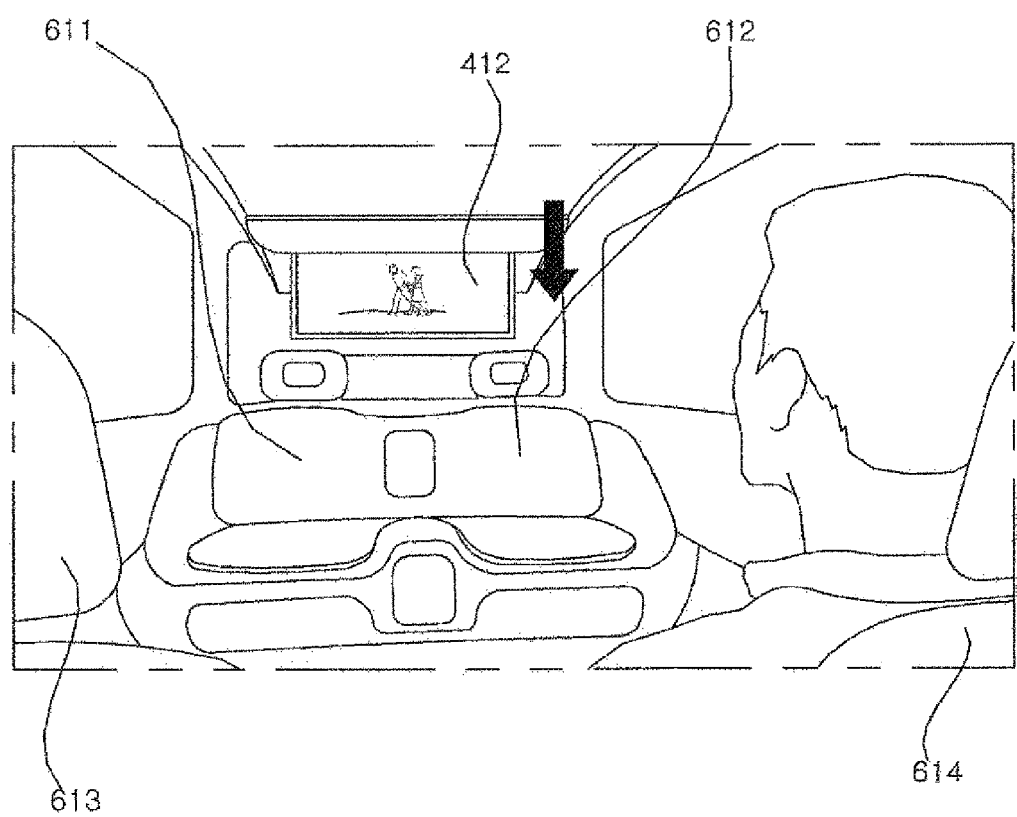

FIGS. 60 and 61 are views exemplarily showing a physical viewing angle adjustment operation of a second display according to an embodiment of the present disclosure.

Referring to the figures, the second display 412 may be located at the ceiling in the cabin. The second display 412 may be formed so as to be rollable. For example, the second display 412 may be located at the ceiling in the cabin between an area corresponding to the first seat 611 and an area corresponding to the third seat 613, which is opposite the first seat 611, or between an area corresponding to the second seat 612 and an area corresponding to the fourth seat 614, which is opposite the second seat 612. In a rolled state, the second display 412 may be disposed at the ceiling in the cabin in the width direction. The second display 412 may be formed so as to output screens from opposite surfaces thereof. All of users sitting on the first seat 611 and the second seat 613 and users sitting on the third seat 613 and the fourth seat 614 may watch content displayed on the second display. The second display 412 may be formed so as to be rolled down into the cabin or to be rolled up from the cabin. The second mechanism 417 may roll or unroll the second display 412.

The second mechanism 417 may physically move the second display 412 in order to adjust the viewing angle thereof. The second mechanism 417 may be operated according to a control signal of the processor 407. The second mechanism 417 may include a driving unit, a power conversion unit, and a power transmission unit. The driving unit may generate driving force. For example, the driving unit may include at least one of a motor, an actuator, or a solenoid. The power conversion unit may convert the generated driving force into power suitable to move the second display 412. The power transmission unit may transmit the converted power to the second display 412.

The processor 407 may provide a control signal to the second mechanism 417 such that the second display 412 is rolled up or down in response to the sitting position. In the case in which data about a first sitting position 441 are acquired, the processor 407 may provide a control signal to the second mechanism 417 such that at least a portion of the second display 412 is rolled up. The second mechanism 417 may roll up at least a portion of the second display 412. In this case, the second display 412 may be in a first state 412a. In the case in which data about a second sitting position 442 are acquired, the processor 407 may provide a control signal to the second mechanism 417 such that at least a portion of the second display 412 is rolled down. In this case, the second display 412 may be in a second state 412b. The second state 412b may be understood as a state in which the area of the second display 412 exposed in the cabin is larger than the first state 412a.

Figure 63:
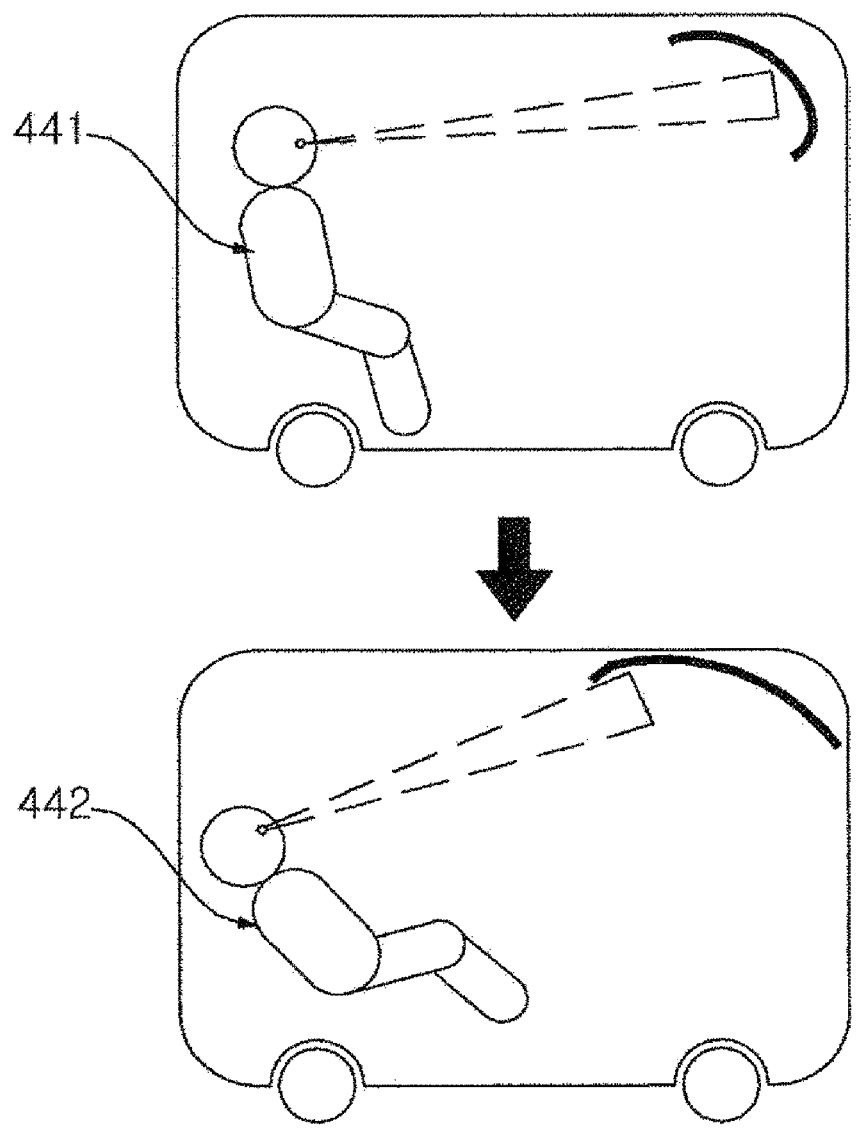

FIGS. 62 and 63 are views exemplarily showing a physical viewing angle adjustment operation of a third display according to an embodiment of the present disclosure.

Referring to the figures, the third display 413 may be located at the ceiling in the cabin. The third display 413 may be formed so as to be flexible. The third display 413 may be located at the ceiling in the cabin at the point at which the third seat 613 and the fourth seat face each other. The third display 413 may be located at the ceiling in the cabin at the point at which the first seat 611 and the second seat face each other. The third display 413 may be bent or unbent.

The third mechanism 418 may physically move the third display 413 in order to adjust the viewing angle thereof. The third mechanism 418 may be operated according to a control signal of the processor 407. The third mechanism 418 may include a driving unit, a power conversion unit, and a power transmission unit. The driving unit may generate driving force. For example, the driving unit may include at least one of a motor, an actuator, or a solenoid. The power conversion unit may convert the generated driving force into power suitable to move the third display 413. The power transmission unit may transmit the converted power to the third display 413.

The processor 407 may provide a control signal to the second mechanism 417 such that the curvature of the third display 413 is changed in response to the sitting position. In the case in which data about a first sitting position 441 are acquired, the processor 407 may provide a control signal to the third mechanism 418 such that the upper part of the third display 413 is bent in a direction opposite the direction toward the interior of the cabin. In this case, the third display 413 may be in a first state 413a. In the case in which data about a second sitting position 442 are acquired, the processor 407 may provide a control signal to the third mechanism 418 such that the lower part of the third display 413 is bent in a direction opposite the direction toward the interior of the cabin. In this case, the third display 413 may be in a second state 413b. The second state 413b may be understood as a state in which the area of the third display 413 facing the floor in the cabin is larger than the first state 413a.

Figure 64:
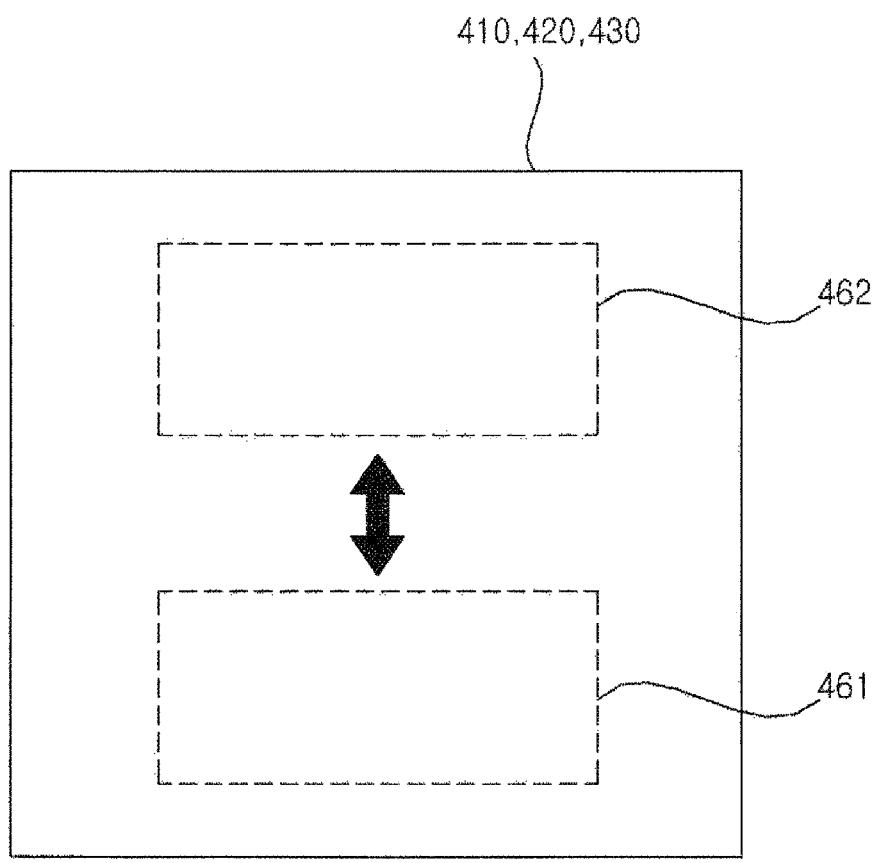
FIG. 64 is a view exemplarily showing a viewing angle adjustment operation based on a change in the position of a display area of a display according to an embodiment of the present disclosure.

FIG. 64 is a view exemplarily showing a viewing angle adjustment operation based on a change in the position of a display area of a display according to an embodiment of the present disclosure.

Referring to FIG. 64, in the state in which the area of the display 411, 412, or 413 exposed in the cabin is uniform, the display area of the display 411, 412, or 413 may be changed depending on the user sitting position. The processor 407 may change the position of the display area of the display 411, 412, or 413 in response to the user sitting position. For example, in the case in which the user sitting position is changed from the first sitting position 441 to the second sitting position 442, the display area of the display 411, 412, or 413 may be changed from a first area 461 to a second area 462. In the case in which the user sitting position is changed from the second sitting position 442 to the first sitting position 441, the display area of the display 411, 412, or 413 may be changed from the second area 462 to the first area 461. The first area 461 may be described as an area of the display 411, 412, or 413 lower than the second area 462.

FIG. 65 is a view exemplarily showing a tilting angle adjustment operation of a touch input unit according to an embodiment of the present disclosure.

The input device 200 may include a touch input unit 210 for converting user touch input into an electrical signal. The touch input unit 210 may be integrated into a private display device 420 in order to realize a touchscreen. The touch input unit 210 may be disposed on at least one of the seat, the armrest, or the door.

The input device 200 may further include a tilting mechanism. The tilting mechanism may physically move the touch input unit 210. The tilting mechanism may be operated according to a control signal of the processor 407. The tilting mechanism may include a driving unit, a power conversion unit, and a power transmission unit. The driving unit may generate driving force. For example, the driving unit may include at least one of a motor, an actuator, or a solenoid. The power conversion unit may convert the generated driving force into power suitable to move the touch input unit 210. The power transmission unit may transmit the converted power to the touch input unit 210.

The processor 407 may provide a control signal for adjusting the tilting angle of the touch input unit in response to the sitting position. In the case in which data about a first sitting position 441 are acquired, the processor 407 may provide a control signal to the tilting mechanism such that the touch input unit 210 is level with the peripheral structure (e.g. the seat, the armrest, or the door). In this case, the tilting angle may be 0 degrees. The touch input unit 210 may be in a first state 210*a*. In the case in which data about a second sitting position 442 are acquired, the processor 407 may provide a control signal to the tilting mechanism such that the touch input unit 210 is tilted. The tilting mechanism may tilt the touch input unit 210. In this case, the tilting angle may range from 1 to 90 degrees. The touch input unit 210 may be in a second state 210*b*. The second state 210*b* may be understood as a state in which the touch input unit is more tilted than the first state 210*a*.

FIG. 66 is a view exemplarily showing an upward and downward movement adjustment operation of a jog dial device according to an embodiment of the present disclosure.

Referring to FIG. 66, the input device 200 may include a jog dial device including a gesture sensor, the jog dial device being configured to protrude from and retreat into a portion of at least one of the seat, the armrest, or the door. A manipulation guide image may be displayed on the upper surface of the jog dial device. The manipulation guide image may be erased according to a control signal of the processor 407. A manipulation guide image may be displayed on the side surface of the jog dial device. The manipulation guide image may be erased according to a control signal of the processor 407.

The input device 200 may further include an upward and downward movement mechanism. The upward and downward movement mechanism may be operated according to a control signal of the processor 407. The upward and downward movement mechanism may include a driving unit, a power conversion unit, and a power transmission unit. The driving unit may generate driving force. For example, the driving unit may include at least one of a motor, an actuator, or a solenoid. The power conversion unit may convert the generated driving force into power suitable to move the jog dial device. The power transmission unit may transmit the converted power to the jog dial device.

The processor 407 may provide a control signal for adjusting the upward or downward movement of the jog dial device in response to a sitting position. In the case in which data about a first sitting position 441 are acquired, the processor 407 may provide a control signal to the upward and downward movement mechanism such that the jog dial device is level with the peripheral structure (e.g. the seat, the armrest, or the door). The upward and downward movement mechanism may move the jog dial device upwards. In this case, the jog dial device may be in a first state 221*a*. In the first state 221*a*, the jog dial device may function as the mechanical input unit 230. In the case in which data about a second sitting position 442 are acquired, the processor 407 may provide a control signal to the upward and downward movement mechanism such that the jog dial device protrudes further than the peripheral structure. The upward and downward movement mechanism may move the jog dial device downwards. In this case, the jog dial device may be in a second state 221*b*. In the second state 221*b*, the jog dial device may function as the gesture input unit 220.

Meanwhile, in the case in which the sitting position is lowered (e.g. in the case in which the sitting position is changed from the first sitting position 441 to the second sitting position 442), the processor 407 may provide a control signal for displaying the manipulation guide image, displayed on the upper surface of the jog dial device, on the side surface of the jog dial device.

Figure 67:
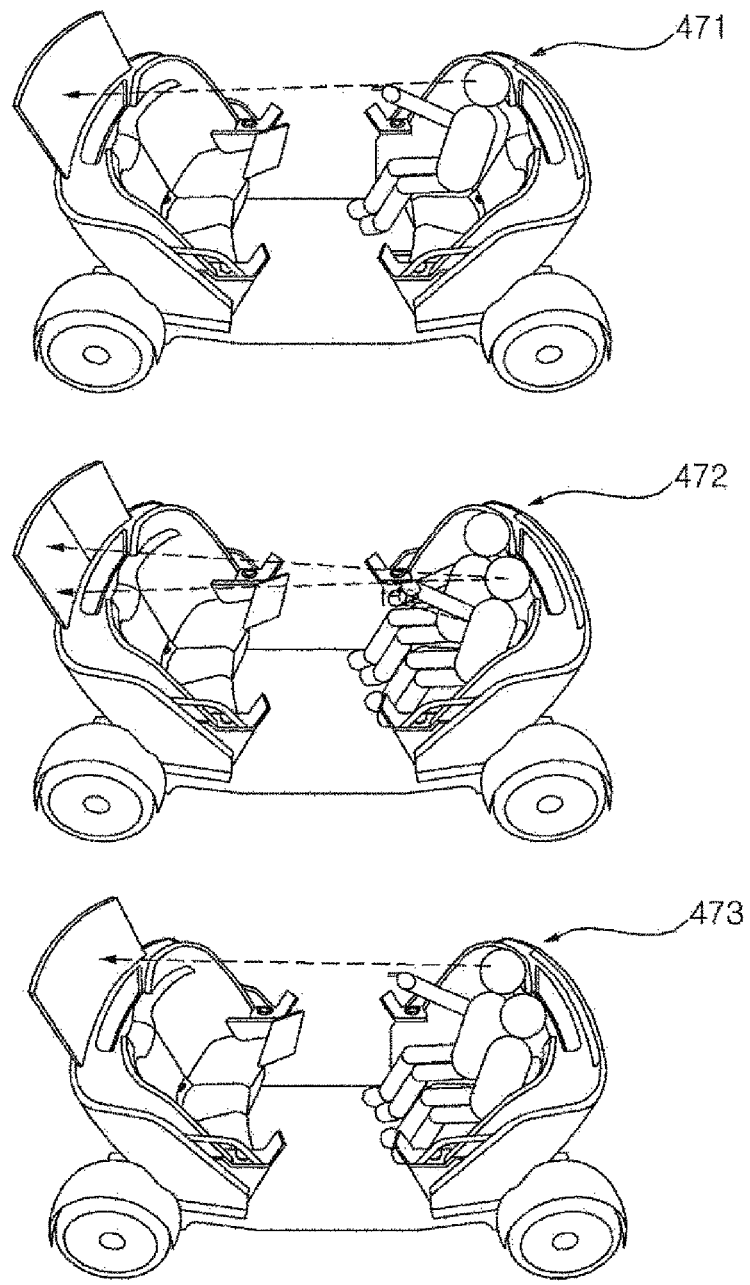
FIG. 67 is a view exemplarily showing a display area division operation of the display based on the number of passengers according to an embodiment of the present disclosure.

FIG. 67 is a view exemplarily showing a display area division operation of the display based on the number of passengers according to an embodiment of the present disclosure.

Referring to FIG. 67, the processor 407 may provide a control signal for dividing the display area of the display 411, 412, or 413 based on the number of passengers to the display device 410. As indicated by reference numeral 471, in the case in which a single user enters the vehicle, content may be displayed in the entire area of the display 411, 412, or 413. As indicated by reference numeral 472, in the case in which a first user and a second user enter the vehicle, the processor 407 may divide the display 411, 412, or 413 into a first area and a second area, may display first content for the first user in the first area, and may display second content for the second user in the second area. As indicated by reference numeral 473, in the case in which the first user and the second user request the same content, the processor 407 may display the same content in the entire area of the display 411, 412, or 413.

Figure 68:
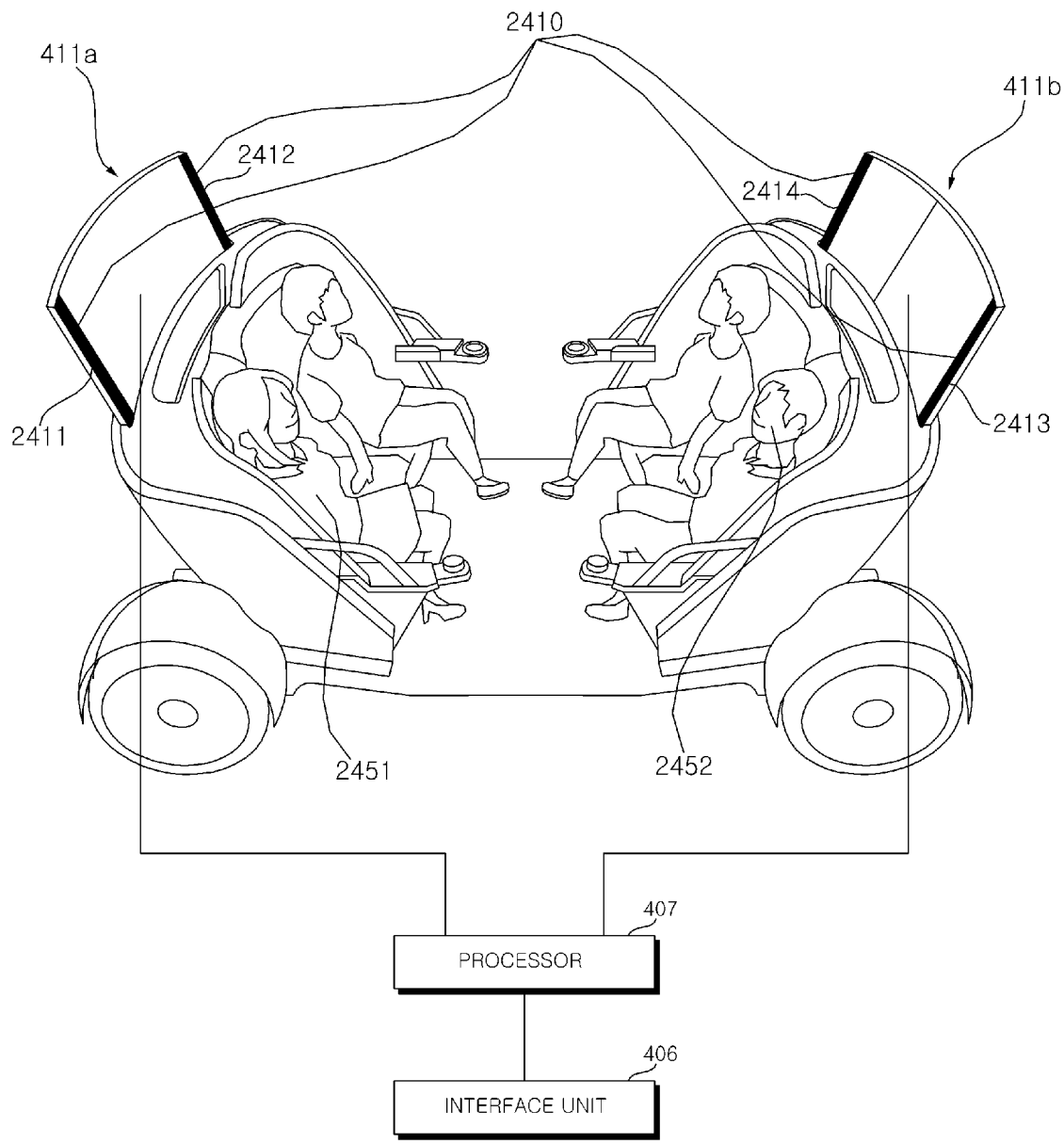
FIGS. 68 and 69 are reference views illustrating a motion sickness reduction system for vehicles according to an embodiment of the present disclosure, wherein FIG. 68 exemplarily shows the first display and FIG. 69 exemplarily shows the third display.
Figure 69:
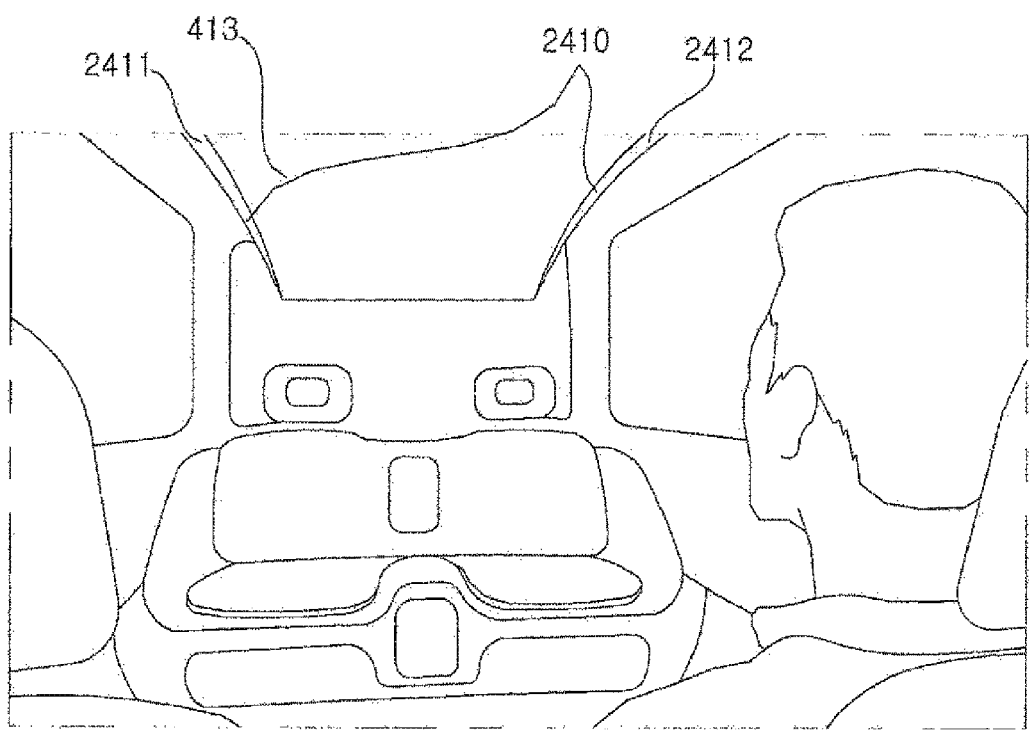

FIGS. 68 and 69 are reference views illustrating a motion sickness reduction system for vehicles according to an embodiment of the present disclosure. FIG. 68 exemplarily shows the first display, and FIG. 69 exemplarily shows the third display.

Referring to FIGS. 68 and 69, the display system 400 of FIG. 55 may function as a motion sickness reduction system 400 for vehicles. A display system 400 capable of performing a motion sickness reduction operation may be referred to as a motion sickness reduction system 400 for vehicles.

The motion sickness reduction system 400 for vehicles may include an interface unit 406, at least one light output area 2410, and a processor 407. The motion sickness reduction system 400 for vehicles may further include at least one of an input device 200, an image device 250, a communication device 300, a sound output unit 490, a memory 408, or a power supply unit 409. The description given with reference to FIGS. 55 to 67 may be applied to the respective components of the motion sickness reduction system 400 for vehicles.

The interface unit 406 may exchange a signal with at least one electronic device mounted in the vehicle 10. The interface unit 406 may receive information about the state of the vehicle from at least one sensor mounted in the vehicle 10. The interface unit 406 may receive information about the state of the vehicle from at least one electronic control unit (ECU) mounted in the vehicle 10. For example, the interface unit 406 may receive at least one of information about the stop state of the vehicle 10, information about the traveling speed of the vehicle 10, information about the steering direction of the vehicle 10, information about the upward and downward movement of the vehicle 10, or information about the heading direction of the vehicle 10 from the at least one electronic device. The interface unit 406 may receive information about the traveling status of the vehicle 10 from the at least one electronic device. For example, the interface unit 406 may receive information about the landform of a road on which the vehicle 10 is traveling from the at least one electronic device.

Meanwhile, the interface unit 406 may exchange a signal with the seat system 600. The interface unit 406 may exchange a signal with a seat orientation adjustment mechanism included in the seat system 600. The seat orientation adjustment mechanism may adjust the orientation of the seat based on a signal provided by the processor 407.

The interface unit 406 may exchange a signal with the communication device 300, which wirelessly communicates with the mobile terminal 390.

The at least one light output area 2410 may be located around at least one display screen. The at least one light output area 2410 may be mechanically integrated into the display screen. The at least one light output area 2410 may constitute at least one of the display 411, the display 412, or the display 413 of the display device 410 together with the at least one display screen. In this case, the at least one light output area 2410 may be realized at the area of at least one of the display 411, the display 412, or the display 413.

In some embodiments, the at least one light output area 2410 may be formed so as to be mechanically separated from the display screen. The at least one light output area 2410 may include at least one light source. The light source may be operated according to a control signal generated by the processor 407. Preferably, the light source is a surface light source.

Meanwhile, a rear seat may be defined as a seat on which a user sits so as to face in the direction in which the vehicle moves forwards. A front seat may be defined as a seat on which a user sits so as to face in the direction in which the vehicle moves rearwards.

Meanwhile, at least one display 411 may include a rear seat display 411a and a front seat display 411b. Although the rear seat display 411a and the front seat display 411b applied to the first display 411 are exemplarily shown in FIG. 68, each of the second display 412 and the third display 413 may include a rear seat display and a front seat display.

In the rear seat display 411a, the direction in which a screen is displayed may be a direction opposite the direction in which the vehicle travels forwards. The rear seat display 411a may be located such that the screen can be watched from a rear seat 2452. The at least one light output area 2410 may include a first light output area 2411 disposed at the left side of the rear seat display 411a in the direction in which the vehicle 10 travels forwards and a second light output area 2412 disposed at the right side of the rear seat display 411a in the direction in which the vehicle 10 travels forwards.

In the front seat display 411b, the direction in which a screen is displayed may be the direction in which the vehicle travels forwards. The front seat display 411b may be disposed such that the screen can be watched from a front seat. The at least one light output area 2410 may include a third light output area 2413 disposed at the left side of the front seat display 411b in the direction in which the vehicle 10 travels forwards and a fourth light output area 2414 disposed at the right side of the front seat display 411b in the direction in which the vehicle 10 travels forwards.

The processor 407 may receive information about the state of the vehicle from the electronic device through the interface unit 406. The processor 407 may provide a control signal for changing the pattern of light, output from the light output area 2410, to the light output area 2410 based on the information about the state of the vehicle. By changing the pattern of the light that is output, it is possible for the user to recognize the movement of the vehicle 10. As a result, motion sickness that the user feels while watching the display screen may be alleviated.

The processor 407 may receive information about the stop state of the vehicle 10 from the electronic device. The processor 407 may provide a control signal for stopping a change in the pattern of light output from the light output area 2410 based on the information about the stop state of the vehicle 10. In some embodiments, the processor 407 may provide a control signal for changing the pattern of light output from the light output area 2410 at a predetermined speed based on the information about the stop state of the vehicle 10. In the state in which the vehicle 10 is not moved, a change in the pattern of light may be stopped, or the pattern of light may be changed at a predetermined speed, in order for the user to recognize that the vehicle 10 is in a stopped state.

The processor 407 may receive information about the traveling speed of the vehicle 10 from the electronic device. The processor 407 may adjust a speed at which the pattern of light output from the light output area 2410 is changed based on the information about the traveling speed of the vehicle 10. For example, the processor 407 may adjust a speed at which the pattern of light that is output is changed so as to be proportional to the value of the traveling speed of the vehicle 10. The processor 407 may adjust a change in the speed at which the pattern of light output from the light output area 2410 is changed based on information about a change in the traveling speed of the vehicle 10. For example, the processor 407 may adjust a change in the speed at which the pattern of light that is output is changed so as to be proportional to the value of the change in the traveling speed of the vehicle 10.

The processor 407 may receive information about the traveling speed of the vehicle 10 from the electronic device. The processor 407 may adjust the length of a light-emitting area of the light output area 2410 based on the information about the traveling speed of the vehicle 10. For example, the processor 407 may adjust the length of the light-emitting area of the light output area 2410 in proportion to the value of the traveling speed of the vehicle 10.

The processor 407 may receive information about the steering of the vehicle 10 from the electronic device. The processor 407 may adjust the width of the light-emitting area of the light output area 2410 based on the information about the steering direction and steering degree of the vehicle 10. For example, the processor 407 may select at least one of a light output area located at the left side of the screen or a light output area located at the right side of the screen depending on the steering direction of the vehicle 10. For example, the processor 407 may adjust the width of the light-emitting area of the selected light output area depending on the steering degree of the vehicle 10. For example, in the case in which steering direction information in the leftward direction is received, the processor 407 may widen the width of the first light output area 2411 located at the left side of the rear seat display 411a. In this case, the processor 407 may narrow or maintain the width of the second light output area 2412 located around the rear seat display 411a. For example, in the case in which steering direction information in the rightward direction is received, the processor 407 may widen the width of the second light output area 2412 located at the right side of the rear seat display 411a. In this case, the processor 407 may narrow or maintain the width of the first light output area 2411 located around the rear seat display 411a. For example, in the case in which steering direction information in the leftward direction is received, the processor 407 may widen the width of the fourth light output area 2414 located at the right side of the front seat display 411b. In this case, the processor 407 may narrow or maintain the width of the third light output area 2413 located at the left side of the front seat display 411b. For example, in the case in which steering direction information in the rightward direction is received, the processor 407 may widen the width of the third light output area 2413 located at the left side of the front seat display 411b. In this case, the processor 407 may narrow or maintain the width of the fourth light output area 2414 located at the right side of the front seat display 411*b*.

The processor 407 may receive information about the upward and downward movement of the vehicle 10 from the electronic device. The processor 407 may change the position of the light-emitting area of the light output area based on the information about the upward and downward movement of the vehicle 10. The processor 407 may change the position of the light-emitting area in a direction opposite the upward and downward movement of the vehicle 10. For example, in the case in which information about the upward movement of the vehicle occurring as the result of the front wheels of the vehicle 10 going onto an object (e.g. a bump) on a road is received, the processor 407 may lower the position of the light-emitting area of the light output area 2410. For example, in the case in which information about the downward movement of the vehicle occurring as the result of the front wheels of the vehicle 10 going down from the object on the road is received, the processor 407 may lower the position of the light-emitting area of the light output area 2410.

The processor 407 may receive information about the landform of a road on which the vehicle is traveling from the electronic device. The processor 407 may display a graphical object corresponding to the information about the landform of the road on which the vehicle is traveling in at least a portion of the display screen. By displaying the graphical object corresponding to the information about the landform of the road on which the vehicle is traveling, it is possible for the user to recognize the landform and to forecast the movement of the vehicle based on the landform, thereby reducing motion sickness.

The processor 407 may receive information about at least one of acceleration, deceleration, or steering based on the landform of the road on which the vehicle is traveling from the electronic device. The processor 407 may display a graphical object corresponding to the information about at least one of acceleration, deceleration, or steering in at least a portion of the display screen. By displaying the graphical object corresponding to the information about at least one of acceleration, deceleration, or steering, it is possible for the user to recognize the movement of the vehicle, thereby reducing motion sickness.

The processor 407 may provide a control signal for changing the pattern of light output from the light output area while displaying a graphic object related to a video conference in at least a portion of the display screen.

The processor 407 may transmit data about a change in the pattern of light output from the light output area to the mobile terminal 390 through the interface unit 406 and the communication device 300. In the case in which the mobile terminal 390 is located in the cabin 100 and user's looking at the mobile terminal 390 is sensed, the processor 407 may transmit the data about the change in the pattern of light to the mobile terminal 390. The mobile terminal 390 may realize a change in the pattern of light for reducing motion sickness of the user, whereby it is possible to reduce motion sickness of the user who looks at the mobile terminal.

The processor 407 may receive information about the state of the vehicle 10 from the electronic device. The processor 407 may provide a control signal for adjusting the orientation of the seat in a direction different from the inertia of the vehicle 10 to the seat orientation adjustment mechanism through the interface unit 406 based on the information about the state of the vehicle 10. The processor 407 may provide a control signal for maintaining the horizontality of the seat to the seat orientation adjustment mechanism through the interface unit 406. Upon determining that the user watches the display screen, the processor 407 may provide a control signal for adjusting the orientation of the seat. Through the above control, it is possible for the user to recognize that the vehicle 10 is not moved, thereby reducing motion sickness.

Figure 70A:
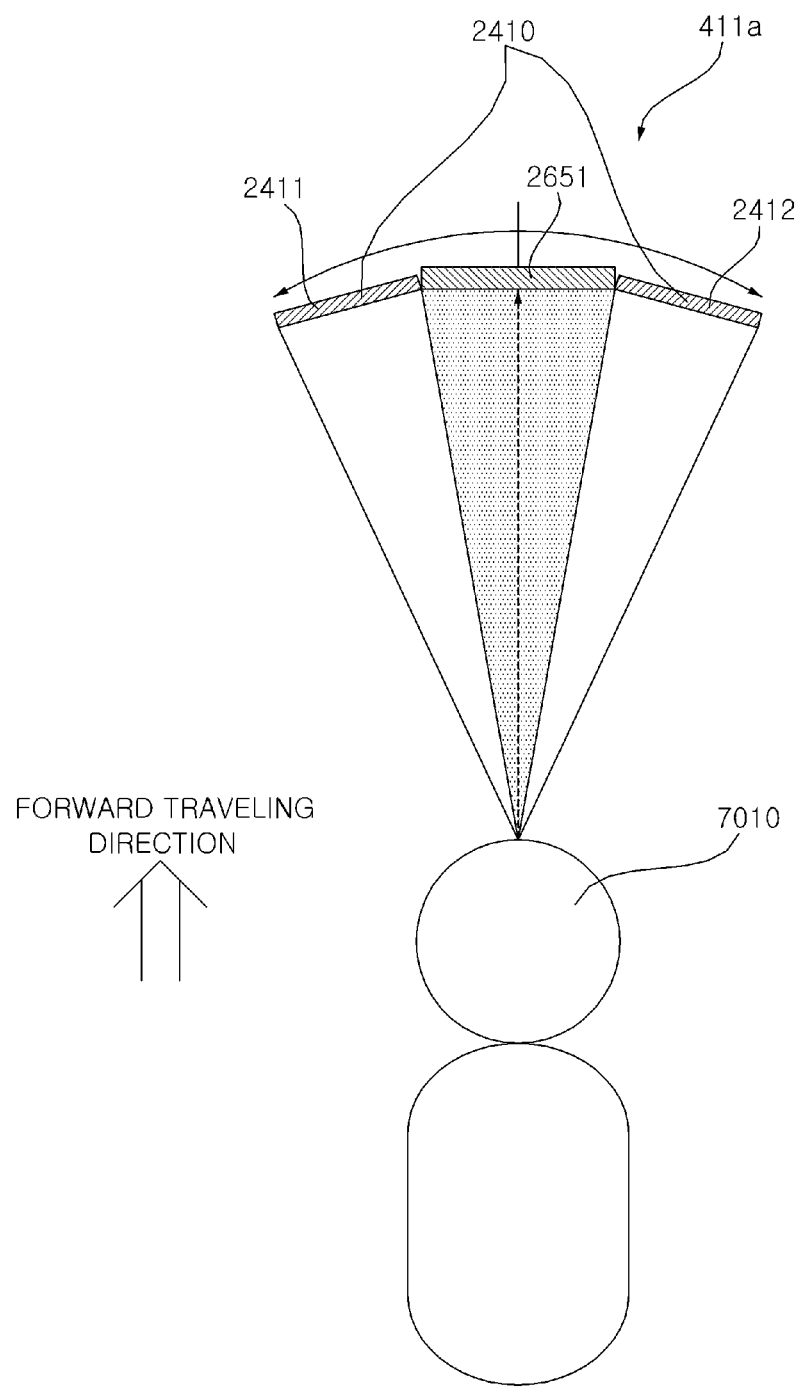
FIGS. 70a to 70c are reference views illustrating a light output area according to an embodiment of the present disclosure.
Figure 70B:
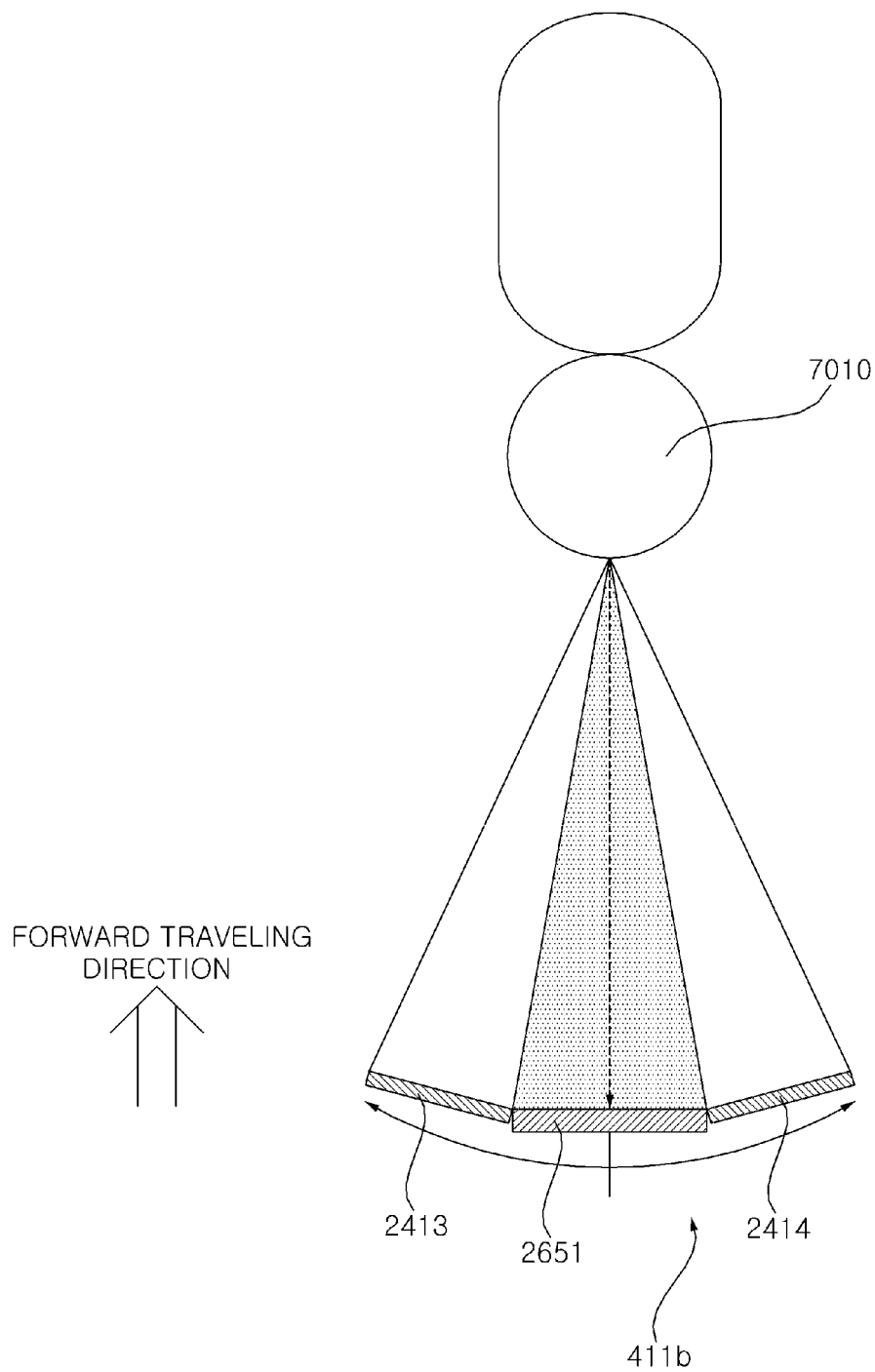
Figure 70C:
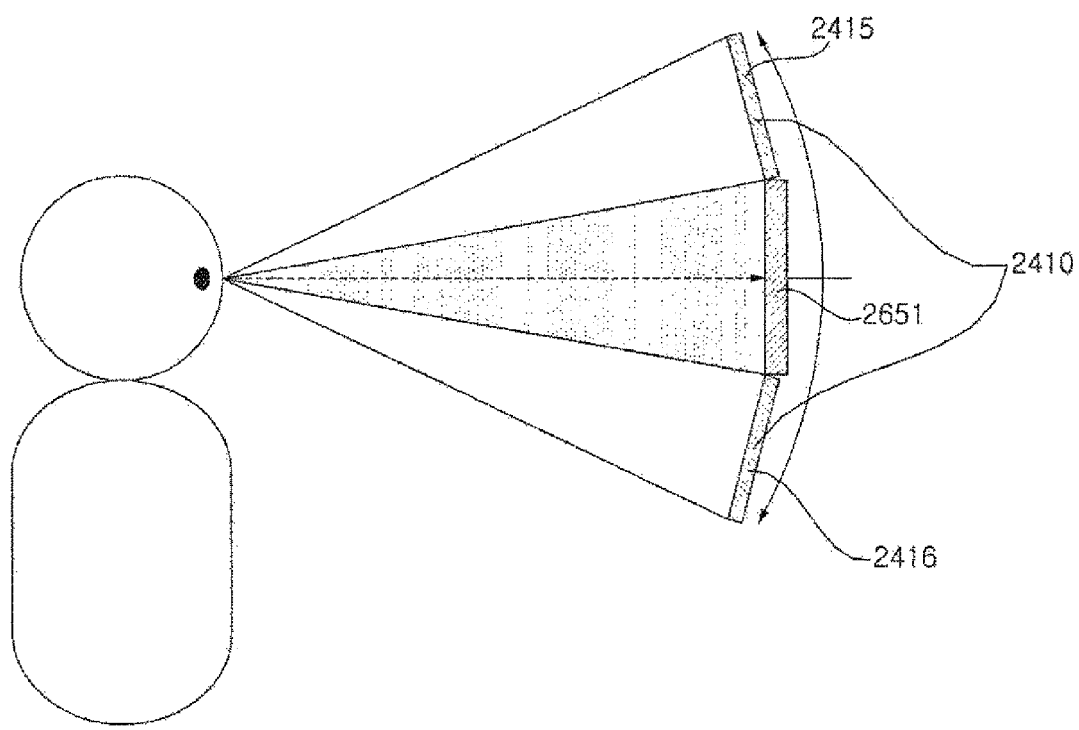

FIGS. 70*a* to 70*c* are reference views illustrating a light output area according to an embodiment of the present disclosure.

Referring to FIG. 70*a*, at least one light output area 2410 may include a first light output area 2411 and a second light output area 2412. The first light output area 2411 may be located at the left side of a display screen 2651 of the rear seat display 411*a* in the direction in which the vehicle 10 travels forwards. Alternatively, the first light output area 2411 may be located at the left side of the display screen 2651 on the basis of a user 7010 when the user 7010 watches the screen 2651. The second light output area 2412 may be located at the right side of the display screen 2651 of the rear seat display 411*a* in the direction in which the vehicle 10 travels forwards. Alternatively, the second light output area 2412 may be located at the right side of the display screen 2651 on the basis of the user 7010 when the user 7010 watches the screen 2651. The display screen 2651 is located in the central vision of the user, and the light output area 2410 is located in the peripheral vision of the user.

Referring to FIG. 70*b*, at least one light output area 2410 may include a third light output area 2413 and a fourth light output area 2414. The third light output area 2413 may be located at the left side of a display screen 2651 of the front seat display 411*b* in the direction in which the vehicle 10 travels forwards. Alternatively, the third light output area 2413 may be located at the right side of the display screen 2651 on the basis of a user 7010 when the user 7010 watches the screen 2651. The fourth light output area 2414 may be located at the right side of the display screen 2651 of the front seat display 411*b* in the direction in which the vehicle 10 travels forwards. Alternatively, the fourth light output area 2414 may be located at the left side of the display screen 2651 on the basis of the user 7010 when the user 7010 watches the screen 2651. The display screen 2651 is located in the central vision of the user, and the light output area 2410 is located in the peripheral vision of the user.

Referring to FIG. 70*c*, at least one light output area 2410 may include a fifth light output area 2415 and a sixth light output area 2416. The fifth light output area 2415 may be located at the upper end of the display screen 2651 of the rear seat display 411*a* or the front seat display 411*b*. The sixth light output area 2416 may be located at the lower end of the display screen 2651 of the rear seat display 411*a* or the front seat display 411*b*. The display screen 2651 is located in the central vision of the user, and the light output area 2410 is located in the peripheral vision of the user.

Figure 71A:
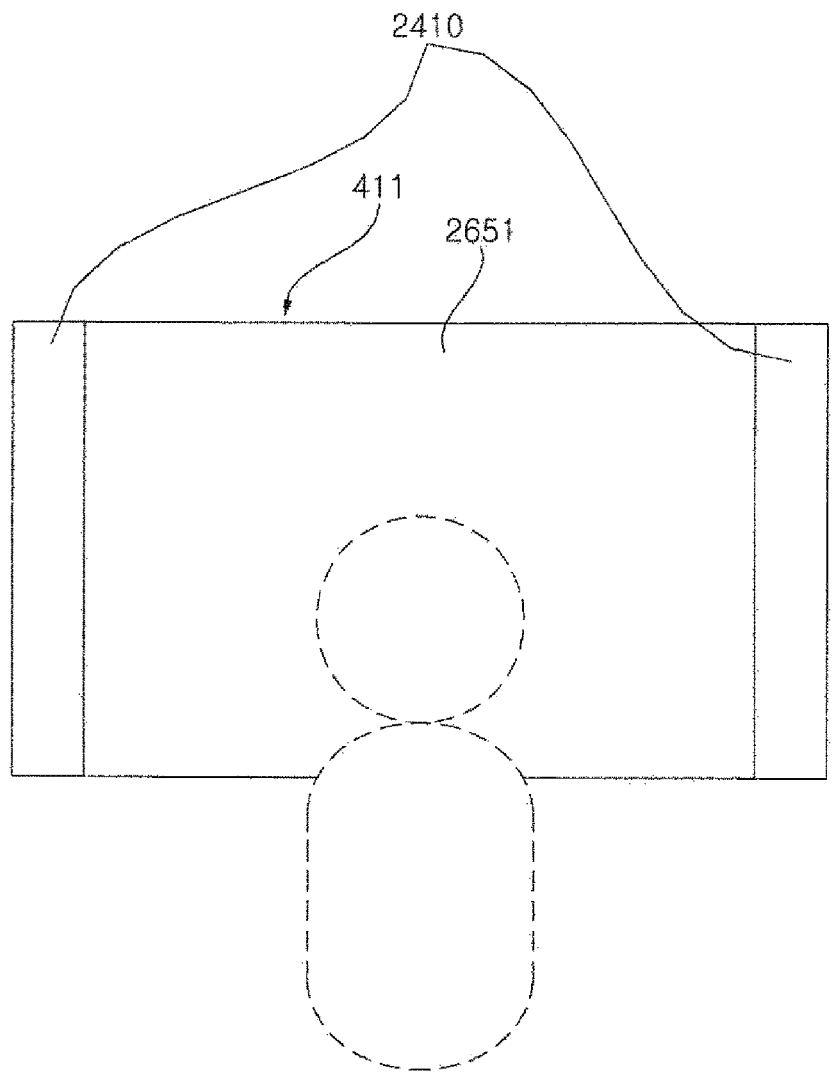

FIGS. 71*a* and 71*b* are reference views illustrating the display and the light output area according to the embodiment of the present disclosure.

Referring to FIG. 71*a*, the first display 411 may be divided into a first rear seat display and a first front seat display. The first rear seat display may be located such that a screen can be watched from the rear seat. The first rear seat display may be located between a front windshield and the front seat. The first front seat display may be located such that a screen can be watched from the front seat. The first front seat display may be located between a rear glass and the rear seat.

The light output area 2410 may be located around the first display 411. The light output area 2410 may be described as at least a portion of the first display 411. In this case, the first display 411 may include a content display area 2651 and a light output area 2410. The light output area 2410 may include at least one light source physically separated from the first display 411. In this case, the at least one light source may be disposed around the first display 411. Preferably, the at least one light source is disposed at opposite sides of the first display 411.

Referring to FIG. 71*b*, the third display 413 may be divided into a third rear seat display and a third front seat display. The third rear seat display may be located such that a screen can be watched from the rear seat. The third rear seat display may be disposed at the ceiling in the cabin 100 so as to be adjacent to the front windshield. The third front seat display may be located such that a screen can be watched from the front seat. The third front seat display may be disposed at the ceiling in the cabin 100 so as to be adjacent to the rear glass.

FIGS. 72 to 74 are reference views illustrating a change in the light output pattern of the light output area according to the embodiment of the present disclosure.

Although only the first rear seat display 411*a* is described by way of example, the description of the light output area 2410 may be applied to the first front seat display 411*b*, the second display, and the third display.

The processor 407 may adjust the length of the light-emitting area of the light output area 2410 based on information about the traveling speed of the vehicle 10.

As indicated by reference numeral 2841 of FIG. 72, the processor 407 may provide a control signal such that a portion 2851 of the first light output area 2411 emits light based on a first speed value of the vehicle 10. The light-emitting area 2851 may have a first length value. The processor 407 may provide a control signal such that a portion 2852 of the second light output area 2412 emits light. The light-emitting area 2852 may have a first length value.

As indicated by reference numeral 2842, the processor 407 may adjust the length of the light-emitting area 2851 of the first light output area 2411 to a second length value based on a second speed value of the vehicle 10, which is greater than the first speed value. The processor 407 may adjust the length of the light-emitting area 2852 of the second light output area 2412 to a second length value based on the second speed value.

As indicated by reference numeral 2843, the processor 407 may adjust the length of the light-emitting area 2851 of the first light output area 2411 to a third length value based on a third speed value of the vehicle 10, which is greater than the second speed value. The processor 407 may adjust the length of the light-emitting area 2852 of the second light output area 2412 to a third length value based on the third speed value of the vehicle 10.

The processor 407 may adjust the width of the light-emitting area of the light output area 2410 based on information about the steering direction and steering degree of the vehicle 10.

As indicated by reference numeral 2941 of FIG. 73, in the case in which steering is performed neither in the leftward direction nor in the rightward direction, the processor 407 may maintain the width of the first light output area 2411 so as to be equal to the width of the second light output area 2412.

As indicated by reference numeral 2942, in the case in which steering direction information in the leftward direction is received, the processor 407 may widen the width of the first light output area 2411 so as to be greater than the width of the second light output area 2412. In the case in which steering direction information in the leftward direction is received, the processor 407 may widen the width of the light-emitting area 2851 of the first light output area 2411 so as to be greater than the width of the light-emitting area 2852 of the second light output area 2412.

As indicated by reference numeral 2942 or 2943, in the case in which steering direction information in the leftward direction is received, the processor 407 may maintain or narrow the width of the second light output area 2412. In the case in which steering direction information in the leftward direction is received, the processor 407 may maintain or narrow the width of the light-emitting area 2852 of the second light output area 2412.

Meanwhile, in the case in which steering is performed in the rightward direction, the first light output area 2411 and the second light output area 2412 may be controlled in inverse relation to what was described with reference to FIG. 73.

The processor 407 may change the position of the light-emitting area of the light output area based on information about the upward and downward movement of the vehicle 10. The processor 407 may change the position of the light-emitting area in a direction opposite the upward and downward movement of the vehicle 10.

As indicated by reference numeral 3041 of FIG. 74, in the case in which there is no upward and downward movement of the vehicle 10, the processor 407 may provide a control signal such that the central area 2851 of the first light output area 2411 and the central area 2852 of the second light output area 2412 emit light.

As indicated by reference numeral 3042, in the case in which information about the upward movement of the vehicle 10 is received, the processor 407 may lower the position of the light-emitting area 2851 of the first light output area 2411. In the case in which information about the upward movement of the vehicle 10 is received, the processor 407 may lower the position of the light-emitting area 2852 of the second light output area 2412. The processor 407 may adjust a speed at which the light-emitting area 2851 or 2852 is lowered in proportion to a speed at which the vehicle 10 is moved upwards. The processor 407 may adjust the downward displacement of the light-emitting area 2851 or 2852 in proportion to the upward displacement of the vehicle 10.

As indicated by reference numeral 3043, in the case in which information about the downward movement of the vehicle 10 is received, the processor 407 may raise the position of the light-emitting area 2851 of the first light output area 2411. In the case in which information about the downward movement of the vehicle 10 is received, the processor 407 may raise the position of the light-emitting area 2852 of the second light output area 2412. The processor 407 may adjust a speed at which the light-emitting area 2851 or 2852 is raised in proportion to a speed at which the vehicle 10 is moved downwards. The processor 407 may adjust the upward displacement of the light-emitting area 2851 or 2852 in proportion to the downward displacement of the vehicle 10.

FIG. 75 is a reference view illustrating an operation of outputting a graphical object that reduces motion sickness according to an embodiment of the present disclosure.

Referring to FIG. 75, the processor 407 may receive information about the landform of a road on which the vehicle is traveling from the electronic device. The processor 407 may display a graphical object corresponding to the information about the landform of the road on which the vehicle is traveling in at least a portion of the display screen.

As indicated by reference numerals 3141 and 3142, the processor 407 may receive information about a curved section from the electronic device. The processor 407 may display an image corresponding to the curved section in at least a portion 3151 of the display screen. The processor 407 may display remaining distance and remaining time to the curved section in at least a portion 3151 of the display screen.

The processor 407 may display a graphical object corresponding to information about at least one of acceleration, deceleration, or steering based on the landform of the road on which the vehicle is traveling in at least a portion of the display screen. For example, the processor 407 may display at least one of an acceleration pedal image, a brake pedal image, or a steering wheel image in at least a portion of the display screen.

Figure 76:
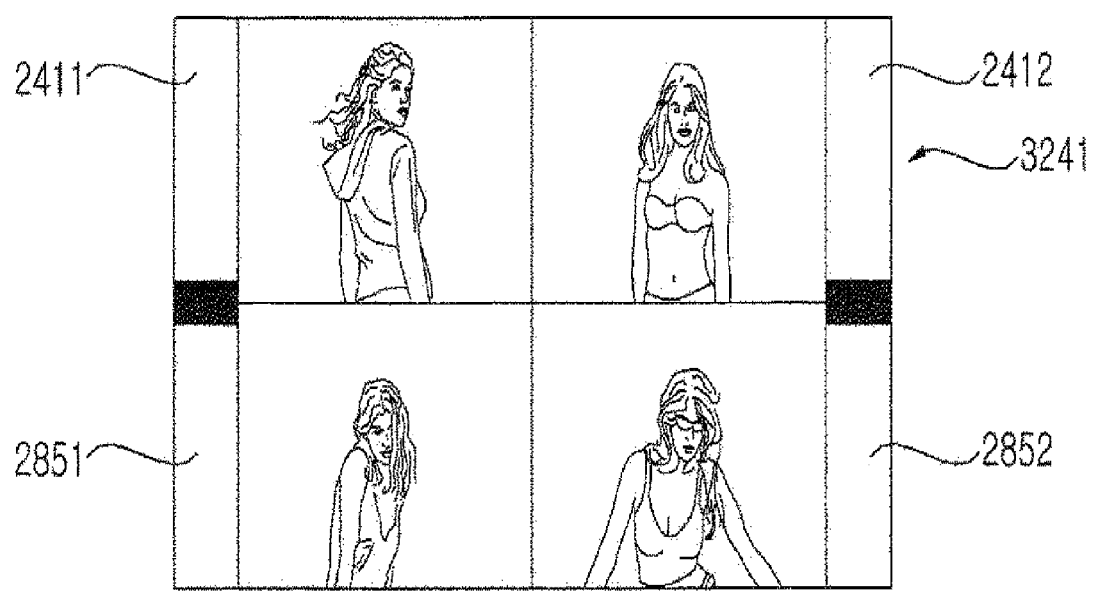
FIG. 76 is a reference view illustrating an operation of reducing motion sickness during a video conference according to an embodiment of the present disclosure.

FIG. 76 is a reference view illustrating an operation of reducing motion sickness during a video conference according to an embodiment of the present disclosure.

Referring to FIG. 76, the processor 407 may display a graphical object related to a video conference on the display. The processor 407 may provide a control signal to the first light output area 2411 and the second light output area 2412 while the graphical object related to the video conference is displayed. The processor 407 may provide a control signal for changing the light-emitting area 2851 of the first light output area 2411 and the light-emitting area 2852 of the second light output area 2412 while video conference content is displayed.

Figure 77:
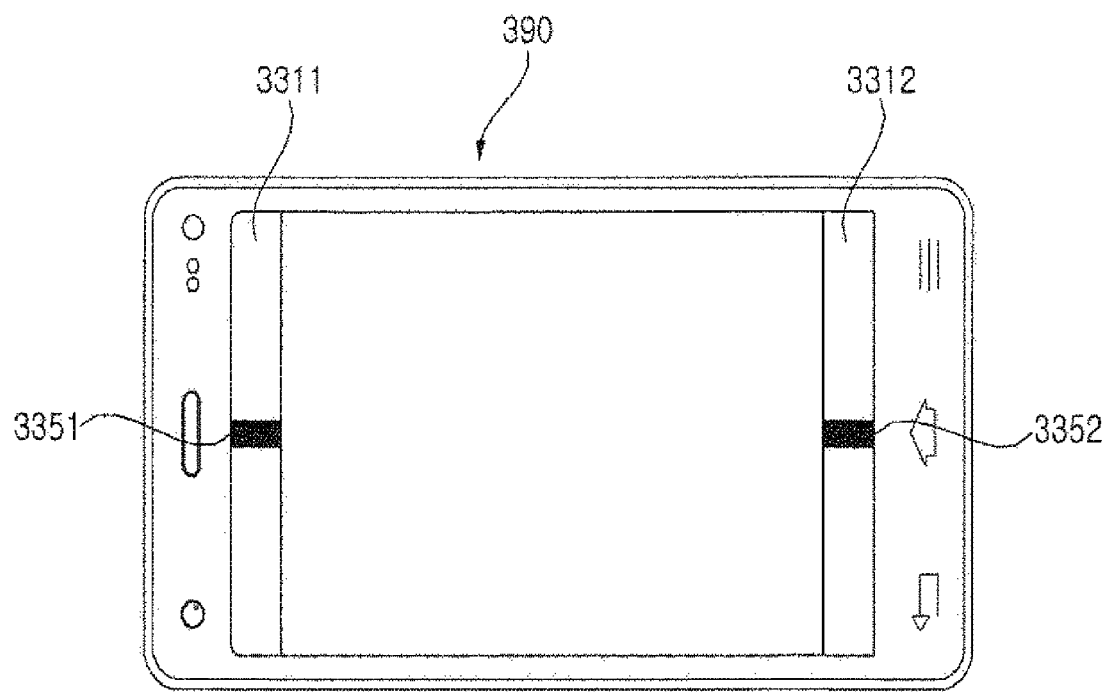
FIG. 77 is a reference view illustrating an operation of reducing motion sickness when watching content through the mobile terminal according to an embodiment of the present disclosure.

FIG. 77 is a reference view illustrating an operation of reducing motion sickness when watching content through the mobile terminal according to an embodiment of the present disclosure.

Referring to FIG. 77, the processor 407 may transmit data about a change in the pattern of light output from the light output area to the mobile terminal 390 through the interface unit 406 and the communication device 300. The mobile terminal 390 may display light output areas 3311 and 3312. The mobile terminal 390 may set portions of the light output areas 3311 and 3312 to light-emitting areas 3351 and 3352. The mobile terminal 390 may control a change in the light-emitting areas 3351 and 3352.

Figure 78:
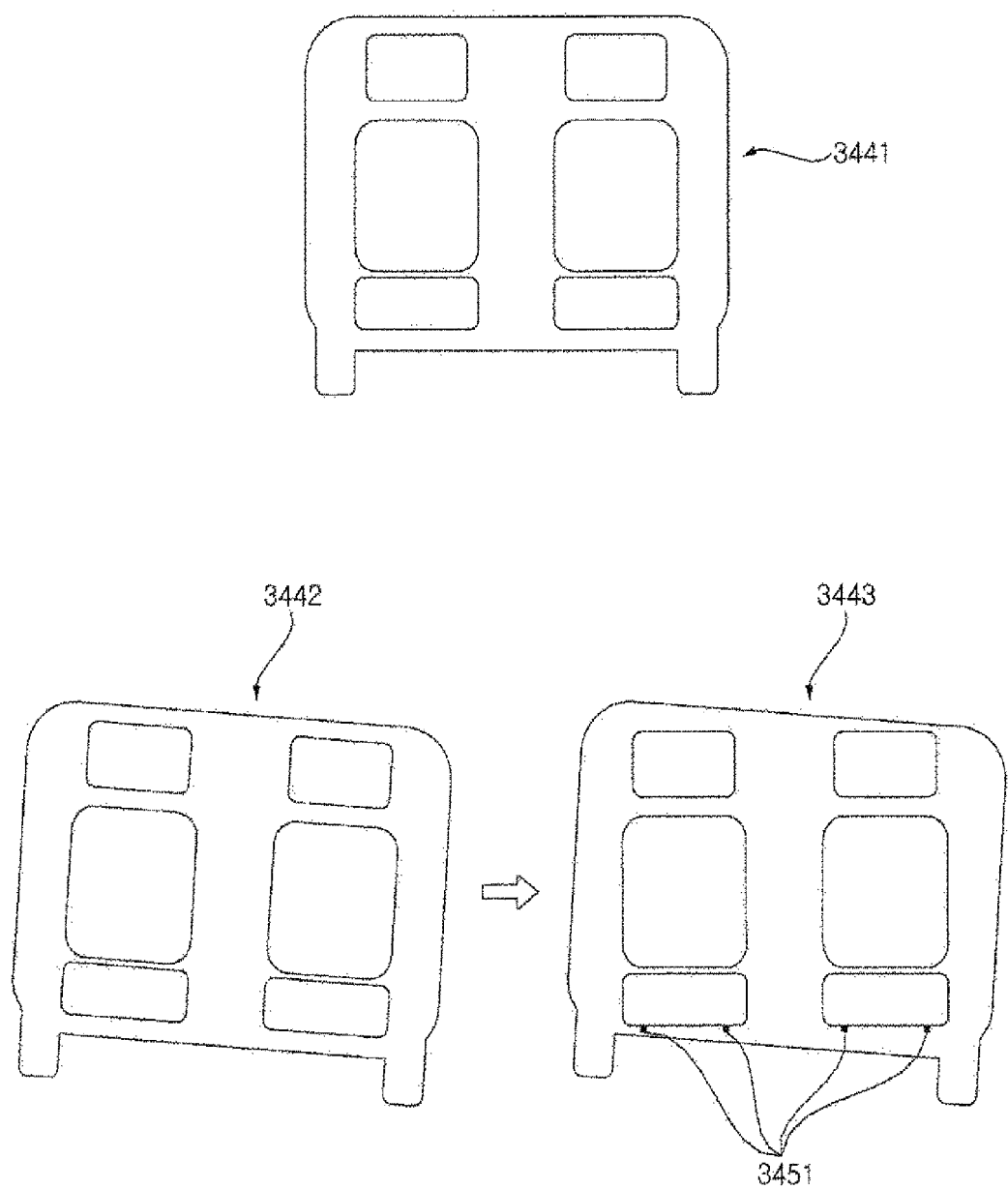
FIG. 78 is a reference view illustrating a seat orientation adjustment operation for reducing motion sickness according to an embodiment of the present disclosure.

FIG. 78 is a reference view illustrating a seat orientation adjustment operation for reducing motion sickness according to an embodiment of the present disclosure.

Referring to FIG. 78, the processor 407 may exchange a signal with the seat system 600 through the interface unit 406. The seat system 600 may include a seat orientation adjustment mechanism 3451. The seat orientation adjustment mechanism 3451 may be located at the lower side of the seat in order to move a portion of the seat upwards or downwards.

The processor 407 may provide a control signal for adjusting the orientation of the seat in a direction different from the inertia of the vehicle 10 to the seat orientation adjustment mechanism based on the information about the state of the vehicle 10 received from the electronic device. For example, in the case in which the vehicle 10 is accelerated at acceleration having a predetermined value, the processor 407 may move the rear part of the seat upwards. For example, in the case in which the vehicle 10 is decelerated at deceleration having a predetermined value, the processor 407 may move the front part of the seat upwards. For example, in the case in which the vehicle 10 is rotated at rotary acceleration having a predetermined value, the processor 407 may move the part of the seat at which centripetal force is generated upwards.

Figure 79:
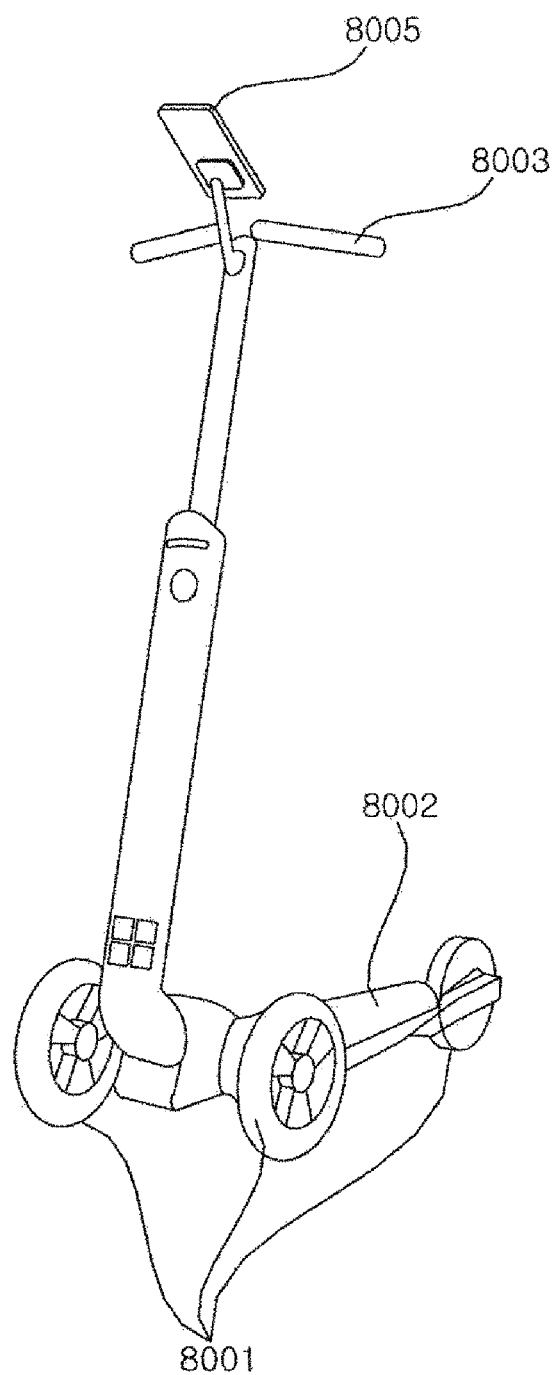
FIG. 79 is a view exemplarily showing the external appearance of a personal mobility according to an embodiment of the present disclosure.

FIG. 79 is a view exemplarily showing the external appearance of a personal mobility according to an embodiment of the present disclosure.

Figure 80:
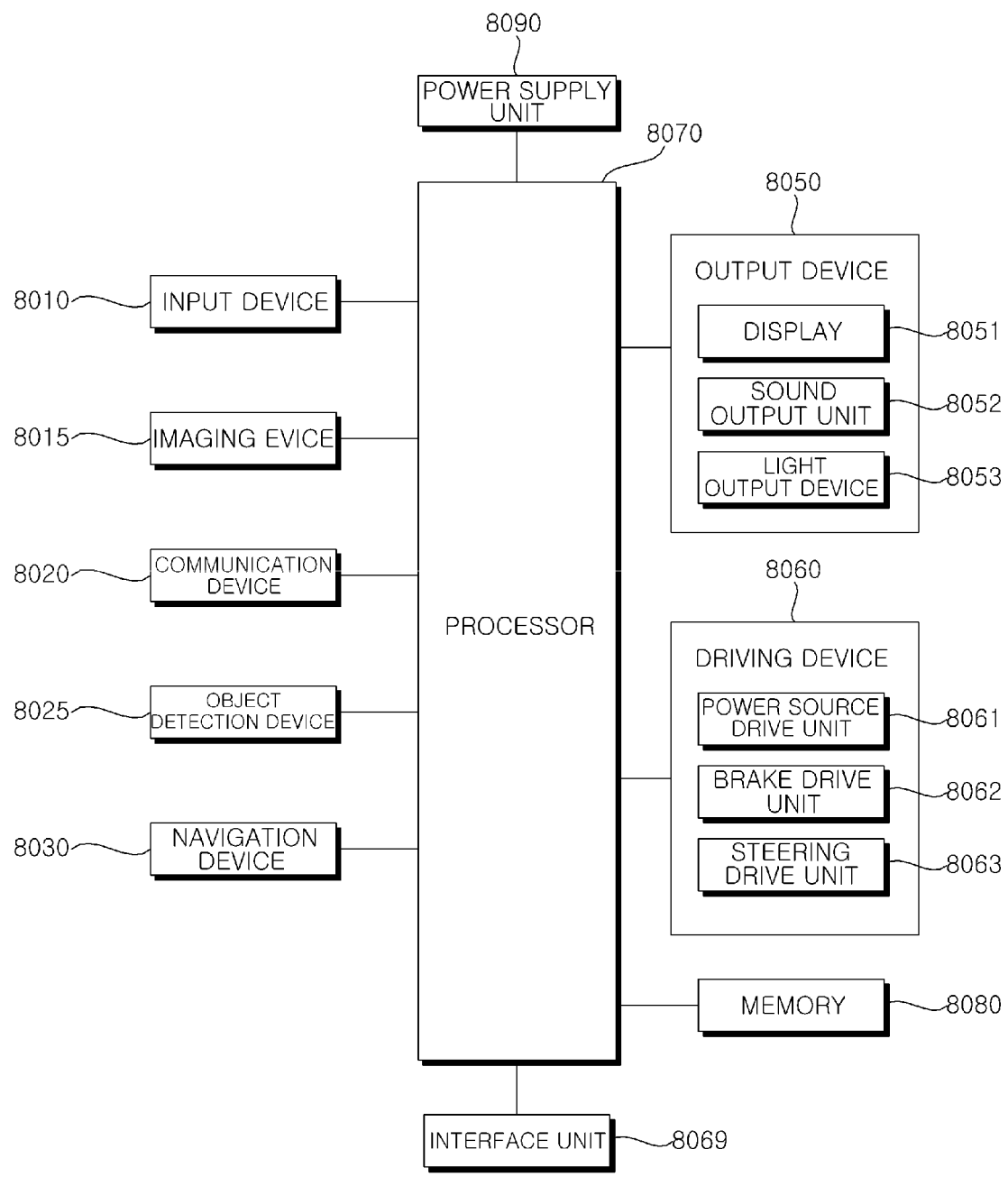
FIG. 80 is an exemplary block diagram of the personal mobility according to the embodiment of the present disclosure.

FIG. 80 is an exemplary block diagram of the personal mobility according to the embodiment of the present disclosure.

Figure 81:
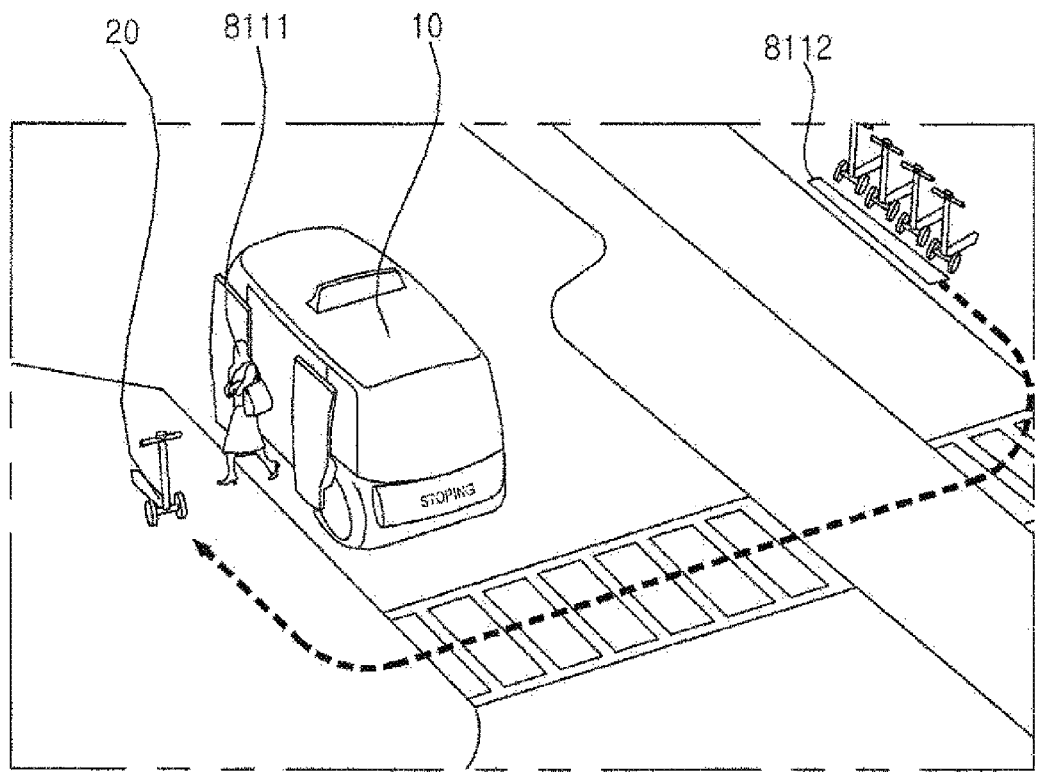
FIG. 81 is a view exemplarily showing a shared vehicle according to an embodiment of the present disclosure and the personal mobility.

FIG. 81 is a view exemplarily showing a shared vehicle according to an embodiment of the present disclosure and the personal mobility.

Referring to FIGS. 79 to 81, the personal mobility 20 may be described as an autonomous vehicle for transporting a single user. The personal mobility 20 may include at least one wheel 8001, a user boarding unit 8002, and a user interface device 8005. The user interface device 8005 may include an input device 8010, an image device 8015, and an output device 8050. In some embodiments, the personal mobility 20 may further include a unit that contacts the body, such as a handle 8003.

The personal mobility 20 may include an input device 8010, an image device 8015, a communication device 8020, an object detection device 8025, a navigation device 8030, an output device 8050, a driving device 8060, an interface unit 8069, a processor 8070, a memory 8080, and a power supply unit 8090. In some embodiments, the personal mobility 20 may not include the components described above, or may further include other components.

The input device 8010 may receive unit input. The input device 8010 may convert the user input into an electrical signal. The input device 8010 may include at least one of a touch sensor for converting user touch input into an electrical signal, a gesture sensor for converting user gesture input into an electrical signal, a mechanical device for converting physical user input (e.g. push or rotation) into an electrical signal, or a microphone for converting user voice input into an electrical signal.

The image device 8015 may include at least one camera. The image device 8015 may acquire a user image. The user image acquired by the image device 8015 may be used for user authentication.

The communication device 8020 may wirelessly exchange a signal with an external device. The communication device 8020 may exchange a signal with the external device over a network, or may directly exchange a signal with the external device. The external device may include at least one of a server 8212 (see FIG. 82a) or 8211 (see FIG. 82b), a mobile terminal, or a shared vehicle 10.

The communication device 8020 may include at least one of an antenna, a radio frequency (RF) circuit capable of realizing at least one communication protocol, or an RF element in order to perform communication. In some embodiments, the communication device 8020 may use a plurality of communication protocols. The communication device 8020 may perform switching between the communication protocols depending on the distance from the mobile terminal.

The object detection device 8025 may detect an object outside the personal mobility. The object detection device 8025 may include at least one of a camera, a radar, a lidar, an ultrasonic sensor, or an infrared sensor. The object detection device 8025 may provide data about an object generated based on a sensing signal generated by a sensor to at least one electronic device included in the vehicle.

The navigation device 8030 may provide navigation information. The navigation information may include at least one of map information, information about a set destination, information about a route based on the setting of the destination, information about various objects on the route, lane information, or information about the current position of the vehicle.

The output device 8050 may output information. The output device 8050 may include a display 8051, a sound output unit 8052, and a light output device 8053. The display 8051 may visually output information. The sound output unit 8052 may aurally output information. The light output device 8053 may output at least one color of light. The light output device 8053 may be disposed on at least a portion of the body of the personal mobility 20 such that a user can easily recognize the color of light that is output.

The driving device 8060 is a device that electrically controls driving of various devices constituting the personal mobility 20. The driving device 8060 may control the movement of the wheel. The driving device 8060 may include a power source driving unit 8061, a brake driving unit 8062, and a steering driving unit 8063. The power source driving unit 8061 may control a power source of the personal mobility 20. For example, in the case in which the power source is an engine, the power source driving unit 8061 may control the output torque of the engine. For example, in the case in which the power source is a motor, the power source driving unit 8061 may control the rotational speed and torque of the motor. The brake driving unit 8062 may electronically control a brake device. The steering driving unit 8063 may electronically control a steering device.

The interface unit 8069 may exchange a signal with another device in a wired fashion. For example, the interface unit 8069 may be connected to the mobile terminal 390 in a wired fashion in order to exchange a signal with the mobile terminal 390.

The processor 8070 may be electrically connected to the input device 8010, the image device 8015, the communication device 8020, the object detection device 8025, the navigation device 8030, the output device 8050, the driving device 8060, the interface unit 8069, and the memory 8080 in order to exchange a signal therewith. The processor 8070 may be realized using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing other functions.

The processor 8070 may receive a signal including information or data from at least one server 8212 (see FIG. 82*a*) or 8211 (see FIG. 82*b*) through the communication device 8020. The processor 8070 may control at least one of the output device 8050 or the driving device 8060 based on the received signal.

The processor 8070 may receive information about the point at which a user exits the shared vehicle 10 through the communication device 8020. The information about the point at which the user exits the shared vehicle 10 may be provided from at least one server 8212 (see FIG. 82*a*) or 8211 (see FIG. 82*b*). The processor 8070 may provide a control signal to the driving device 8060 such that the personal mobility autonomously moves to the exit point. In this case, the processor 8070 may use navigation data provided by the navigation device 8030.

The processor 8070 may receive information about the time at which the shared vehicle 10 arrives at the exit point through the communication device 8020. The processor 8070 may provide a control signal to the driving device 8060 such that the personal mobility arrives at the exit point when the shared vehicle arrives at the exit point. Here, the movement time of the shared vehicle 10 depending on traffic situations may be reflected in the time at which the shared vehicle 10 arrives at the exit point.

The processor 8070 may receive information about the point at which a user is expected to enter the shared vehicle 10 through the communication device 8020. The processor 8070 may provide a control signal to the driving device 8060 such that the user is transported to the expected entrance point.

The processor 8070 may receive the information about the exit point in the state in which the personal mobility moves along a route for a charging station. In this case, the processor 8070 may change the route such that the exit point becomes a destination.

The processor 8070 may receive identification data related to a user through the communication device 8020. The processor 8070 may provide a control signal to the light output device 8053 such that a first color of light for identification is output based on the identification data. The user may recognize an assigned personal mobility through the light for identification.

The processor 8070 may receive first information about the user from a server for administrating the shared vehicle 10 through the communication device 8020. The processor 8070 may authenticate the user based on the first information. The first information may include user authentication information.

The memory 8080 is electrically connected to the processor 8070. The memory 8080 may store basic data about the units, control data necessary to control the operation of the units, and data that are input and output. The memory 8080 may store data processed by the processor 8070. In a hardware aspect, the memory 175 may be constituted by at least one of a ROM, a RAM, an EPROM, a flash drive, or a hard drive. The memory 8080 may store various data necessary to perform the overall operation of the personal mobility 20, such as a program for processing or control of the processor 8070. The memory 8080 may be integrated into the processor 8070.

The power supply unit 8090 may supply power to the personal mobility 20. The power supply unit 8090 may include a battery. The power supply unit 8090 may be operated according to a control signal provided from the main controller 1780.

Figure 82A:
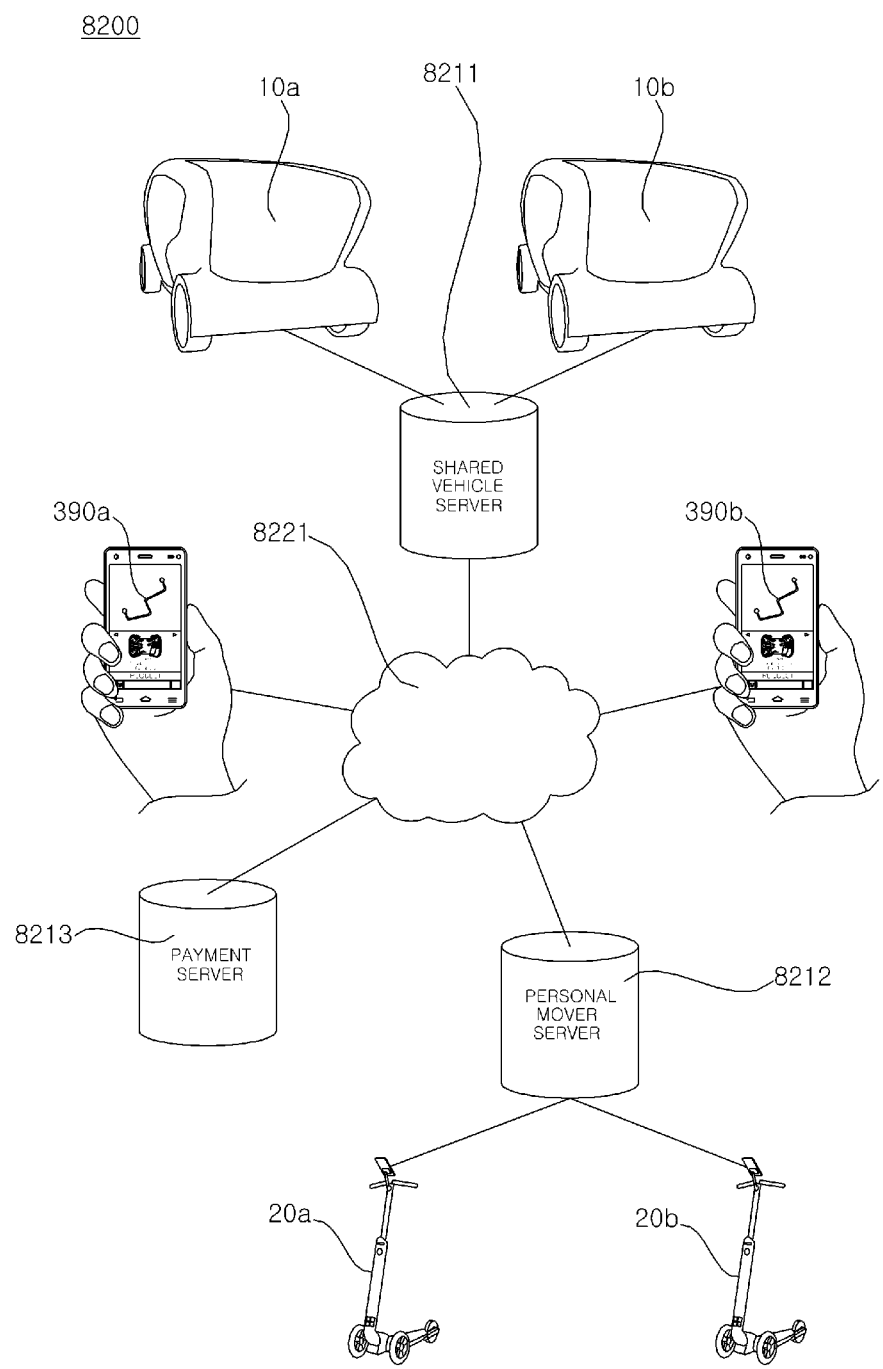
FIGS. 82a and 82b are reference views illustrating a user transportation system according to an embodiment of the present disclosure.
Figure 82B:
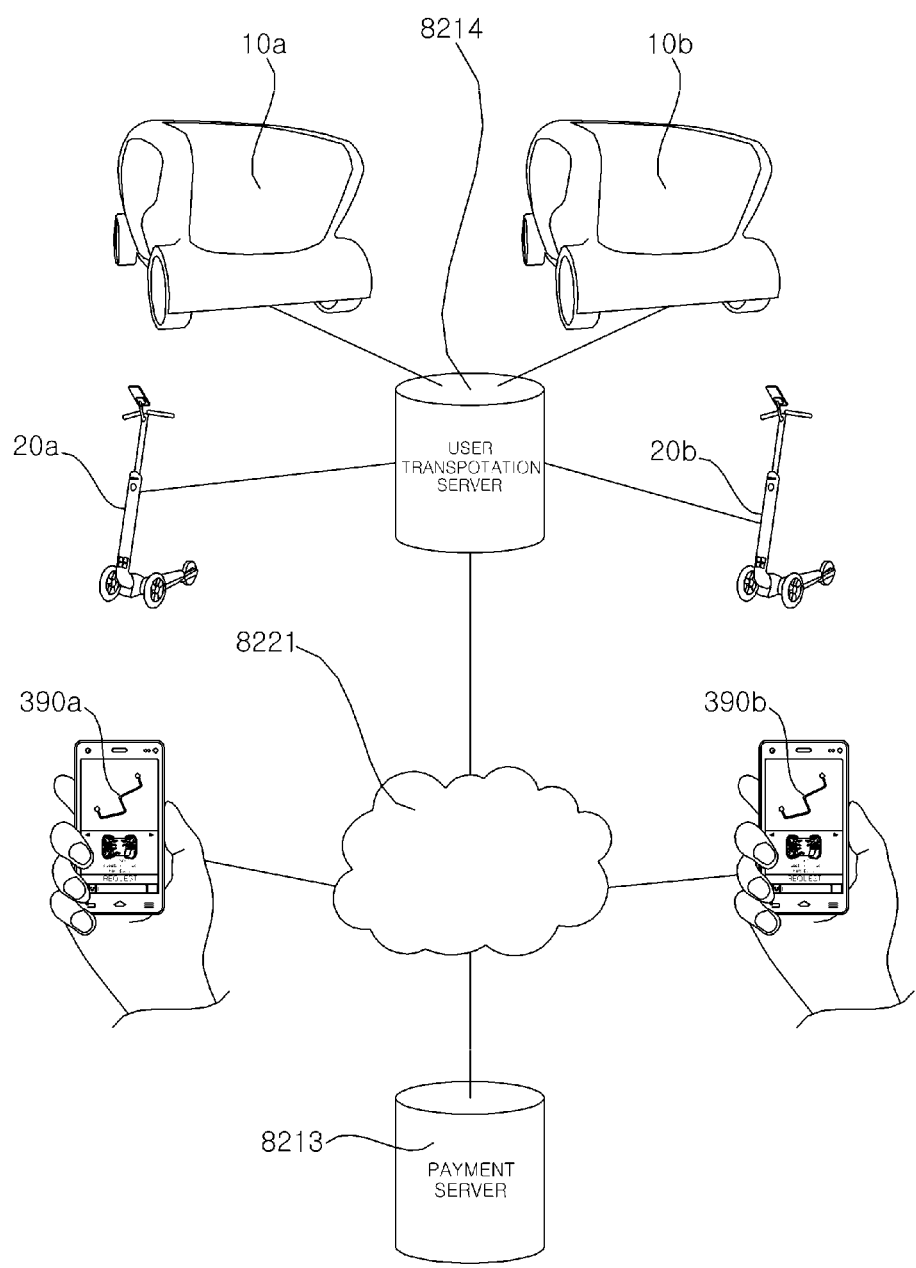

FIGS. 82*a* and 82*b* are reference views illustrating a user transportation system according to an embodiment of the present disclosure.

The user transportation system 8200 may include at least one server 8211, 8212, or 8214, at least one shared vehicle 10*a* or 10*b*, and at least one personal mobility 20*a* or 20*b*. In some embodiments, the user transportation system 8200 may further include at least one user mobile terminal 390*a* or 390*b* and a payment server 8213.

The at least one server 8211, 8212, or 8214 may receive a signal for requesting a mobile service from an initial departure point to a final destination of a first user. The at least one server 8211, 8212, or 8214 may transmit a first request signal such that the shared vehicle moves from the expected entrance point to the expected exit point of the first user. The at least one server 8211, 8212, or 8214 may determine whether a section in which the vehicle cannot travel is present on a route from the initial departure point to the final destination. Upon determining that the section in which the vehicle cannot travel is present on the route, the at least one server 8211, 8212, or 8214 may transmit a second request signal such that the personal mobility moves toward at least one of the initial departure point or the expected exit point.

The at least one shared vehicle 10*a* or 10*b* may move from the expected entrance point to the expected exit point according to the first request signal. The at least one personal mobility 20*a* or 20*b* may move from the initial departure point to the expected entrance point, or may move from the expected exit point to the final destination, according to the second request signal.

Referring to FIG. 82*a*, the user transportation system 8200 may include a shared vehicle server 8211, a plurality of shared vehicles 10*a* and 10*b*, a personal mobility server 8212, a plurality of personal mobilities 20*a* and 20*b*, user mobile terminals 390*a* and 390*b*, and a payment server 8213.

The shared vehicle server 8211 may administrate the shared vehicles 10*a* and 10*b*. The shared vehicle server 8211 may receive a signal from the user mobile terminals 390*a* and 390*b*. The shared vehicle server 8211 may dispatch the shared vehicles 10*a* and 10*b* based on the received signal. The shared vehicle server 8211 may transmit an operation command signal to the shared vehicles 10*a* and 10*b* based on the received signal. For example, the shared vehicle server 8211 may transmit at least one of a movement command signal, a stop command signal, an acceleration command signal, a deceleration command signal, or a steering command signal to the shared vehicles 10*a* and 10*b*.

Meanwhile, the shared vehicle server 8211 may exchange a signal with the personal mobility server 8212.

The shared vehicles 10*a* and 10*b* may be operated based on the operation command signal received from the shared vehicle server 8211. The shared vehicles 10*a* and 10*b* may move to the entrance point of the first user based on the signal received from the shared vehicle server 8211. The shared vehicles 10*a* and 10*b* may move from the entrance point of the first user to the exit point of the first user based on the signal received from the shared vehicle server 8211.

The personal mobility server 8212 may administrate the personal mobilities 20*a* and 20*b*. The personal mobility server 8212 may receive a signal from the user mobile terminals 390*a* and 390*b*. The personal mobility server 8212 may receive a signal from the shared vehicle server 8211. The personal mobility server 8212 may dispatch the personal mobilities 20*a* and 20*b* based on the received signal. The personal mobility server 8212 may transmit an operation command signal to the personal mobilities 20*a* and 20*b* based on the received signal. For example, the personal mobility server 8212 may transmit at least one of a movement command signal, a stop command signal, an acceleration command signal, a deceleration command signal, or a steering command signal to the personal mobilities 20*a* and 20*b*.

The personal mobilities 20*a* and 20*b* may be operated based on the operation command signal received from the personal mobility server 8212. The personal mobilities 20*a* and 20*b* may move to the initial departure point of the first user based on the received signal. The personal mobilities 20*a* and 20*b* may move from the initial departure point of the first user to the point at which the first user enters the shared vehicle 10*a* or 10*b* (or the point at which the first user is expected to enter the shared vehicle 10*a* or 10*b*) based on the received signal. The personal mobilities 20*a* and 20*b* may move to the exit point (or the expected exit point) of the first user based on the received signal. The personal mobilities 20*a* and 20*b* may move from the exit point of the first user to the final destination of the first user based on the received signal.

The user mobile terminals 390*a* and 390*b* may receive user input for using at least one of the shared vehicles 10*a* and 10*b* or the personal mobilities 20*a* and 20*b*. The user mobile terminals 390*a* and 390*b* may transmit a mobile service request signal based on user input to at least one of the shared vehicle server 8211 or the personal mobility server 8212.

The payment server 8213 may pay a mobile service charge of the user. The payment server 8213 may receive payment data from at least one of the shared vehicle server 8211, the personal mobility server 8212, shared vehicles 10*a* and 10*b*, or the personal mobilities 20*a* and 20*b* in order to perform payment.

The description of the user transportation system 8200 of FIG. 82*a* may be applied to the user transportation system 8200 of FIG. 82*b*. Hereinafter, a description will be given based on the differences therebetween.

The user transportation system 8200 may include a user transportation server 8214, a plurality of shared vehicles 10*a* and 10*b*, a plurality of personal mobilities 20*a* and 20*b*, user mobile terminals 390*a* and 390*b*, and a payment server 8213.

The user transportation server 8214 may perform functions of the shared vehicle server 8211 and the personal mobility server 8212 of FIG. 82*a*. The user transportation server 8214 may administrate the shared vehicles 10*a* and 10*b*. The user transportation server 8214 may administrate the personal mobilities 20*a* and 20*b*.

Figure 83:
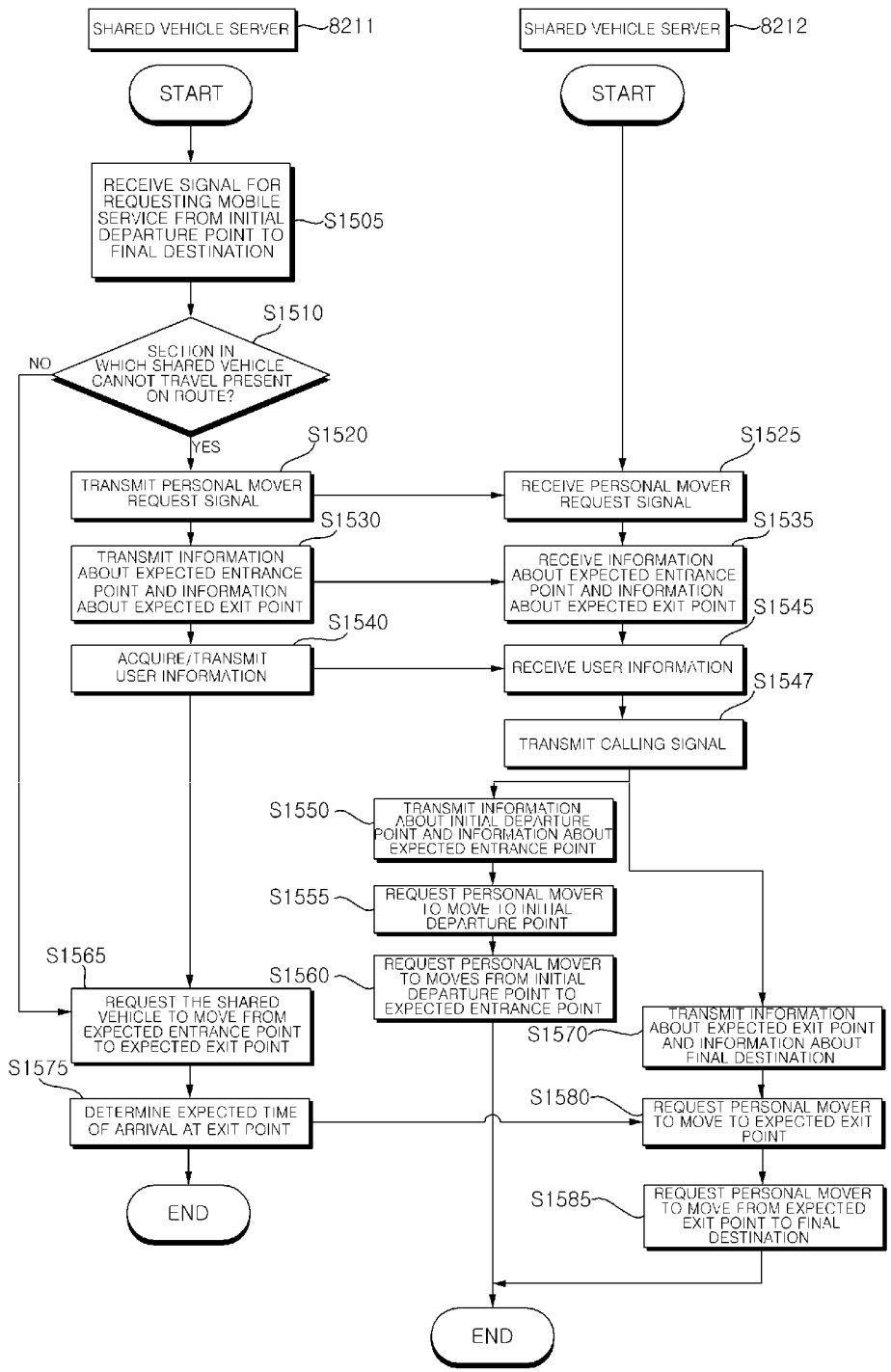
FIG. 83 is an exemplary flowchart of the user transportation system according to the embodiment of the present disclosure.

FIG. 83 is an exemplary flowchart of the user transportation system according to the embodiment of the present disclosure. FIG. 83 is a flowchart showing a user transportation method of the user transportation system 8200 of FIG. 82*a*.

Figure 85:
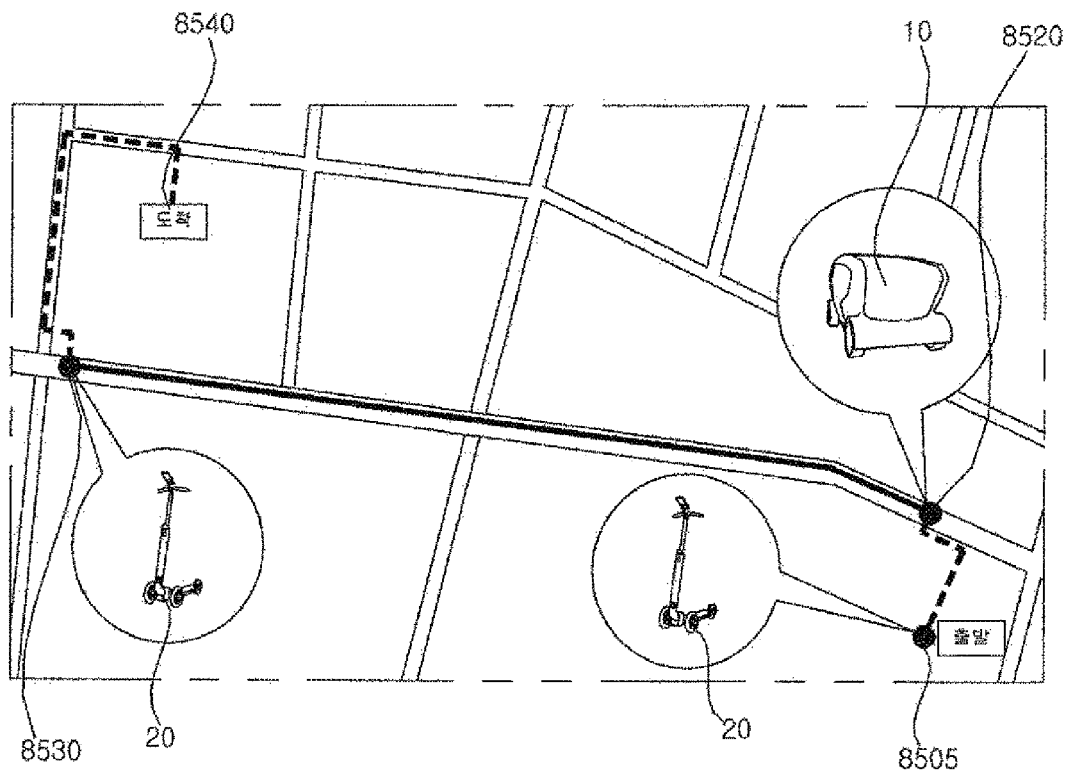
FIG. 85 is a reference view illustrating the use of the shared vehicle and the personal mobility based on a route according to an embodiment of the present disclosure.

FIG. 85 is a reference view illustrating the use of the shared vehicle and the personal mobility based on a route according to an embodiment of the present disclosure.

Referring to FIGS. 83 and 85, the shared vehicle server 8211 may receive a signal for requesting a mobile service from an initial departure point to a final destination from the first user terminal 390*a* (see FIG. 82*a*) (S1505).

The shared vehicle server 8211 may determine whether a section in which the vehicle cannot travel is present on a route from the initial departure point to the final destination (S1510). For example, the shared vehicle server 8211 may determine whether a section having no lane is present on a route from the initial departure point to the final destination.

Upon determining that the section in which the vehicle cannot travel is present, the shared vehicle server 8211 may transmit a personal mobility request signal to the personal mobility server 8212 (S1520).

The personal mobility server 8212 may receive a mobile service request signal of the personal mobility (S1525). The mobile service request signal of the personal mobility may include an article delivery request signal of a user.

The shared vehicle server 8211 may transmit information about the expected entrance point and information about the expected exit point (S1530).

The personal mobility server 8212 may receive information about the expected entrance point 8520 and information about the expected exit point 8530 (S1535). In the case in which the shared vehicle server 8211 determines that the shared vehicle cannot travel on at least a portion of the route from the initial departure point 8505 to the final destination (S1510), the personal mobility server 8212 may receive at least one of information about the expected entrance point 8520 or information about the expected exit point 8530. The expected entrance point 8520 may be defined as a point to which the shared vehicle 10*a* is movable and which is the closest to the initial departure point 8505. The expected exit point 8530 may be defined as a point to which the shared vehicle 10*a* is movable and which is the closest to the final destination.

The shared vehicle server 8211 may acquire and transmit first information of the user (S1540).

The personal mobility server 8212 may receive first information of the user (S1545). Upon determining that the user enters the personal mobility server 8212 before step S1560 or S1585, the personal mobility server 8212 may transmit the first information of the user to the personal mobility 20*a*. The personal mobility 20*a* may perform user authentication based on the received first information.

The personal mobility server 8212 may transmit a calling signal to any one 20*a* of the personal mobilities 20*a* and 20*b* based on the distance between the location of each of the personal mobilities 20*a* and 20*b* and the expected exit point 8530 and the residual energy amount of each of the personal mobilities 20*a* and 20*b* (S1547).

The personal mobility server 8212 may transmit the information about the initial departure point and the information about the expected entrance point 8520 of the shared vehicle 10*a* to the called personal mobility 20*a* (S1550).

The personal mobility server 8212 may request the personal mobility 20*a* to move to the initial departure point (S1555). In some embodiments, the personal mobility server 8212 may request the personal mobility 20*a* to move to the initial departure point in the state in which an article according to the article delivery request signal of the user is loaded in the personal mobility 20*a*. In this case, the personal mobility server 8212 may request the personal mobility 20*a* to move the point at which the article according to the article delivery request signal of the user is acquired before moving to the initial departure point.

The personal mobility server 8212 may transmit a signal to the personal mobility 20*a* such that the personal mobility 20*a* moves from the initial departure point to the expected entrance point 8520 of the shared vehicle 10*a* in the state in which the user enters the personal mobility (S1560).

The shared vehicle server 8211 may request that the shared vehicle 10*a* move from the expected entrance point 8520 to the expected exit point 8530 (S1565).

The personal mobility server 8212 may transmit information about the expected exit point 8530 of the shared vehicle 10*a* and information about the final destination to the personal mobility 20*a* (S1570).

The shared vehicle server 8211 may determine the expected time of arrival at the exit point of the shared vehicle 10*a* (S1575).

The personal mobility server 8212 may transmit a signal to the personal mobility 20*a* such that the personal mobility 20*a* moves to the expected exit point 8530 (S1580). Step S1580 may include a step of the personal mobility server 8212 receiving information about the time of arrival at the expected exit point 8530 of the shared vehicle 10*a* and a step of the personal mobility server 8212 transmitting a signal to the personal mobility 20*a* such that the personal mobility 20*a* is located at the expected exit point 8530 at the time at which the shared vehicle arrives at the expected exit point 8530. Here, the time at which the shared vehicle arrives at the expected exit point 8530 may be determined based on traffic situations. In some embodiments, the personal mobility server 8212 may transmit a signal to the personal mobility 20*a* such that the personal mobility 20*a* moves to the expected exit point in the state in which the article according to the article delivery request signal of the user is loaded in the personal mobility 20*a*. In this case, the personal mobility server 8212 may request the personal mobility 20*a* to move the point at which article according to the article delivery request signal of the user is acquired before moving to the expected exit point.

The personal mobility server 8212 may transmit a signal to the personal mobility 20*a* such that the personal mobility 20*a* moves from the expected exit point 8530 to the final destination in the state in which the user enters the personal mobility (S1585). Meanwhile, in some embodiments, the user transportation method may further include a step of the personal mobility server 8212 transmitting information about the expected entrance point of the shared vehicle 10*a* to the personal mobility 20*a* and a step of the personal mobility server 8212 transmitting a signal to the personal mobility 20*a* such that the personal mobility moves to the expected entrance point. For example, the personal mobility server 8212 may transmit a signal to the personal mobility 20*a* such that the personal mobility 20*a* moves to the expected entrance point in the state in which the article according to the article delivery request signal of the user is loaded in the personal mobility 20*a*. In this case, the personal mobility server 8212 may request the personal mobility 20*a* to move the point at which the article according to the article delivery request signal of the user is acquired before moving to the expected entrance point.

Figure 84:
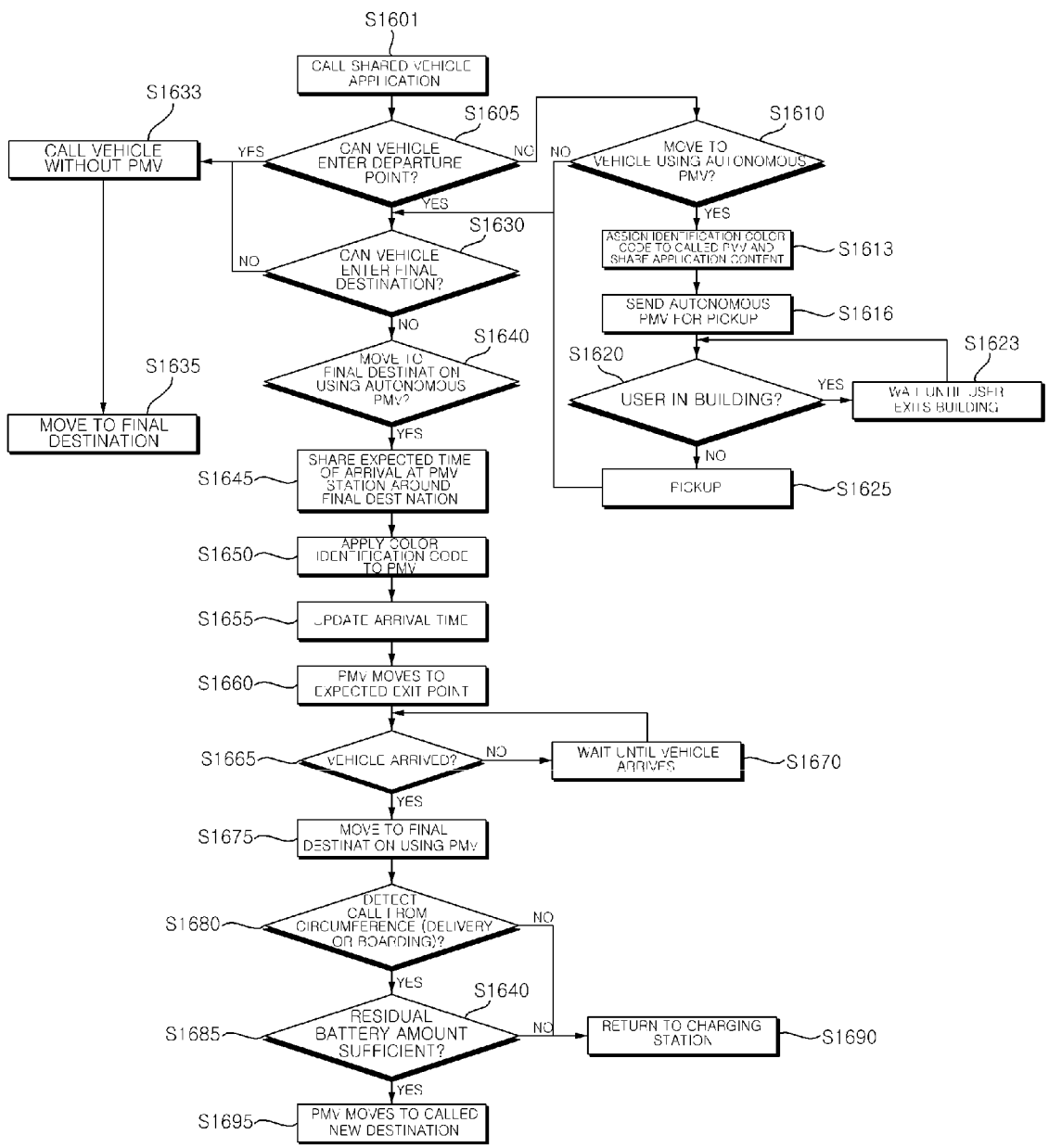
FIG. 84 is an exemplary flowchart of the user transportation system according to the embodiment of the present disclosure.

FIG. 84 is an exemplary flowchart of the user transportation system according to the embodiment of the present disclosure. FIG. 84 is a flowchart of the user transportation system 8200 of FIG. 82*b*.

FIG. 85 is a reference view illustrating the use of the shared vehicle and the personal mobility based on a route according to an embodiment of the present disclosure.

Referring to FIGS. 84 and 85, the user terminal 390*a* may request a shared vehicle from an initial departure point to a final destination 8540. The user transportation server 8214 may assign a shared vehicle 10*a* to a user who requested the same (S1601).

The user transportation server 8214 may determine whether the departure point 8505 is the point that the shared vehicles 10*a* and 10*b* can enter (S1605).

Upon determining that the departure point 8505 is the point that the vehicles cannot enter, the user transportation server 8214 may confirm whether to use the personal mobilities 20*a* and 20*b* through the user terminal 390*a* (S1610).

Upon confirming that the personal mobilities 20*a* and 20*b* are used, the user transportation server 8214 may call any one 20*a* of the personal mobilities 20*a* and 20*b*, and may assign an identification color code to the called personal mobility 20*a*. The user transportation server 8214 may provide information about the identification color code to the user terminal 390*a* (S1613).

The user transportation server 8214 may provide a signal such that the personal mobility 20*a* moves to the initial departure point 8505 (S1616).

The user transportation server 8214 may determine whether the user is in a building (S1620). Upon determining that the user is in the building, the user transportation server 8214 may have the personal mobility 20*a* waiting until the user exits the building (S1623). Upon determining that the user is outside the building, the user transportation server 8214 may provide a signal such that the personal mobility 20*a* moves to the expected entrance point 8520.

The user transportation server 8214 may determine whether the final destination 8540 is the point that the shared vehicles 10a and 10b can enter (S1630).

Upon determining that the shared vehicles 10a and 10b can enter, the user transportation server 8214 may call any one 10a of the shared vehicles 10a and 10b (S1633).

The user transportation server 8214 may provide a signal such that the shared vehicle 10a moves to the final destination 8540 in the state in which the user enters at the expected entrance point 8520 (S1635).

Upon determining at step S1630 that the shared vehicles 10a and 10b cannot enter, the user transportation server 8214 may confirm whether to use the personal mobilities 20a and 20b through the user terminal 390a (S1640).

Upon confirming that the personal mobilities 20a and 20b are used, the user transportation server 8214 may share the expected time of arrival at a station around the final destination 8540 (S1645). The station may charge the batteries of the personal mobilities 20a and 20b while taking custody of the personal mobilities 20a and 20b.

The user transportation server 8214 may apply a color identification code to any one 20a of the personal mobilities 20a and 20b (S1650).

The user transportation server 8214 may update the expected time of arrival to the exit point (S1655).

The user transportation server 8214 may transmit a signal to the personal mobility 20a such that the personal mobility 20a moves to the expected exit point 8530 of the shared vehicle 10a (S1660).

The user transportation server 8214 may determine whether the shared vehicle 10a arrives at the expected exit point 8530 (S1665). In the case in which the shared vehicle 10a does not arrive, the user transportation server may provide a signal to the personal mobility 20a such that the personal mobility 20a waits at the expected exit point 8530 until the shared vehicle arrives (S1670).

Upon determining that the shared vehicle 10a arrives at the expected exit point 8530, the user transportation server 8214 may transmit a signal to the personal mobility 20a such that the personal mobility 20a moves from the expected exit point 8530 to the final destination 8540 in the state in which the user enters the personal mobility (S1675).

The user transportation server 8214 may detect a call of another user around the personal mobility 20a (S1680), and in the case in which there is no call of another user, the user transportation server may transmit a signal to the personal mobility 20a such that the personal mobility 20a returns to the station (S1690). In the case in which there is a call of another user, the user transportation server 8214 may determine whether the residual battery amount of the personal mobility 20a is sufficient (S1685). Upon determining that the residual battery amount is sufficient, the user transportation server may provide a signal to the personal mobility 20a such that the personal mobility 20a moves to a called new destination 8640 (S1695). Upon determining that the residual battery amount is not sufficient, the user transportation server may transmit a signal to the personal mobility 20a such that the personal mobility 20a returns to the station.

Figure 86:
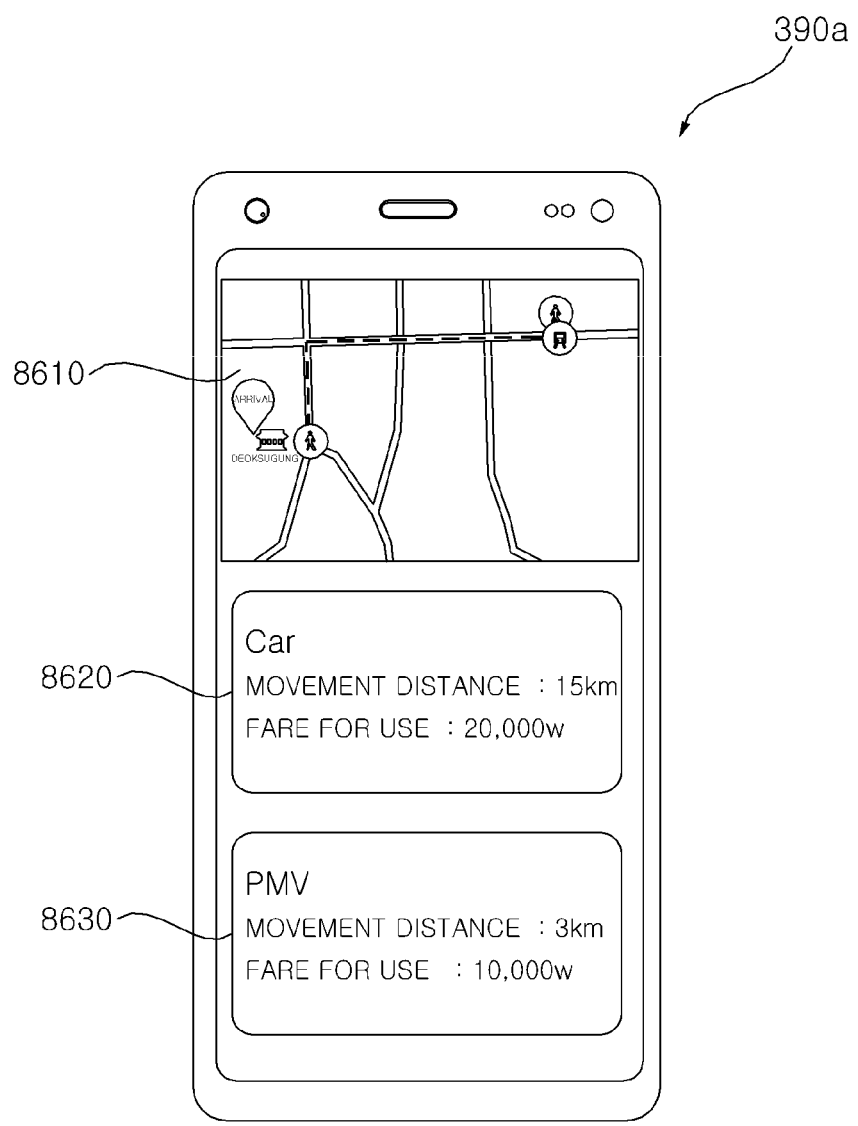
FIG. 86 is a reference view illustrating information provided by a user mobile terminal according to an embodiment of the present disclosure.

FIG. 86 is a reference view illustrating information provided by the user mobile terminal according to an embodiment of the present disclosure.

Referring to FIG. 86, at least one of the shared vehicle server 8211, the personal mobility server 8212, or the user transportation server 8214 may transmit information about a user transportation service to the user terminal 390a. At least one of the shared vehicle server 8211, the personal mobility server 8212, or the user transportation server 8214 may transmit movement route information, information about the use of the shared vehicle 10a, and information about the movement of the personal mobility 20a. The user terminal 390a may display information about the user transportation service. The user terminal 390a may display information 8610 about the route along which the user moved using the shared vehicle 10a and the personal mobility 20a. The user terminal 390a may display information 8620 about the movement distance using the shared vehicle 10a and a fare incurred for the use of the shared vehicle. The user terminal 390a may display information 8620 about the movement distance using the personal mobility 20a and a fare incurred for the use of the personal mobility.

Figure 87:
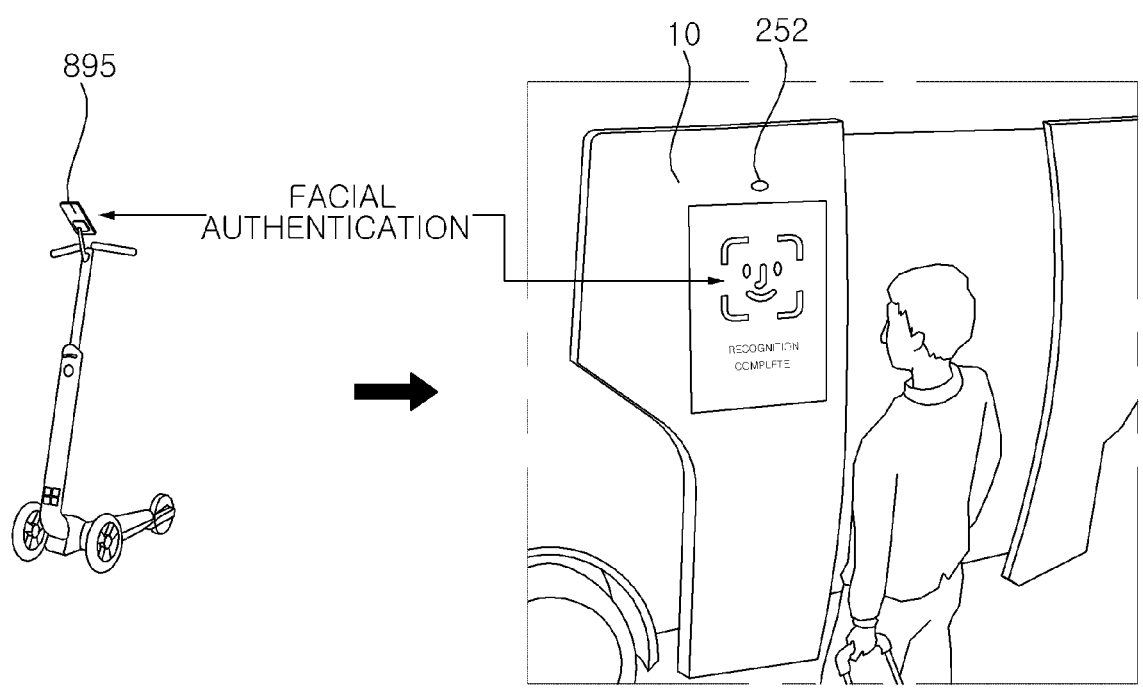
FIG. 87 is a reference view illustrating information sharing between a shared vehicle system and a personal mobility system according to an embodiment of the present disclosure.

FIG. 87 is a reference view illustrating information sharing between a shared vehicle system and a personal mobility system according to an embodiment of the present disclosure.

Referring to FIG. 87, the image device 8015 of the personal mobility 20 may acquire a user image. The personal mobility 20 may transmit the user image to the personal mobility server 8212. The personal mobility server 8212 (see FIG. 82a) may authenticate the user based on the received user image. The personal mobility server 8212 may share authentication information with the shared vehicle server 8211 and the shared vehicles 10a and 10b.

At least one of the internal camera 251 or the external camera 252 of the shared vehicle 10 may acquire a user image. The shared vehicle 10 may transmit the user image to the shared vehicle server 8211 (see FIG. 82a). The shared vehicle server 8211 may authenticate the user based on the received user image. The shared vehicle server 8211 may share authentication information with the personal mobility server 8212 and the personal mobilities 20a and 20b.

Figure 88:
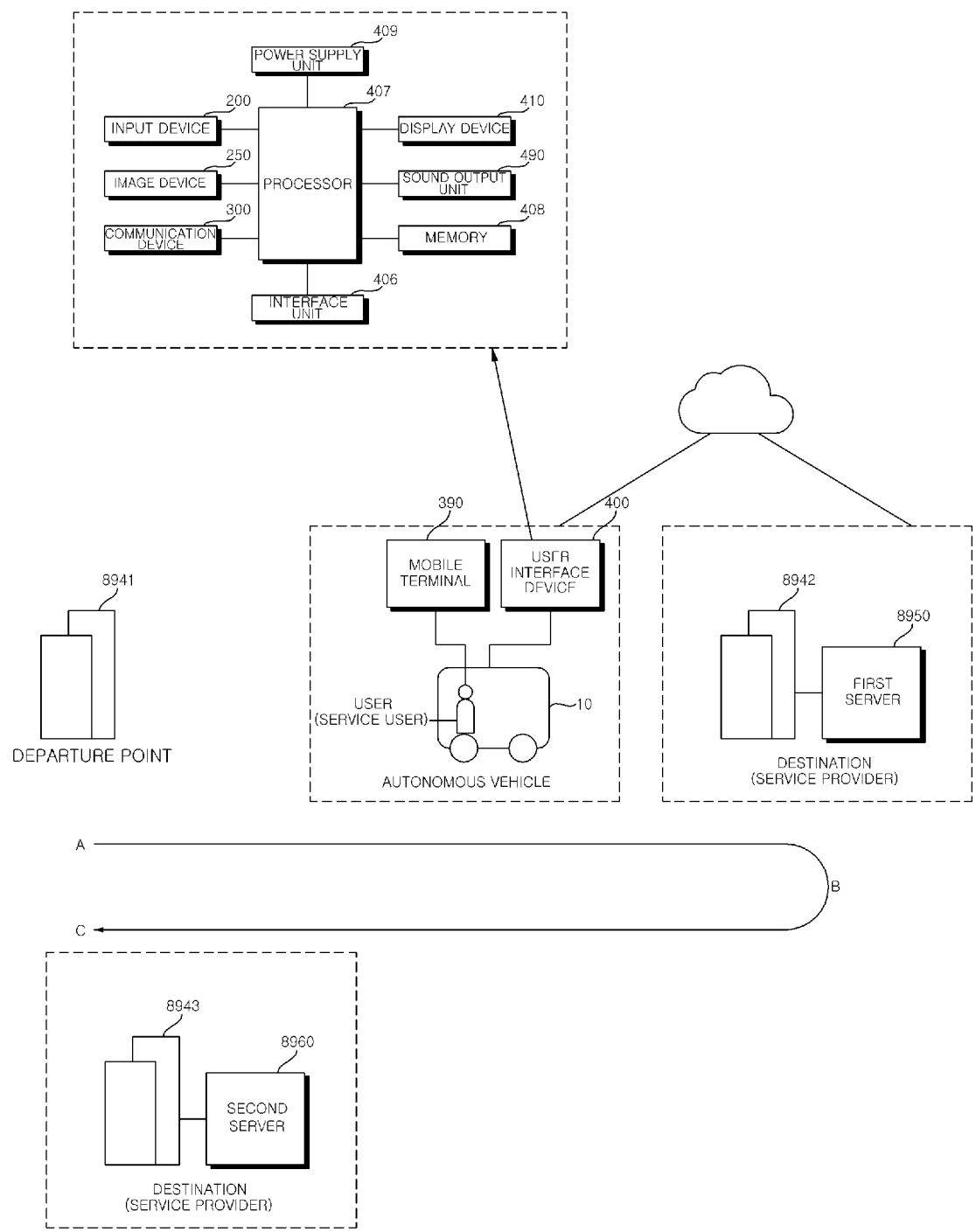
FIG. 88 is a reference view illustrating a destination service information provision system according to an embodiment of the present disclosure.

FIG. 88 is a reference view illustrating a destination service information provision system according to an embodiment of the present disclosure.

Referring to FIG. 88, the destination service information provision system may include a user terminal 390, a shared vehicle server 8211 (see FIGS. 82a and 82b), a first server 8950, and a shared vehicle 10.

The user terminal 390 may receive user input. The user terminal 390 may receive user input having a first point as a destination. The user terminal 390 may transmit a signal corresponding to the user input having the first point as the destination to the shared vehicle server 8211.

The shared vehicle server 8211 may be referred to as an autonomous vehicle server. The autonomous vehicle server 8211 may set the first point requested through the user terminal 390 as the destination. The autonomous vehicle server 8211 may provide a signal such that the autonomous vehicle 10 moves to the first point in the state in which the user enters the autonomous vehicle 10.

The first server 8950 may transmit first prior information and first post information about a service provided at the first point to at least one of the shared vehicle server 8211 or the autonomous vehicle 10. The first server 8950 may reflect user data in order to generate data for service provision at the first point. The first server 8950 may acquire user feedback data corresponding to the data for service provision. The feedback data may be understood as data generated when the user uses the service provided at the first point. For example, the feedback data may include at least one of data generated when the user receives medical treatment, data generated when the user purchases a product, data generated when the user passes through an airport boarding gate, data generated when the user checks into a hotel, data generated when the user orders food, data generated when the user goes to work, data generated when the user attends, data generated when the user enters a sports center or a theater, or data generated when the user hands over a product that is out of order to a service center. The first server 8950 may generate first post information based on the feedback data.

The shared vehicle 10 may be referred to as an autonomous vehicle. The autonomous vehicle 10 may receive prior information from the first server 8950 while moving to the first point based on the signal received from the autonomous vehicle server 8211. The autonomous vehicle 10 may output the prior information through at least one display 411, 412, or 413. The autonomous vehicle 10 may acquire user input corresponding to the prior information. The autonomous vehicle 10 may transmit user data based on the user input to the first server 8950. The autonomous vehicle 10 may generate charging data based on the user data. The autonomous vehicle 10 may transmit the charging data to the first server. The first server 8950 may perform payment based on the received charging data.

In some embodiments, the destination service information provision system may further include a second server 8960. The second server 8960 may provide second prior information about a service provided at a second point. The autonomous vehicle 10 may receive the second prior information while moving from the first point to the second point. In the case in which a condition is satisfied, the autonomous vehicle 10 may change the information output through the at least one display 411, 412, or 413 from the first post information to the second prior information.

The autonomous vehicle 10 may include a display system 400 (see FIG. 55). The display system 400 may function as a user interface device for vehicles that provides a function of interfacing between the autonomous vehicle 10 and a user. The display system 400 may be referred to as a user interface device for vehicles.

The vehicle 10 may move from a departure point 8941 to a first point 8942 in the state in which the user enters the vehicle. After arrival at the first point 8942, the user may use a service provided at the first point 8942. Subsequently, the vehicle 10 may move from the first point 8942 to a second point 8943. After arrival at the second point 8943, the user may use a service provided at the second point 8943.

As described with reference to FIG. 55, the user interface device 400 for vehicles may include an input device 200, an image device 250, a communication device 300, a display device 410, a sound output unit 490, an interface unit 406, a processor 407, a memory 408, and a power supply unit 409. The description of the display system 400 given with reference to FIGS. 55 to 67 may be applied to the user interface device 400 for vehicles. The user interface device 400 for vehicles will be described with reference to FIG. 88 and the following figures based on the differences from the display system 400 and the features thereof.

The input device 200 may convert user input into an electrical signal.

The communication device 300 may wirelessly exchange a signal with at least one server. For example, the communication device 300 may wirelessly exchange a signal with the first server 8950 and the second server 8960. The first server 8950 may be defined as a server that is used for service provision at the first point 8942. The second server 8960 may be defined as a server that is used for service provision at the second point 8943. Each of the first point 8942 and the second point 8943 may be at least one of a hospital, a store, an airport, a hotel, a restaurant, an office, a school, a sports center, a theater, or a service center.

At least one display 411, 412, or 413 may output information. For example, at least one display 411, 412, or 413 may output at least one of prior information or post information about a service provided at the first point 8942. For example, at least one display 411, 412, or 413 may output at least one of prior information or post information about a service provided at the second point 8943. The prior information may be defined as information that is provided to the user before arrival at the first point 8942 or the second point 8943. Alternatively, the prior information may be defined as information that is provided to the user before the use of a service provided at the first point 8942 or the second point 8943. The user may use a service provided at the first point 8942 or the second point 8943 based on the prior information. The post information may be defined as information that is provided to the user before departure from the first point 8942 or the second point 8943. Alternatively, the post information may be defined as information that is provided to the user after the use of the service provided at the first point 8942 or the second point 8943.

The interface unit 406 may exchange a signal with at least one electronic device mounted in the vehicle 10.

The processor 407 may receive the prior information about the service provided at the first point 8942 from the first server 8950 through the communication device 300 while the vehicle 10 moves to the first point 8942.

The processor 407 may output the prior information through at least one display 411, 412, or 413.

The processor 407 may acquire user input corresponding to the prior information. The processor 407 may acquire user input through at least one of the input device or the communication device. For example, the processor 407 may receive an electrical signal generated by the input device in order to acquire user input. The processor 407 may receive an electrical signal converted by the mobile terminal 390 through the communication device 300 in order to acquire user input.

The processor 407 may transmit the user data based on the user input to the first server 8950 through the communication device 300.

The processor 407 may acquire personal information of the user through at least one of the input device 200 or the communication device 300, and may transmit the acquired personal information to the first server 8950 through the communication device 300.

The processor 407 may receive the post information about the service provided at the first point 8942 from the first server 8950 through the communication device 300 while the vehicle 10 moves from the first point 8942 to the second point 8943. The processor 407 may output the post information through the display 411, 412, or 413. The post information may be understood as information different from the prior information.

The processor 407 may receive the prior information about the service provided at the second point 8943 from the second server 8960 through the communication device 300 while the vehicle 10 moves from the first point 8942 to the second point 8943. In the case in which a condition is satisfied, the processor 407 may control the display 411, 412, or 413 such that the post information about the service provided at the first point 8942, displayed on the display 411, 412, or 413, is changed to the prior information about the service provided at the second point 8943.

Meanwhile, the condition may be a first condition, in which the distance value from the first point 8942 to the vehicle 10 is greater than the distance value from the second point 8943 to the vehicle 10. The condition may be a second condition, in which user input having the second point 8943 set as a destination is received. The condition may be a third condition, in which user input for exiting a screen related to the first point 8942 is received.

The processor 407 may acquire data related to user intention about the use of the service provided at the first point 8942 from at least one electronic device mounted in the vehicle 10. In the case in which first data related to intention of not using the service provided at the first point 8942 are acquired, the processor 407 may stop the output of the prior information. The first data may be data generated by a user motion of leaning the seat from at least one of a seat position sensor or the internal camera.

Figure 89:
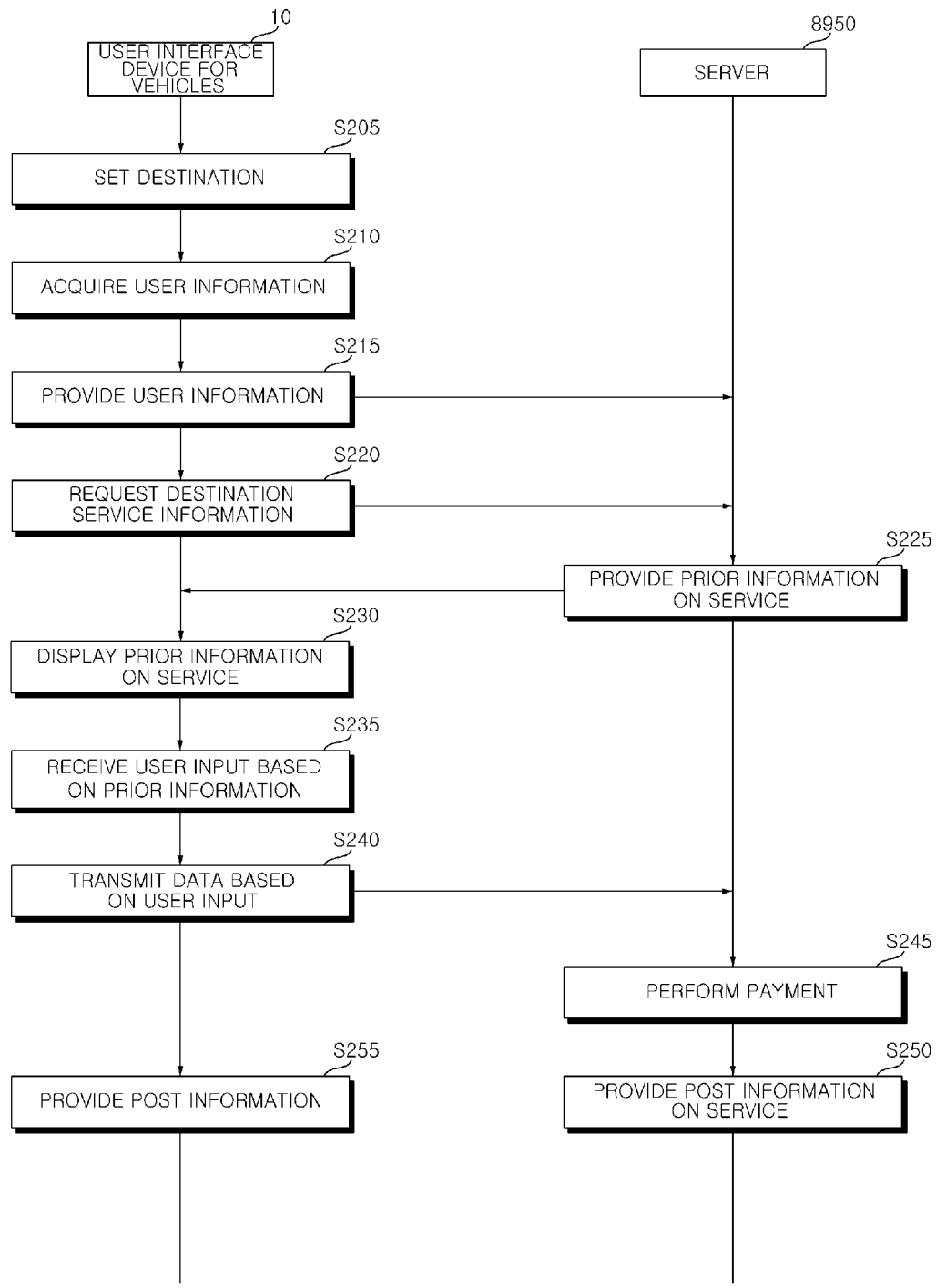
FIG. 89 is an exemplary flowchart of the destination service information provision system according to the embodiment of the present disclosure.

FIG. 89 is an exemplary flowchart of the destination service information provision system according to the embodiment of the present disclosure.

Referring to FIG. 89, the processor 407 may set a destination (S205). The processor 407 may set the destination based on user input through the input device 200. The processor 407 may receive user input, performed through the mobile terminal 390, through the communication device 300 in order to set the destination. Meanwhile, the destination may be understood as the first point 8942.

The processor 407 may acquire user information (S210). The processor 407 may acquire the user information based on user input through the input device. The processor 407 may acquire the user information from the mobile terminal 390. The user information may include at least one of user personal information, user authentication information, user biometric information, user body information, or user service history information.

The processor 407 may request destination service information (S220). For example, upon determining that the distance between the vehicle and the destination is equal to or less than a reference value, the processor 407 may request the destination service information. For example, upon determining that the expected time of arrival at the destination is equal to or less than a reference value, the processor 407 may request the destination service information.

In the case in which a request from the user interface device 400 for vehicles is received, the first server 8950 may provide prior information of a service to the user interface device 400 for vehicles (S225).

The processor 407 may display the prior information of the service on the display 411, 412, or 413 (S230). For example, the processor 407 may stop the playback of content that the user is watching, and may display the prior information of the service. For example, the processor 407 may display content that the user is watching in the first area of the display 411, 412, or 413, and may display the prior information of the service in the second area thereof.

The processor 407 may receive user input based on the prior information (S235).

The processor 407 may transmit user data based on the user input to the first server 8950 through the communication device 300 (S240).

The vehicle 10 may arrive at the destination, and the first server 8950 may provide a service. The first server 8950 may perform payment for the service (S245). In some embodiments, the payment system 700 of the cabin system 100 may generate, in advance, charging data about a service provided using the first server 8950 based on the user input data. The first server 8950 may perform payment based on the charging data.

The first server 8950 may provide post information of the service to the user interface device 400 for vehicles (S250).

The processor 407 may receive the post information through the communication device 300, and may display the post information of the service (S255).

FIGS. 90a and 90b are views exemplarily showing service information provided based on a destination according to an embodiment of the present disclosure.

Referring to FIG. 90a, the first point 8942 or the second point 8943 may be a hospital. Depending on circumstances, the hospital may become the first point 8942 or the second point 8943. Prior information of a service provided at the first point 8942 or the second point 8943 may include at least one of hospital reception status information, waiting list information, or information about medical staff in charge. User data may include at least one of patient medical data for reception, dosage data before medical treatment, medical examination data, temperature data, pulse data, or blood pressure data. Post information of the service provided at the first point 8942 or the second point 8943 may include at least one of dosage information after medical treatment, information about confirmation in reception of medical supplies, information related to diseases, nutrition information, or booking information.

Meanwhile, in some embodiments, the cabin system 100 may further include a healthcare sensor. The healthcare sensor may generate information about at least one of temperature, pulse, or blood pressure of a user. The processor 407 may transmit the information about at least one of temperature, pulse, or blood pressure of the user generated by the healthcare sensor to the first server 8950.

The first point 8942 or the second point 8943 may be a store, such as a department store, a supermarket, or a grocery store. Depending on circumstances, the store may become the first point 8942 or the second point 8943. Prior information of a service provided at the first point 8942 or the second point 8943 may include at least one of new product information, seasonal fruit information, popular product information, or sales information. User data may include at least one of user body data, SNS data, wish product data, or data about membership particulars. Post information of the service provided at the first point 8942 or the second point 8943 may include at least one of information related to a purchased product or delivery service information.

The first point 8942 or the second point 8943 may be an airport. Depending on circumstances, the airport may become the first point 8942 or the second point 8943. Prior information of a service provided at the first point 8942 or the second point 8943 may include at least one of terminal information, airline information, delayed arrival information, airport use information, or pre-check in information. User data may include at least one of booked air ticket data, passport data, user biometric authentication data, or baggage data. Post information of the service provided at the first point 8942 or the second point 8943 may include at least one of use satisfaction survey information or jet lag settlement information.

The first point 8942 or the second point 8943 may be a hotel. Depending on circumstances, the hotel may become the first point 8942 or the second point 8943. Prior information of a service provided at the first point 8942 or the second point 8943 may include at least one of pre-check in information, available room information, concierge service information, tour information, linked service information, or information about services by lodging type. User data may include at least one of data about membership particulars, passport data, user biometric authentication data, user state information, baggage information, preference environment data, or fellow passenger data. Post information of the service provided at the first point 8942 or the second point 8943 may include at least one of use satisfaction survey information or membership update information.

The first point 8942 or the second point 8943 may be a restaurant, such as a drive-through café or a restaurant. Depending on circumstances, the restaurant may become the first point 8942 or the second point 8943. Prior information of a service provided at the first point 8942 or the second point 8943 may include at least one of menu information, preparation status information, vehicle entry congestion information, or expected waiting time information. User data may include at least one of selection menu data, movement route data, expected chain store data, or payment data. Post information of the service provided at the first point 8942 or the second point 8943 may include use satisfaction survey information.

Referring to FIG. 90b, the first point 8942 or the second point 8943 may be an office. Depending on circumstances, the office may become the first point 8942 or the second point 8943. Prior information of a service provided at the first point 8942 or the second point 8943 may include at least one of schedule information, company-related news information, or company mail system access information. User data may include at least one of entrance authority proof data or biometric authentication data. Post information of the service provided at the first point 8942 or the second point 8943 may include next day schedule information.

The first point 8942 or the second point 8943 may be a school. Depending on circumstances, the school may become the first point 8942 or the second point 8943. Prior information of a service provided at the first point 8942 or the second point 8943 may include at least one of prerequisite learning information, class timetable information, school supply information, home record information, official announcement information, or extracurricular activity information. User data may include identification data. Post information of the service provided at the first point 8942 or the second point 8943 may include at least one of home record information, official announcement information, study summary information, extracurricular activity information, or supplementary lesson information.

The first point 8942 or the second point 8943 may be a sports center. Depending on circumstances, the sports center may become the first point 8942 or the second point 8943. Prior information of a service provided at the first point 8942 or the second point 8943 may include at least one of sport item information, instructor information, or information about sports recommended by body type. User data may include at least one of body data, wish sport data, or SNS data. Post information of the service provided at the first point 8942 or the second point 8943 may include at least one of information related to eating habits or supplementary sport information.

The first point 8942 or the second point 8943 may be a theater, such as a movie theater or concert hall. Depending on circumstances, the theater may become the first point 8942 or the second point 8943. Prior information of a service provided at the first point 8942 or the second point 8943 may include at least one of theater snack sales menu information, theater location information, performance-related advertising information, or recommended performance list information. Performance may be a concept including showing of a movie, performance of a play, music performance, and performance of a musical play. User data may include at least one of booking data, wish performance data, data about viewing particulars, or fellow passenger data. Post information of the service provided at the first point 8942 or the second point 8943 may include at least one of scheduled performance information, booking information, or performance grade information.

The first point 8942 or the second point 8943 may be a service center. Depending on circumstances, the service center may become the first point 8942 or the second point 8943. Prior information of a service provided at the first point 8942 or the second point 8943 may include at least one of a service engineer information or information about measures by symptom. User data may include at least one of customer data, service-requested product data, or symptom data. Post information of the service provided at the first point 8942 or the second point 8943 may include at least one of use satisfaction survey information or revisit schedule information.

Figure 91A:
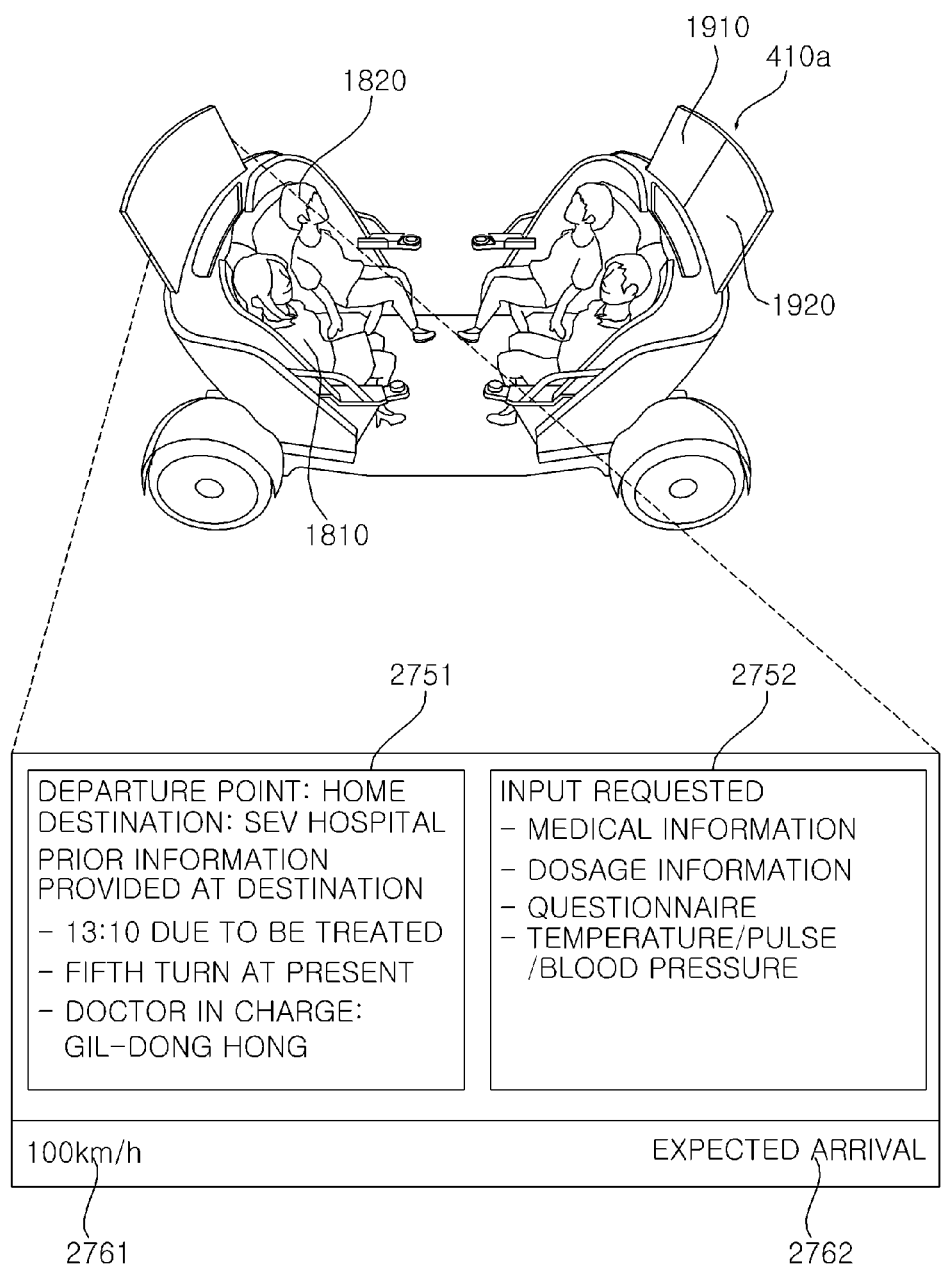
FIGS. 91a to 91c are views exemplarily showing service information provided by a user interface device for vehicles according to an embodiment of the present disclosure.
Figure 91B:
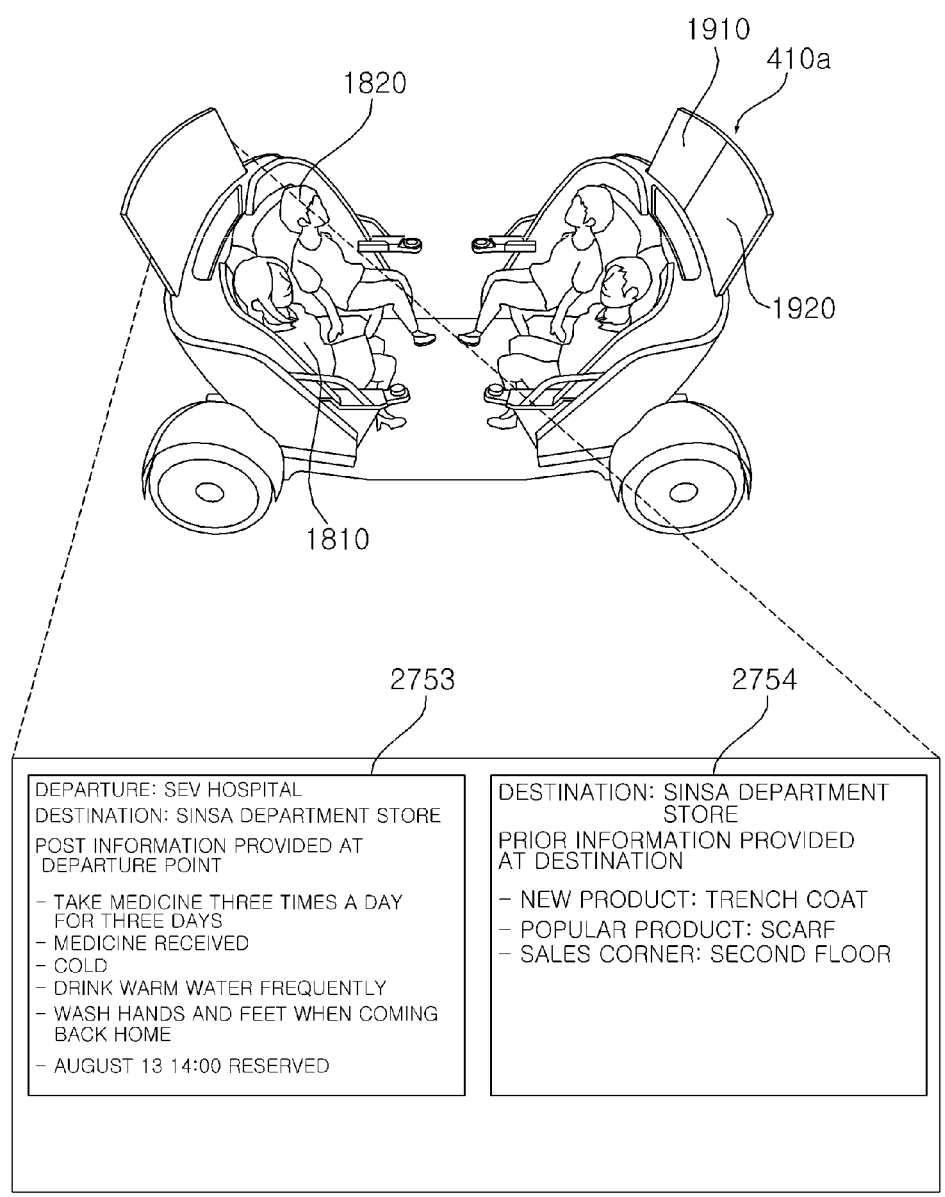
Figure 91C:
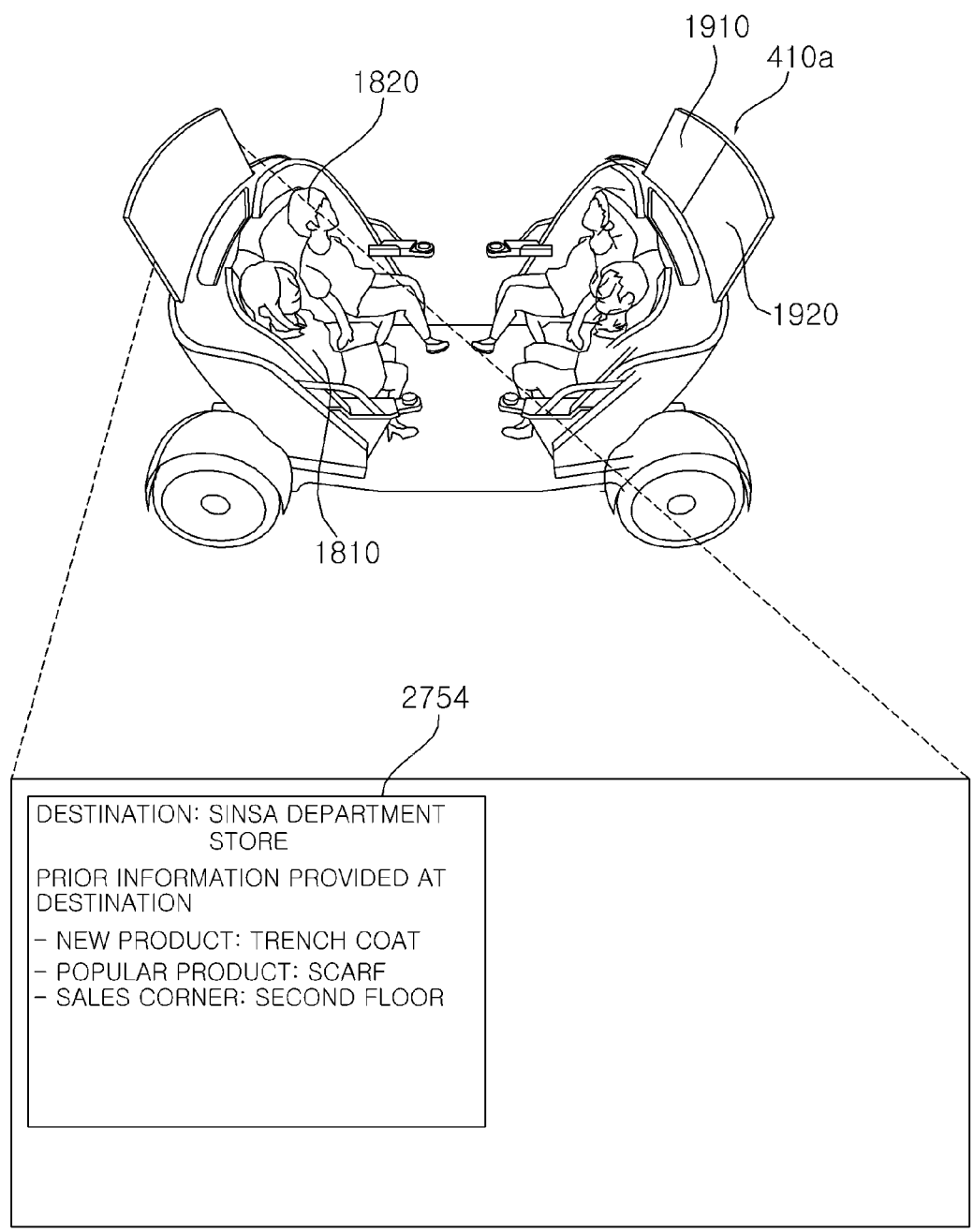

FIGS. 91a to 91c are views exemplarily showing service information provided by the user interface device for vehicles according to an embodiment of the present disclosure.

As exemplarily shown in FIG. 91a, the processor 407 may display prior information 2751 of a service provided by the first server 8950 on the display 411, 412, or 413 while the vehicle 10 moves from the departure point to the first point 8942. The prior information 2751 is the same as what was described with reference to FIGS. 90a and 90b. The processor 407 may request user input in response to the prior information 2751 (2752). The processor 407 may receive the user input through the input device 200, and may generate user data based on the user input. The user data are the same as what was described with reference to FIGS. 90a and 90b.

Meanwhile, the processor 407 may display traveling speed information 2761 of the vehicle 10 in a portion of the display 411, 412, or 413. The processor 407 may display information 2762 about the expected time of arrival at the first point 8942 in a portion of the display 411, 412, or 413.

Meanwhile, the processor 407 may provide a signal for adjusting the traveling speed of the vehicle 10 to at least one electronic device (e.g. ECU) provided in the vehicle such that the vehicle arrives at the first point 8942 on the service booking time of the first point 8942.

As exemplarily shown in FIG. 91b, the processor 407 may display post information 2753 of the service provided by the first server 8950 on the display 411, 412, or 413 while the vehicle 10 moves from the first point 8942 to the second point 8943. The post information 2753 is the same as what was described with reference to FIGS. 90a and 90b. The processor 407 may display prior information 2754 of a service provided by the second server 8960 on the display 411, 412, or 413. The prior information 2754 is the same as what was described with reference to FIGS. 90a and 90b.

Meanwhile, the processor 407 may display both the post information 2753 of the first server 8950 and the prior information 2754 of the second server 8960 on the display 411, 412, or 413.

As exemplarily shown in FIG. 91c, the processor 407 may change the post information 2753 of the first server 8950, displayed on the display 411, 412, or 413, to the prior information 2754 of the second server 8960 according to a predetermined condition.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g. data transmission over the Internet). In addition, the computer may include a processor or a controller. Thus, the above detailed description should not be construed as being limited to the embodiments set forth herein in all terms, but should be considered by way of example. The scope of the present disclosure should be determined by the reasonable interpretation of the accompanying claims and all changes in the equivalent range of the present disclosure are intended to be included in the scope of the present disclosure.

The invention claimed is:

1. A user interface device for vehicles comprising:
a communication device configured to wirelessly exchange a signal with at least one server;
at least one display; and
at least one processor configured to:
receive first prior information of a first service provided at a first point from a first server through the communication device while a vehicle moves to the first point;
output the first prior information through the display;
acquire user input corresponding to the first prior information; and
transmit, to the first server through the communication device, user data based on the user input,
wherein the processor is further configured to:
receive, through the communication device, (i) first post information of the first service from the first server and (ii) second prior information of a second service provided at a second point from a second server while the vehicle moves from the first point to the second point,
display the first post information different from the first prior information through the display, and
control the display such that the first post information displayed on the display is changed to the second prior information based on a condition being satisfied.

2. The user interface device according to claim 1, further comprising:
an input device configured to convert the user input into an electrical signal, wherein
the processor is configured to acquire the user input through at least one of the input device or the communication device.

3. The user interface device according to claim 2, wherein the processor is configured to:
acquire personal information of a user through at least one of the input device or the communication device; and
transmit the personal information to the first server through the communication device.

4. The user interface device according to claim 1, wherein the condition is at least one of:
a first condition, in which a distance value from the first point to the vehicle is greater than a distance value from the second point to the vehicle;
a second condition, in which user input having the second point set as a destination is received; or
a third condition, in which user input for exiting a screen related to the first point is received.

5. The user interface device according to claim 1, further comprising:
an interface unit configured to exchange a signal with at least one electronic device mounted in the vehicle,
wherein the processor is configured to:
acquire data related to user intention about use of the first service from the electronic device; and
stop output of the first prior information in a case in which first data related to intention of not using the first service is acquired, and
wherein the first data is data generated by a user motion of leaning a seat from at least one of a seat position sensor or a camera in a cabin.

6. A destination service information provision system comprising:
a user terminal configured to receive user input;
an autonomous vehicle server configured to set a first point requested through the user terminal as a destination;
a first server configured to transmit first prior information and first post information of a first service provided at the first point;
a second server configured to provide second prior information of a second service provided at a second point, and
an autonomous vehicle configured to:
receive the first prior information based on a signal received from the autonomous vehicle server while moving to the first point;
output the first prior information through at least one display implemented in the autonomous vehicle, acquire user input corresponding to the first prior information, and transmit user data based on the user input to the first server;
receive the first post information and the second prior information while moving from the first point to the second point;
output the first post information through the display; and
change the information output through the display from the first post information to the second prior information based on a condition being satisfied.

7. The destination service information provision system according to claim 6, wherein the first server is configured to reflect the user data in order to generate data for service provision at the first point.

8. The destination service information provision system according to claim 6, wherein the first server is configured to:
acquire user feedback data corresponding to the data for service provision; and
generate the first post information based on the feedback data.

9. The destination service information provision system according to claim 6, wherein the autonomous vehicle is configured to (i) generate charging data based on the user data and (ii) transmit the charging data to the first server, and
wherein the first server is configured to perform payment based on the charging data.

10. A user interface device for vehicles comprising:
a communication device configured to wirelessly exchange a signal with at least one server;
at least one display;
an interface unit configured to exchange a signal with at least one electronic device mounted in the vehicle; and
at least one processor configured to:

receive first prior information of a first service provided at a first point from a first server through the communication device while a vehicle moves to the first point;
output the first prior information through the display;
acquire user input corresponding to the first prior information; and
transmit, to the first server through the communication device, user data based on the user input,
wherein the processor is further configured to:
  acquire data related to user intention about use of the first service from the electronic device; and
  stop output of the first prior information based on first data related to user intention not to use the first service being acquired, and
  wherein the first data is data generated by a user motion of leaning a seat from at least one of a seat position sensor or a camera in a cabin.

11. The user interface device according to claim 10, further comprising:
an input device configured to convert the user input into an electrical signal, wherein
the processor is configured to acquire the user input through at least one of the input device or the communication device.

12. The user interface device according to claim 11, wherein the processor is configured to:
acquire personal information of a user through at least one of the input device or the communication device; and
transmit the personal information to the first server through the communication device.

* * * * *